United States Patent [19]

Ferguson et al.

[11] Patent Number: 4,816,833
[45] Date of Patent: Mar. 28, 1989

[54] PULSE DOPPLER SURVEILLANCE POST SIGNAL PROCESSING AND SCAN TO SCAN CORRELATION

[75] Inventors: Kenneth H. Ferguson, Centreville; Bobby J. Gatlin, Glen Burnie; Philip Real, Baltimore; Joseph L. Conroy, Ellicott City; James P. Ehrman, Catonsville, all of Md.

[73] Assignee: Westinghouse Electric Corp., Pittsburgh, Pa.

[21] Appl. No.: 62,912

[22] Filed: Jun. 16, 1987

[51] Int. Cl.$^4$ .................. G01S 7/44; G01S 13/18; G01S 13/72
[52] U.S. Cl. ................... 342/95; 342/90; 342/108; 342/145
[58] Field of Search ............... 342/95, 108, 115, 195; 364/516, 517

[56] References Cited

U.S. PATENT DOCUMENTS 3,699,573 10/1972 Andrews et al. .
4,106,019 8/1978 Alexander et al. .

OTHER PUBLICATIONS

O'Donnell et al, *Automated Tracking for Aircraft Surveillance Systems,* Jul. 1979, AES-15, No. 4, IEEE Trans. on Aero & Elec. Systems.

*Primary Examiner*—Theodore M. Blum
*Assistant Examiner*—Gilbarto Barrón, Jr.
*Attorney, Agent, or Firm*—W. G. Sutcliff

[57] ABSTRACT

Post detection processing for a pulse doppler surveillance radar is disclosed wherein target reports having ambiguous ranges along with those containing unambiguous ranges are used for tracking targets. The tracking includes a maneuver recognition mechanism for adaptively weighting the range, range rate, and X and Y coordinate driving errors as a function of the maneuvering and non-maneuvering operations of the target.

24 Claims, 14 Drawing Sheets

FIG. 8.

PULSE DOPPLER SURVEILLANCE POST SIGNAL PROCESSING AND SCAN TO SCAN CORRELATION

BACKGROUND OF THE INVENTION

1. Field of Invention

The present invention relates to radar detection and automatic tracking; and more particularly, to a surveillance pulse Doppler radar system and method using scan to scan correlation for the detection and tracking of maneuvering and non-maneuvering targets.

2. Background of Invention

A pulsed radar system that extracts the Doppler frequency shift of return radar pulses for the purpose of detecting moving targets, and determining their radial velocity, is referred to as a pulse Doppler radar. A pulse Doppler radar transmits, repetitively, modulated pulses for a certain time duration, which is referred to as the dwell time of the radar. The time period between each pulse or modulation is the interpulse period, and determines the pulse repetition frequency (PRF). It is common practice to vary the interpulse periods, thus providing several pulse repetition frequencies or PRF's. Such radar systems typically have a relatively high PRF in order to prevent ambiguities in the Doppler frequency shift. However, in preventing ambiguity of the Doppler frequency shift, such relatively high PRF's result in range ambiguities.

Pulse Doppler radar systems are presently used in airborne surveillance systems, which have a highly directional antenna that scans mechanically in azimuth at approximately six revolutions per minute; and in some modes, simultaneously scans electronically in elevation.

In typical prior art systems, it is customary to reject main beam clutter by filtering the output of an A/D converter for rejecting signals which are Doppler shifted by an amount corresponding to such main beam clutter. Hence, the main beam clutter, which has a predictable Doppler shift, is rejected by a band pass (notch) filter. The time domain signals are then transformed to the Doppler domain by the use of an FFT (Fast Fourier transform). The output of the filter bank is fed into a constant false alarm rate (CFAR) threshold circuit. This threshold, in prior art systems, was required to be sufficiently high to reject most of the undesired signals. Moreover, the CFAR is relatively ineffective against clutter signals. Each detected range gate filter out of the CFAR is Doppler centroided; and is then subjected to post-detection processing, wherein the filters are unfolded and normalized to a single PRF, to determine unambiguous radial velocity with multiple PRF's. The detected signals are then correlated in Doppler and range using multiple PRF's. In current airborne surveillance radars, a detection on three (3 of 3) successive PRF's is required before a correlation is declared. Correlations of 2 out of 3, or 2 out of 2 return signals are not considered to be correlations. Although the results of using the most severe post-detection processing (3 of 3) is effective in preventing false alarms and providing excellent performance on today's airborne threat, it is insufficient to provide an acceptable blip/scan ratio for future threats.

The low blip/scan ratio results in an inordinate use of the "coast" feature in radar tracking; that is, the feature where the predicted position of a target is extrapolated upon the failure to detect a target on one or more scans. In such situations, a maneuvering target is difficult to track with a ten second data interval.

SUMMARY OF THE INVENTION

One of the objects of the present invention is to provide an improved pulse Doppler surveillance radar system and method of processing received signals to improve the detection range of the radar.

A further object of the present invention is to provide a pulse Doppler surveillance radar system and method with an improved blip/scan ratio, while at the same time providing a reduction in false alarms, and thus false tracks.

A still further object of the present invention is to provide a pulse Doppler radar system and method that accurately tracks a multitude of targets whether in a non-maneuvering or maneuvering mode.

A still further object of the present invention is to provide a method and system of tracking airborne targets in a surveillance radar that accurately switches between non-maneuvering and maneuvering target modes without excessive perturbation or loss of track.

Additional objects and advantages of the invention will be set forth in the description that follows and in part will be obvious from the description, or may be learned by practice of the invention. The objects and advantages of the invention may be realized and obtained by means of the instrumentalities and combinations particularly pointed out in the appended claims.

To achieve the foregoing objects, in accordance with the purposes of the invention as embodied and broadly described herein, there is provided a method of processing detected signals in a pulse Doppler radar system for tracking targets wherein said system has a directional antenna that scans in azimuth for repetitively collecting return signals from respective targets during successive scans, which method comprises the steps of determining the range and Doppler of signals exceeding a selected threshold level during each dwell of the antenna; correlating the Doppler of such detected signals on successive dwells to determine both ambiguous and unambiguous ranges of each correlation; and tracking the movement of each individual target using unambiguous and ambiguous ranges of each Doppler correlation.

Preferably, a method of processing detected signals in a pulse Doppler radar system for automatically tracking targets is provided wherein said system has a directional antenna for repetitively collecting return signals from respective targets during successive scans, such method includes determining the range and Doppler of signals exceeding a selected threshold level during each dwell of the antenna; correlating the Doppler on successive dwells to determine ambiguous and unambiguous ranges of each Doppler correlation; selecting the Doppler correlations corresponding to ambiguous ranges in accordance with predetermined criteria; and tracking the movement of individual targets on successive scans of the antenna using the selected ambiguous ranges and the unambiguous range.

In one specific aspect, the step of selecting the ambiguous range correlations includes rejecting target reports corresponding to ambiguous ranges where at least one of the detections formed part of an unambiguous range target report.

In another preferable aspect, the step of selecting the ambiguous ranges includes rejecting the ambiguous range correlation where one of the dwells is not range gate eclipsed.

In still another preferable aspect, the step of selecting the ambiguous range of the target reports includes rejecting filter correlations failing to have an amplitude ratio consistent with beam shape modulation.

In a further preferable aspect, the step of selecting the ambiguous ranges of the target reports includes selecting target reports detected on three adjacent range gates on two or more of three dwells for recognizing the range gate straddle pair having the correct target range as compared to a ghost range.

In a still further preferable aspect, the step of selecting ambiguous ranges of target reports includes eliminating target reports failing to have an amplitude ratio consistent with beam shape modulation where two or more of such targets are detected at the same velocity.

In a still further preferable aspect, the step of selecting the ambiguous ranges of target reports includes merging target reports having the same range but different Doppler that come from adjacent sets of modulation periods as being indicative of jet engine modulation.

In a still further preferable aspect, the step of selecting ambiguous ranges of target reports includes extending single range rate reports that have a predetermined number of modulation periods between target reports.

In a still further aspect of the invention, a method is provided of tracking targets detected with a pulse Doppler radar having a directional antenna that scans in azimuth for detecting targets during successive scans that comprises the step of determining the range, range rate, X coordinate and Y coordinate driving errors of a target report on each scan of the antenna and the step of predicting during a current scan the coordinates of a target report for a subsequent scan for correctly assigning the target report to a target track during the subsequent scan. The step of predicting includes adaptively weighting the range, range rate, X and Y coordinate driving errors as a function of one of the maneuvering and non-maneuvering operations of a target during the current scan where the driving errors are formed by subtracting the predicted values for the current scan from the actual values obtained from the target report during the current scan.

The accompaning drawings, which are incorporated in and constitute a part of this specification, illustrate one embodiment of the invention and together with the description, serve to explain the principles of the invention.

BRIEF DESCRIPTION OF THE DRAWINGS

FIG. 8 is a diagram illustrating a range straddling arrangement of individual modulations processed in the target processing function of the present invention;

DETAILED DESCRIPTION OF THE PREFERRED EMBODIMENT

In accordance with the present invention, there is provided a method and system of processing signals from a pulse Doppler radar system for tracking targets, wherein the system has a directional antenna that scans in azimuth for repetitively collecting such recurring signals from respective targets during successive scans.

Figure 1:
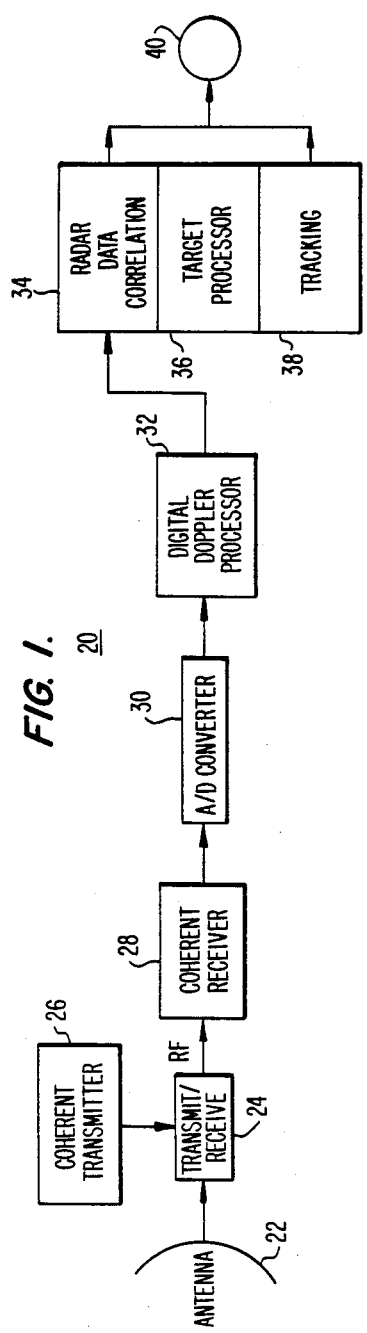
FIG. 1 is a block diagram illustrating a radar system incorporating the teachings of the present invention.

As embodied herein, and referring to FIG. 1, a pulse Doppler surveillance airborne radar system generally referred to at 20, preferably has a directional antenna 22 which scans in azimuth at approximately six revolutions per minute, thus providing a data sampling rate of 0.1 Hertz, for example. In pulse Doppler radar systems of the type exemplifying the teachings of the present invention, each transmitted pulse is coherent with respect to every other transmitted pulse, and the PRF is high enough to monitor high or low speed Doppler shifts in the return signals; such Doppler shift information may be used also to determine the radial velocity of a moving target. For example, a directional antenna 22 is connected through a transmit-receive (T-R) 24, coherent transmitter 26 and a coherent receiver 28. A signal from a stable oscillator (STALO) (not shown) of transmitter 26 is applied to receiver 28 for mixing the return signals supplied to the receiver 28 through antenna 22. The signals received by receiver 28 are then analog-to-digital converted at 30 for converting such values to a digital number, and passed to a digital Doppler processor 32.

The method and system of the present invention provides for determining azimuth angle, range, either ambiguous or unambiguous, and the Doppler shift of each return signal, exceeding a selected CFAR threshold during each dwell of the radar. As exemplified herein, and with further reference to FIG. 1, digital Doppler processor 32 includes a notch filter (not shown), which rejects those signals that are Doppler shifted by an amount corresponding to main beam ground cluter; and is mechanized in a well known manner. The signal is then Doppler filtered by an FFT process; and the result is passed to a CFAR (not shown). The CFAR has an adaptive threshold, which is raised or lowered, to adapt to clutter and noise signals, but such a technique is ineffective against strong discrete clutter signals. The CFAR output of the digital Doppler processor 32 provides the range gate filter cell, for each detected signal; the filter cell (Doppler shift) is used to determine the radial velocity of the detected signal. With the benefit of the present invention, the CFAR threshold of the previously mentioned CFAR circuit may be lower than that required for conventional methods or systems, which of course, will contribute to the improvement in the blip/scan ratio of the present invention.

The invention includes correlating signals from different PRF's to determine either ambiguous or unambiguous ranges during successive dwells of the radar. Such method steps may be implemented by a radar data correlator 34 as illustrated in FIG. 1 which functions to provide filter unfolding and normalization, filter correlation, and range resolution. As exemplified herein, data correlator 34 unfolds and normalizes each detected range gate filter cell into two filters with the same range cell to meet the Doppler envelope requirement. This unfolded and normalized set of filters is then tested for Doppler correlations. The detection rules exemplified by the present system, require three successive correlated detections to create a target report. Thus, the correlation of three detected signals on successive dwells represent a target report. Any fewer successive correlations in the present embodiment of the system will not create a target report.

In accordance with the present invention, any two out of three successive detected signals, in addition to any three successive detected signals which correlate in Doppler and range, will create a report to be used in further processing. The two out of three filter correlations have no more than four range ambiguities within the required radar range detection envelope. The two out of three successive detected signals may be divided into two classes. In one class, the filter correlation may occur on two adjacent dwells (2A/3); and in another class, the filter correlation may occur on two non-adjacent dwells (2N/3). Another way of looking at the filter correlation and range resolution processing is to consider that the filter correlation may occur on either two out of two (2/2) successive dwells or two out of three (2/3) successive dwells. The two out of two (2/2) or two out of three (2/3) correlations will result in several (up to four) ambiguous ranges; while the correlation or resolution of three (3/3) successive detected signals is tantamount to an unambiguous range.

The method according to the present invention includes selecting reports in accordance with a predetermined criteria to determine the best reports to declare as potential targets. As embodied herein, this step is preferably carried out by a target processor function 36, which function includes reference to correlated detections that involve either two out of two (2/2) successive correlated detections or two out of three (2/3) successive correlated detections as compared to three out of three (3/3) successive correlated detections. Such detections are termed "candidate reports" prior to their outputs from target processor 36. Target processor 36 includes range gate straddle elimination, range deghosting, jet engine modulation, report combining, and report extension as hereinafter described.

In summary, the radar detection processing function of the present invention includes all of the processing which converts the detected ambiguous range gate and filter cell into a target report that has no Doppler ambiguity and four or fewer range ambiguities within the range and Doppler envelope requirement of the radar system.

In accordance with the present invention, the invention further includes tracking the movement of individual targets during successive scans of the antenna in accordance with target reports having either unambiguous or ambiguous ranges. As embodied herein, such function is preferably implemented by a tracking and maneuver recognition function referred to at 38. Tracking function 38 preferably involves track initiation and correlation processing functions of the present invention including all processing involved in new track initialization and report-to-track correlation, as well as a target maneuver recognition function that recognizes when a target maneuvers. At the output of tracking and maneuver recognition system 38 is apparatus 40 for displaying and/or recording target reports and tracks obtained with the present invention.

Doppler correlator and range resolver 34, target processor 36, and tracking and maneuver recognition function 38, described in connection with FIG. 1 will now be described in more detail in connection with FIGS. 2 through 6. Correlator 34 preferably includes filter correlation function 42 and range resolution function 44. With respect to filter correlation 42, and as previously mentioned, each detected range gate filter cell is unfolded into two filters for each PRF which are diagrammatically illustrated in FIG. 3. The unfolded filter banks may be divided into two halves as illustrated in FIG. 3. The respective halves represent closing and opening radial velocities. For example, at 46 the unfolded filter detects the Doppler at which signals were detected for PRF 1. Similarly, block 48 represents a filter detector for PRF 2; and a block 50 represents a filter detector for PRF 3. Aligned detected signals 54, 56 and 58, which are connected by a dashed line illustrate the filter correlation of three successive PRF's (dwells). Thus, there is a correlated return referred to as TGT1 in FIG. 3 that correlates for three successive PRF's (dwells). Similarly, a target TGT2 represented by detected signals 60 and 62 in FIG. 3 represent correlation in only two successive PRF's; namely, PRF 1 and PRF 2. The correlation of 60 and 62 correspond to a two out of two (2/2) correlation and 64 and 66 correspond to a two out of three (2/3) correlation, as taught by the present invention.

As embodied herein, radar data correlator 34 also includes function 44 for resolving the range of the detected signals.

Figure 4:
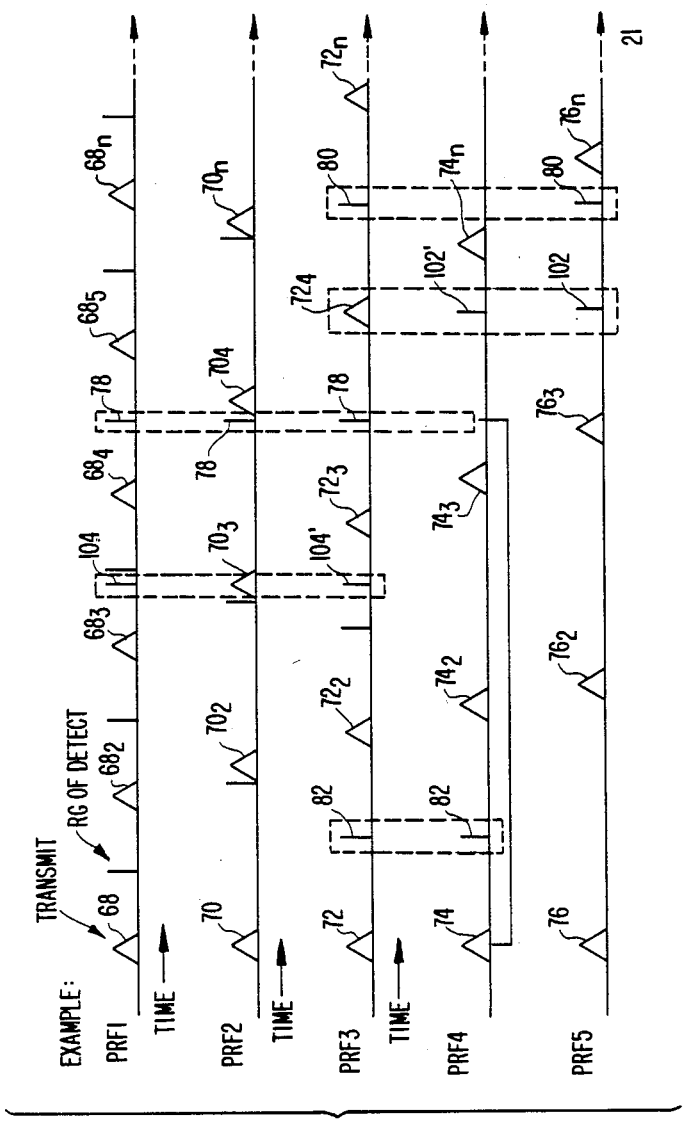
FIG. 4 is a diagram illustrating range correlation in accordance with the principles of the present invention.

Referring to the diagram of FIG. 4, horizontal lines labeled PRF 1, PRF 2, PRF 3, PRF 4 and PRF 5 each represent the variable pulse repetition frequency (PRF); that is, the time between transmissions of PRF 1 is different than the time between transmissions of PRF 2, etc. For example, triangle 68 represents the transmission of modulation PRF 1, $68_2$ represents the next transmission of PRF 1. Similarly, triangles $68_3$ through $68_n$ represent successive transmissions of PRF 1. Triangle 70 represents transmission of PRF 2 while triangles $70_2$ through $70_n$ represent successive transmissions thereof. Similarly, triangles 72, 74 and 76 represent the transmission of PRF 3, PRF 4 and PRF 5, respectively. Triangles $72_2$ through $72_n$ represent successive transmissions of PRF 3; and triangles $74_2$ through $74_n$ represent successive transmissions of PRF 4; and triangles $76_2$ through $76_n$ represent successive transmissions of PRF 5.

As illustrated in FIG. 4, a plurality of different PRF's are transmitted. In a well known manner, each of the PRF's are divided into a predetermined number of range cells, in which signals are detected in accordance with their time of arrival between successive pulse transmissions. The range at which each of the PRF's correlate, represented by the individual vertical lines in FIG. 4; represents the correlated report range. In FIG. 4, as exemplified herein, the detection of signal 78 at the identical range in PRF 1, PRF 2 and PRF 3 represents the unambiguous range of detected signals at 78. The correlation of detected signals 80 in PRF 3 and PRF 5 illustrate an ambiguous range for two out of three (2/3) successive PRF's; and the correlation of detected signals 82 in PRF 3 and PRF 4 indicate an ambiguous range for two out of two (2/2) successive PRF's. Ghost correlations may also occur due to a detection from one target at one PRF correlating with that of other targets at the other PRF's. As a result, the indicated range of such report does not represent that of either target. As hereinafter discussed, the present invention minimizes the reporting of such ghosts to prevent a display of incorrect information.

Figure 2:
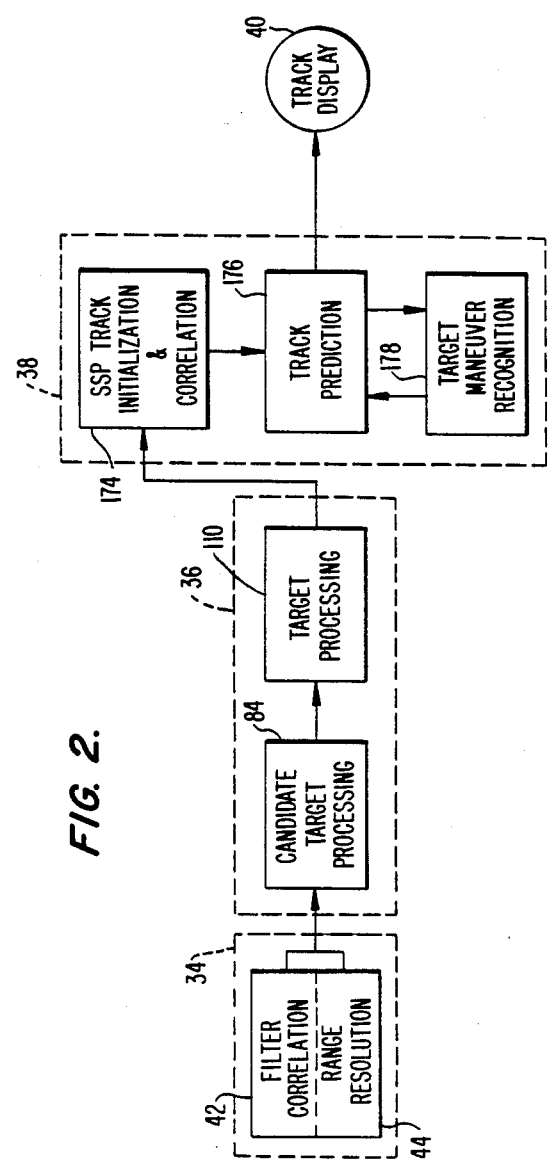
FIG. 2 is a more detailed schematic block diagram illustrating the detection processing and tracking portions of the system of FIG. 1.
Figure 3:
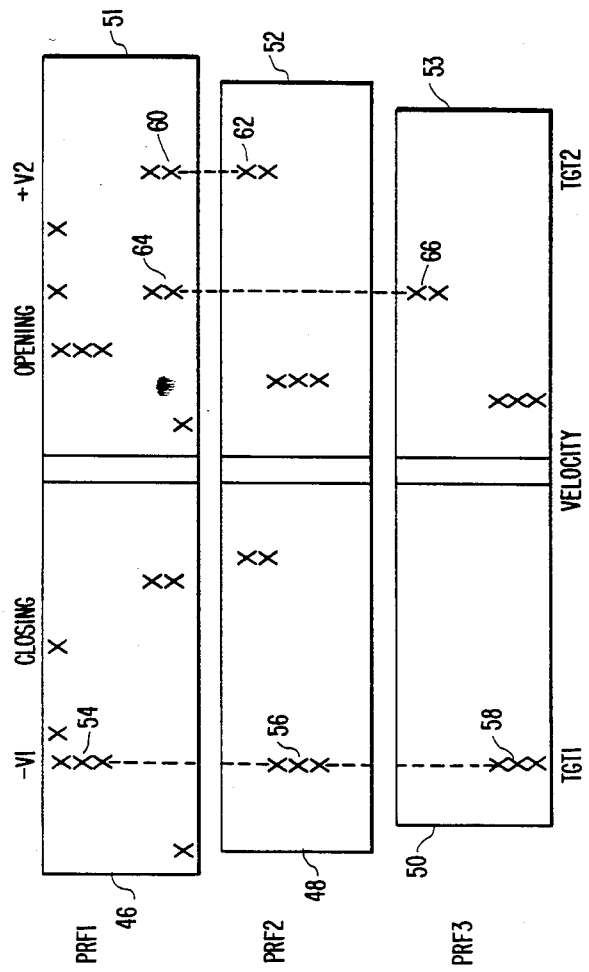
FIG. 3 is a diagram illustrating filter normalization and Doppler correlation of typical detected modulation periods for a system of the present invention.
Figure 5:
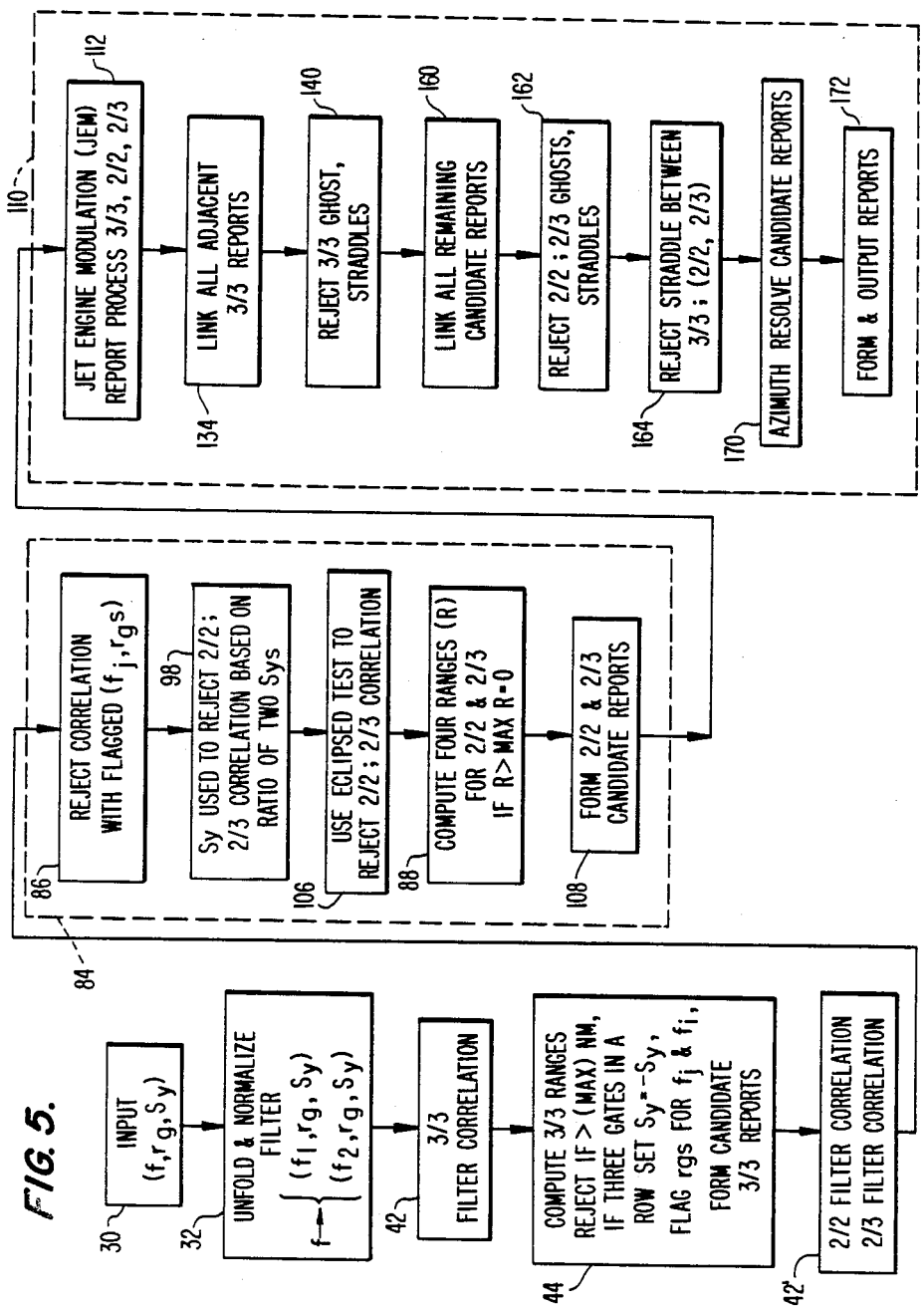
FIG. 5 is a more detailed functional block diagram of the filter correlation and range resolution, candidate target and target processing illustrated in the block diagram of FIG. 2.

To summarize the previous description, and referring to the flowchart of FIG. 5 in addition to FIG. 2, the output of the digital Doppler processor at 30 references the A/D converter on FIG. 1 is the digital equivalent of filter (f), the range gate ($r_g$), and the amplitude of each modulation ($S_y$). The filters are then normalized and unfolded at 32 as discussed in connection with FIG. 3 so that such values are segregated to filters ($f_1$), ($f_2$), range gate ($r_g$) and amplitude $S_y$ which remain the same for both filters. The filter correlations on three successive PRF's are determined as indicated at block 42. The range gates of the detected signals which correlate in three successive PRF's are used to resolve range, and those with ranges that exceeded a preselected or maximum range are rejected; otherwise a candidate report is formed. A flag is set for each of the three detected signals for both $f_j$ and $f_i$, repsectively in block 44. For those correlations not rejected, each successive PRF group of three are designated as a (3/3) candidate target. Subsequent to the correlation of the three out of three (3/3) successive PRF's, and the subsequent resolving of ranges, the two out of two (2/2) filter correlations and the two out of three (2/3) successive correlations are performed as shown by block 42'.

The present invention includes rejecting selected correlations of (2/2) and (2/3) correlations. This includes the rjection of all (2/2) and (2/3) correlations having both correlated detected signals that are also part of a (3/3) candidate detected signal. As embodied herein, and referring to FIG. 5, such rejection shown at block 86 uses the range gate flags described in conjunction with function block 44.

Each of the (2/2) and (2/3) correlations not rejected at block 86 are used to form (2/2) and (2/3) candidate reports, respectively. The candidate reports will include up to four ambiguous ranges. Computation of ranges for (3/3), (2/2) and (2/3) reports may be accomplished by modulo arithmetic in any well-known manner with the Chinese remainder theorem.

The invention further includes rejecting (2/2) and (2/3) correlations wherein the amplitude ratio of the two detected signals fails to meet a criterion which is based on predetermined beam shape modulation. As embodied herein, and referring to FIG. 6, curve 90 represents a typical antenna beam shape modulaiton; and lines 92, 94 and 96, respectively, each represent the amplitude of return signals corresponding to three successive PRF's. The ratios of these amplitudes with some tolerance for error is used to determine the above criterion.

As embodied herein, and also as indicated by block 98 of FIG. 5, the beam shape modulation is determined as follows. For example, assuming that a (2/2) correlation is being processed, the amplitude of line 92 (FIG. 6) is compared with line 94; or the amplitude of line 94 is compared with the amplitude of line 96 to obtain a predetermined ratio of the amplitude of the two adjacent detected PRF's. Preferably, if the amplitude corresponding to the ratio of Y1 divided by Y2 is less than the reciprocal of (7.5) or greater than the value of (7.5), then such a candidate target report is rejected. The same computation is performed for a (2/2) report to correlated return signals 94 and 96. For a third candidate target report, if the amplitude of return signal 92 divided by the amplitude of return signal 96 is less than the reciprocal of fifteen (15) or greater than the value fifteen (15), then such candidate target is rejected.

Block 86 represents the rejection function for the (2/2) and (2/3) correlations that are flagged as previously described in connection with block 44 of FIG. 5. Thus, (2/2) and (2/3) reports are rejected in those instances where both detected signals forming such (2/2) and (2/3) reports were part of (3/3) reports.

Preferably, the present invention includes rejecting (2/2) correlations at times when one of the two adjacent dwells fails to eclipse their respective range gate; and rejecting (2/3) correlations at times when the dwell fails to eclipse the respective range gate. As is well known, during the time of pulse transmission in a pulse Doppler radar system, the receiver is turned off, however, during the time that said receiver is turned off, return signals will not be detected. This missed detection will decrease the probability of detecting targets in a high PRF radar. Referring again to FIG. 4, and recalling that triangles 68, 70, 72, 74 and 76, respectively, all represent the transmission of a pulse, return signals 102 and 102' correlate in PRF 4 and PRF 5, which in turn could correlate with the return signal PRF 3 at 72$_4$ if it were not eclipsed by the transmit pulse. Thus, it is assumed at this point that a third return signal could have occurred during the transmission of 72$_4$ of PRF 3, or in other words, the target is range gate eclipsed in PRF 3. Similarly, correlated return signals 104 and 104', which correspond to (2/3) correlation, would be eclipsed by transmission 70$_3$ of PRF 2.

With reference to the flowchart of FIG. 5, an eclipse test for rejecting (2/2) and (2/3) correlations or reports is accomplished at function block 106.

Specifically, for (2/3) reports,

If $R_i \neq X$ modulo M; i=1,4; where (X= 1, 2, 3, M$_s$) then let $R_i = -r_i$ when $R_i$=one of four ambiguous ranges (2/3) correlation.

If $R_i \leq 0$, for all i then reject the (2/3) correlation report. For (2/3) correlations, the amplitudes $S_{y1}$ and $S_{y2}$ must be greater than 32 in the equation, or the eclipse test is not performed. However, both PRF's adjacent to the 2 PRF's which correlated must fail the test before the correlation is rejected as opposed to the PRF between the two correlations.

The aforesaid rejection techniques in actual practice have been found to reduce the false report rate for (2/2) and (2/3) candidate targets by a factor of 10 with little impact on target detectability. With reference to the flowchart at FIG. 5, the (3/3) candidate target reports from function block 44 together with the (2/2) and (2/3) candidate target reports as indicated by function block 108 are formatted in a conventional manner and output to target processing function 110 from the radar data correlator 34.

The method of the present invention includes report extension in azimuth. Report extension is limited to seven modulations due to beam width considerations. In one implementation of the system of the present invention, four different PRF's are used repetitively for one scan of the antenna. With this information, and the appropriate processing, only seven combinations of the three candidate target types are valid for extensions of a candidate target report. The combinations of extension from one type of candidate target report to another are as follows:

COMBINATIONS OF VALID CANDIDATE REPORT EXTENSIONS

| TYPE EXTENDED FROM TO | NUMBER OF MODULATION PERIODS BETWEEN CANDIDATE TARGET REPORT TYPES |
|---|---|
| (3/3)(3/3) | 1 |
| (3/3)(2/3) | 1 |
| (2/3)(3/3) | 2 |
| (2/3)(2/2) | 1 |
| (2/3)(2/3) | 2 |
| (2/2)(2/3) | 2 |
| (2/2)(2/2) | 4 |

Therefore, if the candidate target reports closely spaced in azimuth are separated by type, only a portion of the total data needs to be searched, to construct valid report extensions. This saves valuable processing time and has been tested thoroughly on many targets with no known target splits; that is, where one single target produces two or more reports with slightly different azimuth angles.

The method of the present invention includes detecting candidate target reports representing jet engine modulation and merging such reports into one target report. Airborne targets having jet engines can create a phenomena that has become a problem for surveillance radar systems known as jet engine modulation. A return signal which is the result of jet engine modulation will be at the same range as an echo from the skin of the aircraft, but will be at a different Doppler due to the signal modulation by engine blades and rotational speed. This modulation can cause returns at several different Dopplers other than that due to aircraft motion.

As embodied herein, and as indicated at function block 112 of target processing function 110 of the flowchart of FIG. 5, preferably candidate target reports having the same range, but different Dopplers, are assumed to be the result of jet engine modulation which has shifted the Doppler return to produce multiple range rates for the same target. Preferably, these multiple range rates are combined into one report, that has up to four different range rates, and all other range rate candidates which are identified as multiple range rates are deleted.

Jet engine modulation reporting presents different problems of candidate target extension and target report merging than a single Doppler target report. The first problem in connection with jet engine modulation report merging is that (3/3), (2/2) and (2/3) type candidate target reports from the same target may be formed at different Dopplers on the same three dwells. This is contrary to the normal expected extension of candidate targets. The other problem is that some type of candidate reports may result in multiple Doppler frequency correlation, while others do not; the azimuth extension of candidate reports must consider this possibility. These two problems cause difficulties in sorting the data to ensure that one target does not cause two or more target reports to be created by the system. Preferably, the largest amplitude Doppler report is selected to compute the most likely correct target range rate; and up to three other range rates are computed for information purposes as the largest amplitude criterion is not completely effective.

Figure 7:
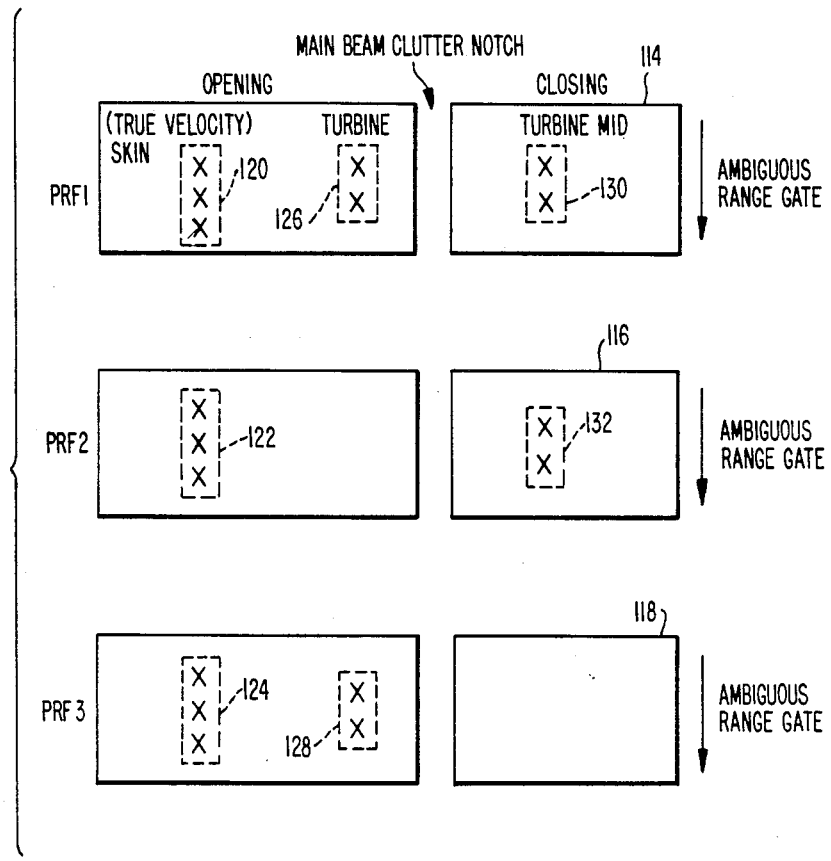
FIG. 7 is a diagram illustrating a typical arrangement of modulations corresponding to jet engine modulation which are processed in accordance with the target processing function of the present invention.

As embodied herein, and referring to FIG. 7, blocks 114, 116 and 118 represent detections in the respective range gates for PRF 1, PRF 2 and PRF 3, respectively. Each block of range gates that line up vertically in the respective PRF's correlate in Doppler frequency. This represents a (3/3) correlation at the true target Doppler. In other words, return signals within dashed lines referred to at 120, 122 and 124 correlate in Doppler frequency shift. Similarly, return signals within dashed lines at 126 and 128 indicate a correlation at the same Doppler frequency; and return signals within dashed lines 130 and 132 are also at the same Doppler frequency. Return signals 126 and 128 is a (2/3) correlation at a Doppler due to jet engine turbine modulation, and 130 and 132 is a (2/2) correlation of a Doppler which is also due to the turbine modulation. In general, many such combinations of correlations may occur when this type modulation takes place, and the resulting candidates must be combined into one report to prevent confusion.

As illustrated by block 134 of FIG. 5, the present invention includes linking all of the candidate target reports, which result from the above correlations, as they all have the same range, and are separated by a Doppler greater than the filter correlation window. Following the linking of all candidate target reports, the link structure is broken to provide a maximum of four individual candidate target reports, and the remaining candidates are deleted. The merging of candidates which form multiple range rate target reports is twofold as a number of reports for the same set of modulation periods must be tied together as well as the azimuth extension. Thus, for the multiple range rate case, the number of possible candidates which may be tied together becomes quite large.

Figure 8:
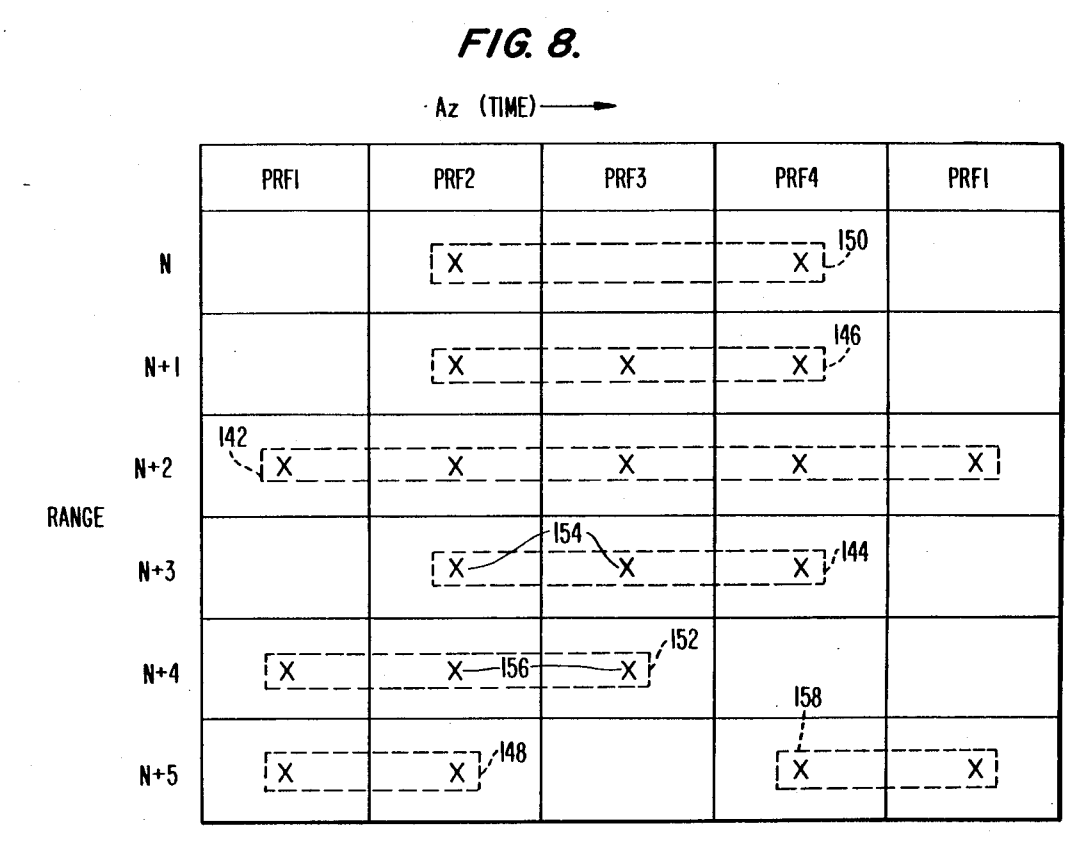

The present invention includes the elimination of candidate reports which occupy adjacent range gates. Such an elimination is commonly called range gate straddle report rejection. As embodied herein, and referring to FIG. 5 and FIG. 8, such rejection is first performed for (3/3) candidate target reports or three out of three successive PRF correlations as indicated at block 140 of the flowchart of FIG. 5. In FIG. 8 the individual columns labeled PRF 1 through PRF 4 represent the successive transmission of such PRF's by a pulse Doppler radar. Each of the rows N to N+5 represent a range gate for a corresponding PRF. For example, detected signals represented by the x designations enclosed by dashed line referred to as 142 illustrate a correlation of five consecutive PRF return signals at one unambiguous range gate, namely, N+2. Correlated detected signals enclosed by dashed line 144 represent a range corresponding to N+3. Similarly, detected signals that are correlated in range at N+1 are referred to by dashed lines 146. The correlated detected signals 144 and 146 each correspond to a (3/3) candidate target report, or in other words, a (3/3) consecutive PRF correlation. Detected signals enclosed by dashed line 148 represent a (2/2) candidate target report or a (2/2) successive PRF correlation at range N+5. Detected signals represented within dashed line 150, correspond to a (2/3) candidate target report or a (2/3) consecutive PRF correlation at range N. Thus, as shown in FIG. 8, the correlated detected signals 150, 146, 142, 144, 152, 148 and 158 are in consecutive adjacent ranges, and are thus said to be range gate straddled.

The deletion and recognition of straddle partners for all candidate target report types which is indicated at blocks 140, 162 and 164 of FIG. 5 is necessary. It is preferable that cross checks be made for straddle partners among all the combinations of the three types of candidate target reports. Once it is recognized that a straddle has occurred after the PRF ranging process, the straddles are deleted, and the range de-ghosting process begins. Range de-ghosting involves recognizing that straddles occurred and the correct target range be used rather than a ghost range. In other words, it is the process of elimination of false targets created by multiple PRF ranging when multiple detections exist at the same Doppler. The two most common ghost problems occur because of multiple range gate straddle by large targets and because of altitude line returns. To eliminate all range ghosts in the radar detection processing stage and retain detection performance is a difficult, if not impossible, task. The purpose of the de-ghosting task of the present invention is to eliminate a sufficient number of the range ghosts to prevent ghost tracking without sacrificing appreciable performance. The more modest task still requires extensive processing in straddle recognition, and the following situations that occur are important. Some (3/3) candidate target reports detected in PRF's are straddle partners with two consecutive range gates. This would be represented in FIG. 8 at 150 and 156 if only ranges N and (N+1) were detected. Another situation involves (3/3) straddles where three consecutive range gates are detected in two or more PRF's, and at least two consecutive range gates are detected in the remaining PRF. Such a situation would include correlations 142, 144 and 152 if only ranges N+2, N+3 and N+4 were detected. The third situation would include any candidate target reports caused by two or more targets which are detected at the same range rate. The final situation occurs when (2/2) and (2/3) candidate target reports have straddle partners, which would be represented by detections 156, 152 and at 148 if only ranges N+4 and N+5 were detected.

Figure 6:
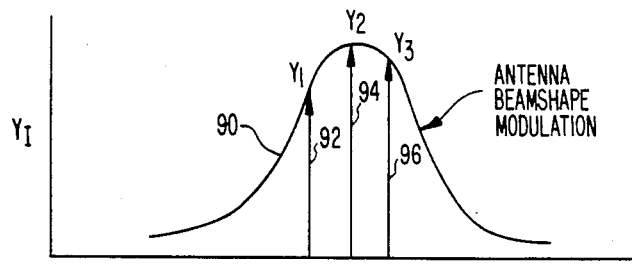
FIG. 6 is a diagram illustrating the manner of testing for amplitudes consistent with antenna beam shape.

Initially, if a pair of candidate target reports occupy adjacent range gates, and the difference in Doppler is less than one filter, the straddle partner with the maximum amplitude is selected, and the other rejected. This sample test applies to all types of candidate target reports. In the event that (3/3) candidate target report straddle partners have three consecutive range gates detected in two or more modulation periods, all additional targets which have at least two range gates identical to any of the gates of the nine range gates that are part of the straddle triplet are eliminated as targets, unless they are more than three modulation periods long. In the event that there are no straddle targets, but two or more targets are detected at the same velocity, preferably a beam shape test previously described in connection with FIG. 6 is utilized, and the candidate targets which fit the beam shape test are retained.

In the event (2/2) and (2/3) candidate target reports have straddle partners, as embodied herein those candidate targets which result from the straddle partners that are not at the straddled range are eliminated as target reports. As embodied herein, and with reference to FIG. 5 prior to rejecting the (3/3) candidate target reports as described in connection with the straddle and ghost rejection, the remaining candidate reports are linked as indicated by function 160 of FIG. 5. Subsequent thereto, the (2/2) and (2/3) candidate target reports are rejected in accordance with the previous discussion as indicated at block 162 of FIG. 5 as previously mentioned. Following the rejection of the ghost and straddles at function 162, the straddles between the various candidate target reports are rejected as indicated at block 164. An example of this is shown in FIG. 8 at 152, 148 and 158 involving both (2/2) and (3/3) candidate types.

The invention further includes the final resolving in azimuth of individual target reports in accordance with the number of consecutive candidate target reports. As embodied herein and indicated at block 170 of FIG. 5, the final processing of the candidate target reports prior to their formation and output as indicated at block 172 for track initialization involves azimuth resolution; that is, the resolving of all the unrejected candidate target reports in azimuth. The decision involved with azimuth resolution is that of determining whether to output a series of detected signals in sequential modulation periods (PRF's) as one or two target reports. Preferably, in the event of the detection of eight sequential signals, for example, two target reports are output. Such reports are split when the amplitude of the detected signals reaches a minimum consistent with a proper beam shape modulation. In the event that the number of sequential detected signals are greater than, or equal to two, and less than or equal to five, one target report is output. For those sequential detected signals that equal six or seven, the ratio of their detected signal amplitudes are computed to determine whether or not an output of one or two target reports should occur, and where the split should be made. For example, if the number of sequential detected signals is six and the second sequential detected signal amplitude is greater than 1.6 times the amplitude of the third detected signal, and the fifth detected signal is greater than 1.6 times the amplitude of the fourth detected signal, and the ratio of the second detected signal to the fourth detected signal is greater than 0.79 and less than 1.26, then the sequence of six detected signals are output as two target reports split after the third detected signal. In the event that the six sequential detected signals do not meet the above criteria, then the six sequential detections are output as one target report.

If the number of sequential return signals equals 7 and the amplitude of the second detected signal is greater than 1.62 times the amplitude of the third detected signal and the sixth detected signal amplitude is greater than 2.55 times the amplitude of the fourth detected signal and the fourth detected signal amplitude is less than the fifth detected signal, the sequence of seven detected signals is then output as two reports split after the third detected signal. Also, in the event of seven sequential detected signals and the sixth detected signal has an amplitude that is 1.6 times greater than the fifth detected signal and the second detected signal has an amplitude greater than 2.5 times the amplitude of the fourth detected signal and the amplitude of the fourth detected signal is less than the amplitude of the third detected signal, then the seven sequential detected signals are output as two target reports, which are split after the fourth detected signal. In the event that neither one of the above criteria are met, the sequence of seven detected signals is output as a single target report. In the event that there is a mixture of (3/3), (2/2) or (2/3) candidate target reports in sequence then the sequence of candidates shall terminate at the last candidate link or at seven consecutive modulation periods.

The detailed description of the present embodiment of the invention up to this point involved the processing of detected signals during a single scan of the antenna. Any correlation of detected signals during the process involved the correlation of detections in successive PRF's of either (3/3) consecutive PRF modulation periods, (2/2) consecutive PRF modulation periods, or (2/3) consecutive modulation periods. After completion of this processing and in accordance with the present preferred embodiment of the invention, the target reports which are formatted at block 172 in the flow diagram of FIG. 5 are then output to the track initialization and correlation function referred to at block 174 in FIG. 2; a more detailed flowchart of which is included in FIGS. 9A-9C.

During the portion of the description concerned with tracking, reference to an uncorrelated target report refers to a target report that has not been correlated with a track on a current scan of the antenna. A correlated report is one which has correlated with a track on the current scan of the antenna. As embodied herein, a tentative track is initiated whenever a correlation occurs between a target report on the current scan of the antenna and a target report from any of a selected number of previous scans. When a third report (and also a fourth report to reduce false tracks even further) correlates with the tentative track, the track is then promoted from the tentative to the established state.

In accordance with the present invention, a track may be initiated by target reports having either ambiguous ranges or an unambiguous range. Thus, a tentative track may be initiated from target reports formed by any combination of two out of three (2/3), two out of two (2/2), or three out of three (3/3) consecutive modulation periods. The (2/3) and (2/2) reports have up to four ambiguous ranges. Preferably, if the track is initiated with at least one (3/3) report, any report, either ambiguous or unambiguous, that correlates with the track within the next predetermined number of scans of the antenna results in the promotion of the track to an established state. Otherwise, without such an update, the tentative track is dropped. For example, the failure of such a tentative track to be updated within eight subsequent scans of the antenna may cause such track to be dropped. The invention further includes the requirement to update a track with a first candidate type (3/3) target report within a predetermined number of scans of the antenna if the track were initiated only on target reports having ambiguous ranges (2/2) or (2/3). For example, such report (3/3) may be required within the next eight scans of the antenna. However, if such a tentative track is not updated within three scans by any type report, the tentative track is dropped.

The present invention also includes successively processing azimuth zones of track and target report data; that is, the correlation function is performed in a small azimuth zone centered at the report. This permits the search of a limited region around the report of interest during both track initiation and correlation processing. The present invention also includes the computation of target azimuth angle predictions from predictions made by X and Y coordinate trackers in order to eliminate the angle dynamic errors that would otherwise be induced even by constant velocity targets when an angle tracker is used.

As previously mentioned, track initiation requires the correlation of uncorrelated target reports from the current scan with uncorrelated target reports from a previous scan. If the target report from the current scan fails to correlate with one or more uncorrelated reports from previous scans, such report is stored for a predetermined number of antenna scans. For example, a storage of from four to six scans is preferred.

The present embodiment of the invention preferably includes azimuth zone processing for initiating tracks from uncorrelated target reports. As mentioned previously, only a selected azimuth zone of stored reports is considered at any one time for possible correlation attempts. Since the size of the zone depends on the age of the stored report, with the zone itself in effect being a sliding window, efficient processing is realized.

Figure 9A:
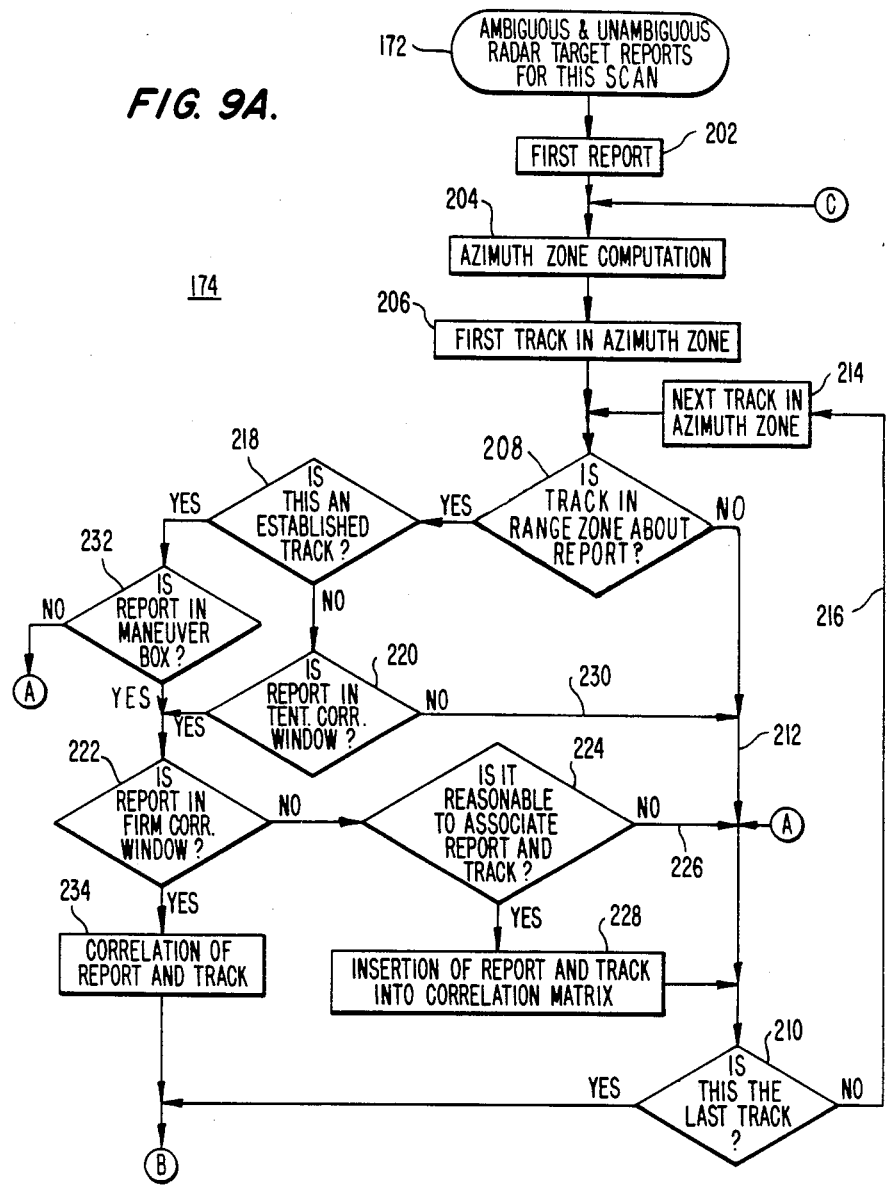
FIGS. 9A through 9C is a flow diagram of the target tracking system portion of the present preferred embodiment of the invention.
Figure 9B:
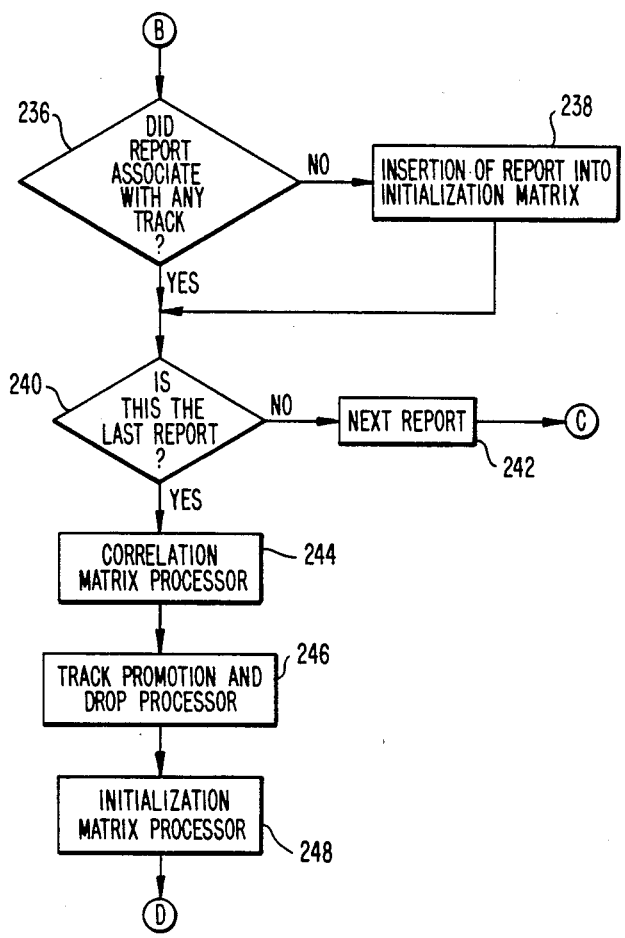
Figure 9C:
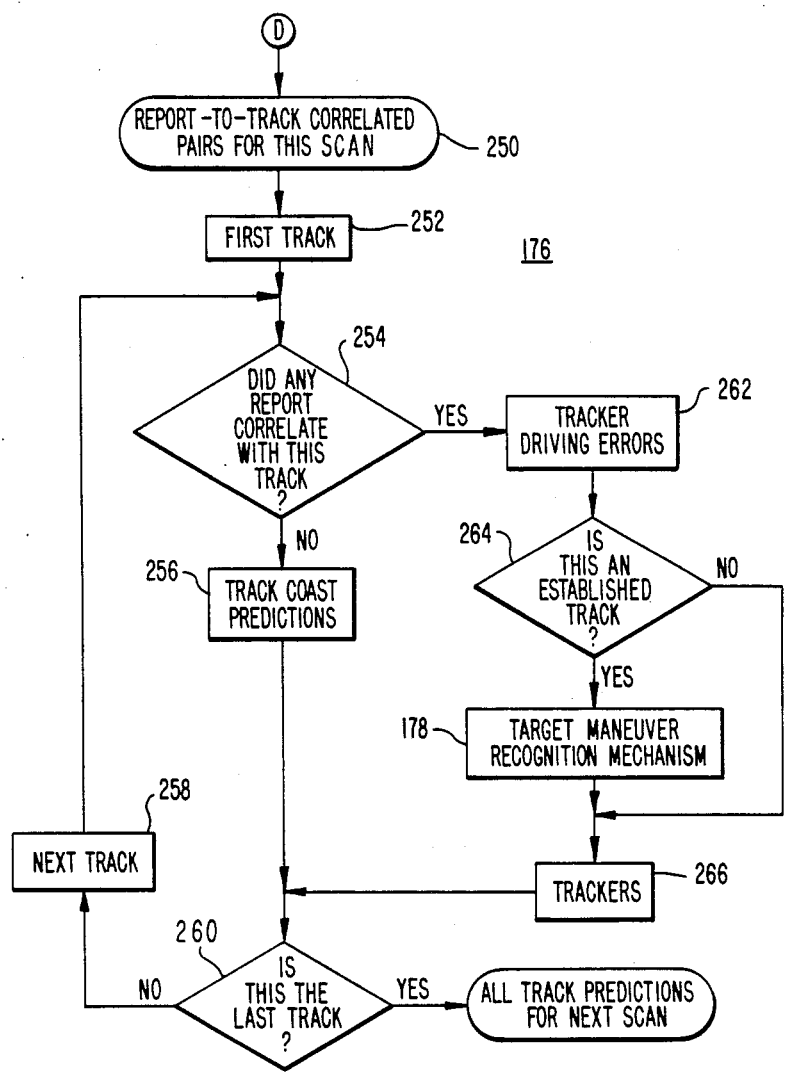

As embodied herein, the tracking function 38 of FIG.1 which includes the track initialization and correlation function 174, track prediction function 176, and target maneuver recognition function 178, as shown in FIG. 2, is schematically and functionally illustrated in the flow diagram of FIGS. 9A-9C.

Prior to describing the details of the individual functions as appropriate, reference is made to the flow diagram in FIGS. 9A-9C. Ambiguous and unambiguous radar target reports for a particular scan are indicated at block 172 in FIG. 9A. The first numbered report is selected at block 202, and the azimuth zone computation for such a report is carried out at block 204. The first track in the computed azimuth zone is then selected as shown by block 206, and a decision is made as to whether or not such track is in the range zone of the particular target report at block 208. If the comparison is negative, the next numbered track in the azimuth zone is selected at block 214, unless the current track is the last track in the zone. Until such time as the comparison at block 208 is in the affirmative, this comparison is made until the last numbered track is determined at block 210. Once a target report and a track are determined to be in the proper range zone, the track status is checked at block 218 as to whether such track is an established track as hereinafter described. If the answer is in the affirmative, then a decision is made as to whether or not the target report falls within the limits of the maneuver box at block 232. If the track is a tentative track rather than an established track, a decision is made as to whether or not the target report falls within the tentative correlation window about the track at block 220. If such comparisons are negative, then the next track is selected at block 214 over lines 212 and 216. If such comparisons are in the affirmative, then a check is made at block 222 to determine whether or not such correlation can be considered firm. If it is not a firm correlation, a comparison is made at block 224 to determine if the parameters of the target report and the track are such that it is reasonable to associate them. If not, then the next track in the azimuth zone is selected over the previously described loop. If block 222 indicates a positive response, then the target report and the track are correlated at block 234. If the parameters of the target report and the track are such that an affirmative comparison is made at block 224, then the target report and the track being processed are inserted into a correlation matrix as indicated at block 228 where they are kept for reconsideration after all the reports have been examined. After the last track has been processed with a particular target report as indicated at block 210, or, after a correlation of the target report with a particular track, the flowchart of FIG. 9A continues from terminus B of FIG. 9A to terminus B of FIG. 9B. A check is made at block 236 of FIG. 9B to determine whether such target report associated with any track, that is, whether it was firmly correlated with a track or at least placed in the correlation matrix with one or more tracks. If a target report failed to associate, then such report is inserted into an initialization matrix at block 238. A maximum of four reports under each track may be saved for later matrix resolution, for example. If the target report did associate with any track, or after insertion into the initialization matrix, a check is made at block 240 to determine if such target report was the last report to be processed for this scan. If the response is negative, the next target report is selected as indicated at block 242, and the flowchart continues from terminus C of FIG. 9B to terminus C of FIG. 9A for comparing such target report with all of the tracks in an azimuth zone about this report as previously described. In the event such target report was the final report for this scan, then all of such target reports and tracks previously inserted at block 228 into the correlation matrix are processed at block 244 of FIG. 9B to resolve conflicts and make as many report-to-track correlations as possible. Reports that do not correlate at block 244 will be moved to the initialization matrix, and tracks that do not correlate will be flagged for subsequent coasting. Next, each tentative track is examined to determine if it should be promoted to the established state, and all tracks are examined to see which ones should be continued, or dropped at block 246. The target reports that were inserted into the initialization matrix at block 238, and possibly at block 244, are processed at block 248 for formation of new tentative tracks. Following such initialization processing, each track is updated for predicting the proper position for a target report for correlation during the next scan of the antenna. The first track is selected for processing as indicated at block 252 of FIG. 9C. Initially, a check is made at block 254 to determine if any target report correlated with the particular track being processed. If no target report correlated, then such track is updated by a well known track coast prediction at block 256. Each track is then checked in succession as indicated at block 258 until the last track is checked as indicated at block 260. If a track did correlate with a report during the current scan, the tracker driving errors are formed at block 262. If such track is an established track, as indicated by decision block 264, the tracker weights may be changed in accordance with the method described in connection with the target maneuver recognition mechanism 178. If the track is not an established track, the weights are not changed. The weighted driving errors are used to update the track and make the predictions for the next scan at block 266. Then the next track is selected for processing. Once the last track has been processed, as indicated at block 260, then all track predictions have been made for the next scan of the antenna.

Now, the process whereby new tracks are initiated is described in detail. As previously mentioned, any ambiguous or unambiguous target reports that fail to correlate are stored for a selected number of scans. If a report-to-report correlation exists, a tentative track is initiated. With reference to the initialization function as embodied herein, there are included azimuth zoning, range rate, range, and azimuth correlation algorithms as well as a sidelobe clutter and altitude line false track rejection algorithm. Preferably, to initiate a tentative track, a currently uncorrelated target report vector and a previously stored target report vector are utilized to compute the following differences:

$$\Delta\dot{R} = \dot{R}_m - \dot{R}_m'$$

$$\Delta R = R_m - (R_m' + \dot{R}_m' Nt)$$

$$\Delta A = A_m - A_m' - NtV \sin(A_m' - H)/(R_m' - NtV \cos(A_m' - H))$$

where
$\dot{R}_m$ is range rate for current target report
$\dot{R}_m'$ is range rate for stored target report
$R_m$ is range for current target report
$R_m'$ is range for stored target report
$A_m$ is azimuth for current target report
$A_m'$ is azimuth for stored target report
V is platform speed
H is platform heading
N is number of scans that report has been stored
t is radar scan duration (10 sec).

The two vectors are required to satisfy all three of the following inequalities before such target reports are declared to be correlated:

$$|\Delta\dot{R}| < C_{\dot{R}}$$

$$|\Delta R| < C_{RD}$$

$$|\Delta A| < C_A$$

where
$C_{RD} = 50$ kts
$C_{\dot{R}} = 0.2$ nmi
$C_A = \tan^{-1}(Nt(V^2_{max} - \dot{R}_m^2)^{\frac{1}{2}}/R_m) + 1.7\sigma A$
$V_{max} = 0.7$ nmi/sec (slightly more than Mach 4)
$\sigma A$ = standard deviation of errors in azimuth measurements Pairs of reports with almost identical ranges, within two tenths of a nautical mile, for example, are further screened as follows. If the change of velocity of the platform is less than 20 knots, track initiation may be disallowed, where the change in platform speed is the total range rate of the target. Also, if the change of range is greater than two tenths of a nautical mile, track initiation is disallowed. This change of range is the difference between the actual range change between the two target reports (R-R') and the range change derived from the average range rate and the time between the two reports, $\frac{1}{2}(\dot{R}+\dot{R}')(T_i-T_j)$ for example. If the change in velocity is less than 20 knots, it is an indication that the reports probably represent PRF dependent ghosts of altitude line returns. If the range change is greater than two tenths of a nautical mile as indicated, then inconsistency exists between the range rate of the current report and the range rate of the previous report, which implies that the two reports probably represent different targets or sidelobe clutter returns.

A pair of target reports that successfully complete the range rate, range, azimuth, and false track rejection processing at block 248 of FIG. 9B are then used to define parameters for a new track, or in other words, are used to initialize a track. Preferably, the following preliminary computations are performed using the current report vector and the stored report vector from a previous scan:

$$X' = R_m' \sin A_m'$$

$$Y' = R_m' \cos A_m'$$

$$\dot{X} = (X - X')/(Nt)$$

$$\dot{Y} = (Y - Y')/(Nt)$$

$$V_X = \dot{X} + V \sin H$$

$$V_Y = \dot{Y} + V \cos H$$

where
N = number of scans that target report has been stored
t = radar scan time
V = platform speed
H = platform heading.

A track is initialized by making the following computations:
$T_{LAST}$ = time tag for ($R_m$, $\dot{R}_m$, $A_m$)
$I_{DROP}$ = 7 (drop counter)
$I_{UNP}$ = 9 (track status counter, which is number of scans track is tentative)
$I_{STAT}$ = 1 (track status flag) for tentative track
$X_P = X + \dot{X}t$ (initial predicted X component of track position)
$Y_P = Y + \dot{Y}t$ (initial predicted Y component of track position)
$\dot{X}_s = \dot{X}$ (initial smoothed X component of track velocity)
$\dot{Y}_s = \dot{Y}$ (initial smoothed Y component of track velocity)
$V_{TRK} = (V_x^2 + V_y^2)^{\frac{1}{2}}$ (initial predicted track speed)
$H_{TRK} = \tan^{-1}(V_X/V_Y)$ (initial predicted track heading)
$\theta_p = \tan^{-1}(X_p/Y_p)$ (initial predicted track azimuth)
$R_p = R_m + \dot{R}_m t$ (initial predicted track range).

Track smoothing or non-maneuvering constants are also initialized. The final step in track initialization in accordance with the present embodiment of the invention is the insertion of the new track number in the appropriate location in the azimuth ordered file of track numbers as previously mentioned.

In addition to the initializing of the track processing, report-to-track correlation processing either for continuing an established track or for converting a tentative track designation into an established track is performed. In report-to-track correlation processing before correlation attempts are made, each incoming report is transformed from rotodome coordinates to space stabilized coordinates and compared to tracks within an azimuth zone of the report. Correlation processing includes range and range rate checks, maneuver box checks (as indicated at block 232 of FIG. 9A), probabilistic distance computations in range, azimuth and range rate, and the selection of the optimum among tentative associations.

The incoming azimuth ordered target reports contain up to four ambiguous ranges and up to four ambiguous range rates as discussed in connection with the detection processing. With azimuth ordering in accordance with the preferred embodiment of the invention, the number of correlation attempts is substantially reduced.

For each incoming target report vector, an azimuth zone ($A_s$, $A_e$) is formed about the report azimuth A as follows:

$$A_s = A - \Delta A$$

$$A_e = A + \Delta A$$

where
A = azimuth of target
$\Delta A = \min(\tan^{-1}(D_{MB}/R_S), A_{max})$
$D_{MB}$ = $\frac{1}{2}$ maneuver box diagonal length
$R_S$ = minimum of the ambiguous ranges or unambiguous range
$A_{max}$ = maximum half zone.

The zone ($A_s$, $A_e$) represents the azimuth extent of a projection of the maneuver box to a range $R_S$. The zone is large enough to contain a target making a 4 g turn for two scans.

Tracks within the zone ($A_s$, $A_e$) are efficiently selected using the azimuth ordered track number file. A track link pointer, which starts out at the track number of the first track outside the previous azimuth zone, is decremented until it points to the first track number for a track preceding the current azimuth zone. From there it is incremented until it points to the first track number for a track within the zone. The indicated track is the first candidate for correlation processing with the report, unless it has already been firmly correlated to a previous report. As the track link pointer is incremented, track numbers representing tracks with increasing azimuths are specified. Each such track is checked for inclusion in the zone. For each track in the azimuth zone, the closest report range and closest report range rate are selected. Report-track pairs satisfying maneuver box checks at 232 are flagged as tentatively associated, while report-track pairs that also satisfy probabilisitic distance checks are classified as firmly correlated. A firmly correlated report and track are not eligible for further correlation processing.

When the track link pointer specifies a track number whose track is outside the zone, correlation processing for the report is suspended, the track link pointer is not moved, and processing proceeds to the next report. The use of an azimuth ordered track number file and a track link pointer guarantees that only a small number of tracks need to be processed for each report, yet it does allow for possible misordering of reports.

If the track status of a report-to-track pair is tentative, maneuver box computations are not performed. In place thereof, a tighter window at 220 is used; it is based only on statistical estimates of the sizes of the random errors in the report sampled coordinates and the track predicted coordinates. The dimensions of this window vary with the number of scans between the two reports that initiate a track and also with the number of scans that elapse before the third report is obtained. However, for an established track, a two-stage maneuver box is centered on the predicted track position and oriented along the predicted track velocity vector. The maneuver box is normally five nautical miles by five nautical miles, but is expanded to ten nautical miles by ten nautical miles following a coast. In the present embodiment, the expanded dimensions are preferably maintained for three scans of the antenna. The maneuver box is large enough to contain a target making a 4 g turn for two scans. A report-track pair remains a candidate for association at block 224 only by passing both the axial and lateral maneuver box checks at 232. The axial distance of the target report from the predicted target position is as follows:

$$D_A = (X_m - X_p) \sin H_{TRK} + (Y_m - Y_p) \cos H_{TRK}$$

where $X_p$, $y_p$, and $H_{TRK}$ are obtained from the track file for a given track. The axial maneuver box check requires that $$|D_A| < K_A/2,$$

where $K_A$ = axial dimension of maneuver box.
Failure at this stage prohibits association of the report and track, while success allows processing to continue to the lateral maneuver box check.

The lateral distance of the report from the predicted target position is $$D_L = (X_m - X_p) \cos H_{TRK} - (Y_m - Y_p) \sin H_{TRK}$$

The lateral maneuver box check requires that $$|D_L| < K_L/2,$$

where $K_L$ = lateral dimension of maneuver box.
Failure at this stage prohibits association of the report-track pair. Success indicates at least a tentative association and guarantees further processing of the report-to-track pair (probabilistic distance checks).

Probabilistic distances in range, azimuth, and range rate are computed for each report-to-track pair that passes either the tentative track correlation window or the maneuver box check. These distances are compared against thresholds. If each of the three distances is less than its respective threshold, a firm association of the report and track is made. If any distance exceeds its threshold, only a tentative association is made at this point. The following range, azimuth, and range rate errors $$\dot{R}_E = \dot{R}_m - \dot{R}_p$$

$$A_E = A_m - A_p$$

$$\dot{R}_E = \dot{R}_m - \dot{R}_p$$

are used with their corresponding rms measurement errors ($\sigma_R$, $\sigma_A$, and $\sigma_{\dot{R}}$) to compute the probabilistic distances.

$$L_R = (R_E/\sigma_R)^2$$

$$L_A = (A_E/\sigma_A)^2$$

$$L_{\dot{R}} = (\dot{R}_E/\sigma_{\dot{R}})^2$$

The three threshold tests are $$L_R \leq K_R$$

$$L_A \leq K_A$$

$$L_{\dot{R}} \leq K_{\dot{R}}.$$

The track threshold setting was chosen to guarantee a firm correlation at least 95% of the time for a non-maneuvering target. If a report-track pair satisfies all three inequalities, then the report and track are firmly correlated, and neither can be considered as candidates for any other associations. If an association is tentative, a total probabilistic distance is computed and used in deciding among tentative associations.

$$L_{TOT} = L_R + L_A + L_{\dot{R}}$$

$L_{TOT}$ is used to dynamically prioritize the report among other reports that have also been tentatively associated with the track. Priority tags are used together with $L_{TOT}$ values during correlation matrix processing.

Tentative associations are broken if inconsistencies between the current report and the last report correlating with the track indicate different targets. In the correlation reasonableness check, the current report vector and the last report vector correlating with this track are used to compute an average value of the range rate. This average is used with $R_m$ to compute an expected track range, $R_{EXP}$. $R_{EXP}$ is required to be close to $R_m$. Otherwise, the tentative association is broken.

With T and $T_{LAST}$ denoting the time tags for ($R_m$, $\dot{R}_m$, $A_m$) and ($R_m'$, $\dot{R}_m'$, $A_m'$), the following computations are made:

$$\dot{R}_{AVE} = (\dot{R}_m + \dot{R}_m')/2$$

$$R_{EXP} = R_m' + \dot{R}_{AVE}(T - T_{LAST})$$

$$R_{VAL} = |R_{EXP} - R_m|$$

A report-to-track pair passes the correlation reasonableness test at block 224 if it satisfies the following inequality:

$$R_{VAL} \leq 0.2915 + 0.07(8 - IDROP)$$

Firm correlations at block 234 require no further processing. The report in a firmly correlated report-to-track pair is used to update the track. However, it is possible for a single report to be tentatively associated with multiple tracks and for a single track to be tentatively associated with multiple reports.

During report-to-track processing in block 244, the reports tentatively associated with a track are dynamically tagged with priorities 1, 2, 3, or 4, depending on the value of $L_{TOT}$. The report with the smallest value of $L_{TOT}$ for the given track is called a priority 1 report and is initially the "best" report for the track. Since the same report might also be a priority 1 report for another track, more processing is required. A matrix with tentatively associated reports labeling the rows and tentatively associated tracks labeling the columns is considered. In each element of the matrix representing a tentative report-to-track association, $L_{TOT}$ and the priority tag are entered. Processing proceeds by levels. At each level, each remaining report is considered in turn. For a given report, the row on which it occurs is scanned for priority 1 tags. If any priority 1 tags are found, the priority 1 association with the smallest $L_{TOT}$ value determines the "best" track association for the report. The report and track are firmly correlated, i.e., the report is used to update the track. All other tentative associations indicated on the same row as the report or in the same column as the track are eliminated from the correlation matrix. If no priority 1 tags are found along the row of the report, no action is taken regarding this report at level 1. After the last report is considered in level 1 processing, level 2 processing begins. Level 2 is identical to level 1 except that priority 2 tags are considered.

Similar processing is performed at levels 3 and 4. Simulation results indicate that levels beyond 4 are not required.

At the conclusion of correlation matrix processing, each report will have attained a final correlation with at most one track. If a report is correlated with a track, it is used to update the track. If a report does not attain a final correlation, it becomes available for initialization processing at 248. Moreover, each track will have attained a final correlation with at most one report. If a track is correlated with a report, it is updated by that report. If a track does not attain a final correlation with a report, it is coasted at block 256.

The tracking function represented by block 38 in the diagram of FIG. 1 includes the predicting function as shown in the diagram of FIG. 2 and the flowchart of FIG. 9C. The function of the target trackers at block 266 is to make predictions of the coordinates of each target one radar scan in advance so that all of the target samples obtained on that scan may be properly assigned to the correct target tracks. The trackers for each target consist of feedback control loops that are driven with radar samples of the target range, range rate, and azimuth angle.

The errors that drive the trackers for a given target are formed by subtracting its predictions for a given scan from its samples obtained on that scan. These driving errors represented by function block 262 of FIG. 9C are as follows where superscript asterisks are used to distinguish the samples from the predictions:

$\Delta R \leftarrow R^* - R$ (range)

$\Delta \dot{R} \leftarrow \dot{R}^* - \dot{R}$ (range rate)

$\Delta A \leftarrow A^* - A$ (azimuth angle)

$X^* \leftarrow R^* \sin(A^*)$ $Y^* \leftarrow R^* \cos(A^*)$ $\Delta X \leftarrow X^* - X$ (X coordinate)

$\Delta Y \leftarrow Y^* - Y$ (Y coordinate)

The psuedo samples $X^*$ and $Y^*$ are formed from the radar samples of target range and azimuth angle. The azimuth angle is measured clockwise from the positive Y axis.

A range tracker is used to make range predictions, and a range rate tracker is used to make range rate predictions. Azimuth angle predictions are computed from predictions made by X and Y coordinate trackers.

The range and range rate trackers are $\hat{R} \leftarrow R + W_R \Delta R$ (range estimate)

$\hat{\dot{R}} \leftarrow \dot{R} + W_{\dot{R}} \Delta \dot{R}$ (range rate estimate)

$R \leftarrow \hat{R} + T\hat{\dot{R}}$ (range prediction)

$\dot{R} \leftarrow \hat{\dot{R}}$ (range rate prediction)

where T is the radar scan time and $W_R$ and $W_{\dot{R}}$ are weights whose values determine the performance characteristics of the trackers. The estimates for the present scan are made by adding weighted values of the driving errors to the predictions for the present scan. Then, the predictions for the next scan are made from the estimates.

The X coordinate tracker is a second order feedback loop that makes predictions of the X component of target position and the X component of tartet velocity as follows:

$\hat{X} \leftarrow X + W_P \Delta X$ (position estimate)

$\hat{\dot{X}} \leftarrow \dot{X} + W_{\dot{P}} \Delta X / ((N+1)T)$ (velocity estimate)

$X \leftarrow \hat{X} + T\hat{\dot{X}}$ (position prediction)

$\dot{X} \leftarrow \hat{\dot{X}}$ (velocity prediction)

The weights $W_P$ and $W_{\dot{P}}$ for this tracker are in general quite different from those used in the range and range rate trackers. The variable N is the number of consecutive radar scans that the target predictions were coasted immediately prior to a given entry into the tracker. A coast condition occurs whenever the target samples are not obtained on a particular scan because of target fading or any other reason. In this case, the prediction of target position for the next scan is made by extrapolating the predicted position for the present scan with the predicted velocity for the present scan.

The Y coordinate tracker makes predictions of the Y component of target position and the Y component of target velocity as follows:

$\hat{Y} \leftarrow Y + W_P \dot{Y}$ (position estimate)

$\hat{\dot{Y}} \leftarrow \dot{Y} + W_P Y / ((N+1)T)$ (velocity estimate)

$Y \leftarrow \hat{Y} + T\hat{\dot{Y}}$ (position prediction)

$\dot{Y} \leftarrow \hat{\dot{Y}}$ (velocity prediction)

The weights for this tracker are identical to the weights for the X coordinate tracker.

The azimuth angle prediction is computed from the predictions of the X and Y components of the target positions as follows:

$A \leftarrow \arctan(X/Y)$ (azimuth angle)

A constant velocity target does not produce dynamic errors in the angle pedictions computed from the predictions of the X and Y coordinate trackers, in that it does not produce accelerations in the X and Y coordinates.

The values assigned to the tracker weights determine the amount of control that can be maintained on tracker dynamic errors induced by target maneuvers and also the amount of smoothing that may be achieved of tracker random errors induced by noise in the radar samples. As the weights are changed to provide more reduction of the random errors, they provide less reduction of the dynamic errors when a maneuver occurs and vice versa. A radar system exemplifying the present invention typically has a data sampling rate in the neighborhood of only one-tenth of a Hertz. Because this sampling rate is so low, it is difficult to keep the dynamic errors small even for slight target maneuvers. For example, a target that turns with only 0.5 g of centripetal acceleration can easily induce a dynamic error of more than one nautical mile in the prediction of the target position even if the tracker weights are set to provide no reduction of the random errors at all.

In accordance with the present invention, the weights in the trackers for a given target are switched to one set of values when the target is maneuvering and to another set of values when it is not maneuvering. Such a function is carried out by the target maneuver recognition mechanism referred to at block 178 in FIG. 9C and the flowchart of FIG. 10. Such mechanism quickly recognizes a target maneuver and switches in appropriate tracker weights to keep the dynamic errors under control during the maneuver. When the maneuver is over and the transients induced in the trackers have decayed, the mechanism then switches in the appropriate weights to reduce the random errors. The adaptive trackers for a given target are kept in the smoothing (non-maneuver) mode as long as the target continues to fly with constant velocity. In this mode, the tracker weights are set to reduce the rms value of the random errors in a predicted variable produced by noise errors in its corresponding samples to a fraction of the rms value of those sampling errors. If this fraction is selected to be one-half, the tracker weights are:

$$W_R = 0.4 \quad W_{\dot{R}} = 0.4$$
$$W_P = 0.18885 \quad W_{\dot{P}} = 0.04458$$

In the maneuver mode, the tracker weights are $$W_R = 1.0 \quad W_{\dot{R}} = 1.0$$
$$W_P = 0.41421 \quad W_{\dot{P}} = 0.34315$$

The above weights serve to keep the rms value of the random errors in a predicted variable produced by noise errors in its corresponding samples equal to the rms value of those sampling errors. Therefore, in the maneuver mode, the random errors in the predictions are not reduced, but they are not magnified either. The dynamic errors induced by a maneuver are typically so large relative to the random errors that the temporary suspension of random error smoothing is of minor consequence. If the weights were not changed during the maneuver, the dynamic errors would become so large as to cause a loss of track in most instances.

Figure 10:
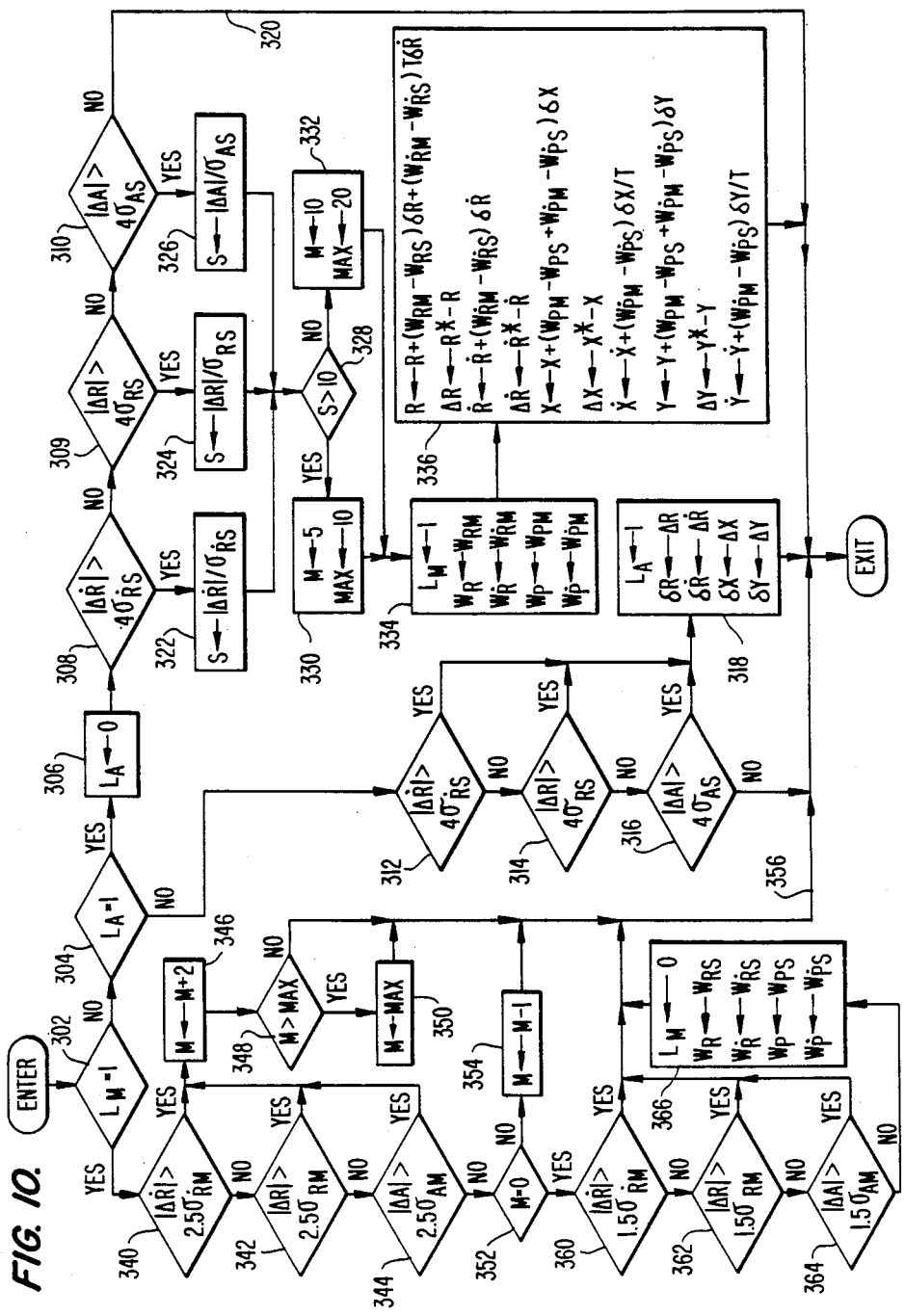
FIG. 10 is a flowchart of the target maneuver recognition mechanism.

With reference to FIG. 10, the following is a list of definitions for the symbols utilized.

T = time interval between successive scans of radar antenna beam
N = number of consecutive radar scans that target predictions were coasted immediately prior to entry into target trackers
R* = sample of target range
$\dot{R}$* = sample of target range rate
A* = sample of target azimuth angle (measured clockwise from positive Y axis)
X* = pseudo sample of X component of target position
Y* = pseudo sample of Y component of target position
R = prediction of target range
$\dot{R}$ = prediction of target range rate
A = prediction of target azimuth angle
X = prediction of X component of target position
$\dot{X}$ = prediction of X component of target velocity
Y = prediction of Y component of target position
$\dot{Y}$ = prediction of Y component of target velocity
$\Delta R$ = range tracker driving error
$\Delta \dot{R}$ = range rate tracker driving error
$\Delta A$ = error between azimuth angle sample and prediction
$\Delta X$ = X coordinate tracker driving error
$\Delta Y$ = Y coordinate tracker driving error
$W_R$ = weight applied to range tracker driving error
$W_{\dot{R}}$ = weight applied to range rate tracker driving error
$W_P$ = weight applied to X and Y coordinate trackers trackers driving errors to compute predicted position
$W_{\dot{P}}$ = weight applied to X and Y coordinate trackers driving errors to compute predicted velocity
$W_{\dot{R}S}$ = value assigned to $W_R$ during smoothing mode
$W_{\dot{R}M}$ = value assigned to $W_R$ during maneuver mode
$W_{RS}$ = value assigned to $W_{\dot{R}}$ during smoothing mode
$W_{RM}$ = value assigned to $W_{\dot{R}}$ during maneuver mode
$W_{PS}$ = value assigned to $W_P$ during smoothing mode
$W_{PM}$ = value assigned to $W_P$ during maneuver mode
$W_{\dot{P}S}$ = value assigned to $W_{\dot{P}}$ during smoothing mode
$W_{\dot{P}M}$ = value assigned to $W_{\dot{P}}$ during maneuver mode
M = counter used in maneuver mode to prevent a premature switch to smoothing mode
MAX = maximum value permitted for M
S = ratio of magnitude of driving error and its rms value
$L_M$ = flag that is set to 1 when trackers are in maneuver mode and to 0 when trackers are in smoothing mode
$L_A$ = alert flag which is set to 1 when any driving error is large enough to suggest that a maneuver may be commencing
$\sigma R$ = value of $\Delta R$ that is saved for next scan whenever maneuver alert flag is set to 1
$\sigma \dot{R}$ = value of $\Delta \dot{R}$ that is saved for next scan whenever maneuver alert flag is set to 1
$\sigma X$ = value of $\Delta X$ that is saved for next scan whenever maneuver alert flag is set to 1
$\sigma Y$ = value of $\Delta Y$ that is saved for next scan whenever maneuver alert flag is set to 1
$\sigma RS$ = rms value of random error in $\Delta R$ when trackers are in smoothing mode
$\sigma RM$ = rms value of random error in $\Delta R$ when trackers are in maneuver mode
$\sigma \dot{R}S$ = rms value of random error in $\Delta \dot{R}$ when trackers are in smoothing mode
$\sigma \dot{R}M$ = rms value of random error in $\Delta \dot{R}$ when trackers are in maneuver mode
$\sigma AS$ = rms value of random error in $\Delta A$ when trackers are in smoothing mode
$\sigma AM$ = rms value of random error in $\Delta A$ when trackers are in maneuver mode.

As embodied herein, upon entry into the target maneuver recognition subsystem, a flag $L_M$ is checked as represented by block 302 to determine the mode in which the trackers are operating. If $L_M = 0$, the trackers are operating in the smoothing mode where random errors in the predictions are significantly compressed with respect to their respective sample errors to produce a smooth track. If $L_M = 1$, the trackers are operating in the maneuver mode where random error smoothing is temporarily suspended in an attempt to keep the dynamic errors under control and thereby prevent the loss of the track.

The present invention includes storing a third and fourth plurality of numerical parameters corresponding to deviation statistics for non-maneuvering and maneuvering targets, respectively. For example, the third plurality of numerical parameters for the non-maneuvering mode may be as follows:

$\sigma \dot{R}S = 11.2$ kt $\sigma RS = 0.0523$ nmi $\sigma AS = 0.112$ deg.

The fourth plurality of parameters corresponding to the maneuver mode may be as follows:

$\sigma \dot{R}M = 14.2$ kt $\sigma RM = 0.0642$ nmi $\sigma AM = 0.142$ deg.

As embodied herein, the present invention includes predicting range, range rate, and azimuth angle of each target report for a succeeding scan in accordance with corresponding weights of said selected first and second plurality of numerical parameters and driving error values determined during the preceeding scan. If the trackers are currently in the smoothing mode, an alert flag $L_A$ as represented as block 304 is checked to determine whether any driving error on the previous scan was large enough to suggest that a maneuver might be commencing. If the decision block indicates an affirmative response, the alert flag is set to zero as indicated at block 306, and the driving errors on the current scan for range rate, range, and azimuth angle as indicated at blocks 308, 309 and 310 are compared with corresponding values of the third plurality of numerical parameters for the smoothing mode multiplied by a factor of four. In the event that maneuver alert flag $L_A$ does not indicate that any driving error on a previous scan suggested the commencement of a maneuver, the same comparison is made at decision blocks 312, 314 and 316 to determine if any of the driving errors on the current scan is greater than four times its corresponding value of the third plurality of numerical parameters that correspond to statistical deviations. If any one such driving error, that is, a driving error for range, range rate or azimuth angle, is greater than said statistic, the alert flag $L_A$ is set to 1 as indicated at box 318 of the flowchart. Also, as indicated in processing block 318, driving error values for range, range rate, X coordinate, and Y coordinate are saved for use during the next scan of the antenna. Thus, on the first radar scan where any driving error exceeds its statistic by a factor of 4, a maneuver alert flag $L_A$ is set to 1, and the driving errors are stored in memory for possible use on the following scan also. However, the trackers are left in the smoothing mode for the present scan, because a noise spike may have produced the large error.

On the scan immediately following the one where the alert flag has been set to 1 as indicated at block 304, the alert flag is reset to zero as indicated at block 306 and each driving error is checked against a corresponding value for the third plurality of numerical parameters at blocks 308, 309 and 310. In the event that none of the driving errors exceeds four times the corresponding deviation statistic, the large error on the previous scan is declared to be a noise spike, and the trackers remain in the smoothing mode as indicated at line 320. However, if the magnitude of any of the driving errors does exceed four times its corresponding statistic, the relative size of the error is used to determine initial and maximum values for the maneuver counter M, the trackers are switched to the maneuver mode, and the tracker weights are changed to their maneuver mode or second plurality of values. Depending on the particular parameter which exceeded the statistic in blocks 308, 309 or 310, the ratio S of the magnitude of the driving error to the smoothing statistic or corresponding one of the third plurality of values is determined at block 322, 324 or 326. In the event such ratio is greater or less than 10 as indicated at decision block 328, counter M is set accordingly. For example, if the ratio is greater than 10, the counter is set to five and the maximum count is set at 10 as indicated at block 330. If the ratio is not greater than 10, then the counter is set to ten and the maximum count is set at 20 as indicated at block 332. Then the flag $L_M$ is set to one, and the second plurality of numerical parameters are assigned to the range, range rate, position, and velocity weights of the target as indicated at processing block 334. Since the large error on the previous scan is now attributed to a target maneuver, the wrong tracker weights (smoothing mode weights) were used to make the predictions on the previous scan. Thus, corrections to each of these predictions are now made at block 336 by subtracting out the product of its old driving error (which was saved in memory on the previous scan at block 318) and its appropriate smoothing mode weight, and by adding in the product of its old driving error and its appropriate maneuver mode weight. These corrected predictions are then subtracted from the samples obtained on the present scan to produce the correct driving errors to send to the trackers. The corrections described and set forth in block 336 are necessary to keep the dynamic errors to a minimum. For a severe target maneuver a delay of even one scan before switching the tracker weights to the maneuver mode values can result in a significant increase in the maximum error that will occur during the maneuver and thereby increase the possibility of losing the track.

If the trackers are in the maneuver mode upon entry into the target maneuver recognition sybsystem, tests are made to determine if the maneuver is over and if the transients in the trackers are decreased to a sufficient level to permit a switch to the smoothing mode. Preferably, the magnitude of each driving error is compared with the value corresponding to 2.5 times its corresponding fourth plurality of numerical parameters or deviation statistics at blocks 340, 342 and 344. If any error exceeds 2.5 times its statistic, this is considered to be sufficient evidence that the target is still maneuvering. During such scan, where the driving error does exceed 2.5 times the statistic, maneuver counter M is increased by two as indicated at block 346. However, such counter is never increased above its maximum as set at either block 330 or block 332 as provided by decision block 348 and processing block 350 in the event such counter should be increased to a count above its set maximum. Thus, on this scan the trackers are left in the maneuver mode. If the magnitude of all three driving errors are less than 2.5 times their respective statistic or fourth plurality of numerical parameters, a check of the counter M is made; if M is not zero as indicated at decision block 352, it is decreased by 1 at block 354, and the program exits over line 356 keeping the trackers in the maneuver mode on this scan.

In the event that the counter is set to zero as indicated at block 352, the driving errors are checked at blocks 360, 362 and 364 to determine if the magnitude of any one of the driving errors for range rate, range, and azimuth angle exceeds 1.5 times its statistic, or the fourth plurality of parameters. If any does, the trackers are left in the maneuver mode and the program exits over line 356. When the magnitude of each driving error is equal to or less than 1.5 times its statistic, then the trackers are switched to the smoothing mode. This final test prevents a switch to the smoothing mode until all of the driving errors are sufficiently small to guarantee a smooth transition to that mode.

The maneuver counter M is inserted into the subsystem to solve a problem that can best be explained in terms of the orientation of the target centripetal acceleration vector during a maneuver. When this vector lies primarily along the radar-to-target line of sight, the largest dynamic errors are produced in the range and range rate predictions. When the vector is primarily perpendicular to this line of sight, the largest dynamic error is produced in the angle prediction. As long as the acceleration vector lies primarily along the line of sight, the range and range rate dynamic errors for most maneuvers are large enough relative to their respective random noise errors to keep the trackers in the maneuver mode regardless of target range. However, when the acceleration vector lies in a direction more perpendicular to the line of sight, the angle dynamic error on many long range targets is not large enough relative to the angle random noise errors to keep the trackers in the maneuver mode. On severe maneuvers, the angle dynamic error is large enough at all target ranges to keep the trackers in the maneuver mode during those times when the range and range rate dynamic errors are too small to do so. On weak maneuvers where the target's centripetal acceleration is on the order of 0.25 g, the angle dynamic error is still large enough for short range targets to accomplish this task, but on long range targets it is not large enough. As a result, a premature switch to the smoothing mode occurs for the long range targets. As the centripetal acceleration vector continues to rotate, a point is reached where the range and range rate dynamic errors become large enough again to switch the trackers back to the maneuver mode. However, the maximum errors during the maneuver are larger when a premature switch to the smoothing mode occurs than when it does not occur. The maneuver counter M has proven to be of significant value in preventing such a premature switch. When a maneuver is over, large transients may still exist in the trackers. The tracker predictions oscillate about their true target coordinates as these transients decay. The maneuver counter M prevents a premature switch to the smoothing mode before the magnitudes of these transients decrease to and remain below the level of the random noise errors. Without the maneuver counter, the trackers tend to switch back and forth between the maneuver and the smoothing modes as the transients pass into and out of nulls. As a result it takes much longer to suppress the transients than is required when the trackers are forced to remain in the maneuver mode.

Initial and maximum values for the maneuver counter M are selected whenever a switch is made from the smoothing mode to the maneuver mode. The values selected, as previously mentioned, depend on the size of the dynamic error producing the switch. A small magnitude dynamic error suggests that a maneuver with a small centripetal acceleration is commencing. Such a maneuver is likely to be of long duration, and therefore relatively large initial and maximum values are selected for the counter to prevent the premature switching previously discussed. A large magnitude dynamic error suggests that a severe maneuver is commencing. A severe maneuver is usually over quickly and therefore relatively small initial and maximum values are selected.

Figure 11:
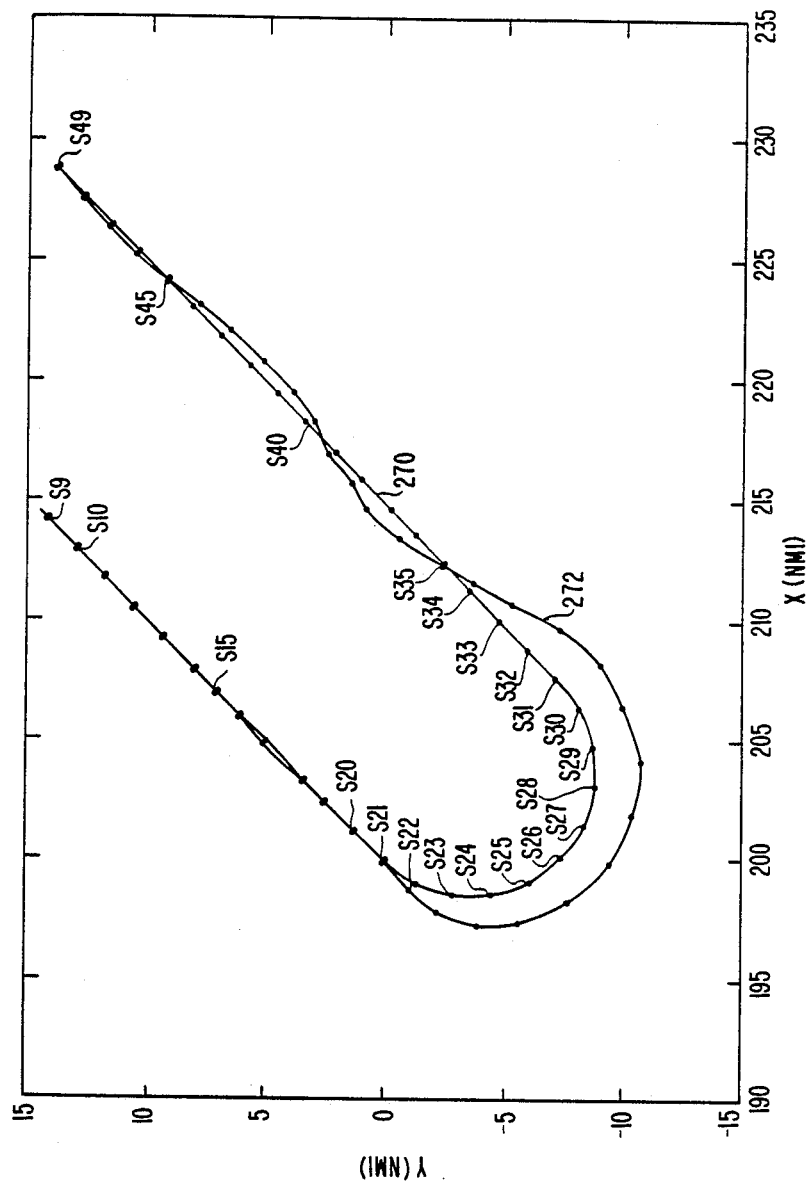
FIGS. 11 and 12 are diagrammatic illustrations of a severely maneuvering and a more moderately maneuvering target, respectively, utilizing the maneuver recognition method and system of the present invention.
Figure 12:
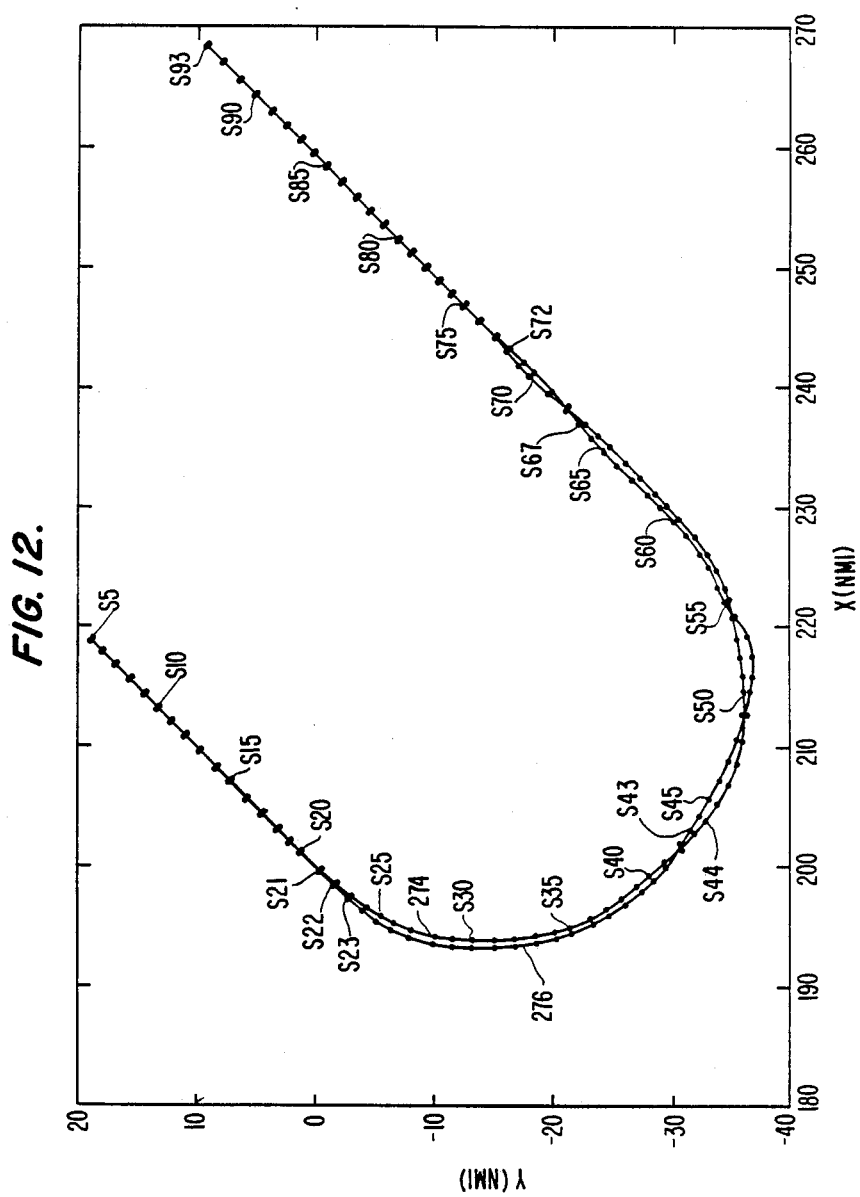

The performance of the target maneuver recognition mechanism subsystem of the present invention is exemplified in FIGS. 11 and 12. Referring to FIG. 11 which illustrates a strong target maneuver, a true target trajectory is represented by line 270. Line 272 which is less regular than 270 represents the predictions made by the X and Y coordinate trackers.

Initially, the target is incoming with a constant velocity and at a 45 degree angle to the radar beam. At a range of 200 nautical miles, it begins a 180° coordinated turn. For the strong maneuver, as illustrated in FIG. 11, the centripetal acceleration during the turn is 1 g. For the weak maneuver, as illustrated in FIG. 12, the centripetal acceleration is 0.25 g. After the turn, the target flies with a constant velocity in the opposite direction. In the examples given, the target speed is 600 knots throughout the trajectory.

The reference numerals S9 and S49 consecutively are radar scan numbers. On the true trajectory 270, the dot associated with each number S9 through S49 is centered on the target position at the time the samples are obtained on that scan. On the curve 272, each dot is centered on the target position predicted for that scan. All of the scan numbers are not referenced in FIG. 11 for the purpose of clarity, and the dots spaced on the lines 270 and 272 that are not numbered represent the intervening scans. The time interval between scans is ten seconds, and the radar is assumed to be located at X=0 and Y=0 which corresponds to a point off of FIG. 11 of 190 nautical miles to the left as viewed in the drawing. For the adaptive tracker performance demonstrated, the parameters in the target trackers and the target maneuver recognition subsystem are set to the values herein described. The tracker weights for the smoothing mode or first plurality of numerical parameteres are set to reduce the RMS value of the random errors in a predicted variable to half of the RMS value of the random errors in its corresponding samples. For the maneuver mode, the weights or second plurality of parameters are set to keep the RMS value of the random errors in a predicted variable equal to the RMS value of the random errors in its corresponding samples. In other words, in the maneuver mode, the random errors in the predictions are not reduced, but neither are they magnified.

As shown in FIG. 11, the maneuver begins immediately after the samples are obtained on scan S21. The maneuver alert flag $L_A$ (see FIG. 10) is set to 1 on scan S22, and the maneuver is declared on scan S23 to have actually begun on scan S22. The maneuver is declared to be a strong maneuver because S for the range rate driving error is equal to 26.3. Therefore, the initial and maximum values of the maneuver counter M are set to 5 and 10, respectively. During the turn, the maneuver counter quickly reaches its maximum, and does not count down to zero until scan S42. The trackers are switched back to the smoothing mode on scan S43. The counter M is instrumental in preventing a switch back to the smoothing mode before the transients induced by the maneuver have been sufficiently suppressed.

Referring to FIG. 12, a weak target maneuver is illustrated. LIne 274 represents the true target trajectory while line 276 represents the predicted trajectory. In comparing FIGS. 11 and 12, it is necessary to double the scale in FIG. 12 relative to the scale in FIG. 11 in order to show the complete turn. As indicated in FIG.

12, the weak target maneuver begins immediately after the samples are obtained on scan S21. The maneuver alert flag $L_A$ is set to 1 on scan S22, and the maneuver is declared on scan S23 to have actually begun on S22. The maneuver is declared to be a weak maneuver in that the value S for the range rate driving error is equal to 7.04. Therefore, the initial and maximum values of the maneuver counter are set to 10 and 20, respectively. During the turn, the maneuver counter quickly reaches its maximum value of 20 and does not count down to zero until scan S67. The trackers are switched back to the smoothing mode shortly thereafter on scan S72. Noise errors prevented the switch from being made between scans S67 and S72. Without the maneuver counter M, the trackers in the example of FIG. 12 would be switched back to the smoothing mode on scan S44 after the maneuver is only about half complete. The range and range rate dynamic errors have decreased to values that are too small relative to their respective random noise errors to keep the trackers in the maneuver mode beyond scan S43. Because the target is at such a long range from the radar, the angle dynamic error does not increase to a large enough value to do the job either.

Figure 13:
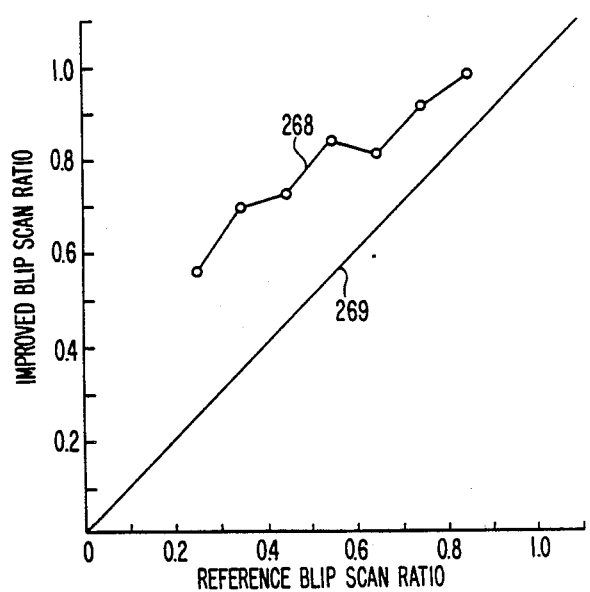
FIG. 13 is a chart illustrating improvement in the blip/scan ratio of the present invention.

Referring to FIG. 13, each point on the broken curve referred to as 268 represents an average of blip/scan ratios obtained using the present invention for a number of targets whose blip/scan ratios without the invention fall in the abscissa cell of length 0.1 about such point. The averages were used to reduce fluctuations in the curve. In a system without the benefit of the present invention, a minimum desirable blip/scan ratio of 0.32 is specified; with the improvement provided by the present invention, the blip/scan ratio is increased to approximately 0.7. The rule of thumb for fluctuating targets over the linear portion of a probability of detection versus signal-to-noise curve is that about 1 dB of improvement is obtained for each 0.08 increase in probability. This means that the present invention provides approximately 5 dB of improvement. In establishing the improvement as illustrated in the diagram of FIG. 13, thirty target tracks established by a system without the benefit of the present invention were selected for analysis. These tracks had blip/scan ratios that covered the interval from 0.2 to 0.9. The same recorded target data was then reprocessed during a simulation of the present invention. In general, a significant improvement, as shown in FIG. 13, in the blip/scan ratio occurred for the thirty tracks. The straight line referred to at 269 represents the blip/scan ratio obtained when the present invention is not used.

Figure 14:
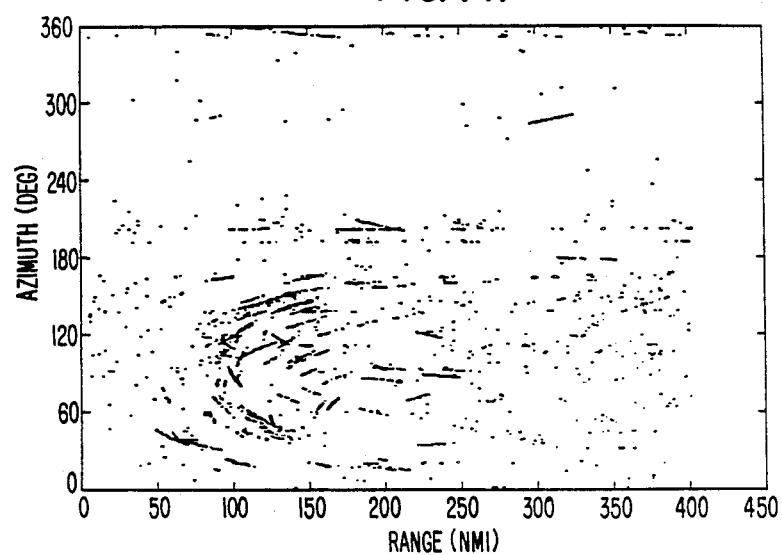
FIGS. 14 and 15 are computer printouts illustrating a display, both without and with the detection processing of the present invention.
Figure 15:
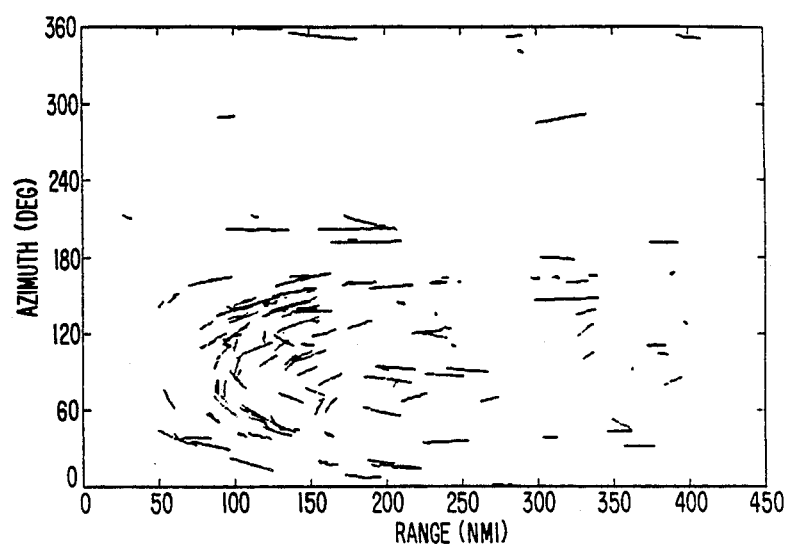

Referring to FIG. 14, a computer printout of a display was made for a pulse Doppler radar surveillance system without the benefit of the present invention during 20 scans of the antenna. FIG. 15 is a display of tracks obtained over 20 scans of the antenna with the benefit of the present invention. As is evident from a comparison between FIGS. 14 and 15, a much clearer picture of actual targets is obtained using the invention even at ranges extending beyond 350–400 nautical miles.

A program listing suitable for performing the functions described in connection with FIGS. 1 through 10 is set forth in the Appendix A attached hereto on pages A1 through A114.

It will be apparent to those skilled in the art that various modifications and variations can be made in the pulse Doppler radar system and method of the present invention without departing from the spirit or scope of the invention. It is intended that the present invention cover such modifications and variations of this invention provided they come within the scope of the appended claims and their equivalents.

```
************************************************************
*                   SCAN-TO-SCAN PROCESSOR
************************************************************
      CHARACTER*5 FDATE
      COMMON TARV,T,DDD,TAU,TAUA,SIGA,SIGR,SIGD,
     ?NTRV,ITOTAL,ITSTAT(4000),
     ?TUF DOPM(4000),
     ?ANGM(4000),RNGM(4000)
      COMMON /TRACK/ ISCH,CRD,I33,NOMORE,
     &IOF TEF NODOP IDSR23,IDHDLR,IDOPEL,
     ?IMODAZ,CLMAX,ELMIN,BETAMIN,IET,IEXTRA,IRDOT,AZCORMIN,AZCORMAX,
     ?NUM REPORTS UPDATE, itime_ck
      COMMON EXWIND CMIN,CMAX
      DIMENSION JDUM(40),XDUM(10),KDUM(10),DATE_ARRAY(3)
      EQUIVALENCE (FDATE,DATE_ARRAY(1))
C------------------------------------------------------------
      HANDLE=0
      STT=LIB$INIT_TIMER(HANDLE)
C------------------------------------------------------------
C     ENTER RUN DATA
C
      NODOP=0            'DOPPLER TRACKING (0-YES, 1-NO)
      IDOPEL=1           'DOPPLER CORRELATION
      TYPE*, 'DO U WANT 1/8(ENTER 1) OR 2/8(ENTER 2)REPORTS FOR UPDATE'
      READ*, NUM_REPORTS_UPDATE
      TYPE*, 'DO U WANT JUST 3/3 PROCESSED ? (1=YES , 0=NO)'
      READ* I33
      TYPE*, 'ENTER SCHEME NUMBER (1, 2, 3 OR 4)'
      READ*, ISCH
      TYPE*, 'ENTER OPTION (1,2,3,4,5,OR 6...)'
      READ*, IOP
      TYPE*, 'ENTER TIME OF FIRST WRITE TO COR'
      READ*, TFF
      IEXPAN=1                    !EXPANDING WINDOW
      CMIN=14
      CMAX=19
      DDD=1
      IPASS=0
      IDSR2=0            !ELIM OF SHORT 2/3 RANGE AT A0 LEVEL
      IDHDL=0            !FOR ELIM OF HI DOP-LONG RANGE AT A0 LEVEL
      IMODAZ=0           !DOPF ERROR USED TO ENHANCE ACTIVE AZ TRACKER
      TYPE*, 'ENTER LAST SCAN TIME'
```

```
      READ*, TIMEND
      IF(TIMEND.GE.TRF)THEN
         TYPE*,'ENTER THE LOWER AZIMUTH BOUNDARY IN DEGREES'
         READ*,AZCORMIN
         TYPE*,'ENTER THE UPPER AZIMUTH BOUNDARY IN DEGREES'
         READ*,AZCORMAX
      ELSE
         AZCORMIN = 0
         AZCORMAX = 360
      ENDIF
      ELMIN=1.3888
      ELMAX=20.
      FLP=0
      SIGA=.225      !SIGA=.15    5/8/86
      SIGA=SIGA/57.29578
      SIGR=.0713     !SIGR=0.043  NM   5/8/86
      CRD=.20        !CRD IS IN NM
      SIGD=5.78      !SIGD=8.5         5/8/86
      SIGD=SIGD/3600
      TYPE*,'ENTER 1 FOR WRITE TO ETEMP'
      TYPE*,'         0 OTHERWISE'
      READ*,IET
      IF(IET.EQ.1)THEN
         TYPE*,'ENTER 1 FOR EXTRA DATA'
         TYPE*,'         0 OTHERWISE'
         READ*,IEXTRA
      ENDIF
      IF(IET.EQ.1)THEN
         TYPE*,'ENTER 1 FOR MULTIPLE R-DOT VERSION OF OUTPUT'
         TYPE*,'         0 OTHERWISE'
         READ*,IRDOT
      ENDIF
C
C-------------------------------------------------------------------
C
C     INITIALIZE RUN PARAMETERS
C
      itime_ck=0
      T=0.                              !INITIAL TIME IN SIMULATION
      NTRK=0                            !INITIAL NUMBER OF TRACKS
      DATA TUP,TAU,TAUA/1.0,10.0,0.7/
      TUP=TAU
      DATA PI,TWOPI,RAD/3.14159265,6.28318531,57.29578/
C
C-------------------------------------------------------------------
C
C     OPEN FILES
C
      OPEN(20,FILE='SUMMARY',STATUS='UNKNOWN')
      CALL DATE(PDATE)
      WRITE(20,2008)PDATE
      READ(78,END=1170)JDUM
      READ(78,END=1170)XDUM
      READ(78,END=1170)KDUM
      WRITE(6,10000)JDUM
      WRITE(6,10001)XDUM
      WRITE(6,10002)KDUM
10000 FORMAT(1H ,10A4//,10I10//,10I10//,10I10)
10001 FORMAT(1H ,10F10.2)
10002 FORMAT(1H ,I2,1H/,I2,1H/,I2,2H  ,I2,1H:,I2,1H:,I2,//,4I10)
      IF(IET.EQ.1)THEN
         OPEN(88,FILE='ETEMP',STATUS='UNKNOWN',FORM='UNFORMATTED')
         WRITE(88)JDUM
         WRITE(88)XDUM
         WRITE(88)KDUM
         NUMSC=1+TIMEND/10
         WRITE(88)DATE_ARRAY
         WRITE(88)NUMSC
2008     FORMAT(70X,A9)
2009     FORMAT(1X,I5)
2010     FORMAT(1X,A9)
      ENDIF
      IF(IEXTRA.EQ.1)THEN
         OPEN(89,FILE='EXTRA',STATUS='UNKNOWN',FORM='UNFORMATTED')
         WRITE(89)NUMSC
      ENDIF
      IF(TRF.LT.1200.)OPEN(31,FILE='COR',STATUS='UNKNOWN')
C
C-------------------------------------------------------------------
C
C     WRITE RUN DATA TO FILES
C
      IF(T.GE.TRF)THEN
         WRITE(31,440)ISCH
         WRITE(31,446)IOP
         WRITE(31,451)IDSRZ
         WRITE(31,452)IDHDL
      ENDIF WRITE(20,440)ISCH
      WRITE(20,446)IOP
      WRITE(20,454)
      WRITE(20,431)
      WRITE(37,4003)
```

```
4005    FORMAT(1X,'REPORT   HOURS   MINS    SECS    MSEC    LAT     LON '
     &,'          VN              VE      ROLL    PITCH   HEAD')
C
C---------------------------------------------------------------
C       FORMAT STATEMENTS
C
431     FORMAT(/1X,7HIDSR23=,I2)
432     FORMAT(/1X,7HIDHDLR=,I2)
431     FORMAT(1X,97H------------------------------------------------
     &---------------------------------------------)
434     FORMAT(//1X,97H  T      33     22     23     A0     A1     A2     A3
     &   A4    A5    A6   TT   TI   TU   TC   TD   ET   FT   EU   EC   ED   TO)
446     FORMAT(/1X,6HOPTION,I2)
440     FORMAT(/1X,6HSCHEME,I2)
C
C---------------------------------------------------------------
C
C       READ TARGET FILE FOR INIITIAL DATA AND CONVERT DATA TO PROPER UNITS
C
        AMIN=1.-1./ELMIN
        AMAX=1.-1./ELMAX
        BMIN=(1.-SQRT(1.-AMIN))**2
        BMAX=(1.-SQRT(1.-AMAX))**2
100     CONTINUE
        IF(T.GT.TIMEND.OR.NOMORE.EQ.1)GO TO 1160
        IF(T/TAU.NE.INT(T/TAU))GO TO 1158
        CALL ATRKR
1158    CONTINUE
        T=T+TUP
        GO TO 100
1160    CONTINUE
        IF(IET.EQ.1)THEN
          CALL OUTPUT(-1,0,0,0,0,0,
     %   0.,0.,0.,0.,
     %   0.,0.,0.,0.,0.,
     %   0,0,0.,0.,0.,0.,0.,0.,0.,0.,0.,0.,0.,0.,0.,0.,0.,0.,0.,0.,0.)
          WRITE(88)NTRK,ITOTAL   !NUM TRACKS ALIVE AT END & NUM INITIATED
        ENDIF
        IF(IEXTRA.EQ.1)THEN
          CALL OUTPUT2(-1,0,0,0,0.,0.,0.,0.,0.,0.,0.,0.,0.,
     %   0.,0.,0.,0,0.,0.,0.,0.,0.)
          WRITE(89)NTRK,ITOTAL
        ENDIF
1170    CONTINUE
        CLOSE(10)
        CLOSE(51)
        CLOSE(20)
        CLOSE(88)

STT=LIB$SHOW_TIMER(HANDLE)

END
C****************************************************************
C
C       SUBROUTINE AZORT ORDERS TRACK INDEX IN
C       AZIMUTH ORDERED TRACK INDEX FILE
C
C
        SUBROUTINE AZORT(KK)
        COMMON/TRACKER/DM(4,8000),RMEAS,AZM(4000),
     %  XM(4000),YM(4000),DP(4000),RP(4000),AZP(4000),XP(4000)
     %  ,YP(4000),TUP,IAOT(4000),XDOTP(4000),YDOTP(4000)
        DO 90 II=KK,2,-1
          if(ii.gt.4000)print*,'error'
        IF(AZP(IAOT(II-1)).LE.AZP(IAOT(II)))GO TO 95
        IAOTS=IAOT(II)
        IAOT(II)=IAOT(II-1)
        IAOT(II-1)=IAOTS
90      CONTINUE
95      CONTINUE
        RETURN
        END
C****************************************************************
C   SUBROUTINE STABL ACCOUNTS FOR PITCH AND ROLL AND PRODUCES
C   A MORE ACCURATE AZIMUTH MEASUREMENT WITH RESPECT TO NORTH
C
C   NON-EL SCAN
C
C
C   THIS VERSION OF THESE SUBROUTINES COMPUTES EL WITHOUT
C   USING DELTA AZIMUTH.
C
        SUBROUTINE STABL
        COMMON/LABEL/AZSTAB,AZMRS(4000),DELAZM(4000),PITCH(4000)
     %   ,ROLL(4000),SQUINT,RG,RAD,JJ,HEADG,ELCMD,PI
        IFLG=0
C  ALL SIN AND COS COMPUTATIONS MUST BE DONE IN RADIANS
        PIT=PITCH(JJ)/RAD
        ROL=ROLL(JJ)/RAD
        SQUINT=SQUINT+.089          !BIAS IN RDC
        SQUINT=SQUINT/RAD
        DELAZM(JJ)=DELAZM(JJ)/RAD
        AZMRS(JJ)=AZMRS(JJ)/RAD
        ELCMD=ELCMD/RAD
```

```
          AZ=AZMRS(JJ)
          AZMRS(JJ)=AZMRS(JJ)-DELAZM(JJ)
C   MATRIX ELEMENTS TO CONVERT FROM ANTENNA COORDINATES TO
C   SPACE COORDINATES
          A11=COS(AZMRS(JJ))*COS(PIT)+SIN(AZMRS(JJ))*SIN(ROL)*SIN(PIT)
          A12=-SIN(AZMRS(JJ))*COS(ROL)
          A13=COS(AZMRS(JJ))*SIN(PIT)-SIN(AZMRS(JJ))*SIN(ROL)*COS(PIT)
          A21=SIN(AZMRS(JJ))*COS(PIT)-COS(AZMRS(JJ))*SIN(ROL)*SIN(PIT)
          A22=COS(AZMRS(JJ))*COS(ROL)
          A23=SIN(AZMRS(JJ))*SIN(PIT)+COS(AZMRS(JJ))*SIN(ROL)*COS(PIT)
          A31=-COS(ROL)*SIN(PIT)
          A32=-SIN(ROL)
          A33=COS(ROL)*COS(PIT)
C
          C1=A13**2+A33**2
          C2=-2*A33*(A23*SIN(SQUINT)+SIN(ELCMD))
          C3=(A23*SIN(SQUINT)+SIN(ELCMD))**2-(A13**2)*
     %       (1-(SIN(SQUINT)**2))
C   SOLVE THE ABOVE QUADRATIC EQUATION TO FIND THE TWO ROOTS
          IF((C2**2-4.*C1*C3).LT.0.)THEN
             ERRORFLAG=1
             R1=(-C2-(ABS(C2**2-4.*C1*C3)**.5))/(2.*C1)     !SIN(THETA1)
             R2=(-C2+(ABS(C2**2-4.*C1*C3)**.5))/(2.*C1)     !SIN(THETA2)
          ELSE
             ERRORFLAG=0
             R1=(-C2-(C2**2-4.*C1*C3)**.5)/(2.*C1)          !SIN(THETA1)
             R2=(-C2+(C2**2-4.*C1*C3)**.5)/(2.*C1)          !SIN(THETA2)
          ENDIF

AR1=ASIN(R1)                                      !THETA1
          AR2=ASIN(R2)                                      !THETA2
          BKW1=A13*((COS(AR1)**2)-(SIN(SQUINT)**2))**.5
     %         -A23*SIN(SQUINT)+A33*R1
          BKW2=A13*((COS(AR2)**2)-(SIN(SQUINT)**2))**.5
     %         -A23*SIN(SQUINT)+A33*R2
C   THE ROOT WHICH IS CLOSEST TO THE SIN OF THE COMMANDED
C   ELEVATION IS USED.  THE ARCSIN OF THAT VALUE IS THE
C   ELEVATION ANGLE.
          D1=ABS(SIN(ELCMD)-BKW1)
          D2=ABS(SIN(ELCMD)-BKW2)
          EL=AR1
          IF (D1.GT.D2)EL=AR2
C   ONCE ELEVATION IS FOUND, USE IT TO PERFORM THE FOLLOWING
C   TRANSFORMATIONS.
          VI=SQRT((COS(EL)**2)-(SIN(SQUINT)**2))
          VJ=-SIN(SQUINT)
          VK=RG*SIN(EL)
          VL=COS(AZMRS(JJ))*VI+SIN(AZMRS(JJ))*VJ
          VM=-SIN(AZMRS(JJ))*VI+COS(AZMRS(JJ))*VJ
          VN=VK
C   USE ROTODOME COORDINATES TO COMPUTE SPACE COORDINATES
  10      VX=(VL*COS(PIT))-(VM*SIN(PIT)*SIN(ROL))-
     %       (VN*SIN(PIT)*COS(ROL))
          VY=(VM*COS(ROL))-(VN*SIN(ROL))
C   AZIMUTH IN SPACE COORDINATES
C         AZS=ATAN2(VX,VY)-PI/2.
          AZS=ATAN2(-VY,VX)
  6       FORMAT(1X,12F10.3)
C   COMPUTE DELAZM TO COMPARE TO THE GIVEN VALUES.
          DELAZM(JJ)=ASIN(SIN(SQUINT)/COS(EL))
C   CONVERT ALL ANGLES BACK TO DEGREES
          EL=EL*RAD
          SQUINT=SQUINT*RAD
          ROL=ROL*RAD
          PIT=PIT*RAD
          AZ=AZ*RAD
          AZS=AZS*RAD
          AZS=AZS-.089
          ELCMD=ELCMD*RAD

DELAZM(JJ)=DELAZM(JJ)*RAD

IF (AZS.GT.360)AZS=AZS-360
          IF (AZ.GT.360)AZ=AZ-360
          IF (AZS.LT.0)AZS=AZS+360
          IF (AZ.LT.0)AZ=AZ+360
          AZMRS(JJ)=AZS

C   ADD HEADING TO AZIMUTH
  30      AZS=AZS+HEADG
          IF(AZS.GT.360.)AZS=AZS-360.
          IF(AZS.LT.0.)AZS=AZS+360.
          AZSTAB=AZS

RETURN
          END
C
C
C
C   SUBROUTINE FREQ SETS UP A LOOK UP TABLE TO GIVE THE
C   SQUINT ANGLE ASSOCIATED WITH EACH FREQUENCY
          SUBROUTINE FREQ(IRF)
          DIMENSION SQNT(6)
          COMMON/LABEL/AZSTAB,AZMRS(4000),DELAZM(4000),PITCH(4000),
     %    ROLL(4000),SQUINT,RG,RAD,JJ,HEADG,ELCMD,PI
```

```
      DATA SQUNT/-25.271,-24.058,-22.894,-20.243,-19.313,-18.318/
      SQUINT=SQUNT(IRF)
      RETURN
      END
C***************************************************************
      SUBROUTINE OUTPUT(ISCAN, ICTN, ICTR, ITRKNUM, ITSTAT, IUP, RMEAS,
     % AZM, AZMRS, DM, RSIGSIG, KRLS, KRNS, ITYP, KHOURS, KMINS, KSECS,
     % KMSECS, RPP, AZPP, DPF, XP, YP, FF, HLAT, HLON, VEAST, VNORTH, ELCOM,
     % KMODE, HTRK, VTRK, XDOTP, YDOTP, MAN_FLAG, DMRAW, DM2, DM3, DM4)
      COMMON/ATRACK/ISCH, CRD, I33, NOMORE, IOP, TRF, NODOP,
     %IDSR23, IDHDLR, IDOPEL, IMODAZ, ELMAX, ELMIN, BETAMIN, IET,
     %IEXTRA, IRDOT, AZCORMIN, AZCORMAX, NUM_REPORTS_UPDATE, itime_ck
      DIMENSION ARRAY(31), IARRAY(31)
      EQUIVALENCE (ARRAY(1), IARRAY(1))
      DATA RAD /57.29578/
      LTIME=KHOURS*67108864+KMINS*1048576+KSECS*16384+KMSECS*16
      IARRAY(1)=ISCAN
      IARRAY(2)=ICTN
      IARRAY(3)=ICTR
      IARRAY(4)=ITRKNUM
      IARRAY(5)=ITSTAT
      IARRAY(6)=IUP
      ARRAY(7)=RMEAS
      ARRAY(8)=AZM*RAD
      IF (IRDOT.EQ.1) THEN
         ARRAY(9)=DM2*3600.
      ELSE
         ARRAY(9)=AZMRS*RAD
      ENDIF
      ARRAY(10)=DM*3600.
      IF (IRDOT.EQ.1) THEN
         ARRAY(11)=DM3*3600.
      ELSE
         ARRAY(11)=RSIGSIG
      ENDIF
      IARRAY(12)=KRLS
      IARRAY(13)=KRNS
      IF (IRDOT.EQ.1) THEN
         ARRAY(14)=AZMRS*RAD
      ELSE
         IARRAY(14)=ITYP
      ENDIF
      IARRAY(15)=LTIME+KMODE
      ARRAY(16)=HTRK*RAD
      ARRAY(17)=VTRK*3600.
      IARRAY(18)=MAN_FLAG
      ARRAY(19)=RPF
      ARRAY(20)=AZPP*RAD
      ARRAY(21)=DPF*3600.
      ARRAY(22)=XP
      ARRAY(23)=YP
      IF (IRDOT.EQ.1) THEN
         ARRAY(24)=DM4*3600.
      ELSE
         ARRAY(24)=FF
      ENDIF
      ARRAY(25)=HLAT
      ARRAY(26)=HLON
      ARRAY(27)=VEAST
      ARRAY(28)=VNORTH
      ARRAY(29)=ELCOM*RAD
      IARRAY(30)=YDOTP
      ARRAY(31)=DMRAW
      WRITE(88)ARRAY
      RETURN
      END
C***************************************************************
      SUBROUTINE OUTPUT2(ISCAN, ICTN, ICTR, ITRKNUM, XPOLD, XDOTPOLD,
     % YDOTPOLD, AZPOLD, RPOLD, DPOLD, XPNEW, XDOTPNEW, YPNEW, YDOTPNEW,
     % AZPNEW, RPNEW, DPNEW, DELX, DELXDOT, DELY, DELYDOT, DELR, DELRDOT)
      DIMENSION ARRAY(24), IARRAY(24)
      EQUIVALENCE (ARRAY(1), IARRAY(1))
      DATA RAD /57.29578/
      IARRAY(1)=ISCAN
      IARRAY(2)=ICTN
      IARRAY(3)=ICTR
      IARRAY(4)=ITRKNUM
      ARRAY(5)=XPOLD
      ARRAY(6)=XDOTPOLD*3600.
      ARRAY(7)=YPOLD
      ARRAY(8)=YDOTPOLD*3600.
      ARRAY(9)=AZPOLD*RAD
      ARRAY(10)=RPOLD
      ARRAY(11)=DPOLD*3600.
      ARRAY(12)=XPNEW
      ARRAY(13)=XDOTPNEW*3600.
      ARRAY(14)=YPNEW
      ARRAY(15)=YDOTPNEW*3600.
      ARRAY(16)=AZPNEW*RAD
      ARRAY(17)=RPNEW
      ARRAY(18)=DPNEW*3600.
      ARRAY(19)=DELX
      ARRAY(20)=DELXDOT*3600.
```

```
      ARRAY(21)=DELY
      ARRAY(22)=DELYDOT*3600.
      ARRAY(23)=DELR
      ARRAY(24)=DELRDOT*3600
      WRITE(89)ARRAY
      RETURN
      END
C************************************************************************

SUBROUTINE MANEUVER(I)

COMMON/FLAG/MANEUVER_FLAG(4000),ALERT_FLAG(4000)
     & ,M(4000),MAX(4000)

COMMON/WEIGHT_TABLE/ WEIGHT_R(4000),WEIGHT_RDOT(4000),
     & WEIGHT_POS(4000),WEIGHT_POSDOT(4000)

COMMON/SIGMA_TABLE/SIG_R_MANEUV,SIG_RDOT_MANEUV,
     & SIG_AZ_MANEUV,SIG_R_SMOOTH,SIG_RDOT_SMOOTH,
     & SIG_AZ_SMOOTH

COMMON/DELTA/DELTA_R(4000),DELTA_RDOT(4000)
     & ,DELTA_AZ(4000),DELTA_X(4000),DELTA_Y(4000)

DATA WEIGHT_R_SMOOTH,WEIGHT_RDOT_SMOOTH,WEIGHT_POS_SMOOTH,
     & WEIGHT_POSDOT_SMOOTH /0.4,0.4,.18885,0.04458/    !23344 NOT 1.8  5/8/86

IF(ABS(DELTA_RDOT(I)).GT.2.5*SIG_RDOT_MANEUV.OR.
     & ABS(DELTA_R(I)).GT.2.5*SIG_R_MANEUV.OR.
     & ABS(DELTA_AZ(I)).GT.2.5*SIG_AZ_MANEUV)  THEN

M(I)=M(I)+2
          IF(M(I).GT.MAX(I))M(I)=MAX(I)

ELSE

IF(M(I).EQ.0)THEN         !MANEUVER IS OVER

IF(ABS(DELTA_RDOT(I)).LE.1.5*SIG_RDOT_MANEUV.AND.
     &        ABS(DELTA_R(I)).LE.1.5*SIG_R_MANEUV.AND.
     &        ABS(DELTA_AZ(I)).LE.1.5*SIG_AZ_MANEUV) THEN

MANEUVER_FLAG(I) = 0
                WEIGHT_R(I) = WEIGHT_R_SMOOTH
                WEIGHT_RDOT(I) = WEIGHT_RDOT_SMOOTH
                WEIGHT_POS(I) = WEIGHT_POS_SMOOTH
                WEIGHT_POSDOT(I) = WEIGHT_POSDOT_SMOOTH

ENDIF

ELSE
                M(I)=M(I)-1
          ENDIF

ENDIF

RETURN
      END
C************************************************************************

SUBROUTINE SMOOTH(I,JJ,IDOP)

COMMON/FLAG/MANEUVER_FLAG(4000),ALERT_FLAG(4000)
     & ,M(4000),MAX(4000)

COMMON/TRACKER/DM(4,8000),RMEAS,AZM(4000),
     & XM(4000),YM(4000),DP(4000),RP(4000),AZP(4000),XP(4000)
     & ,YP(4000),TUP,IAOT(4000),XDOTP(4000),YDOTP(4000)

COMMON/WEIGHT_TABLE/ WEIGHT_R(4000),WEIGHT_RDOT(4000),
     & WEIGHT_POS(4000),WEIGHT_POSDOT(4000)

COMMON/SIGMA_TABLE/SIG_R_MANEUV,SIG_RDOT_MANEUV,
     & SIG_AZ_MANEUV,SIG_R_SMOOTH,SIG_RDOT_SMOOTH,
     & SIG_AZ_SMOOTH

IF(ALERT_FLAG(I).EQ.1)THEN
           CALL ALERT(I,JJ,IDOP)
         ELSE
           CALL NOALERT(I)
         ENDIF
      RETURN
      END
C************************************************************************
```

```
      SUBROUTINE NOALERT(I)

COMMON/FLAG/MANEUVER_FLAG(4000),ALERT_FLAG(4000)
     &  ,M(4000),MAX(4000)

COMMON/WEIGHT_TABLE/ WEIGHT_R(4000),WEIGHT_RDOT(4000),
     &  WEIGHT_POS(4000),WEIGHT_POSDOT(4000)

COMMON/SIGMA_TABLE/SIG_R_MANEUV,SIG_RDOT_MANEUV,
     &  SIG_AZ_MANEUV,SIG_R_SMOOTH,SIG_RDOT_SMOOTH,
     &  SIG_AZ_SMOOTH

COMMON/SAVE_DEL/SAVE_DELTA_RDOT(4000),SAVE_DELTA_R(4000)
     &  ,SAVE_DELTA_X(4000),SAVE_DELTA_Y(4000)

COMMON/DELTA/DELTA_R(4000),DELTA_RDOT(4000)
     &  ,DELTA_AZ(4000),DELTA_X(4000),DELTA_Y(4000)

IF(ABS(DELTA_RDOT(I)).GT.4.*SIG_RDOT_SMOOTH.OR.
     &   ABS(DELTA_R(I)).GT.4.*SIG_R_SMOOTH.OR.
     &   ABS(DELTA_AZ(I)).GT.4.*SIG_AZ_SMOOTH) THEN

ALERT_FLAG(I)=1

SAVE_DELTA_RDOT(I)= DELTA_RDOT(I)
         SAVE_DELTA_R(I)  = DELTA_R(I)
         SAVE_DELTA_X(I)  = DELTA_X(I)
         SAVE_DELTA_Y(I)  = DELTA_Y(I)

ENDIF
      RETURN
      END
C***********************************************************************
      SUBROUTINE ALERT(I,JJ,IDOP)

COMMON/FLAG/MANEUVER_FLAG(4000),ALERT_FLAG(4000)
     &  ,M(4000),MAX(4000)

COMMON/TRACKER/DM(4,8000),RMEAS,AZM(4000),
     &  XM(4000),YM(4000),DP(4000),RP(4000),AZP(4000),XP(4000)
     &  ,YP(4000),TUP,IAOT(4000),XDOTP(4000),YDOTP(4000)

COMMON/WEIGHT_TABLE/ WEIGHT_R(4000),WEIGHT_RDOT(4000),
     &  WEIGHT_POS(4000),WEIGHT_POSDOT(4000)

COMMON/SIGMA_TABLE/SIG_R_MANEUV,SIG_RDOT_MANEUV,
     &  SIG_AZ_MANEUV,SIG_R_SMOOTH,SIG_RDOT_SMOOTH,
     &  SIG_AZ_SMOOTH

COMMON/SAVE_DEL/SAVE_DELTA_RDOT(4000),SAVE_DELTA_R(4000)
     &  ,SAVE_DELTA_X(4000),SAVE_DELTA_Y(4000)

COMMON/DELTA/DELTA_R(4000),DELTA_RDOT(4000)
     &  ,DELTA_AZ(4000),DELTA_X(4000),DELTA_Y(4000)

DATA WEIGHT_R_MANEUV,WEIGHT_RDOT_MANEUV,WEIGHT_POS_MANEUV,
     &  WEIGHT_POSDOT_MANEUV /1.0,1.0,.41421,.34315/   T75736 NOT .41 5/8/86

DATA WEIGHT_R_SMOOTH,WEIGHT_RDOT_SMOOTH,WEIGHT_POS_SMOOTH,
     &  WEIGHT_POSDOT_SMOOTH /0.4,0.4,.18885,0.04458/  !23344 NOT 1.8 5/8/86

ALERT_FLAG(I) = 0

IF(ABS(DELTA_RDOT(I)).GT.4.*SIG_RDOT_SMOOTH) THEN
         S=ABS(DELTA_RDOT(I))/SIG_RDOT_SMOOTH

ELSE IF(ABS(DELTA_R(I)).GT.4.*SIG_R_SMOOTH) THEN
         S=ABS(DELTA_R(I))/SIG_R_SMOOTH

ELSE IF(ABS(DELTA_AZ(I)).GT.4.*SIG_AZ_SMOOTH) THEN
         S=ABS(DELTA_AZ(I))/SIG_AZ_SMOOTH

ELSE
         RETURN
      ENDIF
      M(I)   = 5
      MAX(I) = 10

IF(S.LE.10)THEN
         M(I) = 10
         MAX(I) = 20
      ENDIF

MANEUVER_FLAG(I) = 1

WEIGHT_R(I) = WEIGHT_R_MANEUV
```

```
      WEIGHT_RDOT(I) = WEIGHT_RDOT_MANEUV
      WEIGHT_POS(I) = WEIGHT_POS_MANEUV
      WEIGHT_POSDOT(I) = WEIGHT_POSDOT_MANEUV

RP(I)=RP(I)+(WEIGHT_R_MANEUV-WEIGHT_R_SMOOTH)*
    % SAVE_DELTA_R(I)+(WEIGHT_RDOT_MANEUV
    % -WEIGHT_RDOT_SMOOTH)*SAVE_DELTA_RDOT(I)*TUP

DELTA_R(I)=RMEAS-RP(I)

DP(I)=DP(I)+(WEIGHT_RDOT_MANEUV
    % -WEIGHT_RDOT_SMOOTH)*SAVE_DELTA_RDOT(I)

DELTA_RDOT(I)=DM(IDOP,JJ)-DP(I)

XP(I)=XP(I)+(WEIGHT_POS_MANEUV-WEIGHT_POS_SMOOTH+
    % WEIGHT_POSDOT_MANEUV-WEIGHT_POSDOT_SMOOTH)*SAVE_DELTA_X(I)

DELTA_X(I)=XM(JJ)-XP(I)

XDOTP(I)=XDOTP(I)+(WEIGHT_POSDOT_MANEUV-
    % WEIGHT_POSDOT_SMOOTH)*SAVE_DELTA_X(I)/TUP

YP(I)=YP(I)+(WEIGHT_POS_MANEUV-WEIGHT_POS_SMOOTH+
    % WEIGHT_POSDOT_MANEUV-WEIGHT_POSDOT_SMOOTH)*SAVE_DELTA_Y(I)

DELTA_Y(I)=YM(JJ)-YP(I)

YDOTP(I)=YDOTP(I)+(WEIGHT_POSDOT_MANEUV-
    % WEIGHT_POSDOT_SMOOTH)*SAVE_DELTA_Y(I)/TUP

RETURN
      END

SUBROUTINE AMPFIN(INSLNT,IN)
      COMMON /REPTGT/ TGTBUF(80000),IAD
      COMMON /APARM/ AMP(8),RDOT(8),TPEL(8),IDIV
      DIMENSION INSLNT(8),IBSIN(3),IGTBUF(80000)
      EQUIVALENCE (IGTBUF(1),TGTBUF(1))
      DATA IBSIN/49,36,36/

C     *********************

DO 50 I=1,8
      AMP(I)=0.
      TPEL(I)=0.
  50  RDOT(I)=0.
      DO 500 I=1,IN
      IX=INSLNT(I)
      ITYPE=MMOD(IGTBUF(IX+1),4)
      IBST=3
      IF(ITYPE.NE.1) IBST=2
      INK=IBSIN(ITYPE)
C     WRITE(6,1000) IN,IX,ITYPE,IBST
      IF(I.GT.1) GO TO 200
      DO 100 K=1,IBST
      JJ=(K-1)*8
      TPEL(I+K-1)=TGTBUF(INK+IX+JJ+1)
      RDOT(I+K-1)=TGTBUF(INK+IX+JJ-3)
 100  AMP(I+K-1)=ABS(TGTBUF(INK+IX+JJ))
      IDIV=IBST
      IFBST=IBST-1
      GO TO 500
 200  IF=ISTYPE-ITYPE
      IS=2
      IF(ITYPE.NE.1) IS=1
C     WRITE(6,1000) IN,IX,IF,IS
      IF(IF.EQ.2) GO TO 300
      IF(IF.EQ.0.AND.ITYPE.EQ.2) GO TO 300
      IS=IS*8
      AMP(I+IFBST)=ABS(TGTBUF(IX+INK+IS))
      RDOT(I+IFBST)=TGTBUF(IX+INK+IS-3)
      TPEL(I+IFBST)=TGTBUF(IX+INK+IS+1)
      IDIV=IDIV+1
      GO TO 500
 300  JJ=(IS-1)*8
C     WRITE(6,1000) IF,ITYPE,JJ,IX,INK
      DO 400 M=1,2
      KK=(M-1)*8
      AMP(I+IFBST+M-1)=ABS(TGTBUF(IX+INK+JJ+KK))
      RDOT(I+IFBST+M-1)=TGTBUF(IX+INK+JJ+KK-3)
 400  TPEL(I+IFBST+M-1)=TGTBUF(IX+INK+JJ+KK+1)
      IDIV=IDIV+2
 500  ISTYPE=ITYPE
C     WRITE(6,1010) AMP,RDOT,TPEL
      RETURN
1000  FORMAT(1H ,8I10)
1010  FORMAT(1H0,8F10.3/,1X,8F10.3/,1X,8F10.3)
      END
```

```
      FUNCTION AVGFIL(IP)
C
C         FINDS THE AVERAGE OF THE 3 FILTERS IN ONE 3/3 TARGET
C
      COMMON /REPTGT/ TGTBUF(80000),IAD
      AVGFIL=(TGTBUF(IP+46)+TGTBUF(IP+54)+TGTBUF(IP+62))/3.
C     WRITE(6,1000) AVGFIL
      RETURN
 1000 FORMAT(1H ,10F10.3)
      END

FUNCTION AVGFL2(NN)
      COMMON /REPTGT/ TGTBUF(80000),IAD

AVGFL2=(TGTBUF(NN+33)+TGTBUF(NN+41))/2.
C     WRITE(6,1010) AVGFL2
      RETURN
 1010 FORMAT(1H ,8F10.2)
      END

SUBROUTINE BLANK(IB,IX)
C
C     TIS IS A ROUTINE TO DETERMINE WHAT TO BLANK IN ROLL
C     CONDITIONS  2/2 AND 2/3 ARE BLANKED AND ALT LINE IS CHECKED
C
C
C
      COMMON /LINK/ LXDUM(91),IXP,KCNT
      COMMON /SLNLEN/ NUMSLT
      COMMON /BLKPAR/ ROLL(15),ALTLIN(15),ALTPRE(15),AZDAZ(15)
      COMMON /TARGET/ REPBUF(3000),IXD
      DIMENSION IEPBUF(3000)
      EQUIVALENCE (REPBUF(1),IEPBUF(1))
C
C
C
      IST=MMOD((IXP-6),NUMSLT)
      ITYPE=IEPBUF(IX)
C     WRITE(6,1000) REPBUF(IX+9),AZDAZ(IST),ALTLIN(IST),ALTPRE(IST),
C    * ROLL(IST),ITYPE
      IF(ITYPE.EQ.3.OR.ITYPE.EQ.2) THEN
C     ********************************** BLANK 2/2 OR 2/3 NOT SLANT EXTENDED
C     **********************************  IF ROLL > 20 DEGREES
         IF(ABS(ROLL(IST)).GT.20.) IB=1
      ELSE
         VEL=REPBUF(IX+20)
         AVEL=ALTLIN(IST)
C        WRITE(6,1010) VEL,AVEL
C     ********************************** IS REPORT WITHIN 42KTS OF
C     **********************************   OF ALTITUDE LINE
         IF(ABS(VEL-AVEL).LT.42. .AND. ABS(ROLL(IST)).GT.20.) IB=2
      END IF
C     WRITE(6,1020) IB
      RETURN
C
 1000 FORMAT(6H BLANK,5F10.2,Z10)
 1010 FORMAT(6H BLANK,2F10.2)
 1020 FORMAT(6H BLANK,I10)
      END

SUBROUTINE CANPRT(ITYPE,IPAS)
C
C
      COMMON /LINK/ LXDUM(90),RMAX,IXP,KCNT
      COMMON /INTCOM/ IA,IZDUM(6)
      COMMON /REPTGT/ IGTBUF(80000),IAD
      COMMON /SADD/ ISADRS(15),NPR(5)
      COMMON /OPTION/ ITAPID(10),IPRTOP(10),IPRSOP(10),ITHROP(10)
      COMMON /REPLEN/ IOX,ITW,ITV
      COMMON /KTSFIL/ RKTFIL(6)
      COMMON /SLNLEN/ NUMSLT
      DIMENSION TGTBUF(80000)
      EQUIVALENCE (IGTBUF(1),TGTBUF(1))
C
C
      IF(ITYPE.GT.1) GO TO 610
      JTAD=MMOD((IXP-4),NUMSLT)
      IA=MMOD((IXP-4),NUMSLT)+15
      IA=LXDUM(IA)
      JTAD=LXDUM(JTAD)
C     WRITE(6,1000) IA,JTAD,ITYPE
      IF(IPRTOP(2).NE.1) GO TO 700
  525 IF((IA-JTAD).LT.(IOX-1)) GO TO 700
      DO 540 L=JTAD,IA,IOX
C        IF(IGTBUF(L+1).LT.0) GO TO 540
```

```
          IHOURS=JIBITS(IGTBUF(L+2),26,5)
          MINS=JIBITS(IGTBUF(L+2),20,6)
          ISECS=JIBITS(IGTBUF(L+2),14,6)
          MSECS=JIBITS(IGTBUF(L+2),4,10)
          MODE=JIBITS(IGTBUF(L+2),0,4)
          ITEM2=JIBITS(IGTBUF(L+71),0,17)
          ITEM1=IGTBUF(L+71)/131072
          ITEM3=TGTBUF(L+73)
          ITEM4=TGTBUF(L+74)
          KF=TGTBUF(L+28)
          FTEM3=(TGTBUF(L+54)-129.)*RKTFIL(KF)
C           WRITE(6,1000) IGTBUF(L+1), IGTBUF(L), ITEM2, ITEM3, ITEM4,
C         +IGTBUF(L), IGTBUF(L+70),
C         +IHOURS, MINS, ISECS, MSECS, ITEM1
          IY=L+9
          IM=IY+2
C           WRITE(6,1020) (TGTBUF(KL), KL=IY, IM)
          IY=L+42
          IM=IY+3
C           WRITE(6,1020) FTEM3, TGTBUF(L+46), TGTBUF(L+54), TGTBUF(L+62)
C           WRITE(6,1020) (TGTBUF(KL), KL=IY, IM), TGTBUF(L+75)
C           WRITE(6,1020) TGTBUF(L+72), TGTBUF(L+48), TGTBUF(L+56),
C         +TGTBUF(L+64)
          WRITE(6,1050) IGTBUF(L+1), TGTBUF(L+9), TGTBUF(L+42), TGTBUF(L+43),
         + TGTBUF(L+44), TGTBUF(L+45), FTEM3, IHOURS, MINS, ISECS, MSECS
          WRITE(6,1060) TGTBUF(L+46), TGTBUF(L+48), TGTBUF(L+49), TGTBUF(L+51)
          WRITE(6,1060) TGTBUF(L+54), TGTBUF(L+56), TGTBUF(L+57), TGTBUF(L+59)
          WRITE(6,1060) TGTBUF(L+62), TGTBUF(L+64), TGTBUF(L+65), TGTBUF(L+67)
          WRITE(6,1070) IGTBUF(L), IGTBUF(L+70), ITEM3, ITEM4, ITEM2, ITEM1
540       CONTINUE
          GO TO 700
610       KP=IA-1
          IA=MMOD((IXF-4),NUMSLT)+(IFAS-1)*30+15
          IA=LXSUM(IA)
          WRITE(6,1040) KP, IA, IXF, IPAS
          IF(IPRTOP(2).NE.1) GO TO 700
615       IF((IA-KF).LT.(ITW-1)) GO TO 700
          DO 620 IP=KF, IA, ITW
          IHOURS=JIBITS(IGTBUF(IP+2),26,5)
          MINS=JIBITS(IGTBUF(IP+2),20,6)
          ISECS=JIBITS(IGTBUF(IP+2),14,6)
          MSECS=JIBITS(IGTBUF(IP+2),4,10)
          MODE=JIBITS(IGTBUF(IP+2),0,4)
          ITEM2=JIBITS(IGTBUF(IP+51),0,17)
          ITEM1=IGTBUF(IP+51)/131072
          ITEM3=TGTBUF(IP+53)
          ITEM4=TGTBUF(IP+54)
          KF=TGTBUF(IP+19)
          FTEM3=(TGTBUF(IP+33)-129.)*RKTFIL(KF)
C           WRITE(6,1000) IGTBUF(IP+1), IGTBUF(IP), ITEM2, ITEM3, ITEM4,
C         +IGTBUF(IP), IGTBUF(IP+50),
C         +IHOURS, MINS, ISECS, MSECS, ITEM1
          IY=IP+7
          IM=IY+1
C           WRITE(6,1020) (TGTBUF(KK), KK=IY, IM)
          IY=IP+29
          IM=IY+3
C           WRITE(6,1020) FTEM3, TGTBUF(IP+33), TGTBUF(IP+41)
C           WRITE(6,1020) (TGTBUF(KL), KL=IY, IM)
C           WRITE(6,1020) TGTBUF(IP+52), TGTBUF(IP+35), TGTBUF(IP+43)
          WRITE(6,1050) IGTBUF(IP+1), TGTBUF(IP+7), TGTBUF(IP+29),
         +TGTBUF(IP+30), TGTBUF(IP+31), TGTBUF(IP+32), FTEM3,
         +IHOURS, MINS, ISECS, MSECS
          WRITE(6,1060) TGTBUF(IP+33), TGTBUF(IP+35), TGTBUF(IP+36),
         +TGTBUF(IP+38)
          WRITE(6,1060) TGTBUF(IP+41), TGTBUF(IP+43), TGTBUF(IP+44),
         +TGTBUF(IP+46)
          WRITE(6,1070) IGTBUF(IP), IGTBUF(IP+50), ITEM3, ITEM4, ITEM2, ITEM1
620       CONTINUE
700       RETURN
1000      FORMAT(1H0, 7I10, I8, 2I3, I4, I10)
1010      FORMAT(1H , 3F10.2, I10)
1020      FORMAT(1H , 8F10.3)
1040      FORMAT(1H , 10I10)
1050      FORMAT(1H , 5X, I5, 5X, 6F10.3, 2X, 3I3, I4, I7)
1060      FORMAT(1H , 10X, 4F10.3)
1070      FORMAT(1H , 10X, 10I10)
          END
          SUBROUTINE CLIP2(ICLIP)
C
C                                    SUBROUTINE TO DO
C         *************** 2/2 ECLIPSE TEST
C
          COMMON /CLIP/ KRGX(4), IECLIF(5), KECLIP(5), LATPRF(8), IPRF1,
         +IPRF2, IPRF3, NRG1, NRG2, NRG3, AF1, AF2, AF3, IS1, IS2, IS3,
         +DF1, DF2, DF3, MRG, KTYPE, NOUT
          COMMON /SADD/ ISADRS(15), NPRFNG(5)
          COMMON /OPTION/ ITAPID(10), IPRTOP(10), IPRSOP(10), ITHROP(10)
          DIMENSION ITPRF(2)
C
C
          ICLIP=1
          MM=MMOD((IPRF1*10+IPRF3),8)
          MD=(IPRF1*10+IPRF3)/8
```

```
      IF(MM.NE.5) GO TO 250
      IF(MD.EQ.6) MM=6
250   LPRF=LATPRF(MM)
      IF(AF1.GT.AF2) THEN
          ITPRF(1)=NPRFNG(LPRF)
          ITPRF(2)=NPRFNG(IPRF3)
      ELSE
          ITPRF(1)=NPRFNG(LPRF)
          ITPRF(2)=NPRFNG(IPRF3)
      END IF
C     WRITE(6,1010) IPRF1,IPRF2,IPRF3,MM,LPRF,NRG1,NRG2,ITPRF
C     WRITE(6,1010) KRGX
      KTEA=0
      INO=1
      IF(IPRSOP(8).EQ.1) INO=2
      DO 300 I=1,INO
      LPRF=ITPRF(I)
      KECLIP(3)=LPRF-1
      KECLIP(4)=LPRF
260   DO 270 KK=1,4
      IF(KRGX(KK).EQ.0) GO TO 270
      MR=MMOD(IABS(KRGX(KK)),LPRF)
C     WRITE(6,1010) MR,KRGX(KK)
      DO 265 KM=1,4
      IF(MR.NE.KECLIP(KM)) GO TO 265
      KTEA=KTEA+1
      KRGX(KK)=IABS(KRGX(KK))
      GO TO 270
265   CONTINUE
      IF(I.EQ.2) GO TO 270
      KRGX(KK)=-KRGX(KK)
270   CONTINUE
C     WRITE(6,1010) ITPRF,KRGX,KECLIP
300   CONTINUE
      IF (AF1 .LT. 53 .AND. AF2 .LT. 53) ICLIP = 0
      IF(KTEA.GT.0) ICLIP=0
      RETURN
1010  FORMAT(7H CLIP2 ,12I8)
      END

SUBROUTINE CLIP3(ICLIP)
C
C     SUBROUTINE TO DO 2/3 ECLIPSE TEST
C
      COMMON /CLIP/ KRGX(4),IECLIP(5),KECLIP(5),LATPRF(8),IPRF1,
     +IPRF2,IPRF3,NRG1,NRG2,NRG3,AF1,AF2,AF3,IS1,IS2,IS3,
     +DF1,DF2,DF3,MRG,KTYPE,NOUT
      COMMON /SADD/ ISADRS(15),NPRFNG(5)
      DATA    IECLIP/1,2,0,0,0/,KECLIP/1,2,0,0,0/,LATPRF/1,3,2,3,5,4,2,5/
C
      ICLIP=1
      KTEA=0
50    DO 150 KK=1,4
      IF(KRGX(KK).LE.0) GO TO 100
      MR=MMOD(KRGX(KK),MRG)
      DO 100 KM=1,4
C     WRITE(6,1010) MR,IECLIP(KM),KRGX(KK),MRG,IPRF3
      IF(MR.NE.IECLIP(KM)) GO TO 100
      KTEA=KTEA+1
      GO TO 150
100   CONTINUE
      KRGX(KK)=-KRGX(KK)
150   CONTINUE
      IF(KTEA.GT.0) ICLIP=0
      RETURN
1000  FORMAT(1H ,8F10.2)
1010  FORMAT(1H ,10I8)
1020  FORMAT(1H ,8F10.3)
1030  FORMAT(1H ,4F9.3,6I6)
1040  FORMAT(1H ,5HCRT2Z)
      END

SUBROUTINE CRT2(I,IADD1,IADD2,KS1,KS2,KS3,ITY
C
C     SUBROUTINE TO DO 2/2 CHINESE REMIANDER THEORM
C
      COMMON /LINK/ LXDUM(92),KCNT
      COMMON /CLIP/ KRGX(4),IECLIP(5),KECLIP(5),LATPRF(8),IPRF1,
     +IPRF2,IPRF3,NRG1,NRG2,NRG3,AF1,AF2,AF3,IS1,IS2,IS3,
     +DF1,DF2,DF3,MRG,KTYPE,NOUT
      COMMON /DETSNT/ DETBUF(3,550)
      COMMON /KTSFIL/ RKTFIL(6)
      COMMON /REPTGT/ TGTBUF(80000),IAD
      COMMON /REPLEN/ IOX,ITW,ITV
      COMMON /CRTCNS/ MA2CNS(5,5,3),MA3CNS(5,5,5,4)
      COMMON /OPTION/ ITAPID(10),IPRTOP(10),IPRSOP(10),ITHROP(10)
      COMMON /THROP/ DTHR(10)
      COMMON /SADD/ ISADRS(15),NPRFNG(5)
      COMMON /MYSTRY/ DEHIST(20)
      DIMENSION IADD1(50),IADD2(50),IETBUF(3,550),IGTBUF(80000),
     +RATES(4)
      EQUIVALENCE (DETBUF(1,1),IETBUF(1,1)),(TGTBUF(1),IGTBUF(1)),
```

```
+(KRGX(1),KRG1),(KRGX(2),KRG2),(KRGX(3),KRG3),(KRGX(4),KRG4)
 DATA RLSB/.06475/,MAXRNG/6184/
C
C      ******   SET UP SLANT AND PRF INDEXS

KTYPE=ITYPE
 IS1=KS1+1
 IS2=KS2+1
 IPRF1=IETBUF(IS1,5)
 IPRF2=IETBUF(IS2,5)
 IPRF3=IETBUF(KS3+1,5)
 MRG=NPRFNG(IPRF3)
 IECLIP(3)=MRG-1
 IECLIP(4)=MRG
C
C      ********  ASSIGN CRT CONSTANTS AND MODULUS
C
 ICNST1=MA2CNS(IPRF1,IPRF2,1)
 ICNST2=MA2CNS(IPRF1,IPRF2,2)
 IMOD=MA2CNS(IPRF1,IPRF2,3)
C
C      ********  RANGE GATE SLANT ONE ADDRESS
C
 IRG1=IADD1(I)+2
 DO 600 K=1,I
 IF (IAD + ITW .LT. 80000) GO TO 5
 WRITE (6,1050) LXDUM,IAD
C      ********  RANGE GATE SLANT TWO ADDRESS
 5 IRG2=IADD2(K)+2
C
C
C   ********************************************************
C   ********************************************************
C
C      THIS IS -600 PROBLEM FOR ALASKA AND OTHER DATA
C
 JF1=IRG1-2
 JF2=IRG2-2
 KF=DETBUF(IS1,14)
 VEL=(DETBUF(IS1,JF1)+DETBUF(IS2,JF2))/2.
 VEL=(VEL-129.)*RKTFIL(KF)
 AVEL = ABS(VEL)
 AZ=DETBUF(IS1,8)
 WRITE(6,1000) AZ,VEL,JF1,JF2,IRG1,IRG2,IS1,KF
 IF(AZ.LT.160. .OR. AZ.GT.185.) GO TO 10
 IF(VEL.GT.-635. .AND. VEL.LT.-560.) GO TO 700
 IF(AVEL.GT.800.) GO TO 700
C
C   ********************************************************
C   ********************************************************
C
 10 NRG1=DETBUF(IS1,IRG1)
    NRG2=DETBUF(IS2,IRG2)
C
C      *********  OBTAIN RANGE GATE # AND CALCULATE RANGE
C
 15 IRG=ICNST1*NRG1+ICNST2*NRG2
    WRITE(6,1010) IS1,IS2,IPRF1,IPRF2,IMOD
 KRG1=MMOD(IRG,IMOD)
 KRG2=KRG1+IMOD
 KRG3=KRG2+IMOD
 KRG4=KRG3+IMOD
 IF(KRG3.GT.MAXRNG) KRG3=0
 IF(KRG4.GT.MAXRNG) KRG4=0
C      ****************  FILTER UNNORMALIZED
 DF1=DETBUF(IS1,IRG1-1)
 DF2=DETBUF(IS2,IRG2-1)
C      **************  AMPLITUDE
 AF1=DETBUF(IS1,IRG1+1)
 AF2=DETBUF(IS2,IRG2+1)
 WRITE(6,1040)
   WRITE(6,*) DF1,AF1,DF2,AF2,NRG1,NRG2,KRGX
   WRITE(6,1030) DF1,AF1,DF2,AF2,NRG1,NRG2,KRGX
C
C      **************  ECLIPSE TEST
C
 IF(IPRSOP(10).EQ.1) GO TO 20
 IF(ITYPE.EQ.3) GO TO 16
 IF(AF1.LT.DTHR(1).AND.AF2.LT.DTHR(1)) GO TO 20
 NOUT=9
 CALL CLIP2(ICLIP)
 GO TO 18
 16 NOUT=10
    CALL CLIP3(ICLIP)
 18 CONTINUE
    WRITE(6,1010) ICLIP,ITYPE
 IF(ICLIP.EQ.1) GO TO 550
C
C      ************  TEST TO SEE IF 3/3 ALREADY CREATED A REPORT
C
C         **************  CKECK TO SEE IF BOTH GATES PART OF 3/3
C                         IF SO DONT ALLOW
 20 NOUT=1
    IF(NRG1.LE.0.AND.NRG2.LE.0) GO TO 550
    IF(IPRSOP(2).EQ.1) GO TO 290
```

```
      CALL ELIM23(KTEST)
      WRITE(6,1110) KTEST,ITYPE,ITYPE
      IF(KTEST EQ 1) GO TO 550
C
C     *************   PLACE POSSIBLE REPORTS IN TARGET REPORT BUFFER
C                     WITH ADDITIONAL INFORMATION AS AZ,NAV,RGS,FIL,ETC
 290  IP=IAD
      NOUT=11
C                *****************   MODE
      IGTBUF(IAD+2)=IETBUF(IS1,20)
      IAD=IAD+3
C                **************      NAV,AZ,ETC
      DO 300 L=1,13
      TGTBUF(IAD)=DETBUF(IS1,L+5)
      TGTBUF(IAD+1)=DETBUF(IS2,L+5)
 300  IAD=IAD+2
C                **************      RANGE
      TGTBUF(IAD)=KRG1*RLSB
      TGTBUF(IAD+1)=KRG2*RLSB
      TGTBUF(IAD+2)=KRG3*RLSB
      TGTBUF(IAD+3)=KRG4*RLSB
      IAD=IAD+4
      IX=IRG1-3
C                **************      DDP PRAMATERS # 1
      DO 400 L=1,5
      TGTBUF(IAD)=DETBUF(IS1,L+IX)
 400  IAD=IAD+1
      TGTBUF(IAD-3)=MMOD(INT(TGTBUF(IAD-3)),NPRFNG(IPRF1))
      TGTBUF(IAD)=IPRF1
      TGTBUF(IAD+1)=IS1
      TGTBUF(IAD+2)=IRG1
      IAD=IAD+3
      IX=IRG2-3
C                **************      DDP PRAMATERS # 2
      DO 450 L=1,5
      TGTBUF(IAD)=DETBUF(IS2,L+IX)
 450  IAD=IAD+1
      TGTBUF(IAD-3)=MMOD(INT(TGTBUF(IAD-3)),NPRFNG(IPRF2))
      TGTBUF(IAD)=IPRF2
      TGTBUF(IAD+1)=IS2
      TGTBUF(IAD+2)=IRG2
      IZM=IAD+3
      IAD=IAD+9
      IX=IAD-1
      DO 475 L=IZM,IX
 475  TGTBUF(L)=0.
      IGTBUF(IX-3)=IP+KCNT*131072
C
C                *****************   PUT IN LENGTH AND TYPE IN BUFFER
      IGTBUF(IP)=0
      IGTBUF(IP+1)=KTYPE
      WRITE(6,1010) IP,IAD,KTYPE
C
 550  CONTINUE
      DEHIST(NOUT)=DEHIST(NOUT)+1
C     IF(NOUT LT 3) GO TO 600
C     WRITE(6,1010) NOUT

590  CONTINUE
 600  CONTINUE
      RETURN
 1000 FORMAT(1H ,2F10.2,6I10)
 1010 FORMAT(7H CCLIP2,5I8)
 1110 FORMAT(7H ELIM23,10I8)
 1020 FORMAT(1H ,8F10.3)
 1030 FORMAT(7H CRT2,4F9.3,6I6)
 1040 FORMAT(1H ,3HCRT2Z)
 1050 FORMAT(1H ,4HCRT2,6(15I7/,4X))
      END

SUBROUTINE CRT3(I,II,IADD1,IADD2,IADD3,KS1,KS2,KS3)
C
C     SUBROUTINE TO DO 3/3 CHINESE REMIANDER THEORM
C
      COMMON /LINK/   LXDUM(92),KCNT
      COMMON /DETSNT/ DETBUF(3,550)
      COMMON /KTSFIL/ RKTFIL(6)
      COMMON /REPTGT/ TGTBUF(80000),IAD
      COMMON /REPLEN/ IOX,ITW,ITV
      COMMON /OPTION/ IZXDUM(20),IPRSOP(10),KZXDUM(10)
      COMMON /CRTCNS/ MA2CNS(5,5,3),MA3CNS(5,5,5,4)
      COMMON /SADD/   ISADRS(15),NPRFNG(5)
      COMMON /TAG/    MISX(3),MIRGX(3),MINTX(3)
      COMMON /THROP/  DTHR(10)
      DIMENSION IADD1(50),IADD2(50),IADD3(50),IETBUF(3,550),
     +IGTBUF(80000),ISUM(3),IPRFX(3),NUMDEX(2)
      EQUIVALENCE (DETBUF(1,1),IETBUF(1,1)),(TGTBUF(1),IGTBUF(1)),
     +(MISX(1),IS1),(MISX(2),IS2),(MISX(3),IS3),(MIRGX(1),IRG1),
     +(MIRGX(2),IRG2),(MIRGX(3),IRG3),(IPRF1,IPRFX(1)),
     +(IPRF2,IPRFX(2)),(IPRF3,IPRFX(3)),(DTHR(7),WIN)
      DATA RLSB/.06475/,MAXRNG/6184/,NPRFNG/49,47,45,43,41/,
     +NUMDEX/4,2/
```

```
C            ********** CALULLAT SLANT AND PRF INDEXS
      IS1=KS1+1
      IS2=KS2+1
      IS3=KS3+1
      IPRF1=IETBUF(IS1,5)
      IPRF2=IETBUF(IS2,5)
      IPRF3=IETBUF(IS3,5)
      ISG=IABS(IPRF1+IPRF3-7)+1
      ISG=MOD(ISG,3)
      MNB=NUMDEX(ISG)
C
C            ********* ASSIGN CRT CONSTANTS AND MODULUS
C
      ICNST1=MA3CNS(IPRF1,IPRF2,IPRF3,1)
      ICNST2=MA3CNS(IPRF1,IPRF2,IPRF3,2)
      ICNST3=MA3CNS(IPRF1,IPRF2,IPRF3,3)
      IMOD=MA3CNS(IPRF1,IPRF2,IPRF3,4)
C            **********    RANGE GATE ADDRESS SLANT # 1
      IRG1=IADD1(1)+2
      DO 600 K=1,I
      DO 600 KK=1,II
      IF (IAD+IDX .LT. 50000) GO TO 50
      WRITE (6,1010) LXDUM,IAD
      IAD = IAD - IDX
C            **********    RANGE GATE ADDRESS SLANT # 2
   50 IRG2=IADD2(K)+2
C            **********    RANGE GATE ADDRESS SLANT # 3
      IRG3=IADD3(KK)+2
C
C            *************  FINAL 3 OF 3 FILTER CORRELATION
C
C    ********************************************************************
C    ********************************************************************
C
C            TAIL -600 REMOVAL FOR ALASKA AND OTHER DATA WHERE NECESSARY
C
      JF1=IRG1-2
      JF2=IRG2-2
      JF3=IRG3-2
      KF=DETBUF(IS1,14)
      VEL=(DETBUF(IS1,JF1)+DETBUF(IS2,JF2)+DETBUF(IS3,JF3))/3.
      VEL=(VEL-129.)*RKTFIL(KF)
      AVEL = ABS(VEL)
      AZ=DETBUF(IS1,8)
      WRITE(6,1000) AZ,VEL,JF1,JF2,IRG1,IRG2,IS1,KF,KF
      IF(AZ.LT.160. .OR.AZ.GT.185.) GO TO 100
      IF(VEL.GT.-635. .AND.VEL.LT.-560.) GO TO 700
      IF(AVEL.GT.800.) GO TO 700
C
C    ********************************************************************
C    ********************************************************************
C
  100 RLOW=AMIN1(DETBUF(IS1,IRG1-2),DETBUF(IS2,IRG2-2),
     -DETBUF(IS3,IRG3-2))
      RHIGH=AMAX1(DETBUF(IS1,IRG1-2),DETBUF(IS2,IRG2-2),
     -DETBUF(IS3,IRG3-2))
      DIFF=RHIGH-RLOW
      IF(DIFF.GT.WIN) GO TO 600
      AMP1=DETBUF(IS1,IRG1+1)
      AMP2=DETBUF(IS2,IRG2+1)
      AMP3=DETBUF(IS3,IRG3+1)
      FAC=AMP2**2/(AMP1*AMP3)
      IF(FAC.GT.999.) FAC=999.
      WRITE(6,1000) AMP1,AMP2,AMP3,FAC
      IF(IPRSOP(7).EQ.0) GO TO 200
      IF(FAC.LT.1 .OR.FAC.GT.12) GO TO 600
C
C            *************    RANGE CALCULATIONS
C
  200 NRG1=DETBUF(IS1,IRG1)
      NRG2=DETBUF(IS2,IRG2)
      NRG3=DETBUF(IS3,IRG3)
      IRG=ICNST1*NRG1+ICNST2*NRG2+ICNST3*NRG3
      WRITE(6,1010) IS1,IS2,IS3,IPRF1,IPRF2,IPRF3,IMOD
      KRG1=MMOD(IRG,IMOD)
      IF(KRG1.GT.MAXRNG) GO TO 600
      WRITE(6,1030)
      WRITE(6,1010) NRG1,NRG2,NRG3,KRG1
      IF(IPRSOP(7).NE.1) GO TO 225
      CALL FOFCHK(MISX,IFIG,MIRGX)
      IF(IFIG.EQ.0) GO TO 225
      CALL FORCHK(ISG,MNB,KRG1,IB)
      IF(IB.EQ.1) GO TO 600
  225 IP=IAD
C            ***************  MODE
      IGTBUF(IAD+2)=IETBUF(IS1,20)
      IAD=IAD+3
      CALL SUMFLG(ISUM,IPRFX)
C
C    ************** PLACE POSSIBLE REPORTS IN TARGET REPORT BUFFER
C                   WITH ADDITIONAL INFORMATION AS AZ,NAV,FIL,RGS,ETC
```

```
C    *    *    AZ, NAV, ETC
     DO 300 L=1,13
     TGTBUF(IAD)=DETBUF(IS1,L+5)
     TGTBUF(IAD+1)=DETBUF(IS2,L+5)
     TGTBUF(IAD+2)=DETBUF(IS3,L+5)
300  IAD=IAD+3
C                    ***************** RANGE
     TGTBUF(IAD)=KRG1*RLSB
     TGTBUF(IAD+1)=0.
     TGTBUF(IAD+2)=0.
     TGTBUF(IAD+3)=0.
     IAD=IAD+4
     IX=IRG1-3
     RTM=DETBUF(IS1,IX+1)-INT(DETBUF(IS1,IX+1))
     IFT1=0
     IF(RTM.GT..00001) IFT1=1
C                    *******   DDP PARAMETERS SLANT # 1
     DO 400 L=1,5
     TGTBUF(IAD)=DETBUF(IS1,L+IX)
400  IAD=IAD+1
     TGTBUF(IAD-2)=TGTBUF(IAD-2)*ISUM(1)
     TGTBUF(IAD-3)=MMOD(INT(TGTBUF(IAD-3)),NPRFNG(IPRF1))
     TGTBUF(IAD)=IPRF1
     TGTBUF(IAD+1)=IS1
     TGTBUF(IAD+2)=IRG1
     IAD=IAD+3
     IX=IRG2-3
     RTM=DETBUF(IS2,IX+1)-INT(DETBUF(IS2,IX+1))
     IFT2=0
     IF(RTM.GT..00001) IFT2=1
C                    *******   DDP PARAMETERS SLANT # 2
     DO 450 L=1,5
     TGTBUF(IAD)=DETBUF(IS2,L+IX)
450  IAD=IAD+1
     TGTBUF(IAD-2)=TGTBUF(IAD-2)*ISUM(2)
     TGTBUF(IAD-3)=MMOD(INT(TGTBUF(IAD-3)),NPRFNG(IPRF2))
     TGTBUF(IAD)=IPRF2
     TGTBUF(IAD+1)=IS2
     TGTBUF(IAD+2)=IRG2
     IAD=IAD+3
     IX=IRG3-3
     RTM=DETBUF(IS3,IX+1)-INT(DETBUF(IS3,IX+1))
     IFT3=0
     IF(RTM.GT..00001) IFT3=1
C                    *******   DDP PARAMETERS SLANT # 3
     DO 475 L=1,5
     TGTBUF(IAD)=DETBUF(IS3,L+IX)
475  IAD=IAD+1
     TGTBUF(IAD-2)=TGTBUF(IAD-2)*ISUM(3)
     TGTBUF(IAD-3)=MMOD(INT(TGTBUF(IAD-3)),NPRFNG(IPRF3))
     TGTBUF(IAD)=IPRF3
     TGTBUF(IAD+1)=IS3
     TGTBUF(IAD+2)=IRG3
     IGTBUF(IAD+3)=0
     IGTBUF(IAD+4)=IAD-67+KCNT*131072
     TGTBUF(IAD+6)=0.
     TGTBUF(IAD+7)=0.
     IFTM=IFT1+IFT2*2+IFT3*4
     TGTBUF(IP+72)=SUMY(IP)
     TGTBUF(IP+73)=FAC
     TGTBUF(IP+76)=IFTM
     TGTBUF(IP+77)=0.
     TGTBUF(IP+78)=0.
     TGTBUF(IP+79)=0.
     IAD=IAD+13
C                    **************  SET ADRESSES OF DETECTION NEGATIVE TO NOTE
C                                     PART OF A 3/3 REPORT
     DETBUF(IS1,IRG1)=INT(DETBUF(IS1,IRG1))-NPRFNG(IPRF1)
     DETBUF(IS2,IRG2)=INT(DETBUF(IS2,IRG2))-NPRFNG(IPRF2)
     DETBUF(IS3,IRG3)=INT(DETBUF(IS3,IRG3))-NPRFNG(IPRF3)
C    IF(KRG1.GT.MAXRNG) GO TO 600
     CALL TAGVEL
C                    ***********  PUT IN TYPE WORD
550  IGTBUF(IP)=0
     IGTBUF(IP+1)=1
C
600  CONTINUE
700  CONTINUE
     RETURN
1000 FORMAT(1H ,2F10.2,7I10)
1010 FORMAT(1H ,4HCRT3,6(15I7/,4X))
1020 FORMAT(1H ,6F11.3)
1030 FORMAT(1H ,4HCRT3)
     END
```

```
      SUBROUTINE CRTCOR
C
C       *>****   SUBROUTINE TO CORRELATE FILTERS AND CALL CRT SUBS
C
      COMMON /BLKPAR/ ROLL(15),ALTLIN(15),ALTPRE(15),AZDAZ(15)
      COMMON /LINK/ L11ADS(15),L11ADE(15),
     +L22ADS(15),L22ADE(15),L33ADS(15),L33ADE(15),RMAX,IXP,KCNT
      COMMON /INTCOM/ IAMDUM, ICNT, IZDUM(2),KADX(3)
      COMMON /KTSFIL/ RKTFIL(6)
      COMMON /TAG/ MISX(3),MIRGX(3),MINTX(3)
      COMMON /REPTGT/ IGTBUF(80000),IAD
      COMMON /REPLEN/ IOX, ITW, ITV
      COMMON /SLNLEN/ NUMSLT
      COMMON /SADD/ ISADRS(15),NPR(5)
      COMMON /OPTION/ ITAPID(10), IPRTOP(10), IPRSOP(10), ITHROP(10)
      COMMON /THROP/ DTHR(10)
      COMMON /DETSNT/ DETBUF(3,550)
      DIMENSION IETBUF(3,550),IADD1(50),IADD2(50),IADD3(50),
     +TGTBUF(80000),LXDUM(93),WINDOW(3)
      EQUIVALENCE (DETBUF(1,1),IETBUF(1,1)),(KAD1,KADX(1)),
     +(KAD2,KADX(2)),(KAD3,KADX(3)),(IGTBUF(1),TGTBUF(1)),
     +(MINTX(1),INT1),(MINTX(2),INT2),(MINTX(3),INT3),
     +(LXDUM(1),L11ADS(1)),(WINDOW(1),DTHR(7))
C
C       UP DATE SLANT POINTERS
C
      KCNT=MMOD((IABS(ICNT)),8191)
       WRITE(6,1000) KCNT
      ITAD=IAD
      DO 50 I=1,3
      KADX(I)=KADX(I)+1
   50 KADX(I)=MOD(KADX(I),3)
      INT1=IETBUF(KAD1+1,19)*5+20
      INT2=IETBUF(KAD2+1,19)*5+20
      INT3=IETBUF(KAD3+1,19)*5+20
       WRITE(6,1000) INT1,INT2,INT3,KADX,KAD1,KAD2,KAD3
C
      ROLL(IXP)=DETBUF(KAD2+1,11)
      KF=DETBUF(KAD2+1,14)
      ALTLIN(IXP)=(DETBUF(KAD2+1,15)-64.)*RKTFIL(KF)
      ALTPRE(IXP)=COS(DETBUF(KAD2+1,8)/57.2958)*(DETBUF(KAD2+1,16)**2+
     * DETBUF(KAD2+1,17)**2)**.5
      AZDAZ(IXP)=DETBUF(KAD2+1,8)
       WRITE(6,1060) ROLL(IXP),ALTLIN(IXP),ALTPRE(IXP),AZDAZ(IXP),IXP,KF
C
C       ********   USE FIRST SLANT AS BASE LINE
C
      IPAS=1
   75 IF((INT1-20).LE.0) GO TO 640
      DO 500 N=21,INT1,5
      I=1
      II=1
      RLOW=DETBUF(KAD1+1,N)-WINDOW(IPAS)
      RHIGH=DETBUF(KAD1+1,N)+WINDOW(IPAS)
C      WRITE(6,1010) DETBUF(KAD1+1,N),RLOW,RHIGH,N
      IADD1(1)=N
C
C       *******   CORRELATE SECOND SLANT
C
      IF((INT2-20).LE.0) GO TO 150
      DO 100 K=21,INT2,5
C      WRITE(6,5000) DETBUF(KAD2+1,K),RHIGH,RLOW
      IF(DETBUF(KAD2+1,K).GT.RHIGH.OR.DETBUF(KAD2+1,K).LT.RLOW)
     + GO TO 100
      IADD2(I)=K
      I=I+1
C      WRITE(6,1000) I,N,K
  100 CONTINUE
C
C       ******   CORRELATE THIRD SLANT
C
  150 IF((INT3-20).LE.0) GO TO 210
      DO 200 K=21,INT3,5
      IF(DETBUF(KAD3+1,K).GT.RHIGH.OR.DETBUF(KAD3+1,K).LT.RLOW)
     +GO TO 200
      IADD3(II)=K
      II=II+1
C      WRITE(6,1000) II,II,N,K
  200 CONTINUE
  210 I=I-1
      II=II-1
      GO TO (225,250,300), IPAS
  225 IF(I.LE.0.OR.II.LE.0) GO TO 500
C
C       ******   1 - 2 - 3   *******
C
       WRITE(6,1000) I,II
      CALL CRT3(I,II,IADD1,IADD2,IADD3,KAD1,KAD2,KAD3)
      GO TO 500
  250 IF(I.LE.0) GO TO 500
C
C       **********   1 - 2   ************
C
      IF(IPRTOP(10).EQ.1) GO TO 500
      CALL CRT2(I,IADD1,IADD2,KAD1,KAD2,KAD3,2)
```

```
            GO TO 500
 300    IF(II.LE.0) GO TO 500
C
C              ********    1 - 3    ********
C
        WRITE(6,1000) II
        IF(IPRTOP(10).EQ.1) GO TO 500
        CALL CRT2(II,IADD1,IADD3,KAD1,KAD3,KAD2,3)
 500    CONTINUE
C
C
C       WRITE (6,1000) IXP, ICNT, IAD
 510    GO TO(520,600,600), IPAS
 520    RMAX=0.
        MCNT=KCNT-3
C       WRITE(6,1000) MCNT,IXP
        L11ADE(IXP)=IAD-1
        L11ADS(IXP)=ITAD
        IF((IABS(ICNT)).LT.5) GO TO 580
        CALL CANPRT(1,IPAS)
 580    I2ADD=IAD

IPAS=IPAS+1
        GO TO 75
 600    IF(IPAS.EQ.3) GO TO 605
        L22ADS(IXP)=I2ADD
        L22ADE(IXP)=IAD-1
        GO TO 610
 605    L33ADS(IXP)=I3ADD
        L33ADE(IXP)=IAD-1
 610    IF(IABS(ICNT).LT.5) GO TO 630
        CALL CANPRT(2,IPAS)
 630    IF(IPAS.EQ.3) GO TO 650
        IPAS=IPAS+1
        I3ADD=IAD
        GO TO 75
 640    I2ADD=ITAD
        I3ADD=ITAD
C       WRITE (6,1000) IXP,ICNT,IAD,IAD
        GO TO 510
 650    CONTINUE
        IGTBUF(IAD)=ICNT
        IGTBUF(IAD+1)=ICNT
        IGTBUF(IAD+2)=ICNT
        ICNT=ICNT-1
        IAD=IAD+3
        IF (IAD + IDX .GT. 80000 .AND. IXP .LT. NUMSLT) THEN
        WRITE (6,1050) LXDUM
        STOP
        ELSE
        CONTINUE
        END IF
C       WRITE (6,1000) IAD,ICNT
        IF((IAD-ITAD).LT.6000) IAD=6000+ITAD
C       WRITE (6,1000) IAD, ITAD,KCNT,ICNT,IZDUM,IXP,IAMDUM
C       IF(IAD.GT.75000) IAD=0
C       IF ((IAD - ITAD) .GT. 6000) THEN
C       WRITE(6,1000) L11ADS(IXP),L11ADE(IXP),L22ADS(IXP),L22ADE(IXP),
C      +L33ADS(IXP),L33ADE(IXP),ISADRS(IXP),IAD,ITAD
C       ELSE
C       CONTINUE
C       END IF
C       WRITE(6,1040) L11ADS,L11ADE
C       WRITE(6,1040) L22ADS,L22ADE
C       WRITE(6,1040) L33ADS,L33ADE
C       WRITE(6,1040) ISADRS
        RETURN
1000    FORMAT(7H CRTCOR ,10I10)
1010    FORMAT(7H CRTCOR,3F10.2,I10)
1020    FORMAT(7H CRTCOR,8F10.3)
1030    FORMAT(7H CRTCOR,8F10.3)
1040    FORMAT(7H CRTCOR,15I5/,1X,15I5)
1050    FORMAT(7H CRTCOR,1I7,1X)
1060    FORMAT(7H CRTCOR,4F10.2,2I10)
2000    FORMAT(7H CRTCOR,2I10)
5000    FORMAT(7H CRTCOR,3F10.2)
        END
        SUBROUTINE DATPRT(NSLT)
C
C              *******    PRINT OF NORMALIZED FILTER RANGE GATE DATA BY SLANT
C
        COMMON /DETSNT/ DETBUF(3,550)
        COMMON /INTCOM/ IZDUM(2),KKCNT,IAMDUM(4)
        COMMON /LINK/ LXDUM(92),KCNT
        COMMON /OPTION/ ITAPID(10),IPRTOP(10),IPRSOP(10),ITHROP(10)
        COMMON /VELCHK/ VELMAT(5),NUMT
        COMMON /TIME/ IHOURS,MINS,ISECS,MSECS
        COMMON /TIMEDT/ JHOURS,JMINS,JSECS,JMSECS,KHOURS,KMINS,
       +KSECS,KMSECS
        DIMENSION IETBUF(3,550)
        EQUIVALENCE (DETBUF(1,1),IETBUF(1,1))
        DATA MAX/8192/
C
C
        NDEX=NSLT+1
```

```
C
C         ****    SLANT INFORMATION
C
      IHOURS=JIBITS(IETBUF(NDEX,20),26,5)
      MINS=JIBITS(IETBUF(NDEX,20),20,6)
      ISECS=JIBITS(IETBUF(NDEX,20),14,6)
      MSECS=JIBITS(IETBUF(NDEX,20),4,10)
      MODE=JIBITS(IETBUF(NDEX,20),0,4)
      ITIME=(IHOURS*3600+MINS*60+ISECS)*1000+MSECS
      JTIME=(JHOURS*3600+JMINS*60+JSECS)*1000+JMSECS
      KTIME=(KHOURS*3600+KMINS*60+KSECS)*1000+KMSECS
C     WRITE (6,1000) KCNT,ITIME
      IF(KCNT.NE.0) THEN
         KKCNT=KCNT+3
       ELSE
         KKCNT=KKCNT+1
         KCTIME=ITIME
      END IF
      IF(ITIME.LT.JTIME) GO TO 50
      IF(ITIME.GT.KTIME) GO TO 50
C     WRITE (6,1000) KCNT,ITIME,KCTIME
      IF((ITIME-KCTIME).GT.1000) THEN
         KCTIME=ITIME
         WRITE(7,1040) IHOURS,MINS,ISECS,MSECS,
     +        DETBUF(NDEX,11),DETBUF(NDEX,12),DETBUF(NDEX,13),
     +        DETBUF(NDEX,6), DETBUF(NDEX,7)
       ELSE
         CONTINUE
      END IF
      IF(IPRTOP(1).LT.1) GO TO 50
      WRITE(6,1030) IETBUF(NDEX,4),
     +IHOURS,MINS,ISECS,MSECS,IETBUF(NDEX,5),KKCNT,KCNT
     +,DETBUF(NDEX,8)
 50   CONTINUE
C
C         *****    DETECTION DATA FILTER **  RANGE GATE  ** AMP
C
      NT=IETBUF(NDEX,19)*5+19
      DO 100 K=20,NT,5

C     IF(IMT.EQ.0) GO TO 75
C        FILSCH(IPRT,NDEX,K)
C     IF(IFRT.EQ.0) GO TO 100
 75   CONTINUE
      ITEMP=IETBUF(NDEX,K+5)
      IPEAK=JIBITS(ITEMP,0,17)
      MFIL=JIBITS(ITEMP,17,3)
      MFIL=IABS(MFIL-7)
      IF(MFIL.EQ.0) MFIL=7
      DETBUF(NDEX,K+5)=IPEAK
      IF(IPRTOP(1).LT.1) GO TO 100
      IF(ITIME.LT.JTIME) GO TO 100
      IF(ITIME.GT.KTIME) GO TO 100
      WRITE(6,1020) (DETBUF(NDEX,K+I),I=1,4),IPEAK,MFIL
     +,ITEMP
 100  CONTINUE
 200  RETURN
 1000 FORMAT(1H ,5I10/,5F11.3)
 1010 FORMAT(1H ,5F11.3/,1X,3F11.3,2I10)
 1020 FORMAT(1H ,4F11.3,I10,I5,Z12)
 1030 FORMAT(1H0,65X,I10,I5,2I3,I4,I5,2I8,F10.3)
 1040 FORMAT(7H DATPRT,4I5,5F10.2)
      END
      SUBROUTINE DPXFER(NSLT,KX)
C
C         *******   THIS ROUTINE TANSFERS DDP DATA ****
C
      COMMON /DETSNT/ DETBUF(3,550)
      COMMON /TAP/ ITAPE(500)
      DIMENSION IETBUF(3,550),TAPE(500),FLNRM(2)
      EQUIVALENCE (DETBUF(1,1),IETBUF(1,1)),(ITAPE(1),TAPE(1))
      NDEX=NSLT+1
C                  ***********  SLANT COUNTER
      IETBUF(NDEX,1)=ITAPE(8)
C                  ************  SYNC CODE
      IETBUF(NDEX,2)=JIBITS(ITAPE(11),0,2)
      IT=0
      IF(KX.NE.1) GO TO 200
      IDEX=21
      NT=ITAPE(10)
      IF(NT.GT.200) NT=200
      NT=NT+10
      IPRF=IETBUF(NDEX,5)
      IFO=DETBUF(NDEX,15)
      DO 100 I=13,NT,4
      FIL=TAPE(I)
C
C       ******* UNFOLD AND NORMALIZE FILTERS
C
      CALL FILNRM(IPRF,FIL,FLNRM)
      IRG=TAPE(I+1)
      CALL FOCUNT(FLNRM,IFO,IPRF,IRG)
C                  ***********   1ST UNFOLDED AND NORMALIZED FILTER
```

```
      DETBUF(NDEX,IDEX)=FLNRM(1)
C                     **********       ACTUAL FILTER
      DETBUF(NDEX,IDEX+1)=FIL
C                       **********     RANGE GATE
      DETBUF(NDEX,IDEX+2)=TAPE(I+1)
C                       **********     AMP1
      DETBUF(NDEX,IDEX+3)=TAPE(I+2)
C                       **********     AMP2
      DETBUF(NDEX,IDEX+4)=TAPE(I+3)
      IDEX=IDEX+5
C                      **********      2ND UNFOLDED AND NORMALIZED FILTER
      DETBUF(NDEX,IDEX)=FLNRM(2)
C                     **********       ACTUAL FILTER
      DETBUF(NDEX,IDEX+1)=FIL
C.                      **********     RANGE GATE
      DETBUF(NDEX,IDEX+2)=TAPE(I+1)
C                       ***********    AMP1
      DETBUF(NDEX,IDEX+3)=TAPE(I+2)
C                       ************   AMP2
      DETBUF(NDEX,IDEX+4)=TAPE(I+3)
      IDEX=IDEX+5
  100 CONTINUE
      IT=(IDEX-21)/5
  200 IETBUF(NDEX,19)=IT
      RETURN
      END
      SUBROUTINE ELIM23(KTEST)
C
C     SUBROUTINE TO DO 2/2 ELIMINATION VIA VARIOUS TEST
C
      COMMON /CLIP/ KRGX(4),IECLIP(3),KECLIP(5),LATPRF(8),IPRF1,
     +IPRF2,IPRF3,NRG1,NRG2,NRG3,AF1,AF2,AF3,IS1,IS2,IS3,
     +DF1,DF2,DF3,MRG,KTYPE,NOUT
      COMMON /DETSNT/ DETBUF(3,550)
      COMMON /OPTION/ ITAPID(10),IPRTOP(10),IPRSOP(10),ITHROP(10)
      COMMON /THROP/ DTHR(10)
      COMMON /SADD/ ISADRS(15),NPRFNG(5)
      DIMENSION IADD1(50),IADD2(50),IETBUF(3,550),
     +RATES(4)
      EQUIVALENCE (DETBUF(1,1),IETBUF(1,1)),
     +(DTHR(2),RATES(1)),(DTHR(1),AZTES),(DTHR(6),XTES)
C
C
C
      KTEST=1
      RAT=AF1/AF2
      NI=KTYPE-1
C     WRITE(6,1030) RAT,RAT,RATES(NI),RATES(NI+2),NI
C
C     ************ CHECK TO SEE IF AMPLITUDE DIFFERENCE TO GREAT
C
      IF(IPRSOP(3).EQ.1) GO TO 25
      NOUT=3
      IF(RAT.LT.RATES(NI).AND.RAT.GT.RATES(NI+2)) GO TO 25
      GO TO 550
C            *********** CHECK TO SEE IF PART OF UNFOLDED 3/3
C                        AND IF INTEGER FILTER AND SMALL AMPLITUDE
C                        ON BOTH GATES
   25 NOUT=4
      IF(IPRSOP(4).EQ.1) GO TO 30
      IF(NRG1.GT.NPRFNG(IPRF1).AND.((DF2-INT(DF2)).LT..0001.AND.
     +AF2.LT.XTES)) GO TO 550
      IF(NRG2.GT.NPRFNG(IPRF2).AND.((DF1-INT(DF1)).LT..0001.AND.
     +AF1.LT.XTES)) GO TO 550
C
C     ********** CHECK TO SEE IF BOTH GATES ARE PART OF
C                UNFOLDED 3/3
C
   30 IF(IPRSOP(5).EQ.1) GO TO 35
      NOUT=5
      IF(NRG1.GT.NPRFNG(IPRF1).AND.NRG2.GT.NPRFNG(IPRF2)) GO TO 550
C.          ************ MAKE SMALL AMPLITUDE AND INTGER FILTER TEST
C                        ON BOTH DETCTION GATES
   35 IF(IPRSOP(6).EQ.1) GO TO 40
      NOUT=6
      RFT1=DETBUF(IS1,IRG1-1)-INT(DETBUF(IS1,IRG1-1))
      RFT2=DETBUF(IS2,IRG2-1)-INT(DETBUF(IS2,IRG2-1))
      KTES=0
      IF(RFT1.LT..0001.AND.AF1.LT.XTES) KTES=KTES+1
      IF(RFT2.LT..0001.AND.AF2.LT.XTES) KTES=KTES+1
C     WRITE(6,1030) RFT1,AF1,RFT2,AF2,KTES
      IF(KTES.GE.2) GO TO 550
   40 KTEST=0
      GO TO 600

550 CONTINUE
  600 CONTINUE
      RETURN
 1030 FORMAT(1H ,4F5.3,6I6)
 1040 FORMAT(1H ,5HCRT2Z)
      END
```

```
      SUBROUTINE FFGOST(ITADD,KAD)
C
C          ************   SUB TO  3/3  DEGHOST
      COMMON /REPTGT/ TGTBUF(80000),LAD
      COMMON /FILCOM/ FILWIN
      COMMON /LGHST/ GHSTFL
      COMMON /KTSFIL/ RKFIL(6)
      COMMON /REPLEN/ IOX,ITW,ITV
      DIMENSION IGTBUF(80000),KXRGX(9),MRGX(3)
      EQUIVALENCE (TGTBUF(1),IGTBUF(1))
C
C
      IF(KAD.LE.ITADD) GO TO 700
C     WRITE(6,1000) ITADD,KAD
      DO 600 MK=ITADD,KAD,IOX
      IF(IGTBUF(MK+1).LE.0) GO TO 600
      IF(TGTBUF(MK+75).LT..75) GO TO 600
      FILB=AVGFIL(MK)
C          **************  ADJACENT GATE TEST SEE CALL ABOVE
      IF(IGTBUF(MK+1).GT.1) GO TO 300
      KXRGX(1)=TGTBUF(MK+48)
      KXRGX(4)=TGTBUF(MK+56)
      KXRGX(7)=TGTBUF(MK+64)
      DO 200 I=2,3
      KXRGX(I)=0
      KXRGX(I+3)=0
  200 KXRGX(I+6)=0
      GO TO 325
  300 KXRGX(1)=TGTBUF(MK+48)-1
      KXRGX(2)=TGTBUF(MK+48)
      KXRGX(3)=TGTBUF(MK+48)+1
      KXRGX(4)=TGTBUF(MK+56)-1
      KXRGX(5)=TGTBUF(MK+56)
      KXRGX(6)=TGTBUF(MK+56)+1
      KXRGX(7)=TGTBUF(MK+64)-1
      KXRGX(8)=TGTBUF(MK+64)
      KXRGX(9)=TGTBUF(MK+64)+1
  325 CONTINUE
      DO 550 MM=ITADD,KAD,IOX
      IF(MK.EQ.MM) GO TO 550
      IF(IGTBUF(MM+1).LE.0) GO TO 550
      IF(TGTBUF(MM+74).GT.0.OR.TGTBUF(MM+73).GT.0) GO TO 550
      IF(TGTBUF(MM+75).GE..75) GO TO 550
      FILC=AVGFIL(MM)
C     WRITE(6,1010) FILB,FILC,RM
C .        ************       FILTER MATCH
      IF((ABS(FILB-FILC)).GT.FILWIN) GO TO 550
      MRGX(1)=TGTBUF(MM+48)
      MRGX(2)=TGTBUF(MM+56)
      MRGX(3)=TGTBUF(MM+64)
C     WRITE(6,1000) KXRGX,MRGX
      IS=0
      DO 400 I=1,3
      DO 400 K=1,3
      J=(I-1)*3+K
      IF(KXRGX(J).EQ.MRGX(I)) IS=IS+1
  400 CONTINUE
C
C     WRITE(6,1000) IS
      IF(IS.LT.2) GO TO 550
      IGTBUF(MM+1)=-7
  550 CONTINUE
  600 CONTINUE
  700 RETURN
 1000 FORMAT(7H FFGOST,10I10)
 1010 FORMAT(7H FFGOST,8F10.2)
      END
      SUBROUTINE FILNRM(IP,FIL,FNFIL)
C
C       ***** SUB TO NORMALIZE AND UNFOLD FILTERS  ******
C
      DIMENSION FNFIL(2),FNRM(5)
      DATA FNRM/.8367,.8723,.9111,.9535,1./
C
C         **********     FILTERS 65 TO 192
C
      FNFIL(1)=(FIL-64.)*FNRM(IP)+129
      IF(FIL.GT.63.) THEN
C          *****************    FILTERS 1 TO 64
      FNFIL(2)=(FIL-192.)*FNRM(IP)+129
      ELSE
C          *****************    FILTERS 193 TO 256
      FNFIL(2)=(FIL+64.)*FNRM(IP)+129
      END IF
      RETURN
      END

SUBROUTINE FILSCH(IP,NDEX,K)
      COMMON /DETENT/ DETBUF(3,550)
```

```
      COMMON /VELCHK/ VELMAT(5),NUMT
      COMMON /KTSFIL/ RKTFIL(6)
      IP=0
      KF=DETBUF(NDEX,14)
C     WRITE(6,1010) KF
      DO 100 I=1,NUMT
      FX=VELMAT(I)/RKTFIL(KF)+129.
      IF(FX.GE.65. .AND.FX.LE.192.) F1=FX-65.
      IF(FX.GE.0. .AND.FX.LE.65.) F1=FX+63.
      IF(FX.GT.193.) F1=FX-193.
      FIL=DETBUF(NDEX,K+1)
      IF(ABS(FIL-F1).LT.3.) IP=1
C     WRITE(6,1000) FX,F1,FIL,IP
  100 CONTINUE
      RETURN
 1000 FORMAT(1H ,3F10.2,I10)
 1010 FORMAT(1H ,I10)
      END

SUBROUTINE FOCUNT(FIL,IFO,IPRF,IRG)
      COMMON /FORG/ IFOHST(5,50),IFAHST(5,50)
      DIMENSION FIL(2)
C
C     *************** CALCULATES F-0 DETECTION BY RANGE GATE
C
C     **********************************************
C     WRITE(6,1000) IPRF,IFO
      DO 200 I=1,2
      IF=FIL(1)-64
      IF(IF.LE.0) GO TO 200
      IDEL=IABS(IF-IFO)
C     **************         FILTER WITH IN 3 OF F-0
      IF(IDEL.GT.3) GO TO 200
C     WRITE(6,1000) IPRF,IRG,IFO,IDEL,IF
      IFOHST(IPRF,IRG)=IFOHST(IPRF,IRG)+1
  200 CONTINUE
      IFAHST(IPRF,IRG)=IFAHST(IPRF,IRG)+1
      RETURN
 1000 FORMAT(1H ,10I8)
      END
      SUBROUTINE FOCHK(MISX,IFIG,MIRGX)
C
C     SUB TO CHECK IF FILTERS OR IN ALT LINE BLANK REGION
C
      COMMON /DETSNT/ DETBUF(3,550)
      DIMENSION MIRGX(3),MISX(3)
C
      IFIG=0
      DO 100 I=1,3
      IFIX=MIRGX(I)-2
      KFIX=MISX(I)
      FO=DETBUF(KFIX,15)
      FILX=DETBUF(KFIX,IFIX)
      IF(FILX.GE.65. AND.FILX.LE.192.) FX=FILX-65.
      IF(FILX.GE.0. AND.FILX.LT.65.) FX=FILX+63.
      IF(FILX.GT.193.) FX=FILX-193.
      IF(ABS(FO-FX).LT.5.01) IFIG=1
C     WRITE(6,1000) FILX,FX,FO,IFIG,IFIX,KFIX
      IF(IFIG.EQ.1) GO TO 200
  100 CONTINUE
  200 RETURN
 1000 FORMAT(1H ,3F10.2,7I10)
      END

SUBROUTINE FORCHK(ISQ,MNB,KRG1,IB)
C
C     SUB TO CHEC IF RANGE IS IN BLANK WINDOWS FOR PRF
C     SEQENCE 1 OR 4 AND SET BLANK FLAG IB
C
      DIMENSION IBRGX(2,4)
      DATA IBRGX/72,72,2317,3587,5598,0,5842,0/
C     WRITE(6,1000) ((IBRGX(K,I),K=1,2),I=1,4)
      IB=0
      DO 100 I=1,MNB
      IRB=IBRGX(ISQ,I)
      IF(IABS(IRB-KRG1).LE.29) IB=1
C     WRITE(6,1010) IRB,KRG1,MNB,ISQ,IB
      IF(IB.EQ.1) GO TO 200
  100 CONTINUE
  200 RETURN
 1000 FORMAT(1H ,2(4I10))
 1010 FORMAT(1H ,8I10)
      END
```

```
      SUBROUTINE GATE3(MM,KXRGX,LXRGX,AX,NF,IL)
C
C     ************  SET UP ARRAYS OF 3 ADJACENT GATES OF A
C                   CANDIDATE REPORT SUN SUM Y INDICATES
C                   3 ADJACENT SLANTS
C
      COMMON /REPTGT/ TGTBUF(80000),LAD
      DIMENSION KXRGX(9),LXRGX(9),AX(3)
C
C
C
      WRITE(6,1020)
      NF=1
      IL=0
      DO 25 I=1,9
      KXRGX(I)=0
   25 LXRGX(I)=0
C              *********** SET UP AND TES SUM SUM Y
      AX(1)=TGTBUF(MM+49)
      AX(2)=TGTBUF(MM+57)
      AX(3)=TGTBUF(MM+65)
      IF(AX(1).LT.0 .OR. AX(3).LT.0.) GO TO 50
      NF=0
      GO TO 200
   50 DO 150 IX=1,3
      KX=(IX-1)*3+1
C              ***************** ALL GATES
      KXRGX(KX+1)=TGTBUF(MM+48+(IX-1)*8)
      KXRGX(KX)=KXRGX(KX+1)-1
      KXRGX(KX+2)=KXRGX(KX+1)+1
      IF(AX(IX).GT.0) GO TO 150
C              ****************** ALL ADJACENT GATES
      LXRGX(KX+1)=KXRGX(KX+1)
      LXRGX(KX)=KXRGX(KX)
      LXRGX(KX+2)=KXRGX(KX+2)
      IL=IL+1
  150 CONTINUE
C     WRITE(6,1000) KXRGX
C     WRITE(6,1000) LXRGX
C     WRITE(6,1010) AX
  200 RETURN
 1000 FORMAT(1H ,10I8)
 1010 FORMAT(1H ,8F10.2)
 1020 FORMAT(1H ,5HGATE3)
      END

SUBROUTINE GHSTWO(ITADD,KAD,IDX)
C
C     ************  SUB TO FIND 3/3 WITH IN SLANT STRADDLE PARTNERS
C                   AND DEGHOST TRIPLE PARTNERS ALREADY FOUND
      COMMON /REPTGT/ TGTBUF(80000),LAD
      COMMON /FILCOM/ FILWIN
      COMMON /REPLEN/ IOX,ITW,ITV
      COMMON /STRRGH/ ISTRAD(50,2,2)
      DIMENSION IGTBUF(80000)
C
C
      IF(KAD.LE.ITADD) GO TO 600
C     WRITE(6,1000) ITADD,KAD
      DO 450 M=1,50
      MM=ISTRAD(M,1,IDX)
      MK=ISTRAD(M,2,IDX)
C     WRITE(6,1000) MM,MK,IDX,M
      IF(MK.EQ.0 .OR. MM.EQ.0) GO TO 500
      CALL GOSDEL(MM,MK,ITADD,KAD)
  450 CONTINUE
  500 DO 550 M=1,50
      ISTRAD(M,1,IDX)=0
  550 ISTRAD(M,2,IDX)=0
  600 RETURN
 1000 FORMAT(7H GHSTWO,10I10)
 1010 FORMAT(7H GHSTWO,8F10.2)
      END

SUBROUTINE GMATCH(MK,IS,LXRGX)
C
C     *********  CHECK TO SEE IF ANY GATE MATCHS WITH REPORT WITH
C                THREE ADJACENT GATES
C
      COMMON /REPTGT/ TGTBUF(80000),LAD
      DIMENSION LXRGX(9),L1RGX(3),L2RGX(3),L3RGX(3)
C
C
      WRITE(6,1010)
      IS=0
C              ************** 3 CANDIATE TARGET GATES
      MRG1=TGTBUF(MK+48)
      MRG2=TGTBUF(MK+56)
      MRG3=TGTBUF(MK+64)
C     WRITE(6,1000) MRG1,MRG2,MRG3
C     WRITE(6,1000) LXRGX
C              **********  DO THESE GATES EUQAL ANY OF DELARED 3
C                          ADJACENT GATE TARGET
```

```
      DO 250 IM=1,3
      IF(MRG1.EQ.LXRGX(IM)) IS=IS+1
      IF(MRG2.EQ.LXRGX(IM+3)) IS=IS+1
      IF(MRG3.EQ.LXRGX(IM+6)) IS=IS+1
 250  CONTINUE
C     WRITE(6,1000) MRG1,MRG2,MRG3,IS
      RETURN
1000  FORMAT(1H ,10I8)
1010  FORMAT(1H ,6HGMATCH)
      END
      SUBROUTINE GOSDEL(INDEX,KDEX,ITADD,KAD)
C     ************* SUB TO FIND 3/3 GHOST OF STRADDLE PAIRS AND
C                   FLAG AS DELETES
C
      COMMON /REPTGT/ TGTBUF(80000),LAD
      COMMON /DETSNT/ DETBUF(3,550)
      COMMON /SADD/ ISADRS(15),NPRFNG(5)
      COMMON /FILCOM/ FILWIN
      COMMON /LOGHST/ GHSTFL
      COMMON /KTSFIL/ RKFIL(6)
      COMMON /REPLEN/ IOX,ITW,ITV
      DIMENSION IGTBUF(80000),IRGEXT(6),KPRF(5),IGX(3)
      EQUIVALENCE (TGTBUF(1),IGTBUF(1)),(IGX(1),IG1),(IGX(2),IG2),
     +(IGX(3),IG3)
      DATA GHSTFL/165./
C
C
C
C     WRITE(6,1030)
C     WRITE(6,1000) INDEX,KDEX,ITADD,KAD
      IF(IGTBUF(INDEX+1).LE.0) GO TO 700
      IF(IGTBUF(INDEX+75).LT..75) GO TO 700
      TFIL1=AVGFIL(INDEX)
      IRGEXT(1)=TGTBUF(INDEX+48)
      IRGEXT(4)=TGTBUF(KDEX+48)
      IRGEXT(2)=TGTBUF(INDEX+56)
      IRGEXT(5)=TGTBUF(KDEX+56)
      IRGEXT(3)=TGTBUF(INDEX+64)
      IRGEXT(6)=TGTBUF(KDEX+64)
      DO 50 I=1,3
      KP=TGTBUF(INDEX+51+(I-1)*8)
 50   KPRF(I)=NPRFNG(KP)
C     WRITE(6,1010) IRGEXT
      DO 500 K=ITADD,KAD,IOX
      IF(K.EQ.INDEX.OR.K.EQ.KDEX) GO TO 500
      IF(IGTBUF(K+75).GE..75) GO TO 500
      IF(TGTBUF(K+73).NE.0..OR.TGTBUF(K+74).NE.0.) GO TO 500
      ITYPE=IGTBUF(K+1)
      IF(ITYPE.LT.1.OR.ITYPE.GT.3) GO TO 500
      TFIL2=AVGFIL(K)
      TFIL=ABS(TFIL2-TFIL1)
C     WRITE(6,1020) TFIL1,TFIL2,TFIL
      IF(TFIL.GT.FILWIN) GO TO 500
      IG1=MMOD(INT(TGTBUF(K+48)),KPRF(1))
      IG2=MMOD(INT(TGTBUF(K+56)),KPRF(2))
      IG3=MMOD(INT(TGTBUF(K+64)),KPRF(3))
      DO 100 I=1,3
      IF(IGX(I).EQ.IRGEXT(I)) IS=IS+1
      IF(IGX(I).EQ.IRGEXT(I+3)) IS=IS+1
 100  CONTINUE
      IF(IS.LT.2) GO TO 500
 490  IGTBUF(K+1)=-7
C     WRITE(6,1000) IGX,IRGEXT,IGTBUF(K+1)
 500  CONTINUE
 700  RETURN
1000  FORMAT(1H ,10I8)
1010  FORMAT(1H ,5I8/,1X,5I8)
1020  FORMAT(1H ,8F10.2)
1030  FORMAT(1H ,7HGOSDELX)
      END
      SUBROUTINE HFFRNT
C
C     ************* SUB TO PRINT AND SUMARIZE FORM FACTOR DATA
C
      COMMON /FAC/ RHISFC(160),FHISFC(160),IFFAL(3),IFTGT(3),
     +LDETS,LFALS,IFAL,ITGT
      DIMENSION CHISFC(160)
      SUM=0
      WRITE(6,1010)
      WRITE(6,1020) LDETS,ITGT,IFTGT
C     *********** FIND SUM TO NORMALIZE HISTOGRAM AND CULMATIVE
      DO 100 I=1,160
      SUM=RHISFC(I)+SUM
 100  CHISFC(I)=SUM
C     ********   DETERMINE HISTOGRAM AND CULMATIVE VALUES NORMALIZED
      IF(SUM.LT..001) GO TO 250
      DO 200 I=1,160
      RHISFC(I)=RHISFC(I)/SUM
 200  CHISFC(I)=CHISFC(I)/SUM
C     ***********    PRINT RESULTS ABOVE INTEGER REF,HIST,CUM
 250  DO 300 I=1,160,4
```

```
              J=I/4
              L=I+3
              WRITE(6,1000) J,(RHISFC(K),K=I,L),(CHISFC(M),M=I,L)
      300     CONTINUE
              SUM=0
              WRITE(6,1010)
              WRITE(6,1020) LFALS,IFAL,IFFAL
C     ************ FIND SUM TO NORMALIZE HISTOGRAM AND CULMATIVE
              DO 400 I=1,160
              SUM=FHISFC(I)+SUM
      400     CHISFC(I)=SUM
C     ********    DETERMINE HISTOGRAM AND CULMATIVE VALUES NORMALIZED
              IF(SUM LT. .001) GO TO 550
              DO 500 I=1,160
              FHISFC(I)=FHISFC(I)/SUM
      500     CHISFC(I)=CHISFC(I)/SUM
C     ************   PRINT RESULTS ABOVE INTEGER REF,HIST,CUM
      550     DO 600 I=1,160,4
              J=I/4
              L=I+3
              WRITE(6,1000) J,(FHISFC(K),K=I,L),(CHISFC(M),M=I,L)
      600     CONTINUE
              RETURN
      1000    FORMAT(1H ,I4,8F10.2)
      1010    FORMAT(1H1)
      1020    FORMAT(1H ,8I10)
              END

SUBROUTINE INNFIL
              COMMON /TGTINN/ IDUM(3000),LEN
              COMMON /OPTION/ ITAPID(10),IPRTOP(10),IPRSOP(10),ITHROP(10)
C     ************ FOR FO TEST
C             COMMON /FORG/ IFOHST(5,50),IFAHST(5,50)
C
              DIMENSION RDUM(3000),KDUM(40),LDUM(10),XDUM(10),IDATIM(10)
              EQUIVALENCE (IDUM(1),RDUM(1)),(LDUM(1),XDUM(1))
C
C
C
C     ********************** F-O TEST ONLY
C             WRITE(6,1010)
C             DO 10 I=1,50
C             WRITE(6,1020) I,(IFOHST(J,I),J=1,5)
C     10      CONTINUE
C             WRITE(6,1010)
C             DO 12 I=1,50
C             WRITE(6,1020) I,(IFAHST(J,I),J=1,5)
C     12      CONTINUE
C             WRITE(6,1010)
C             GO TO 200
C
C     **********************
C
      15      IF(IPRTOP(5).NE.1) GO TO 25
              WRITE(6,1010)
      25      REWIND 12
              READ(12,END=200) KDUM
              READ(12,END=200) LDUM
              READ(12,END=200) IDATIM
              IF(IPRTOP(5).NE.1) GO TO 50
              WRITE(6,1040) KDUM
              WRITE(6,1030) XDUM
              WRITE(6,1020) IDATIM
              WRITE(6,1010)
      50      READ(12,END=200) LEN
              IX=LEN*30
              READ(12,END=200) (IDUM(I),I=1,IX)
              IF(IPRTOP(5).NE.1) GO TO 50
              WRITE(6,1050)
              DO 100 I=1,IX,30
              IHOURS=JIBITS(IDUM(I+4),26,5)
              MINS=JIBITS(IDUM(I+4),20,6)
              ISECS=JIBITS(IDUM(I+4),14,6)
              MSECS=JIBITS(IDUM(I+4),4,10)
              WRITE(6,1000) IDUM(I),RDUM(I+9),RDUM(I+14),
             +(RDUM(I+J),J=20,28),RDUM(I+7),RDUM(I+8),IHOURS,MINS,
             +ISECS,MSECS
      100     CONTINUE
              GO TO 50
      200     RETURN
      1000    FORMAT(1H ,Z7,2F8.2,4F9.2,4F8.3,F6.1,2F8.2,3I3,I4)
      1010    FORMAT(1H1)
      1020    FORMAT(1H ,10I8)
      1030    FORMAT(1H ,10F10.2)
      1040    FORMAT(1H ,10A4//,10I8//,10I8//,10I8/)
      1050    FORMAT(1H )

END
```

```fortran
      SUBROUTINE INTIAL
C
C           ********** INITALIIZE DATA
C
      COMMON /LINK/ LXDUM(93)
      COMMON /INTCOM/ IA,ICNT,KKCNT,NSLT,KADX(3)
      COMMON /REPTGT/ IGTBUF(80000),IAD
      COMMON /MYSTRY/ DEHIST(20)
      COMMON /STRRGH/ IDEE(200)
      COMMON /SADD/ ISADRS(15),NPR(5)
      COMMON /FAC/ RHISFC(160),FHISFC(160),IFFAL(3),IFTGT(3),
     +LDETS,LFALS,IFAL,ITGT
      COMMON /SCANX/ MCNTS(200),ISTX
      DO 100 I=1,160
      FHISFC(I)=0
  100 RHISFC(I)=0.
      DO 150 I=1,15
  150 ISADRS(I)=0
      LDETS=0
      LFALS=0
      LFALS=0
      ITGT=0
      ICNT=-1
      IA=0
      IAD=1
      KKCNT=0
      NSLT=0
      ISTX = 0
      KADX(1)=2
      KADX(2)=0
      KADX(3)=1
      DO 200 I=1,3
      IFTGT(I)=0
  200 IFFAL(I)=0
      DO 300 I=1,93
  300 LXDUM(I)=0
      DO 350 I=1,20
  350 DEHIST(I)=0
      DO 400 I=1,200
      MCNTS(I) = 0
  400 IDEE(I)=0
      RETURN
      END
      SUBROUTINE JEM(ITADD,KAD)
      COMMON /REPTGT/ TGTBUF(80000),LAD
      COMMON /FILCOM/ FILWIN
      COMMON /REPLEN/ IOX,ITW,ITV
      EQUIVALENCE (IGTBUF(1),TGTBUF(1))
      DIMENSION IAMNDX(50,2),IGTBUF(80000),INX(50),IBSIN(3)
      DATA IBSIN/70,50,50/
C
C
C           ************* ROUTINE TO LINK 3/3 JEM REPORTS WITHIN A SNAP
C
C           *************** ANY DATA TO PROCESS
      IF((KAD-ITADD).LE.0) GO TO 800
       WRITE(6,1000) ITADD,KAD,IOX
      DO 700 MY=ITADD,KAD,IOX
      J=1
      IF(IGTBUF(MY+1).LE.0) GO TO 700
      IF(IGTBUF(MY).NE.0) GO TO 700
      RY=TGTBUF(MY+42)
      FILY=AVGFIL(MY)
      IAMNDX(J,1)=TGTBUF(MY+72)
      IAMNDX(J,2)=MY
      J=J+1
      DO 100 MX=ITADD,KAD,IOX
      IF(MX.EQ.MY) GO TO 100
      IF(IGTBUF(MX+1).LE.0) GO TO 100
      IF(IGTBUF(MX).NE.0) GO TO 100
      RX=TGTBUF(MX+42)
C           ****************** RANGE MATCH
      IF(ABS(RX-RY).GT..262) GO TO 100
      FILX=AVGFIL(MX)
C      WRITE(6,1020) RX,RY,FILX,FILY,FILWIN
C           ************* FILTER DOES MATCH GO ON
      IF(ABS(FILX-FILY).LE.FILWIN) GO TO 100
      IAMNDX(J,1)=TGTBUF(MX+72)
      IAMNDX(J,2)=MX
      J=J+1
  100 CONTINUE
      NDX=J-1
      MAX=0
      KD=1
C      WRITE(6,1000) NDX
      IF(NDX.LE.1) GO TO 700
      LNKNDX=0
      LNKFLG=0
  400 DO 450 I=1,NDX
      IF(IAMNDX(I,2).EQ.0) GO TO 450
      IF(IAMNDX(I,1).GT.MAX) THEN
         MAX=IAMNDX(I,1)
         KDEX=IAMNDX(I,2)
         IDEX=I
      ELSE
         END IF
```

```
450   CONTINUE
      IF(KD.GT.4) GO TO 475
      IF(LNKFLG.GE.1) GO TO 475
      LINK=TGTBUF(KDEX+74)
      IF(LINK.LE.0) GO TO 475
      LNKNDX=KD

LNKFLG=1
475   INX(KD)=KDEX
      IAMNDX(IDEX,2)=0
      IF(KD.GT.4) IGTBUF(KDEX+1)=-11
      KD=KD+1
      IF(KD.GT.NDX) GO TO 500
      MAX=0
      GO TO 400
500   IF(LNKNDX.LE.1) GO TO 520
      LNKSAV=INX(1)
      KM=KD-1
      IF(KM.GT.4) KM=4
      INX(1)=INX(LNKNDX)
      DO 510 I=2,KM
      ITEM=INX(I)
      INX(I)=LNKSAV
      LNKSAV=ITEM
      IF(I.EQ.LNKNDX) GO TO 520
510   CONTINUE
520   IGTBUF(INX(1))=-4
      IF(KD.GT.5) KD=5
      KDM=KD-2
      DO 600 I=1,KDM
      IGTBUF(INX(I)+70)=INX(I+1)
600   IGTBUF(INX(I+1))=INX(I)
      KD=KDM+1
C     WRITE(6,1000) (INX(I),I=1,KD)
700   CONTINUE
800   RETURN
1000  FORMAT(7H JEM    ,8I10,2Z10)
1020  FORMAT(7H JEM    ,8F10.3)
      END
      SUBROUTINE JEM123(KX)
      COMMON /REPTGT/ TGTBUF(80000),IAD
      COMMON /FILCOM/ FILWIN
      COMMON /LINK/ L11ADS(15),L11ADE(15),L22ADS(15),L22ADE(15),
     +L33ADS(15),L33ADE(15),DUM(3)
      COMMON /REPLEN/ IOX,ITW,ITV
      DIMENSION IGTBUF(80000),IBSIN(3)
      EQUIVALENCE (TGTBUF(1),IGTBUF(1))
      DATA IBSIN/70,50,50/
C
C
C***************  TYPE 1 TO TYPE 2 OR 3  WITHIN SNAP
C                 ENGINE MODS
C
C
C              ************** SET UP 3/3 ADDRESS
      IB1=L11ADS(KX)
      IS1=L11ADE(KX)
      IF((IS1-IB1).LE.0) GO TO 600
C              ***********  2/2 ADDRESS
      IB2=L22ADS(KX)
      IS2=L22ADE(KX)
      ID2=IS2-IB2
C              **********  2/3 ADDRESS
      IB3=L33ADS(KX)
      IS3=L33ADE(KX)
      ID3=IS3-IB3
C              **************  ANY 2/2 OR 2/3
      IF(ID2.LE.0.AND.ID3.LE.0) GO TO 600
C     WRITE(6,1020) IB1,IS1,IB2,IS2,IB3,IS3
C              ********** START BASE WITH 3/3
      DO 300 M=IB1,IS1,IOX
      ITYPE=IGTBUF(M+1)
      IF(ITYPE.LT.0) GO TO 500
      VL1=AVGFIL(M)
      RG1=TGTBUF(M+42)
      IFLG=1
C              *************  2/2 FIRST.ANY 2/2 NO=450
      IF(ID2.LE.0) GO TO 450
      IBX=IB2
      ISX=IS2
C              ************ SEARCH 2/2 OR 2/3 AS APPORIATE
100   DO 400 I=IBX,ISX,ITW
      IF(IGTBUF(I+1).LE.0) GO TO 400
      VL2=AVGFL2(I)
C     WRITE(6,1000) VL1,VL2,RG1
C              ***************************** FILTER MATCH
      IF((ABS(VL1-VL2)).LE.FILWIN) GO TO 400
      DO 200 K=1,4
      RG2=ABS(TGTBUF(I+K+28))
C              ******************** RANGE MATCH INCLUDIN MULTIPATH
      IF((ABS(RG1-RG2)).LT..21) GO TO 300
200   CONTINUE
      GO TO 400
C
```

```
C                ************** ENGINE MOD LINK
C
 300  IF(IGTBUF(I).GT.0) GO TO 400

IF   TBUF(M).NE.0) GO TO 370
      IG    F(M)=-4
      IGTBUF(M+70)=I
      IGTBUF(I)=M
      GO TO 400
 370  MSX=M
      INDX=70
 380  MSAVE=MSX
      MSX=IGTBUF(MSX+INDX)
      IF(MSX.EQ.0) GO TO 390
      ITYPE=MMOD(IGTBUF(MSX+1),4)
      INDX=IBSIN(ITYPE)
C     WRITE(6,1020) M,MSX,MSAVE,ITYPE,INDX
      GO TO 380
 390  IGTBUF(MSAVE+INDX)=I
      IGTBUF(I)=MSAVE
C     WRITE(6,1020) IGTBUF(I),IGTBUF(M),I,M,M,M
 400  CONTINUE
C                ************** 2/2 AND 2/3 DONE
 450  IF(IFLG.GT.1) GO TO 500
      IBX=IB3
      ISX=IS3
      IF(ID3.LE.0) GO TO 500
      IFLG=IFLG+1
C                ************ GO DO 2/3
      GO TO 100
 500  CONTINUE
 600  CONTINUE
      RETURN
 1000 FORMAT(7H JEM123,4F10.2,I10)
 1020 FORMAT(7H JEM123,10I10)
      END
      SUBROUTINE JEM2(ITADD,KAD,ITYPE)
      COMMON /REPTGT/ TGTBUF(80000),LAD
      COMMON /FILCOM/ FILWIN
      COMMON /REPLEN/ IGX,ITW,ITV
      EQUIVALENCE (IGTBUF(1),TGTBUF(1))
      DIMENSION IAMNDX(50,2),IGTBUF(80000),INX(50)

C             ************ ROUTINE TO LINK JEM REPORTS WITHIN A SNAP
C                          2/2 AND 2/3
C             ************** ANY DATA TO PROCESS
      IF((KAD-ITADD).LE.0) GO TO 800
C     WRITE(6,1000) ITADD,KAD,ITYPE,ITW
      DO 700 MY=ITADD,KAD,ITW
      J=1
      IF(IGTBUF(MY+1).LE.0) GO TO 700
      IF(IGTBUF(MY).GT.0.OR.IGTBUF(MY).EQ.(-4)) GO TO 700
      FILY=AVGFL2(MY)
      IAMNDX(J,1)=SUMY2(MY)
      IAMNDX(J,2)=MY
      J=J+1
      DO 300 MX=ITADD,KAD,ITW
      IF(IGTBUF(MX+1).LE.0) GO TO 300
      IF(IGTBUF(MX).GT.0.OR.IGTBUF(MX).EQ.(-4)) GO TO 300
      IF(MX.EQ.MY) GO TO 300
      FILX=AVGFL2(MX)
C             ************ FILTER DOES NOT MATCH GO ON
      IF(ABS(FILX-FILY).LE.FILWIN) GO TO 300
      DO 100 KY=1,4
      RNGY=ABS(TGTBUF(KY+MY+28))
      DO 100 KX=1,4
      RNGX=ABS(TGTBUF(KX+MX+28))
      IF(RNGX.LE.0.OR.RNGY.LE.0.) GO TO 100
      RNG=ABS(RNGX-RNGY)
      IF(RNG.GT..262) GO TO 100
      GO TO 200
 100  CONTINUE
      GO TO 300
 200  IAMNDX(J,1)=SUMY2(MX)
      IAMNDX(J,2)=MX
C     WRITE(6,1000) IAMNDX(J,1),MX,J
      J=J+1
 300  CONTINUE
      NDX=J-1
      MAX=0
      KD=1
      IF(NDX.LE.1) GO TO 700
      LNKNDX=0
      LNKFLG=0
 400  DO 450 I=1,NDX
      IF(IAMNDX(I,2).EQ.0) GO TO 450
      IF(IAMNDX(I,1).GT.MAX) THEN
          MAX=IAMNDX(I,1)
          KDEX=IAMNDX(I,2)
          IDEX=I
      ELSE
          END IF
 450  CONTINUE
      IF(KD.GT.4) GO TO 475
```

```
        IF   (K LG GE 1) GO TO 475
        LI    TGTBUF(KDEX+54)
        IF(LINK LE 0) GO TO 475
        LNKNDX=KD
        LNKFLG=1
  475   INX(KD)=KDEX
        IAMNDX(IDEX,2)=0
        IF(KD.GT.4) IGTBUF(KDEX+1)=-12+ITYPE
        KD=KD+1
        IF(KD.GT.NDX) GO TO 500
        MAX=0
        GO TO 400
  500   IF(LNKNDX.LE.1) GO TO 520
        LNKSAV=INX(1)
        KM=KD-1
        IF(KM.GT.4) KM=4
        INX(1)=INX(LNKNDX)
        DO 510 I=2,KM
        ITEM=INX(I)
        INX(I)=LNKSAV
        LNKSAV=ITEM
        IF(I.EQ.LNKNDX) GO TO 520
  510   CONTINUE
  520   IGTBUF(INX(1))=-4
        IF(KD.GT.5) KD=5
        KDM=KD-2
        DO 600 I=1,KDM
        IGTBUF(INX(I)+50)=INX(I+1)
  600   IGTBUF(INX(I+1))=INX(I)
        KD=KDM+1
C       WRITE(6,1000) (INX(I),I=1,KD)
  700   CONTINUE
  800   RETURN
 1000   FORMAT(7H JEM2  ,8I10,2Z10)
        END
        SUBROUTINE LINKXX(ITB,ITS,KSB)
        COMMON /REPTGT/ TGTBUF(80000),IAD
        COMMON /LINK/ LXDUM(91),IXP,KCNT
        COMMON /FILCOM/ FILWIN
        COMMON /SLNLEN/ NUMSLT
        COMMON /REPLEN/ ISK(3)
        DIMENSION IOFF(3),ILOP(3),IFIL(3),IRNG(3),DIV(3),
       ++IGTBUF(80000)
        DATA IOFF/72,52,52/,ILOP/17,9,9/,
       +IFIL/45,32,32/,IRNG/1,4,4/,DIV/3.,2.,2./
        EQUIVALENCE (TGTBUF(1),IGTBUF(1))
C
C            *************         SET UP ADDRESS OF ALL TYPE
C                                  REPORTS FOR UP TO "KSB" SLANTS BACK
C
C*************************************************************
C
C            *************         CALCULATE STARTING AND ENDING ADDRES OF
C                                  B=BASE SLANT AND S=SLANT "KSB" BACK
C
        IB=30*(ITB-1)+IXP
        IS=IXP-KSB
        IS=30*(ITS-1)+MMOD(IS,NUMSLT)
C       WRITE (6,1000) IS
        IBS=LXDUM(IB)
        IBE=LXDUM(IB+15)
        ISS=LXDUM(IS)
        ISE=LXDUM(IS+15)
C       WRITE(6,1000) ITB,ITS,KSB,IXP,IB,IS
C       WRITE(6,1000) IBS,IBE,ISS,ISE
C            *****************  ANY DATA TO LINK
        IF((IBE-IBS).LE.0.OR.(ISE-ISS).LE.0) GO TO 600
C            **************  DETERIME # WORDS OF REPORT TYPE
C                             AND OTHER ADDRESS DIFFERECCES
C                             BETWEEN REPORT TYPE
C       WRITE(6,1020)
        IBSKIP=ISK(ITB)
        ISSKIP=ISK(ITS)
        KBFIL=ILOP(ITB)
        KSFIL=ILOP(ITS)
        LTB=IOFF(ITB)
        LTS=IOFF(ITS)
        IRB=IRNG(ITB)
        IRS=IRNG(ITS)
        MTB=IFIL(ITB)
        MTS=IFIL(ITS)
C       WRITE(6,1000) IBSKIP,ISSKIP,KBFIL,KSFIL,LTB,LTS,IRB,IRS,
C      +MTB,MTS
C            **************  START LINK SEARCH
        DO 350 KB=IBS,IBE,IBSKIP
        IF(IGTBUF(KB+1).LE.0) GO TO 550
        DO 500 KS=ISS,ISE,ISSKIP
        IF(IGTBUF(KS+1).LE.0) GO TO 500
C            **************  CALULATE AVGERAGE FILTER
        IF(IRB.EQ.1) THEN
          FILB=AVGFIL(KB)
```

```
      ELS~
            LB=AVGFL2(KB)
      END IF
      IF(IRS.EQ.1) THEN
            FILS=AVGFIL(KS)
      ELSE
            FILS=AVGFL2(KS)
      END IF
      DIFF=ABS(FILB-FILS)
      IF(DIFF.GT.FILWIN) GO TO 500
C     WRITE(6,1010) FILB,FILS,DIFF,DIFF
      DO 300 MB=1,IRB
      RNGB=ABS(TGTBUF(KB+MB+MTB-4))
      DO 300 MS=1,IRS
      RNGS=ABS(TGTBUF(KS+MS+MTS-4))
      IF(RNGB.EQ.0.0.OR.RNGS.EQ.0.0) GO TO 300
      RNG=ABS(RNGB-RNGS)
C                 **************    .13 DEPENDS ON RANGE ORDER WHICH
C                                   MUST BE NEAREST RANGE FIRST
      IF(RNG.LT..13) GO TO 400
  300 CONTINUE
      GO TO 500
C                 ************** ESTABLISH LINK
  400 IF(TGTBUF(KB+LTB+2).GT.0. .OR.TGTBUF(KS+LTS+1).GT.0. ) GO TO 500
C     WRITE(6,1010) RNGB,RNGS,RNG
      TGTBUF(KB+LTB+2)=KS
      TGTBUF(KS+LTS+1)=KB
C     WRITE(6,1010) TGTBUF(KB+LTB+2),TGTBUF(KS+LTS+1)
  500 CONTINUE
  550 CONTINUE
  600 RETURN
 1000 FORMAT(7H LINKXX,10I8)
 1010 FORMAT(1H ,8F10.1)
 1020 FORMAT(1H ,6HLINKXX)
      END
      SUBROUTINE LNKJEM(ITB,ITS,KKSB)
      COMMON /REPTGT/ TGTBUF(80000),IAD
      COMMON /LINK/ LXDUM(91),IXP,KCNT
      COMMON /FILCOM/ FILWIN
      COMMON /SLNLEN/ NUMSLT
      COMMON /REPLEN/ ISK(3)
      DIMENSION IOFF(3),ILOP(3),IFIL(3),IRNG(3),DIV(3),
     +IGTBUF(80000)
      DATA IOFF/72,32,32/,ILOP/17,9,9/,
     +IFIL/45,32,32/,IRNG/1,4,4/,DIV/3.,2.,2./
      EQUIVALENCE (TGTBUF(1),IGTBUF(1))
C
C           **************    SET UP ADDRESS OF ALL TYPE
C                             REPORTS FOR UP TO "KSB" SLANTS BACK
C
C******************************************************************
C
C
C           **************    CALCULATE STARTING AND ENDING ADDRES OF
C                             B=BASE SLANT AND S=SLANT "KSB" BACK
C
      KSB=IABS(KKSB)
      KIXP=MMOD((IXP-1),NUMSLT)
      IB=30*(ITB-1)+KIXP
      IS=KIXP-KSB
      IS=30*(ITS-1)+MMOD(IS,NUMSLT)
C     WRITE (6,1005) IS
      IBS=LXDUM(IB)
      IBE=LXDUM(IB+15)
      ISS=LXDUM(IS)
      ISE=LXDUM(IS+15)
C                 ****************** ANY DATA TO LINK
      IF((IBE-IBS).LE.0.OR.(ISE-ISS).LE.0) GO TO 600
C                 ************** DETERIME # WORDS OF REPORT TYPE
C                                AND OTHER ADDRESS DIFFERECCES
C                                BETWEEN REPORT TYPE
C     WRITE(6,1020)
C     WRITE(6,1000) ITB,ITS,KSB,KIXP,IB,IS
C     WRITE(6,1000) IBS,IBE,ISS,ISE,KKSB
      IBSKIP=ISK(ITB)
      ISSKIP=ISK(ITS)
      KBFIL=ILOP(ITB)
      KSFIL=ILOP(ITS)
      LTB=IOFF(ITB)
      LTS=IOFF(ITS)
      IRB=IRNG(ITB)
      IRS=IRNG(ITS)
      MTB=IFIL(ITB)
      MTS=IFIL(ITS)
C     WRITE(6,1000) IBSKIP,ISSKIP,KBFIL,KSFIL,LTB,LTS,IRB,IRS,
C    +MTB,MTS
C                 ************** START LINK SEARCH
      DO 550 KB=IBS,IBE,IBSKIP
      IF(IGTBUF(KB+1).LE.0) GO TO 550
      DO 500 KS=ISS,ISE,ISSKIP
      IF(IGTBUF(KB+1).LE.0) GO TO 550
      IF(IGTBUF(KS+1).LE.0) GO TO 500
```

```
C                     *************** CALCULATE  AVERAGE FILTER
      IF(ITB.EQ.1) THEN
          FILB=AVGFIL(KB)
      ELSE
          FILB=AVGFL2(KB)
      END IF
      IF(ITS.EQ.1) THEN
          FILS=AVGFIL(KS)
      ELSE
          FILS=AVGFL2(KS)
      END IF
      DIFF=ABS(FILB-FILS)
C                     ******************* CHECK FOR RANGE MATCH
      DO 425 MB=1,IRB
      RRNGB=ABS(TGTBUF(KB+MB+MTB-4))
      DO 430 MS=1,IRS
      RRNGS=ABS(TGTBUF(KS+MS+MTS-4))
      IF(RRNGS.EQ.0.0.OR.RRNGB.EQ.0.0) GO TO 430
      RRNG=ABS(RRNGB-RRNGS)
C          WRITE(6,1000) MB,MS
C          WRITE(6,1010) RRNGB,RRNGS,RRNG
C                     *************** RANGE AGREE WITH IN MULTIPATH LIMITS
      IF(RRNG.GT..261) GO TO 430
C          WRITE(6,1000) KB,KS
      IF(KKSB.LT.0) GO TO 431
      GO TO 438
 430  CONTINUE
 425  CONTINUE
      GO TO 500
 431  IF(DIFF.LE.FILWIN) GO TO 433
      IF(IGTBUF(KB).EQ.0.AND.IGTBUF(KS).EQ.0) GO TO 432
      IF(IGTBUF(KB).EQ.0.AND.IGTBUF(KS).EQ.-4) GO TO 435
      IF(IGTBUF(KS).EQ.0.AND.IGTBUF(KB).EQ.-4) GO TO 434
      GO TO 500
 432  IF(ITB.EQ.1) THEN
          IGTBUF(KB)=-4
          IGTBUF(KB+IOFF(ITB)-2)=KS
          IGTBUF(KS)=KB
      ELSE
          IGTBUF(KS)=-4
          IGTBUF(KS+IOFF(ITS)-2)=KB
          IGTBUF(KB)=KS
      END IF
C     WRITE(6,1000) KB,KS,ITB,ITS,IGTBUF(KB),IGTBUF(KS)
      GO TO 550
 434  MZ=KB
      KKB=KS
      KKS=KB
      IT=IOFF(ITB)-2
      MSAVE=MZ
      GO TO 436
 435  KKB=KB
      KKS=KS
      MZ=KS
      IT=IOFF(ITS)-2
      MSAVE=MZ
 436  MZ=IGTBUF(MZ+IT)
      IF(MZ.LE.0) GO TO 437
      IT=MMOD(IGTBUF(MZ+1),4)
      IT=IOFF(IT)-2
      MSAVE=MZ
      GO TO 436
 437  IGTBUF(KKB)=KKS
      IGTBUF(MSAVE+IT)=KKB
C     WRITE(6,1000) KB,KS,KKB,KKS,MSAVE,IT,MZ
      GO TO 550
 438  CONTINUE
C     WRITE(6,1000) KB,KS,IGTBUF(KB),IGTBUF(KS),IGTBUF(KB+1),
C    +IGTBUF(KS+1)
      IF(DIFF.GT.FILWIN) GO TO 439
 433  IF(IGTBUF(KS).NE.0.OR.IGTBUF(KB).NE.0) GO TO 500
      IF(IGTBUF(KB).EQ.0.AND.IGTBUF(KS).EQ.0) GO TO 550
      IF(IGTBUF(KB).EQ.-4.AND.IGTBUF(KS).EQ.-4) GO TO 550
      IGTBUF(KB)=-4
      IGTBUF(KS)=-4
C     WRITE(6,1000) KB,KS,IGTBUF(KB),IGTBUF(KS),IGTBUF(KB+1),
C    +IGTBUF(KS+1)
      GO TO 445
C                     *************** JEM LINK PROCESS
C
C                     ***************  IS IT A  JEM REPORT TYPE
 439  CONTINUE
C     WRITE(6,1010) FILB,FILS,DIFF
C     WRITE(6,1000) IGTBUF(KB),IGTBUF(KS)
      LNKSB=0
C                     *************** DO WE LINK AND SEARCH BACK YES: LNKSB=1
      IF(IGTBUF(KS).EQ.0.AND.(IGTBUF(KB).EQ.0.OR.IGTBUF(KB).EQ.-4))
     +LNKSB=1
C                     *************** DO WE LINK AND NOT SEARCH BACK  YES: LNKSB=-1
      IF(IGTBUF(KS).EQ.-4.AND.(IGTBUF(KB).EQ.0.OR.IGTBUF(KB).EQ.-4))
     +LNKSB=-1
C                     *************** NO LINK IF LNKSB=0
      IF(LNKSB.EQ.0) GO TO 500
```

```
440   TGTBUF(KS+LTS+1)=KB
      TGTBUF(KB+LTB+2)=KS
      IGTBUF(KB)=-4
      IGTBUF(KS)=-4
C     WRITE(6,1010) RRNGB,RRNGS,RRNG,RRNG
C     WRITE(6,1000) KB,KS,LTB,LTS
C     ******************  DO WE SEARCH BACK TO SET JEM FLAG=-4
      IF(LNKSB.NE.1) GO TO 550
445   IC=2
      IX=TGTBUF(KS+LTS+2)
C     WRITE(6,1000) KB,KS
450   IF(IX.LE.0) GO TO 550
C     WRITE(6,1000) IX,IC
      IF(IGTBUF(IX).NE.0) GO TO 550
      IGTBUF(IX)=-4
      IT=MMOD(IGTBUF(IX+1),4)
      IZ=IOFF(IT)
      IX=TGTBUF(IX+IZ+2)
      IC=IC+1
      IF(IC.GE.7) GO TO 550
      GO TO 450
500   CONTINUE
550   CONTINUE

600   RETURN
1000  FORMAT(7H LNKJEM,10I8)
1005  FORMAT(7H LNKJEM,10I10)
1010  FORMAT(7H LNKJEM,8F10.1)
      END

C
C     **********   MAIN ROUTINE TO START TARGET PROCESSING
C

COMMON /MYSTRY/ DEHIST(20)
      COMMON /MINRB/  RBMIN
      COMMON /OPTION/ ITAPID(10),IPRTOP(10),IPRSOP(10),ITHROP(10)
      COMMON /THROP/  DTHR(10)
      COMMON /SLNLEN/ NUMSLT
      COMMON /TIMEOT/ JHOURS,JMINS,JSECS,JMSECS,KHOURS,KMINS,
     +KSECS,KMSECS
      COMMON /VELCHK/ VELMAT(5),NUMT
      COMMON /FILCOM/ FILWIN
      COMMON /REPLEN/ IOX,ITW,ITV
      COMMON /SCANX/  MCNTS(200),ISTX
      COMMON /AZFILM/ IAZFIL(24,256)
      DIMENSION ITHR(10),IDUM(40),IDATIM(10),IBUF(2)
      EQUIVALENCE (DTHR(1),ITHR(1)),(IDUM(1),ITAPID(1))
      DATA IOX/80/,ITW/55/,ITV/55/,NUMSLT/12/
```

```
***********************************************************
DTHR         ITHROP           DESCRIPTION 8,9            1              2/2; 2/3 WINDOW
7              9              3/3    WINDOW
FILWIN         5              CORRELATION BETWEEN REPORTS
2,4            2              RATIO OF DELTA AMPS 2/2
3,5            3              RATIO OF DELTA AMPS 2/3
6              4              XTES   INTEGER FILTER AMP
6              6              XTES   INTEGER FILTER AMP
1              10             AZTES ECLIPSE AMPLITUDE
10             7,8            SPARE
***********************************************************

***********************************************************
  I          IPRTOP                      IPRSOP

1     PRINT DETECTIONS UNFOLDED   USED TO FLAG DTHR(7),CHANGE 2/2,2/3
                                    FILTER WINDOW 1=CHANGE
  2     PRINT CANDIATE REPORT       BY PASS ELIMIN ROUTINE FOR 2/2;2/3
                                    1=BYPASS 0=TEST
  3     PRINT SALNT COUNTER SLTEXT  2/;2/3 AMPLITUDE CHECK
  4     PRINT FINAL REPORT          UNFOLD AND INTEGER TEST
  5     NO PRINT WHEN FILE READ     UNFOLD TEST
  6                                 INTEGER FILTER
  7                                 ONLY 3/3 FOR AND FORM FACTOR &
                                    5.15 BLANKING 1=USE 0=NO OTHERS
                                    FOR OLD RDC
  8                                 2/2 ELIPSE TEST BOTH SIDES 1=YES
                                    0=MAX AMP SIDE
  9                                 CHANGE FILTER FOR 3/3 FROM DEFAULT
                                    1=CHANGE 0=NO
 10     NO 2/2 OR 2/3 PROCESSING    DO 2/3,2/2 ECLIPSE TEST 1=NO 0=YES
```

```
      READ(5,1010) ITAPID
      READ(5,1000) IPRTOP
      READ(5,1000) IPRSOP
      READ(5,1000) ITHROP
      READ(5,1000) NUMT
      READ(5,1070) VELMAT
```

```
      READ(5,1000) JHOURS,JMINS,JSECS,JMSECS
      READ(5,1000) KHOURS,KMINS,KSECS,KMSECS
      WRITE(6,1030) ITAPID
      WRITE(6,1020) IPRTOP
      WRITE(6,1020) IPRSOP
      WRITE(6,1040) ITHROP
      WRITE(6,1040) JHOURS,JMINS,JSECS,JMSECS
      WRITE(6,1040) KHOURS,KMINS,KSECS,KMSECS
      WRITE(7,1030) ITAPID
      WRITE(7,1020) IPRTOP
      WRITE(7,1020) IPRSOP
      WRITE(7,1040) ITHROP
      WRITE(7,1040) JHOURS,JMINS,JSECS,JMSECS
      WRITE(7,1040) KHOURS,KMINS,KSECS,KMSECS
      DTHR(1)=ITHROP(10)
      DTHR(2)=75/10.
      DTHR(3)=150/10.
      DTHR(4)=1./DTHR(2)
      DTHR(5)=1./DTHR(3)
      DTHR(6)=8
      DTHR(8)=44/100.
      DTHR(7)=84/100.
      RBMIN=5.2
      IF(IPRSOP(9).EQ.1) DTHR(8)=ITHROP(1)/100.
      IF(IPRTOP(9).EQ.1) THEN
          DTHR(2)=ITHROP(2)/10.
          DTHR(3)=ITHROP(3)/10.
          DTHR(4)=1./DTHR(2)
          DTHR(5)=1./DTHR(3)
      ELSE
      END IF
      IF(IPRSOP(7).EQ.1) RBMIN=5.15
      IF(IPRSOP(9).EQ.1) DTHR(7)=ITHROP(9)/100.
      DTHR(9)=DTHR(8)
      FILWIN=ITHROP(5)/100.
      WRITE(6,1050) FILWIN
      WRITE(6,1050) DTHR
      WRITE(7,1050) FILWIN
      WRITE(7,1050) DTHR
      WRITE(12) IDUM
      WRITE(12) ITHR
      CALL IDATE(IDATIM(1),IDATIM(2),IDATIM(3))
      CALL TIME(IBUF)
C     WRITE(6,1080) IBUF
      IDATIM(4)=JIBITS(IBUF(1),8,8)-48+(JIBITS(IBUF(1),0,8)-48)*10
      IDATIM(5)=JIBITS(IBUF(2),0,8)-48+(JIBITS(IBUF(1),24,8)-48)*10
      IDATIM(6)=JIBITS(IBUF(2),24,8)-48+(JIBITS(IBUF(2),16,8)-48)*10
      WRITE(6,1000) IDATIM
      WRITE(7,1000) IDATIM
      WRITE(12) IDATIM
      CALL REDCNS
      CALL RNGCHK
 200  CALL TGMAIN
      WRITE(6,1060)
      WRITE(6,1050) DEHIST
      WRITE(7,1050) DEHIST
      WRITE(6,2010) (I,I=1,24)
      DO J=1,256
          WRITE(6,2020) J,(IAZFIL(I,J),I=1,24)
      END DO
      WRITE(7,2010) (I,I=1,24)
      DO J=1,256
          WRITE(7,2020) J,(IAZFIL(I,J),I=1,24)
      END DO
      ISUM = 0
      DO 250 I = 1,200
 250  ISUM = ISUM + MCNTS(I)
      WRITE(6,2000) (MCNTS(I),I=1,200)
      WRITE(6,2000) ISUM
      READ(5,1000) JHOURS,JMINS,JSECS,JMSECS
      IF(JHOURS.EQ.99) GO TO 300
      READ(5,1000) KHOURS,KMINS,KSECS,KMSECS
      WRITE(6,1090)
      GO TO 200
 300  CALL INNFIL
      STOP
 1000 FORMAT(10I4)
 1010 FORMAT(20A4)
 1020 FORMAT(1H ,10I2)
 1030 FORMAT(1H ,20A4)
 1040 FORMAT(1H ,10I8)
 1050 FORMAT(1H ,5F10.3)
 1060 FORMAT(1H )
 1070 FORMAT(5F10.1)
 1080 FORMAT(1H ,2Z12)
 1090 FORMAT(1H1)
 2000 FORMAT(10(1H ,8I10/))
 2010 FORMAT('1',//4X,24(1X,I4),/)
 2020 FORMAT(1X,I3,1X,24(1X,I4))
      END
      FU    IJN MMOD(II,KK)
      MM   =KK*(II/KK)
      IF(MM.GE.0) GO TO 100
      MM=MM+KK
```

```
  100   IF(MM.EQ.0) MM=KK
        MMOD=MM
C       WRITE(6,1000) MMOD,MM,II,KK
 1000   FORMAT(1H ,10I12)
        RETURN
        END
        SUBROUTINE OUT123(INSLNT,MMSLNT,IN,KN,KTT)
        COMMON /TARGET/ REPBUF(3000),IXD
        COMMON /REPTGT/ TGTBUF(80000),IAD
        COMMON /APARM/ AMP(8),RDOT(8),TPEL(8),IDIV
        COMMON /OPTION/ ITAPID(10),IPRTOP(10),IPRSOP(10),ITHROP(10)
        COMMON /MINRB/ RBMIN
        COMMON /RKTSFIL/ RKTFIL(6)
        DIMENSION INSLNT(6),IBSIN(3),IGTBUF(80000),
       +AZX(3,2),IEPBUF(3000),MMSLNT(6,5)
        EQUIVALENCE (IGTBUF(1),TGTBUF(1)),(IEPBUF(1),REPBUF(1))
        DATA IBSIN/41,28,28/,RKTFIL/21.5532,21.3543,21.1590,
       +20.7168,20.5330,20.3523/
C
C
C       ************* OUT PUT TO REPORT BUFFER ********
C
C       WRITE(6,1020) IXD,IN,KN,KTT
C       WRITE(6,1020) INSLNT
C       DO 5 I=1,6
C       IF(MMSLNT(I,1).NE.0) GO TO 10
C   5   CONTINUE
C       GO TO 15
C  10   WRITE(6,1020) MMSLNT
C                     *************** INTIALIZE BUUFER TO ZERO
   15   DO 50 I=1,30
   50   REPBUF(IXD+I-1)=0.
C                     *********** SET UP MODE ,LENGTH,ELCMD
        REPBUF(IXD+1)=0.
        REPBUF(IXD+2)=KN
        REPBUF(IXD+3)=IN
        REPBUF(IXD+5)=-2.1
        LNN=IN
        DO 600 I=1,IN
        IX=INSLNT(I)
        IEPBUF(IXD)=IEPBUF(IXD)+JIBITS(IGTBUF(IX+1),0,4)*(16**(I-1))
        ITYPE=MMOD(IGTBUF(IX+1),4)
        INK=IBSIN(ITYPE)
C       WRITE(6,1020) ITYPE,IGTBUF(IX+1),IGTBUF(IX),IX,IN,INK
        ISTP=3
        IF(ITYPE.NE.1) ISTP=2
C       WRITE(6,1020) IEPBUF(IXD+6),IN,ISTP
        IF(I.GT.1) GO TO 200
        IEPBUF(IXD+4)=IGTBUF(IX+2)
        REPBUF(IXD+6)=0.
        IF(ITYPE.EQ.1) REPBUF(IXD+6)=TGTBUF(IX+75)
        DIV=ISTP
        DO 100 K=7,23
        DO 100 J=1,ISTP
        JJ=(K-7)*ISTP+J+2
        IF(K.EQ.9.OR.K.EQ.10) THEN
           IF(J.GT.1) GO TO 25
           JX=JJ
           IF(J.EQ.1) GO TO 100
   25      IF ((ABS(TGTBUF(IX+JJ)-TGTBUF(IX+JX))).GT.3.) THEN
              IF(TGTBUF(IX+JJ).LT.3.) TGTBUF(IX+JJ)=TGTBUF(IX+JJ)+360.
              IF(TGTBUF(IX+JX).LT.3.) TGTBUF(IX+JX)=TGTBUF(IX+JX)+360.
           ELSE
              CONTINUE
           END IF
           IF(J.EQ.2) THEN
              AZX(1,K-8)=TGTBUF(IX+JX)
              AZX(2,K-8)=TGTBUF(IX+JJ)
              AZX(3,K-8)=0
C             WRITE(6,1000) AZX
           ELSE
              AZX(3,K-8)=TGTBUF(IX+JJ)
           END IF
           GO TO 100
        ELSE
           CONTINUE
        END IF
C       WRITE(6,1020) IXD,K,JJ,IX
        IF(J.LT.2) GO TO 90
        IF(K.EQ.14) THEN
           IF (ABS(REPBUF(IXD+K)/(J-1)-TGTBUF(IX+JJ)).GT.15) THEN
              TGTBUF(IX+JJ)=-TGTBUF(IX+JJ)
           ELSE
              CONTINUE
           END IF
C          WRITE(6,1030) REPBUF(IXD+K),TGTBUF(IX+JJ)
        ELSE
           CONTINUE
        END IF
   90   CONTINUE
C       WRITE (6,1020) IXD,K,IX,JJ
C       WRITE (6,1030) REPBUF(IXD+K),TGTBUF(IX+JJ)
        REPBUF(IXD+K)=REPBUF(IXD+K)+TGTBUF(IX+JJ)
  100   CONTINUE
        REPBUF(IXD+9)=AZX(1,1)+AZX(2,1)+AZX(3,1)
        REPBUF(IXD+10)=AZX(1,2)+AZX(2,2)+AZX(3,2)
```

```
C         WRITE(6,1000) REPBUF(IXD+9),AZX(1,1),AZX(2,1),AZX(3,1)
          IZZ=IX
          ISTYPE=ITYPE
          IFTYPE=ITYPE
          KF=TGTBUF(ISTP*10+IX-1)
          GO TO 600
   200    IF=ISTYPE-ITYPE
C         WRITE(6,1020) IF,ISTYPE,ITYPE
          IF(IF.EQ.2) GO TO 400
          IF(IF.EQ.0.AND.ITYPE.EQ.2) GO TO 400
          DO 300 K=7,23
          KK=(K-6)*ISTP+2
          IF(K.EQ.9.OR.K.EQ.10) THEN
              IF ((ABS(TGTBUF(IX+KK)-REPBUF(IXD+K)/DIV)).GT.3.) THEN
                   TGTBUF(IX+KK)=TGTBUF(IX+KK)+360.
              ELSE
                   CONTINUE
              END IF
              REPBUF(IXD+K)=TGTBUF(IX+KK)+REPBUF(IXD+K)
C             WRITE(6,1000) REPBUF(IXD+K),TGTBUF(IX+KK)
              GO TO 300
          ELSE
              CONTINUE
          END IF
          IF(K.EQ.14) THEN
              IF (ABS(REPBUF(IXD+K)/(DIV)-TGTBUF(IX+KK)).GT.15) THEN
                   TGTBUF(IX+KK)=-TGTBUF(IX+KK)
              ELSE
                   CONTINUE
              END IF
C             WRITE(6,1030) REPBUF(IXD+K),TGTBUF(IX+KK)
          ELSE
              CONTINUE
          END IF
C         WRITE(6,1000) REPBUF(IXD+K),TGTBUF(IX+KK)
C         IF(K.LT.19) GO TO 299
C         IF(ABS(TGTBUF(IX+KK)).GT.256) TGTBUF(IX+KK)=0
   299    REPBUF(IXD+K)=REPBUF(IXD+K)+TGTBUF(IX+KK)
   300    CONTINUE
          DIV=DIV+1
          GO TO 550
C
C         ************** LAT,LON,AZ DAZ,ROLL,PITCH,HEADING,RF
C                         ALT LINE,ALT,VE,VN
C
   400    DO 500 K=7,19
          DO 500 L=1,2
          KK=(ISTP-2)+(K-7)*ISTP+2+L
          IF(K.EQ.9.OR.K.EQ.10) THEN
              IF((ABS(TGTBUF(IX+KK)-REPBUF(IXD+K)/(DIV+L-1.))).GT.3.) THEN
                   TGTBUF(IX+KK)=TGTBUF(IX+KK)+360.
              ELSE
                   CONTINUE
              END IF
              REPBUF(IXD+K)=REPBUF(IXD+K)+TGTBUF(IX+KK)
              GO TO 500
          ELSE
              CONTINUE
          END IF
          IF(K.EQ.14) THEN
              IF (ABS(REPBUF(IXD+K)/(DIV+L-1)-TGTBUF(IX+KK)).GT.15) THEN
                   TGTBUF(IX+KK)=-TGTBUF(IX+KK)
              ELSE
                   CONTINUE
              END IF
C             WRITE(6,1030) REPBUF(IXD+K),TGTBUF(IX+KK)
          ELSE
              CONTINUE
          END IF
          REPBUF(IXD+K)=REPBUF(IXD+K)+TGTBUF(IX+KK)
   500    CONTINUE
          DIV=DIV+2
   550    IF(ITYPE.NE.1) GO TO 575
          IFTYPE=ITYPE
          IZZ=IX
   575    ISTYPE=ITYPE
   600    CONTINUE
C         WRITE(6,1020) MMSLNT(1,1)
          JEM=0
          IF(MMSLNT(1,1).LE.0) GO TO 610
C         WRITE(6,1020) MMSLNT
          CALL OUTJEM(INSLNT,MMSLNT,IN,IBLNK)
          JEM=1
          GO TO 725
   610    IF(KTT.GT.1) GO TO 650
          CALL AMPFIN(INSLNT,IN)
   650    AA=
          RRM=0
          TPM=0
          IDX=DIV
          DO 700 I=1,IDX
          AAM=AMP(I)+AAM
          RRM=RDOT(I)+RRM
   700    TPM=TPEL(I)+TPM
C         ************** RDOT :NO JEM
```

```
      REPBUF(IXD+20)=(RRM-(129.*DIV))*RKTFIL(KF)/DIV
      REPBUF(IXD+21)=0.
      REPBUF(IXD+22)=0.
      REPBUF(IXD+23)=0.
      REPBUF(IXD+28)=AAM
      REPBUF(IXD+29)=TPM
  725 DO 750 I=7,19
      IF(I.EQ.9.OR.I.EQ.10) THEN
          REPBUF(IXD+I)=REPBUF(IXD+I)/DIV
          IF(REPBUF(IXD+I).GT.360.) REPBUF(IXD+I)=REPBUF(IXD+I)-360.
          GO TO 750
      ELSE
          REPBUF(IXD+I)=REPBUF(IXD+I)/DIV
      END IF
  750 CONTINUE
      IF(JEM.EQ.1) GO TO 900
      IF(IFTYPE.EQ.1.OR.IN.EQ.1) THEN
          IF(IFTYPE.EQ.1) INK = IBSIN(1)
C     ********************* RANGE OF 3/3 OR 2/2;2/3 NO EXTENT
  775 CONTINUE
C     WRITE(6,1020) IXD,IZZ,INK
      REPBUF(IXD+24)=TGTBUF(IZZ+INK+1)
      REPBUF(IXD+25)=TGTBUF(IZZ+INK+2)
      REPBUF(IXD+26)=TGTBUF(IZZ+INK+3)
      REPBUF(IXD+27)=TGTBUF(IZZ+INK+4)
      IBLNK=1
C     WRITE(6,1040) IFTYPE,IFTYPE,TGTBUF(IZZ+INK+1)
      IF(IFTYPE.EQ.1) IBLNK=0
      GO TO 900
      ELSE
C     ***************** RANGE WITH SLANT EXTENT 2/2;2/3
      IT=INSLNT(1)
      KT=INSLNT(2)
      ITYPE=MMOD(IGTBUF(IT+1),4)
      KTYPE=MMOD(IGTBUF(KT+1),4)
      IF(ITYPE.EQ.KTYPE) GO TO 775
      IT=IT+29
      KT=KT+29
      ITT=IT+3
      LTT=KT+3
      DO 800 I=IT,ITT
      KK=I
      DO 800 K=KT,LTT
      IF(TGTBUF(I).EQ.TGTBUF(K)) GO TO 850
  800 CONTINUE
      INK = IBSIN(2)
      GO TO 775
C     *************** RANGE VALUES
  850 REPBUF(IXD+24)=TGTBUF(KK)
      REPBUF(IXD+25)=0.
      REPBUF(IXD+26)=0.
      REPBUF(IXD+27)=0.
      IBLNK=0
      END IF
  900 CONTINUE
C     ************ REPORT BLANKING RDOT,RANGE
      IF((ABS(REPBUF(IXD+20))).LE.2100..OR.IPRSOP(7).EQ.1) THEN
          IF(IEPBUF(IXD).EQ.2.OR.IEPBUF(IXD).EQ.3) GO TO 910
          IF(IBLNK.EQ.1) GO TO 910
          IF(REPBUF(IXD+24).LT.RBMIN) GO TO 915
  910     CALL OUTPRT
          IXD=IXD+30
          IF (IXD.GT.3000) WRITE (6,1020) IXD
      ELSE
          CONTINUE
      END IF
  915 CONTINUE
C     WRITE(6,1020) LNN,KTT,INSLNT
      IF(KTT.LE.3) GO TO 925
      IF(LNN.NE.KTT) LNN=LNN+2
      IF(LNN.GT.KTT) LNN=KTT
  925 DO 950 I=1,LNN
      IX=INSLNT(I)
      IF(IX.LE.0) GO TO 950
C     WRITE(6,1020) IX,IGTBUF(IX+1)
      IGTBUF(IX+1)=IGTBUF(IX+1)-100
  950 CONTINUE
      RETURN
 1000 FORMAT(7H OUT123,8F10.3)
 1010 FORMAT(7H OUT123,I10,7F10.3)
 1020 FORMAT(7H OUT123,10I10)
 1030 FORMAT(7H OUT123,8F10.2)
 1040 FORMAT(7H OUT123,2I10,F10.3)
      END

SUBROUTINE OUT4(INSLNT,MMSLNT,IN,KN)
      COMMON /APARM/ AMP(8),RDOT(8),TPEL(8),IDIV
      DIMENSION INSLNT(6),DBEQ(2)
      DATA DB4/1.6/,DBEQ/1.26,.79/
C
C     **********************
C
      JN=IN
      KM=KN
```

```
      CALL AMPFIN(INSLNT,IN)
      IF(IN.NE.KN) GO TO 100
      IF((AMP(2).GT.(AMP(3)*DB4).AND.AMP(5).GT.(AMP(4)*DB4)).AND.
     +((AMP(2)/AMP(4)).LT.DBEG(1).AND.(AMP(2)/AMP(4)).GT
     +.DBEG(2))) THEN
          JN=1
          KM=1
          CALL OUT123(INSLNT,MMSLNT,JN,KM,4)
      ELSE
          CALL OUT123(INSLNT,MMSLNT,JN,KM,4)
      END IF
      GO TO 200
 100  CALL OUT123(INSLNT,MMSLNT,IN,KN,4)
 200  RETURN
1000  FORMAT(1H ,10I10)
1010  FORMAT(1H ,10F10.3)
      END

SUBROUTINE OUT5(INSLNT,MMSLNT,IN,KN)
      COMMON /AFARM/ AMP(8),RDOT(8),TPEL(8),IDIV
      DIMENSION INSLNT(6),DBEG(2)
      DATA DB4/1.6/,DB8/2.5/
C
C        ********************
C
      JN=IN
      KM=KN
      CALL AMPFIN(INSLNT,IN)
      IF(IN.NE.KN) GO TO 100
      JN=1
      KM=1
      IF((AMP(2).GT.(AMP(3)*DB4).AND.AMP(6).GT.(AMP(4)*DB8)).AND.
     +(AMP(4).LT.AMP(5))) GO TO 100
      JN=3
      KM=2
      IF((AMP(6).GT.(AMP(5)*DB4).AND.AMP(2).GT.(AMP(4)*DB8)).AND.
     +(AMP(4).LT.AMP(3))) GO TO 100
      JN=IN
      KM=KN
 100  CALL OUT123(INSLNT,MMSLNT,JN,KM,5)
      RETURN
1000  FORMAT(1H ,10I10)
1010  FORMAT(1H ,10F10.3)
      END
      SUBROUTINE OUT6(INSLNT,MMSLNT,IN,KN)
      COMMON /AFARM/ AMP(8),RDOT(8),TPEL(8),IDIV
      DIMENSION INSLNT(6),IBSIN(3)
      DATA IBSIN/71,51,51/
C
C        ********************
C
      CALL AMPFIN(INSLNT,IN)
      AMIN=4096
      MM=IN+1
C     WRITE(6,1000) IN,KN,MM
      DO 100 I=3,MM
      IF(AMP(I).GT.AMIN) GO TO 100
      K=I
      AMIN=AMP(I)
 100  CONTINUE
      AMAX=AMAX1(AMP(K-1),AMP(K+1))
      IS=K-2
      IF(AMAX.EQ.AMP(K+1)) IS=K-3
      IF(IS.EQ.0) IS=1
      JN=IS
C     WRITE(6,1010) AMAX,AMIN,IS,JN,K
 200  CALL OUT123(INSLNT,MMSLNT,IS,JN,5)
      RETURN
1000  FORMAT(1H ,10I8)
1010  FORMAT(1H ,2F10.3,3I10)
      END

SUBROUTINE OUT6(INSLNT,MMSLNT,IN,KN)
      COMMON /AFARM/ AMP(8),RDOT(8),TPEL(8),IDIV
      DIMENSION INSLNT(6),IBSIN(3)
      DATA IBSIN/71,51,51/
C
C        ********************
C
      CALL AMPFIN(INSLNT,IN)
      AMIN=4096
      MM=IN
      IF(IN.EQ.KN) MM=IN+1
C     WRITE(6,1000) IN,KN,MM
      DO 100 I=3,MM
      IF(AMP(I).GT.AMIN) GO TO 100
      K=I
      AMIN=AMP(I)
 100  CONTINUE
      AMAX=AMAX1(AMP(K-1),AMP(K+1))
      IS=K-2
      IF(AMAX.EQ.AMP(K+1)) IS=K-3
      IF(IS.EQ.0) IS=1
      JN=IS
```

```
C       WRITE(6,1010) AMAX,AMIN,IS,JN,K
        IF(IN.EQ.KN) GO TO 200
        IS=IN
        JN=KN
C       WRITE(6,1000) IS,JN
  200   CALL OUT123(INSLNT,MMSLNT,IS,JN,6)
        RETURN
 1000   FORMAT(1H ,1018)
 1010   FORMAT(1H ,2F10.3,3I10)
        END
        SUBROUTINE OUTFIL
        COMMON /TARGET/ REPBUF(3000),IXD
        COMMON /OPTION/ ITAPID(10),IPRTOP(10),IPRSOP(10),ITHROP(10)
        COMMON /MYSTRY/ DEHIST(20)
        COMMON /RKTSFIL/ RKTFIL(6)
        COMMON /AZFILM/ IAZFIL(24,256)
        DIMENSION IEPBUF(3000)
        EQUIVALENCE (IEPBUF(1),REPBUF(1))
C
C
C
        IX=IXD-1
C  **********************************************************
C              BLANKING CODE FOR 30 DEGREE ROLL
        IB=1
        DO 50 I=1,IX,30
        IBS=0
        CALL BLANK(IBS,I)
        IF(IBS.GE.1) GO TO 45
        IF(IB.EQ.1) THEN
             IB=IB+1
          ELSE
             IZ=(IB-1)*30 +1
             IY=IZ+29
             DO 25 K=IZ,IY
  25         IEPBUF(K)=IEPBUF(I+K-IZ)
             IB=IB+1
        END IF
        GO TO 50
  45    IZX=IBS+13
        DEHIST(IZX)=DEHIST(IZX)+1
  50    CONTINUE
C       WRITE(6,1020) IX,IB
        IX=(IB-1)*30
C       WRITE(6,1020) IX
C
C  **********************************************************
        IF(IX.LE.0) GO TO 200
        DO 100 I=1,IX,30
        ITX=MMOD(IEPBUF(I),4)
        DEHIST(16+ITX)=DEHIST(16+ITX)+1
        IHOURS=JIBITS(IEPBUF(I+4),26,5)
        MINS=JIBITS(IEPBUF(I+4),20,6)
        ISECS=JIBITS(IEPBUF(I+4),14,6)
        MSECS=JIBITS(IEPBUF(I+4),4,10)
        IAZ = IIFIX(REPBUF(I+9) / 15.0)+1
        IF (IAZ.GT.24) IAZ = 24
C       WRITE(6,1030) IAZ,REPBUF(I+9)
        IFIL = IIFIX(REPBUF(I+20) / RKTFIL(IIFIX(REPBUF(I+15))))+129
        IF (IFIL.LE.0) IFIL = 1
        IF (IFIL.GT.256) IFIL = 256
C       WRITE (6,1030) IFIL,REPBUF(I+20),REPBUF(I+15)
        IAZFIL(IAZ,IFIL) = IAZFIL(IAZ,IFIL) + 1
        IF(IPRTOP(4).NE.1) GO TO 100
        WRITE(6,1000) IEPBUF(I),REPBUF(I+9),REPBUF(I+14),
       +(REPBUF(I+J),J=20,28),REPBUF(I+6),REPBUF(I+7),REPBUF(I+8),
       +IHOURS,MINS,ISECS,MSECS
  100   CONTINUE

CALL SCAN(IHOURS,MINS,ISECS,MSECS,IX)
        IF(IPRTOP(4).NE.1) GO TO 150
        WRITE(6,1010)
  150   LL=IX/30
        DEHIST(20)=DEHIST(20)+LL
        WRITE(12) LL
        WRITE(12) (IEPBUF(I),I=1,IX)
  200   RETURN
 1000   FORMAT(1H ,I6,F7.2,F8.2,4F9.2,4F8.3,F6.0,F6.2,2F8.2,3I3,I4)
 1010   FORMAT(1H )
 1020   FORMAT(7H OUTFIL,2I10)
 1030   FORMAT(7H OUTFIL,I10,2F10.2)
        END

SUBROUTINE OUTJEM(INSLNT,MMSLNT,IN,IRF)
        COMMON /TARGET/ REPBUF(3000),IXD
        COMMON /REPTGT/ TGTBUF(80000),IAD
        COMMON /AFARM/ AMP(8),RDOT(8),TPEL(8),IDIV
        COMMON /FILCOM/ FILWIN
        DIMENSION INSLNT(6),IBSIN(3),IGTBUF(80000),RKTFIL(6),
       +AZX(3,2),IEPBUF(3000),MMSLNT(6,5),FIL(4),RANGE(4),JMSLNT(6),
       +TTFM(4),TAAM(4)
        EQUIVALENCE (IGTBUF(1),TGTBUF(1)),(IEPBUF(1),REPBUF(1))
        DATA IBSIN/41,28,28/,RKTFIL/21.5532,21.3343,21.1570,
       +20.7168,20.5330,20.3523/
```

```
C          ***** SET UP RDOT AND RANGES FOR JEM OUTPUT
C
C          *************** INTIALIZE BUUFER TO ZERO
C      WRITE(6,1030)
       DO 25 I=1,4
       RANGE(I)=0
  25   FIL(I)=129
       IRF=1
C          *************** CANDIDATE TARGET MORE THAN ONE SNAP LONG
C                                               100=YES
C      WRITE(6,1020) IN
       IF(IN GT.1) GO TO 100
C          *************** #IN SNAP
       JP=MMSLNT(1,1)+1
       IT=MMSLNT(1,2)
       ITY=MMOD(IGTBUF(IT+1),4)
C          ********** CHECK TYPE
       IF(ITY.EQ.1) THEN
C          ******************** 3/3
          KF=TGTBUF(IT+27)
          FIL(1)=AVGFIL(IT)
          AAM=SUMY(IT)
          JX=IT+1
          TPM=SUMY(JX)
          RANGE(1)=TGTBUF(IT+42)
          RANGE(2)=0.
          RANGE(3)=0.
          RANGE(4)=0.
          IRF=0
       ELSE
C          ************* 2/2;2/3
          KF=TGTBUF(IT+19)
          FIL(1)=AVGFL2(IT)
          AAM=SUMY2(IT)
          JX=IT+1
          TPM=SUMY2(JX)
          RANGE(1)=TGTBUF(IT+29)
          RANGE(2)=TGTBUF(IT+30)
          RANGE(3)=TGTBUF(IT+31)
          RANGE(4)=TGTBUF(IT+32)
          IRF=1
       END IF
       DO 50 I=3,JP
       IF(I.GT.5) GO TO 95
       JM=MMSLNT(1,I)
       IT=IGTBUF(JM+1)
       ITY=MMOD(IT,4)
C          *************** CHECK TYPE
       IF(ITY.EQ.1) THEN
C          ************* 3/3
          FIL(I-1)=AVGFIL(JM)
          IF(IRF.EQ.0) GO TO 50
          RANGE(1)=TGTBUF(JM+42)
          RANGE(2)=0.
          RANGE(3)=0.
          RANGE(4)=0.
          IRF=0
       ELSE
C          **************** 2/2;2/3
          FIL(I-1)=AVGFL2(JM)
       END IF
  50   CONTINUE
       GO TO 95
C
C          ********************** ORDER BY AMPLTIUDE
C
  55   KS=1
       KX=KCNT-1
  60   TMAX=0
       DO 70 I=KS,KX
       IF(TAAM(I).GT.TMAX) THEN
          TMAX=TAAM(I)
          KMAX=I
       ELSE
          CONTINUE
       END IF
  70   CONTINUE
       IF(KS.EQ.1) MAXSAV=KMAX
       TFIL=FIL(KMAX)
       FIL(KMAX)=FIL(KS)
       FIL(KS)=TFIL
       KS=KS+1
       IF(KS.GE.KX) GO TO 75
       GO TO 60
  75   AAM=TAAM(MAXSAV)
       TPM=TTPM(MAXSAV)
C      WRITE(6,1000) TAAM,TTPM
C      WRITE(6,1000) FIL
C          **********************       SET UP JEM RDOT,RANGE ,AMP
C                                       IN OUT PUT BUFFER
  95   CONTINUE
C      WRITE(6,1000) RANGE,FIL
```

```
      REPBUF(IXD+20)=(FIL(1)-129.)*RKTFIL(KF)
      REPBUF(IXD+21)=(FIL(2)-129.)*RKTFIL(KF)
      REPBUF(IXD+22)=(FIL(3)-129.)*RKTFIL(KF)
      REPBUF(IXD+23)=(FIL(4)-129.)*RKTFIL(KF)
      REPBUF(IXD+24)=RANGE(1)
      REPBUF(IXD+25)=RANGE(2)
      REPBUF(IXD+26)=RANGE(3)
      REPBUF(IXD+27)=RANGE(4)
      REPBUF(IXD+28)=AAM
      REPBUF(IXD+29)=TPM
      GO TO 500
C                 **************** MORE THAN ONE SNAP
  100 KCN=1
      DO 0 I=1,IN
C                 ************** JJ # JEMS IN SNAP
      JJ=MMSLNT(I,1)+1
      IF(JJ.LT.2) GO TO 450
      DO 400 J=2,JJ
      IF(MMSLNT(I,J).LE.0) GO TO 400
      IT=IGTBUF(MMSLNT(I,J)+1)
      IT=MMOD(IT,4)
C                 **************** SET RANGE ONLY IF A TYPE ONE AFTER FIRST
C                                  SNAP AND THEN ONLY IF NO PREVIOUS
C                                  TYPE ONE
      IF(IRF.EQ.0) GO TO 130
C                 **************** CHECK TYPE
      IF(IT.EQ.1) THEN
C                 *************** 3/3
         RANGE(1)=TGTBUF(MMSLNT(I,J)+42)
         RANGE(2)=0
         RANGE(3)=0
         RANGE(4)=0
         KF=TGTBUF(MMSLNT(I,J)+27)
         IRF=0
      ELSE
C                 **************** 2/2;2/3
         IF(IRF.EQ.2) GO TO 125
         RANGE(1)=TGTBUF(MMSLNT(I,J)+29)
         RANGE(2)=TGTBUF(MMSLNT(I,J)+30)
         RANGE(3)=TGTBUF(MMSLNT(I,J)+31)
         RANGE(4)=TGTBUF(MMSLNT(I,J)+32)
         KF=TGTBUF(MMSLNT(I,J)+19)
         LTYPE=IT
         ISL=TGTBUF(MMSLNT(I,J)+38)
         ISTT=I
         IRF=2
      END IF
C                 BUFFER OF ALL ADDRESS TO GET JEM LINES
      GO TO 130
  125 NSL=TGTBUF(MMSLNT(I,J)+38)
      IF(I.GT.ISTT) NSL=NSL+5
      CALL TRANGE(ISL,NSL,IT,LTYPE,MMSLNT(I,J),IRF,RANGE)
C     WRITE(6,1000) RANGE
C     WRITE(6,1020) ISL,NSL,IT,LTYPE,ISTT,IRF
  130 KN=1
      JMSLNT(KN)=MMSLNT(I,J)
      IJ=MMSLNT(I,J)
      MMSLNT(I,J)=0
      KN=KN+1
C                 *************** HAS THIS JEM ALREADY BEEN USED
C                 ************* FILTER OF JEM =FILIJ
      IF(IT.EQ.1) THEN
         FILIJ=AVGFIL(IJ)
      ELSE
         FILIJ=AVGFL2(IJ)
      END IF
C                 ************* SEARCH ADJACENT SNAPS
C     WRITE(6,1000) FILIJ
      DO 300 K=1,IN
      IF(K.EQ.I) GO TO 300
      JK=MMSLNT(K,1)+1
      IF(JK.LT.2) GO TO 300
      DO 200 L=2,JK
      KL=MMSLNT(K,L)
      IF(KL.LE.0) GO TO 200
      IT=MMOD(IGTBUF(KL+1),4)
C                 ************* FILTER OF JEM =FILIJ
      IF(IT.EQ.1) THEN
         FILKL=AVGFIL(KL)
      ELSE
         FILKL=AVGFL2(KL)
      END IF
C                 ************ ARE FILTERS SAME NO=200
C     WRITE(6,1000) FILKL,FILIJ
C     WRITE(6,1020) KL,IJ
      IF((ABS(FILKL-FILIJ)).GT.FILWIN) GO TO 200
C                 *****        DONT CHANGE RANGE UNLESS NO PREVIOUS
C                              TYPE ONE ; IF NO PREVIOUS AND TYPE ONE
C                              CHANGE RANGE
      IF(IRF.EQ.0) GO TO 175
      IF(IT.NE.1) GO TO 140
```

```
      RANGE(1)=TGTBUF(KL+42)
      RANGE(2)=0.
      RANGE(3)=0.
      RANGE(4)=0.
      IRF=0
C                   ************* CONTINUE TO UP DATE ADDRESS BUFFER
C                                   OF JEMS
      GO TO 175
  140 NSL=TGTBUF(MMSLNT(K,L)+38)
      IF(K.NE.ISTT) NSL=NSL+5
      CALL TRANGE(ISL,NSL,IT,LTYPE,MMSLNT(K,L),IRF,RANGE)
C     WRITE(6,1000) RANGE
C     WRITE(6,1020) ISL,NSL,IT,LTYPE,ISTT,IRF,IRF
  175 JMSLNT(KN)=MMSLNT(K,L)
C     WRITE(6,1020) JMSLNT,KN,K,L,I,J
      KN=KN+1
C                   ************* SET ADDRESS TO ZERO TO INDICATE USED
      MMSLNT(K,L)=0
C                   ************* GO TO NEXT SNAP
      GO TO 300
  200 CONTINUE
  300 CONTINUE
      KN=KN-1
      IF(KCNT.GT.4) GO TO 360
C                             ************ CALCULATE FILTER AND AMP
      CALL AMPFIN(JMSLNT,KN)
C     WRITE(6,1020) JMSLNT,KN,IDIV
C     WRITE(6,1000) RANGE,RDOT
      FIL(KCNT)=0
      DO 325 IM=1,IDIV
  325 FIL(KCNT)=FIL(KCNT)+RDOT(IM)
      FIL(KCNT)=FIL(KCNT)/IDIV
C     WRITE(6,1000) FIL(KCNT)
C     WRITE(6,1000) RANGE,RDOT
C     WRITE(6,1000) AMP
C     WRITE(6,1000) TPEL
C     WRITE(6,1020) JMSLNT,IDIV

TAAM(KCNT)=0
      TTPM(KCNT)=0
      DO 335 IM=1,IDIV
      TAAM(KCNT)=TAAM(KCNT)+AMP(IM)
  335 TTPM(KCNT)=TTPM(KCNT)+TPEL(IM)
C     WRITE(6,1000) TAAM,TTPM
  350 KCNT=KCNT+1
  360 CONTINUE
C     WRITE(6,1020) KN,JMSLNT
      DO 375 MI=1,KN
      IX=JMSLNT(MI)
      IF(IX.LE.0) GO TO 375
C     WRITE(6,1020) IX,IGTBUF(IX+1)
      IGTBUF(IX+1)=IGTBUF(IX+1)-100
  375 CONTINUE
      DO 380 MI=1,6
  380 JMSLNT(MI)=0
  400 CONTINUE
  450 CONTINUE
C                   *********** GO SET UP REPORT
      GO TO 55
  500 RETURN
 1000 FORMAT(7H OUTJEM,12F10.3)
 1010 FORMAT(7H OUTJEM,Z10,7F10.3)
 1020 FORMAT(7H OUTJEM,12I8)
      END

SUBROUTINE OUTPRT
      COMMON /TARGET/ REPBUF(3000),IXD
      COMMON /OPTION/ ITAPID(10),IPRTOP(10),IPRSOP(10),ITHROP(10)
      DIMENSION IEPBUF(3000)
      EQUIVALENCE(IEPBUF(1),REPBUF(1))
C
C                 ***************  OUT PUT TO PRINT BUFFER ********
C
      IF(IPRTOP(3).NE.1) GO TO 950
  910 KXD=IXD+5
      JXD=IXD+2
      WRITE(6,1010) IEPBUF(IXD),REPBUF(IXD+1),REPBUF(IXD+3),
     +IEPBUF(IXD+4),REPBUF(IXD+5),IEPBUF(IXD+6)
      JXD=IXD+7
      KXD=IXD+14
      WRITE(6,1000) (REPBUF(I),I=JXD,KXD)
      JXD=IXD+15
      KXD=IXD+23
      WRITE(6,1000) (REPBUF(I),I=JXD,KXD)
      JXD=IXD+24
      KXD=IXD+29
      WRITE(6,1000) (REPBUF(I),I=JXD,KXD)
  950 RETURN
 1000 FORMAT(1H ,9F10.3)
 1010 FORMAT(1H0,Z10,2F10.3,Z10,F10.3,I10)
 1020 FORMAT(1H ,10I8)
      END
```

```
      SUBROUTINE RDCNS
C
C     ******    SUB TO READ IN 2/2 AND 3/3 CONSTANTS
C                IN ALL POSSIBLE COMBINTATIONS AND ORDES OF PRFS
C
      COMMON /CRTCNS/ MA2CNS(5,5,3),MA3CNS(5,5,5,4)
C
C     ******    3 OF 3 CONSTANTS   ********
C
      DO 100 I=1,5
      DO 100 J=1,5
      DO 100 K=1,5
      READ(10,1000,END=150) M,(MA3CNS(I,J,K,L),L=1,4)
C     WRITE(6,1010) M,(MA3CNS(I,J,K,L),L=1,4),I,J,K
 100  CONTINUE
C
C     ********    2 OF 2 CONSTANTS   *******
C
 150  DO 200 I=1,5
      DO 200 J=1,5
      READ(11,1020,END=250) M,(MA2CNS(I,J,L),L=1,3)
C     WRITE(6,1010) M,(MA2CNS(I,J,L),L=1,3),I,J
 200  CONTINUE
 250  RETURN
1000  FORMAT(5I6)
1010  FORMAT(1H ,8I10)
1020  FORMAT(4I6)
      END
      SUBROUTINE RNGCHK
C
C             ********* SUB TO CHECK CRT CONSTANS ARE CORRECT ON FILE
C
      COMMON /CRTCNS/ MA2CNS(5,5,3),MA3CNS(5,5,5,4)
      DIMENSION IR(5)
      DATA IR/-43,12,20,28,36/
      N=1
C
C     ***********   3 OF 3
C
      DO 100 I=1,5
      DO 100 J=1,5
      DO 100 K=1,5
      KR=IR(I)*MA3CNS(I,J,K,1)+IR(J)*MA3CNS(I,J,K,2)+IR(K)*MA3CNS
     +(I,J,K,3)
      L=MA3CNS(I,J,K,4)
      IF(L.EQ.0) L=1
      KR=MMOD(KR,L)
C     WRITE(6,1000) N,I,J,K,IR(I),IR(J),IR(K),KR
      N=N+1
 100  CONTINUE
      N=1
C
C     ************** 2 OF 2
C
      DO 200 I=1,5
      DO 200 J=1,5
      KR=IR(I)*MA2CNS(I,J,1)+IR(J)*MA2CNS(I,J,2)
      L=MA2CNS(I,J,3)
      IF(L.EQ.0) L=1
      KR=MMOD(KR,L)
C     WRITE(6,1000) N,I,J,IR(I),IR(J),KR
      N=N+1
 200  CONTINUE
      RETURN
1000  FORMAT(1H ,8I10)
      END

SUBROUTINE SAXFER(NSLT,NZ)
C
C     *******   THIS ROUTINE TANSFERS SLANT ASSU DATA ****
C
      COMMON /TAP/ ITAPE(500)
      COMMON /DETSNT/ DETBUF(3,550)
      DIMENSION IETBUF(3,550),TAPE(1)
      EQUIVALENCE (DETBUF(1,1),IETBUF(1,1)),(ITAPE(1),TAPE(1))
      NDEX=NSLT+1
      NX=NZ
C                           *** SLANT COUNT ***
      IETBUF(NDEX,3)=ITAPE(5+NX)
C                           *** DDP SYNC CODE  ***
      IETBUF(NDEX,4)=ITAPE(16+NX)
C                           *** DDP  PRF       ***
      IETBUF(NDEX,5)=ITAPE(17+NX)
C                           ***  LAT           ***
      DETBUF(NDEX,6)=TAPE(22+NX)
C                           ***  LON           ***
      DETBUF(NDEX,7)=TAPE(23+NX)
C                           ***  AZ+DAZ        ***
      DETBUF(NDEX,8)=TAPE(8+NX)+TAPE(9+NX)
      IF(DETBUF(NDEX,8).LT.0.) DETBUF(NDEX,8)=DETBUF(NDEX,8)+360.
C                           ***  AZ            ***
      DETBUF(NDEX,9)=TAPE(8+NX)
C                           ***  DAZ           ***
```

```
      DETBUF(NDEX,10)=TAPE(9+NX)
C                              ***   ROLL          ***
      DETBUF(NDEX,11)=TAPE(20+NX)
C                              ***   PITCH         ***
      DETBUF(NDEX,12)=TAPE(21+NX)
C                              ***   HEADING       ***
      DETBUF(NDEX,13)=TAPE(11+NX)
C                              ***   RFSET         ***
      DETBUF(NDEX,14)=ITAPE(12+NX)
C                              ***   ALT LINE      ***
      DETBUF(NDEX,15)=ITAPE(19+NX)
C                              ***   VEL EAST      ***
      DETBUF(NDEX,16)=TAPE(24+NX)
C                              ***   VEL NORTH     ***
      DETBUF(NDEX,17)=TAPE(25+NX)
C                              ***   ALTITUDE      ***
      DETBUF(NDEX,18)=TAPE(26+NX)
C
      IETBUF(NDEX,20)=ITAPE(13+NX)
C
      RETURN
      END
      SUBROUTINE SCAN(IHOURS,MINS,ISECS,MSECS,IX)
      COMMON /SCAN/ MCNTS(200),ISTX
      COMMON /TARGET/ REPBUF(3000),IXD
C
C     COUNTS NUMBER OF REPORTS PER SCAN
C
      IF (ISTX .EQ. 0) THEN
         ISTX = 1
         STRAZ = REPBUF(10) + REPBUF(14)
         IF (STRAZ .GT. 360.) STRAZ = STRAZ - 360.
         IF (STRAZ .LT. 0.) STRAZ = STRAZ + 360.
         AZDIF = 360. - STRAZ
         AZTIM = AZDIF / 36.
         KSCTIM = (IHOUR*3600 + MINS*60 + ISECS)*1000 + MSECS + 10000
      ELSE
         ITIME = (IHOUR*3600 + MINS*60 + ISECS)*1000 + MSECS
         IF (ITIME .GT. KSCTIM) THEN
            ISTX = ISTX + 1
            KSCTIM = KSCTIM + 10000
         ELSE
            CONTINUE
         END IF
         MCNTS(ISTX) = MCNTS(ISTX) + IX/30
      END IF
      RETURN
      END

SUBROUTINE SLTEXT
      COMMON /LINK/ LXDUM(91),IXP,KCNT
      COMMON /SADD/ ISADRS(15),NPRFNG(5)
      COMMON /TARGET/ REPBUF(3000),IXD
      COMMON /REPTGT/ TGTBUF(80000),IAD
      COMMON /SLNLEN/ NUMSLT
      COMMON /OPTION/ ITAPID(10),IPRTOP(10),IPRSOP(10),ITHROP(10)
      COMMON /REPLEN/ IOX,ITW,ITV
      COMMON /INTCOM/ IDUM,ICNT,KDUM(5)
      DIMENSION INSLNT(6),IBSIN(3),IGTBUF(80000),KSLNT(6),MMSLNT(6,5)
      EQUIVALENCE (IGTBUF(1),TGTBUF(1))
      DATA IBSIN/73,53,53/,INSLNT/6*0/
C
C     ***************   START OF SLANT EXTENSION
C
      IF(IPRTOP(2).NE.1) GO TO 50
      WRITE(6,1000) ICNT,KCNT
 50   IXD=1
      IST=MMOD((IXP-6),NUMSLT)
C     ****  IABS(ICNT) IS ONE MORE THAN KCNT *****
      IF((IABS(ICNT)-1).LT.7) GO TO 900
C     WRITE (6,1000) IXP, IST
      KST=ISADRS(IST)
      LST=IGTBUF(KST)
      MST=IGTBUF(KST+1)
      NST=IGTBUF(KST+2)
      JEM=LST
      JEMSAV=JEM
C     WRITE(6,1020) LST,MST,NST,KST
      IF((MST-NST).EQ.0.AND.(LST-MST).EQ.0) GO TO 900
 100  ITYPE=IGTBUF(KST+1)
      JJTYPE=ITYPE
      KTYPE=MMOD(ITYPE,4)
C     WRITE(6,1050) KTYPE,TGTBUF(KST+42)
      IF(ITYPE.LE.0) GO TO 700
C     IF(KTYPE.LT.1.OR.ITYPE.GT.11) WRITE(6,1030) LST,MST,NST,KST,
C    +LEN,IOX,ITW
C     WRITE(6,1030) LST,MST,NST,KST,LEN,IOX,ITW
      INK=IBSIN(KTYPE)
      LNK=TGTBUF(KST+INK)
      KN=1
      IN=1
```

```
      JEMY=IGTBUF(KST)
      JEMX=IGTBUF(INK+KST-3)
C     WRITE(6,1000) ITYPE,KTYPE,INK,LNK,KN,IN,JEMX,JEMY,JEM
      IF(JEM.EQ.-4) GO TO 175
      IF(JEMX.GT.0.OR.JEMY.GT.0) GO TO 700
175   INSLNT(IN)=KST
C     WRITE(6,1050) KTYPE,TGTBUF(KST+42)
      KSLNT(IN)=IGTBUF(KST+INK-2)/131072
      IF(LNK.LE.0) GO TO 300
200   IN=IN+1
      IF (IN .GT. 6) THEN
C     WRITE (6,1040) INSLNT, KSLNT, IN, KN
      IN = 6
      GO TO 800
      ELSE
      CONTINUE

END IF
      INSLNT(IN)=LNK
      ITYPE=IGTBUF(LNK+1)
      KTYPE=MMOD(ITYPE,4)
      IF(ITYPE.LE.0) GO TO 700
      INK=IBSIN(KTYPE)
      IF(JEM.EQ.-4) GO TO 210
      JEMX=IGTBUF(LNK)
      JEMY=IGTBUF(LNK+INK-3)
C     WRITE(6,1000) ITYPE,KTYPE,INK,LNK,KN,IN,JEMX,JEMY,JEM,JEM
      IF(JEMX.GT.0.OR.JEMY.GT.0) GO TO 700
210   CONTINUE
      KSLNT(IN)=IGTBUF(LNK+INK-2)/131072
      IF (KSLNT(IN) .LE. KSLNT(IN-1)) THEN
      IHOURS=JIBITS(IGTBUF(KST+2),26,5)
      MINS=JIBITS(IGTBUF(KST+2),20,6)
      ISECS=JIBITS(IGTBUF(KST+2),14,6)
      MSECS=JIBITS(IGTBUF(KST+2),4,10)
C     WRITE (6,1000) JEM,JEMX,JEMY,LNK,KST,LST,MST,NST,
C     +       IHOURS,MINS,ISECS,MSECS
      END IF
      KN=KSLNT(IN)-KSLNT(1)+1
C     WRITE(6,1000) INK,LNK,KN
      IF(KN.LE.0) KN=8191+KN
      LNK=TGTBUF(LNK+INK)
      JEM=IGTBUF(LNK)
C     WRITE(6,1000) ITYPE,KTYPE,INK,LNK,KN,IN,JEMX,JEMY,JEM,JEMSAV
      IF(KN.GE.6) GO TO 800
      IF(LNK.LE.0) GO TO 300
      GO TO 200
300   CONTINUE
C     WRITE(6,1000) ITYPE,KTYPE,INK,LNK,KN,IN,JEMX,JEMY,JEM,JEMSAV
C     WRITE(6,1000) JEM,IN,KN,KST,JEMSAV
      IF(JEMSAV.EQ.(-4)) GO TO 850
      IF(IPRSOP(7).EQ.1) GO TO 400
      GO TO (400,400,400,500,600), KN
400   CALL OUT123(INSLNT,MMSLNT,IN,KN,1)
      GO TO 700
500   CALL OUT4(INSLNT,MMSLNT,IN,KN)
      GO TO 700
600   CALL OUT5(INSLNT,MMSLNT,IN,KN)
700   CONTINUE
C     WRITE(6,1050) KTYPE,TGTBUF(KST+42)
      IT=MMOD(JJTYPE,4)
      LEN=IOX
      IF(IT.NE.1) LEN=ITW
      KST=KST+LEN
      LST=IGTBUF(KST)
      MST=IGTBUF(KST+1)
      NST=IGTBUF(KST+2)
C     WRITE(6,1000) LEN,LST,MST,NST,KST,KST
      JEM=LST
      JEMSAV=JEM
      DO 725 I=1,6
      DO 720 J=1,5
720   MMSLNT(I,J)=0
725   INSLNT(I)=0
C     WRITE(6,1020) LST,MST,NST,KST,KST
      IF (LST-NST).EQ.0.AND.(LST-MST).EQ.0) GO TO 9
C     WRITE(6,1030) LST,MST,NST,KST,LEN,IOX,ITW
      GO TO 100
800   CONTINUE
      IF(IN.GT.5) IN=5
      KN=5
      IF(JEMSAV.EQ.(-4)) GO TO 850
      IF(IPRSOP(7).EQ.1) GO TO 400
      IF(IN.NE.KN) GO TO 600
      CALL OUT6(INSLNT,MMSLNT,IN,KN)
      GO TO 700
850   CONTINUE
C     WRITE(6,1000) JEM,IN,KN,KN,JEMSAV
C     WRITE (6,1000) INSLNT
C     ******************* JEM REPORTS ONLY *********
      DO 875 I=1,IN
      K=2
      MMSLNT(I,K)=INSLNT(I)
      K=K+1
      MMT=INSLNT(I)
```

```
C           WRITE (6,1000) I,K,INSLNT(I)
  825     IT=IGTBUF(MMT+1)
          IT=MMOD(IT,4)
          KMZ=50
          IF(IT.EQ.1) KMZ=70
          MMT=IGTBUF(MMT+KMZ)
          IF(MMT.EQ.0) GO TO 860
          MMSLNT(I,K)=MMT
C           WRITE(6,1000) I,K,MMT
          K=K+1
          IF(K.GT.5) GO TO 860
          GO TO 825
  860     K=K-2
          MMSLNT(I,1)=K
C           WRITE(6,1000) I,K
  875     CONTINUE
C           WRITE(6,1030) KST
          CALL OUT123(INSLNT,MMSLNT,IN,KN,0)
C           WRITE(6,1030) KST
          GO TO 700
  700     RETURN
 1000     FORMAT(7H SLTEXT, 12I10)
 1020     FORMAT(7H SLTEXT, 5I20)
 1030     FORMAT(7H SLTEXT, 5I20,2I10)
 1040     FORMAT(2X,16I8)
 1050     FORMAT(7H SLTEXT, I10,F10.2)
          END
          SUBROUTINE SNTGHS(ITADD,KAD,KNFLG)
C
C              ************  SUB TO 3/3  DEGHOST
          COMMON /REPTGT/ TGTBUF(80000),LAD
          COMMON /FILCOM/ FILWIN
          COMMON /LOGHST/ GHSTFL
          COMMON /KTSFIL/ RKFIL(6)
          COMMON /REFLEN/ IOX,ITW,ITV
          DIMENSION IGTBUF(80000),KXRGX(9)
          EQUIVALENCE (TGTBUF(1),IGTBUF(1))
C
C
          IF(KAD.LE.ITADD) GO TO 700
C           WRITE(6,1000) ITADD,KAD,KNFLG
          IF(KNFLG.LT.1) GO TO 700
          DO 600 MM=ITADD,KAD,IOX
          IF(IGTBUF(MM+1).NE.9) GO TO 600
          IF(TGTBUF(MM+75).LT..75) GO TO 600
          FILB=AVGFIL(MM)
C              ************  ADJACENT GATE TEST SEE CALL ABOVE
          KXRGX(1)=TGTBUF(MM+48)-1
          KXRGX(2)=TGTBUF(MM+48)
          KXRGX(3)=TGTBUF(MM+48)+1
          KXRGX(4)=TGTBUF(MM+56)-1
          KXRGX(5)=TGTBUF(MM+56)
          KXRGX(6)=TGTBUF(MM+56)+1
          KXRGX(7)=TGTBUF(MM+64)-1
          KXRGX(8)=TGTBUF(MM+64)
          KXRGX(9)=TGTBUF(MM+64)+1
C           WRITE(6,1000) KXRGX
          DO 530 MK=ITADD,KAD,IOX
          IF(MK.EQ.MM) GO TO 550
C              ************  DONT TEST WHEN TYPE IS 9
          IF(TGTBUF(MK+73).GT.0.OR.IGTBUF(MK+74).GT.0) GO TO 550
          IF(IGTBUF(MK+1).GT.5) GO TO 550
          FILC=AVGFIL(MK)
C           WRITE(6,1010) FILB,FILC,RM
C              ************  FILTER MATCH
          IF((ABS(FILB-FILC)).GT.FILWIN) GO TO 550
  525     CALL GMATCH(MK,IS,KXRGX)
          IND=TGTBUF(MK+27)
          TEMP=GHSTFL/RKFIL(IND)
          RUPLIM=129.+TEMP
          RLOLIM=129.-TEMP
C           WRITE(6,1010) RUPLIM,RLOLIM,FILC
C           WRITE(6,1000) MK,IS,IND
          IF(FILC.LT.RLOLIM.OR.FILC.GT.RUPLIM) GO TO 520
          IF(IS.LT.1) GO TO 550
          GO TO 530
  520     IF(IS.LT.2) GO TO 550
  530     IGTBUF(MK+1)=-7
  550     CONTINUE
  600     CONTINUE
  700     RETURN
 1000     FORMAT(7H SNTGHS,10I10)
 1010     FORMAT(7H SNTGHS,8F10.2)
          END
          SUBROUTINE SNTSTR(ITADD,KAD,KNFLG)
C
C              ************  SUB TO FIND 3/3 WITH IN SLANT STRADDLE PARTNERS
C                              AND DEGHOST
          COMMON /REPTGT/ TGTBUF(80000),LAD
          COMMON /FILCOM/ FILWIN
          COMMON /LOGHST/ GHSTFL
```

```
      COMMON /KTSFIL/ RKFIL(6)
      COMMON /REPLEN/ IOX,ITW,ITV
      DIMENSION IGTBUF(80000),AX(3),KXRGX(9),LXRGX(9),K1RGX(3),BX(3),
     +K2RGX(3),K3RGX(3),L1RGX(3),L2RGX(3),L3RGX(3),MXRGX(9),NXRGX(9)
      EQUIVALENCE (TGTBUF(1),IGTBUF(1)),(KXRGX(1),K1RGX(1)),
     +(KXRGX(4),K2RGX(1)),(KXRGX(7),K3RGX(1)),
     +(LXRGX(1),L1RGX(1)),(KXRGX(4),L2RGX(1)),
     +(LXRGX(7),L3RGX(1)),(AX(1),A1),(AX(2),A2),(AX(3),A3)
C
C
C
      IF(KAD.LE.ITADD) GO TO 700
C     WRITE(6,1000) ITADD,KAD,IOX,KNFLG
      KNFLG=0
      DO 350 MM=ITADD,KAD,IOX
      IF(IGTBUF(MM+1).LT.1) GO TO 350
C
C
C*********** ADJACENT GATE TEST AND SET UP
C
C             MMO=0   ADJACENT GATES
C             MMO=1   NO ADJACENT GATES
C             MMN=    # OF SLANTS THREE ADJACENT GATES
C
      CALL GATE3(MM,KXRGX,LXRGX,AX,MMO,MMN)
C     WRITE(6,1000) MMO,KXRGX
C     WRITE(6,1000) MMN,LXRGX
      IF(MMN.LT.2) GO TO 350
      FILB=AVGFIL(MM)
      RB=TGTBUF(MM+42)
      IGTBUF(MM+1)=9
      KNFLG=1
      DO 325 MK=ITADD,KAD,IOX
      IF(MK.EQ.MM) GO TO 325
      IF(IGTBUF(MK+1).LT.1) GO TO 325
      FILC=AVGFIL(MK)
      RR=TGTBUF(MK+42)
      RNG=ABS(RR-RB)
      DIFF=ABS(FILB-FILC)
C     WRITE(6,1010) RR,RB,RNG,FILB,FILC,DIFF
      IF(DIFF.GT.FILWIN) GO TO 325
      IF(RNG.GT..27) GO TO 325
      IGTBUF(MK+1)=-3
  325 CONTINUE
  350 CONTINUE
  700 RETURN
 1000 FORMAT(7H SNTSTR,10I10)
 1010 FORMAT(7H SNTSTR,8F10.2)
      END
      SUBROUTINE STR123(KX,KY)
      COMMON /REPTGT/ TGTBUF(80000),IAD
      COMMON /FILCOM/ FILWIN
      COMMON /LINK/ L11ADS(15),L11ADE(15),L22ADS(15),L22ADE(15),
     +L33ADS(15),L33ADE(15),DUM(3)
      COMMON /REPLEN/ IOX,ITW,ITV
      DIMENSION IGTBUF(80000),IBSIN(3)
      EQUIVALENCE (TGTBUF(1),IGTBUF(1))
      DATA IBSIN/70,50,50/
C
C
C*************** TYPE 1 TO TYPE 2 OR 3 STADDLE CHECKS WITHIN SNAP
C
C
C              ************** SET UP 3/3 ADDRESS
      IB1=L11ADS(KX)
      IS1=L11ADE(KX)
      IF((IS1-IB1).LE.0) GO TO 600
C              ************ 2/2 ADDRESS
      IB2=L22ADS(KY)
      IS2=L22ADE(KY)
      ID2=IS2-IB2
C              ********** 2/3 ADDRESS
      IB3=L33ADS(KY)
      IS3=L33ADE(KY)
      ID3=IS3-IB3
C              ************ ANY 2/2 OR 2/3
      IF(ID2.LE.0.AND.ID3.LE.0) GO TO 600
      WRITE(6,1020) IB1,IS1,IB2,IS2,IB3,IS3,KX
C              ********** START BASE WITH 3/3
      DO 500 M=IB1,IS1,IOX
      ITYPE=IGTBUF(M+1)
      IF(ITYPE.LT.0) GO TO 500
      VL1=AVGFIL(M)
      RG1=TGTBUF(M+42)
      IFLG=1
C              ************** 2/2 FIRST ANY 2/2 NO=450
      IF(ID2.LE.0) GO TO 450
      IBX=IB2
      ISX=IS2
C              *********** SEARCH 2/2 OR 2/3 AS APPORIATE
  100 DO 400 I=IBX,ISX,ITW
      IF(IGTBUF(I+1).LE.0) GO TO 400
      VL2=AVGFL2(I)
C     WRITE(6,1000) VL1,VL2,RG1
C              ********************** FILTER MATCH
```

```
      IF((ABS(VL1-VL2)).GT.FILWIN) GO TO 400
      DO 200 K=1,4
      RG2=ABS(TGTBUF(I+K+28))
C                    ******************** RANGE MATCH INCLUDIN MULTIPATH
      IF((ABS(RG1-RG2)).LT..21) GO TO 300
  200 CONTINUE
      GO TO 400
C                    *************** SET TYPE TO STRADDLE
  300 IGTBUF(I+1)=MMOD(IGTBUF(I+1),4)-4
      WRITE(6,1000) VL1,VL2,RG1,RG2,I
      GO TO 400
  400 CONTINUE

C                    ************** 2/2 AND 2/3 DONE
  450 IF  LG.GT.1) GO TO 500
      IBX=IB3
      ISX=IS3
      IF(ID3.LE.0) GO TO 500
      IFLG=IFLG+1
C                    *********** GO DO 2/3
      GO TO 100
  500 CONTINUE
  600 CONTINUE
      RETURN
 1000 FORMAT(7H STR123,4F10.2,I10)
 1020 FORMAT(7H STR123,10I10)
      END

SUBROUTINE STRGHS(ITADD,KAD,NTYPE)
      COMMON /FILCOM/ FILWIN
      COMMON /REPTGT/ TGTBUF(80000),IAD
      COMMON /REPLEN/ IOX,ITW,ITV
      DIMENSION IGTBUF(80000),K1RGX(2),K2RGX(2),IRG(2),K3RGX(2)
      EQUIVALENCE (IGTBUF(1),TGTBUF(1))
C
C             ************** 2/2 *** 2/3 *** GHOST
C
      IF(KAD.LE.ITADD) GO TO 600
C     WRITE(6,1000) ITADD,KAD,ITW,NTYPE
      DO 500 MM=ITADD,KAD,ITW
      IF(IGTBUF(MM+1).LT.(NTYPE+4)) GO TO 500
      FILB=AVGFL2(MM)
      SUMB=SUMY2(MM)
      RB=ABS(TGTBUF(MM+29))
C     WRITE(6,1010) FILB,SUMB,RB
C                 ******************* SET UP FOR GHOST CHECKS PUT GGS IN A BUFFER
      K1RGX(1)=TGTBUF(MM+35)-1
      K1RGX(2)=TGTBUF(MM+43)-1
      K2RGX(1)=TGTBUF(MM+35)
      K2RGX(2)=TGTBUF(MM+43)
      K3RGX(1)=TGTBUF(MM+35)+1
      K3RGX(2)=TGTBUF(MM+43)+1
C             ************ SEARCH FOR GHOST
      DO 300 MI=ITADD,KAD,ITW
      IF(IGTBUF(MI+1).NE.NTYPE) GO TO 300
      IF(TGTBUF(MI+53).GT.0. .OR. TGTBUF(MI+54).GT.0. ) GO TO 300
      IF(MI.EQ.MM) GO TO 300
      FILC=AVGFL2(MI)
      IF(ABS(FILC-FILB).GT.FILWIN) GO TO 300
  100 IF((ABS(TGTBUF(MI+29)-RB)).LT..21) GO TO 300
      IS=0
      DO 200 I=1,2
      KX=(I-1)*8+35
      IRG(I)=TGTBUF(MI+KX)
      IF(IRG(I).EQ.K1RGX(I)) IS=IS+1
      IF(IRG(I).EQ.K2RGX(I)) IS=IS+1
      IF(IRG(I).EQ.K3RGX(I)) IS=IS+1
  200 CONTINUE
C     WRITE(6,1000) IS,K1RGX,K2RGX,IRG
      IF(IS.LT.1) GO TO 300
      IGTBUF(MI+1)=IGTBUF(MI+1)-8
  300 CONTINUE
  500 CONTINUE
  600 RETURN
 1000 FORMAT(7H STRGHS,8I10)
 1010 FORMAT(7H STRGHS,8F10.2)
      END

SUBROUTINE STRR23(ITADD,KAD,NTYPE)
      COMMON /FILCOM/ FILWIN
      COMMON /REPTGT/ TGTBUF(80000),IAD
      COMMON /REPLEN/ IOX,ITW,ITV
      COMMON /MYSTRY/ DEHIST(20)
      DIMENSION IGTBUF(80000),K1RGX(2),K2RGX(2),IRG(2)
      EQUIVALENCE (IGTBUF(1),TGTBUF(1))
C
C             ************** 2/2 *** 2/3 *** STRADDLES
C
      IF(KAD.LE.ITADD) GO TO 600
C     WRITE(6,1000) ITADD,KAD,ITW,NTYPE
      DO 500 MM=ITADD,KAD,ITW
      IF(IGTBUF(MM+1).NE.NTYPE) GO TO 500
```

```
      FILB=AVGFL2(MM)
      SUMB=SUMY2(MM)
      RB=ABS(TGTBUF(MM+29))
C     WRITE(6,1010) FILB,SUMB,RB
      ML=MM
      IRAT1 = TGTBUF(MM+36)/TGTBUF(MM+44) + .001
      IF (IRAT1 .GT. 1) IRAT1 = 1
      DO 400 MK=ITADD,KAD,ITW
      IF(MM.EQ.MK) GO TO 400
      IF(IGTBUF(MK+1).NE.NTYPE) GO TO 400
      IRAT2 = TGTBUF(MK+36)/TGTBUF(MK+44) + .001
      IF (IRAT2 .GT. 1) IRAT2 = 1
      FILA=AVGFL2(MK)
      RR=ABS(TGTBUF(MK+29))
      IF(ABS(FILB-FILA).GT.FILWIN) GO TO 400
      IF(ABS(RR-RB).GT..21) GO TO 400
C     WRITE(6,1010) TGTBUF(MM+36),TGTBUF(MM+44),TGTBUF(MK+36),
C    *              TGTBUF(MK+44)
C     WRITE(6,1000) IRAT1,IRAT2
      IF (IRAT1 .NE. IRAT2) THEN
          DEHIST(16) = DEHIST(16) + 1
          GO TO 400
      END IF
      SUMR=SUMY2(MK)
C     WRITE(6,1010) SUMR,SUMB,RB,RR
      IF(SUMR.GT.SUMB) THEN
          MZ=MK
          MX=ML
          ML=MK
          SUMB=SUMR
      ELSE
          MZ=ML
          MX=MK
      END IF
C                 *************     SET STRADDLE
      IGTBUF(MZ+1)=IGTBUF(MZ+1)+4
      IGTBUF(MX+1)=IGTBUF(MX+1)-4
C     WRITE(6,1000) IGTBUF(MZ+1),IGTBUF(MX+1),MZ,MX
 400  CONTINUE
 500  CONTINUE
 600  RETURN
1000  FORMAT(7H STRR23,8I10)
1010  FORMAT(7H STRR23,8F10.2)
      END

SUBROUTINE STRTWO(ITADD,KAD,IDX)

C                 *************     SUB TO FIND 3/3 WITH IN SLANT STRADDLE PARTNERS

COMMON /REPTGT/ TGTBUF(80000),LAD
      COMMON /FILCOM/ FILWIN
      COMMON /OPTION/ IDUMX(20),IPRSOP(10),IDUMZ(10)
      COMMON /REPLEN/ IOX,ITW,ITV
      COMMON /STRRGH/ ISTRAD(50,2,2)
      DIMENSION IGTBUF(80000)
      EQUIVALENCE (TGTBUF(1),IGTBUF(1))
C
C
      IF(KAD.LE.ITADD) GO TO 500
C     WRITE(6,1000) ITADD,KAD,IOX,IDX
      JI=1
      DO 350 MM=ITADD,KAD,IOX
      IF(IPRSOP(7).EQ.1) GO TO 100
      IF(IGTBUF(MM+1).LT.1.OR.IGTBUF(MM+1).GE.5) GO TO 350
      GO TO 150
 100  IF(IGTBUF(MM+1).LT.1) GO TO 350
 150  FILB=AVGFIL(MM)
      RB=TGTBUF(MM+42)
      ML=MM
      DO 325 MK=ITADD,KAD,IOX
      IF(MK.EQ.MM) GO TO 325
      IF(IPRSOP(7).EQ.1) GO TO 200
      IF(IGTBUF(MK+1).LT.1.OR.IGTBUF(MK+1).GE.5) GO TO 325
      GO TO 250
 200  IF(IGTBUF(MK+1).LT.1) GO TO 325
 250  FILC=AVGFIL(MK)
      RR=TGTBUF(MK+42)
      RNG=ABS(RR-RB)
      DIFF=ABS(FILB-FILC)
C     WRITE(6,1010) RR,RB,RNG,FILB,FILC,DIFF
      IF(DIFF.GT.FILWIN) GO TO 325
      IF(RNG.GT..27) GO TO 325
      IF(TGTBUF(MM+72).GT.TGTBUF(MK+72)) THEN
          MZ=ML
          MX=MK
          ML=MM
          ISTRAD(JI,1,IDX)=MM
          ISTRAD(JI,2,IDX)=MK
          JI=JI+1
      ELSE
          MZ=MK
          MX=ML
          ML=MK
```

```
          ISTRAD(JI,1,IDX)=MK
          ISTRAD(JI,2,IDX)=MM
          JI=JI+1
       END IF
          IGTBUF(MZ+1)=5
          IGTBUF(MX+1)=-3
C      WRITE(6,1000) IGTBUF(MM+1),IGTBUF(MK+1),MM,MK,
C     +ISTRAD(JI-1,1,IDX),ISTRAD(JI-1,2,IDX),IDX
 325   CONTINUE

350   CONTINUE
 500   RETURN
 1000  FORMAT(7H STRTWO,10I10)
 1010  FORMAT(7H STRTWO,8F10.2)
       END

SUBROUTINE SUMFLG(ISUM,IPRFX)
C      SUBROUTINE TO SEARCH FOR AJACENT RANGE GATES TO TARGET RANGE
       COMMON /DETSNT/ DETBUF(3,550)
       COMMON /TAG/ MISX(3),MIRGX(3),MINTX(3)
       COMMON /SADD/ IIS(15),NP(5)
       COMMON /FILCOM/ FILWIN
       DIMENSION ISUM(3),IPRFX(3)
C
C
       WRITE(6,1030)
       KSUM=0
       FILX=FILWIN+2
       DO 100 M=1,3
       ISUM(M)=1
C                ************ RG ADDRESS
       MR=MIRGX(M)
C                **************** SLANT ADDRESS
       MS=MISX(M)
C                ********** # TOTAL WORDS IN DETECTION DATA
       MX=MINTX(M)
C      WRITE(6,1000) MR,MS,MX
C                ************** ADDRESS LESS THAN DATA WORDS
       IF((MR-12).LT.21) GO TO 100
       IM=MR-12
       DO 25 I=21,IM,5
C                ********** DOES FILTER CORRELATE
       IF(ABS(DETBUF(MS,MR-2)-DETBUF(MS,I)).GT.FILX) GO TO 25
       JX=IPRFX(M)
C                ********** ADJACENT DETCION GATES
       IX=MMOD(INT(DETBUF(MS,MR)),NP(JX))
       IY=MMOD(INT(DETBUF(MS,I+2)),NP(JX))
C                **************** ARE THEY ONLY DIFFERNT BY 1 GATE
       IF(IABS(IX-IY).GT.1) GO TO 25
C      WRITE(6,1020) DETBUF(MS,I),DETBUF(MS,I+2)
C      WRITE(6,1000) JX,IX,IY,IM
       GO TO 50
 25    CONTINUE
C                ************ CANT BE 3 ADJACENT GATES GO ON
       GO TO 100
C                ************ CHECK FOR OUT OF DATA ADDRESS
 50    IF((MR+8).GT.MX) GO TO 100
       IM=MR+8
       DO 75 I=IM,MX,5
C
C                ************ SAME TEST AS ABOVE ON LATE GATE
C

IF(ABS(DETBUF(MS,I)-DETBUF(MS,MR-2)).GT.FILX) GO TO 75
       JX=IPRFX(M)
       IX=MMOD(INT(DETBUF(MS,MR)),NP(JX))
       IY=MMOD(INT(DETBUF(MS,I+2)),NP(JX))
       IF(IABS(IX-IY).GT.1) GO TO 75
C      WRITE(6,1020) DETBUF(MS,I),DETBUF(MS,I+2)
C      WRITE(6,1000) JX,IX,IY,IM,IM
C                ************ WE HAVE 3 ADJACENT GATES SET AMP FLAG
C                             AND UP DATE COUNTER
       ISUM(M)=-1

KSUM=KSUM+1
       GO TO 100
 75    CONTINUE
 100   CONTINUE
       WRITE(6,1000) ISUM
       RETURN
 1000  FORMAT(1H ,8I10)
 1020  FORMAT(1H ,8F10.3)
 1030  FORMAT(1H ,6HSUMFLG)
       END
```

```
      FUNCTION SUMY(JJ)
      COMMON /REPTGT/ TGTBUF(80000), IAD
C
C     ************    THIS ROUTINE TAKES SUM OF SUM Y ACROSS 3 SLANTS
      SUMY=ABS(TGTBUF(JJ+49))+ABS(TGTBUF(JJ+57))+
     +ABS(TGTBUF(JJ+65))
C     WRITE(6,1000) JJ,SUMY
      RETURN
 1000 FORMAT(1H ,I10,2F10.2)
      END

FUNCTION SUMY2(NN)
      COMMON /REPTGT/ TGTBUF(80000), IAD
C
C

SUMY2=TGTBUF(NN+36)+TGTBUF(NN+44)
C     WRITE(6,1010) SUMY2
      RETURN
 1010 FORMAT(1H ,6F10.2)
      END

SUBROUTINE TAGVEL
      COMMON /DETSNT/ D(3,550)
      COMMON /TAG/ MS(3),MR(3),MI(3)
      COMMON /SADD/ IDS(15),NP(5)
      DIMENSION ID(3,500)
      EQUIVALENCE(ID(1,1),D(1,1))
C
C     ************    THIS ROUTINE REFLECTS THE FACT THAT A 3/3
C                     CORRELATION WAS MADE ON THE VELOCITY
C                     AMBGUITY PAIR

DO 200 I=1,3
      KX=MS(I)
      KY=MR(I)
      KZ=ID(KX,5)
C     WRITE(6,1000) KX,KY,KZ,MI(I),D(KX,KY-1),D(KX,KY),D(KX,KY-6),
C    +D(KX,KY-5),D(KX,KY+4),D(KX,KY+5)
      IF((KY+5).GT.MI(I)) GO TO 100
      IF(D(KX,KY-1).EQ.D(KX,KY+4).AND.(MMOD(INT(D(KX,KY)),NP(KZ)).
     +EQ.INT(D(KX,KY+5))) D(KX,KY+5)=MMOD(INT(D(KX,KY+5)),NP(KZ))+NP(KZ)
  100 IF((KY-6).LT.21) GO TO 150
      IF(D(KX,KY-1).EQ.D(KX,KY-6).AND.(MMOD(INT(D(KX,KY)),NP(KZ))).
     +EQ.INT(D(KX,KY-5))) D(KX,KY-6)=MMOD(INT(D(KX,KY-6)),NP(KZ))+NP(KZ)
  150 CONTINUE
C     WRITE(6,1000) KX,KY,KZ,I,D(KX,KY-1),D(KX,KY),D(KX,KY-6),
C    +D(KX,KY-5),D(KX,KY+4),D(KX,KY+5)
  200 CONTINUE
      RETURN
 1000 FORMAT(1H ,4I10,6F10.3)
      END

SUBROUTINE TCOUNT(IT,M)

C
C     **********    COUNTS BASED ON REPORT TYPE OF PREVIOUS OR
C                   PRIOR SLANT
C
C                   TYPE=9     (3ADJACENT)  +2
C                   TYPE=1,4   NORMAL 3/3   +1
C                   TYPE<1     DELETED 3/3  -1
C
C

COMMON /REPTGT/ IGTBUF(80000)
C
      IT=IGTBUF(IT+1)
      IF(IT.EQ.9) M=M+1
      IF(IT.GE.1) M=M+1
      IF(IT.LT.1) M=M-1
      RETURN
      END

SUBROUTINE TGMAIN
      COMMON /REPTGT/ TGTBUF(80000), IAD
      COMMON /TAP/ ITAPE(500)
      COMMON /OPTION/ KZDUM(20),IPRSOP(10),IZXDUM(10)
      COMMON /SLNLEN/ NUMSLT
      COMMON /SADD/ ISADRS(15),NPRFNG(5)
      COMMON /INTCOM/ IZDUM(3),NSLT,KZXDUM(3)
      COMMON /LINK/ L11ADS(15),L11ADE(15),L22ADS(15),L22ADE(15),
     +L33ADS(15),L33ADE(15),RMAX,IXP,KCNT
      COMMON /TIME/ IHOURS,MINS,ISECS,MSECS
      COMMON /TIMEDT/ JHOURS,JMINS,JSECS,JMSECS,KHOURS,KMINS,
     +KSECS,KMSECS
      DIMENSION IGTBUF(80000)
      EQUIVALENCE(IGTBUF(1),TGTBUF(1))
      CALL INTIAL
```

```
C
      IPAS=0
      IPAST=1
      INFLG=0
      ISTR=1
      KSTR=2
  10  CONTINUE
C
C           ************ READ SLANT ASSO DATA AND DDP DATA
C
      READ(1,END=200) NP
      READ(1,END=200) (ITAPE(I),I=1,NP)
      NX=ITAPE(10)+10
      KX=JIBITS(ITAPE(4),0,6)
      IF(KX.NE.1) NX=3
C                 ***************** XFER SLANT ASSO DATA
      CALL SAXFER(NSLT,NX)
C
C                 **************** XFER DDP DATA
      CALL DPXFER(NSLT,KX)
C           ************ CHECK PRINT DATA
      CALL DATPRT(NSLT)
C
C           ************* UPDATA SLANT INDEX
C
      ITIME=(IHOURS*3600+MINS*60+ISECS)*1000+MSECS
      JTIME=(JHOURS*3600+JMINS*60+JSECS)*1000+JMSECS
      KTIME=(KHOURS*3600+KMINS*60+KSECS)*1000+KMSECS
C     WRITE(6,1050) ITIME,JTIME,KTIME
C     WRITE(6,1050) IHOURS,MINS,ISECS,MSECS
C     WRITE(6,1050) JHOURS,JMINS,JSECS,JMSECS
C     WRITE(6,1050) KHOURS,KMINS,KSECS,KMSECS
C
C           ****************** TIME EDIT CHECK
C
      IF(ITIME.LT.JTIME) GO TO 10
      IF(ITIME.GT.KTIME) GO TO 200
      KSLT=NSLT
      NSLT=NSLT+1
      NSLT=MOD(NSLT,3)
C     WRITE (6,1050) IXP
      IF(IPAS.GT.1) GO TO 150
      IPAS=IPAS+1

GO TO 10
 130  IXP=MMOD(IPAST,NUMSLT)
      WRITE (6,1000) IXP
      IF(IXP.EQ.1) IAD=1
      ISADRS(IXP)=IAD
C     **************
C                 DETECTION COUNT PATCH
C
      GO TO 175
C*******************************
C              ************* START CRT CORRELATION PROCESS
 150  CALL CRTCOR
C              **************** LINK 3/3 INTWO ADJACENT SNAPS
      IF(IPRSOP(7).EQ.1) GO TO 165
      CALL SNTSTR(L11ADS(IXP),L11ADE(IXP),KNFLG)
 165  CALL STRTWO(L11ADS(IXP),L11ADE(IXP),ISTR)
      CALL LINKXX(1,1,1)
      KIXP=MMOD((IXP-1),NUMSLT)
C              ******************** DEGHOST AND ELIMNATE STRADDLES
C                                   FOR 3/3 REPORTS
      IXPADD = L11ADS(IXP)
      KIXPADD = L11ADS(KIXP)
      LIXPADD = L11ADS(LIXP)
      IF(IPRSOP(7).EQ.1) GO TO 170
      CALL SNTGHS(L11ADS(KIXP),L11ADE(KIXP),INFLG)
C     IF (IPAST .LT. 7) GOTO 167
C     WRITE(6,1010) IGTBUF(IXPADD+1),TGTBUF(IXPADD+42),
C    +  IGTBUF(KIXPADD+1),TGTBUF(KIXPADD+42),IGTBUF(LIXPADD+1),
C    +  TGTBUF(LIXPADD+42)
 167  INFLG=KNFLG
 170  CALL GHSTWO(L11ADS(KIXP),L11ADE(KIXP),KSTR)
C     IF (IPAST .LT. 7) GOTO 177
C     WRITE(6,1010) IGTBUF(IXPADD+1),TGTBUF(IXPADD+42),
C    +  IGTBUF(KIXPADD+1),TGTBUF(KIXPADD+42),IGTBUF(LIXPADD+1),
C    +  TGTBUF(LIXPADD+42)
 177  KSTR=ISTR
      ISTR=MMOD(ISTR+1,2)
      IF(IPRSOP(7).EQ.1) GO TO 180
      CALL FFGOST(L11ADS(KIXP),L11ADE(KIXP))
C     IF (IPAST .LT. 7) GOTO 180
C     WRITE(6,1010) IGTBUF(IXPADD+1),TGTBUF(IXPADD+42),
C    +  IGTBUF(KIXPADD+1),TGTBUF(KIXPADD+42),IGTBUF(LIXPADD+1),
C    +  TGTBUF(LIXPADD+42)
 180  CALL STRR23(L22ADS(IXP),L22ADE(IXP),2)
C     IF (IPAST .LT. 7) GOTO 187
C     WRITE(6,1010) IGTBUF(IXPADD+1),TGTBUF(IXPADD+42),
C    +  IGTBUF(KIXPADD+1),TGTBUF(KIXPADD+42),IGTBUF(LIXPADD+1),
C    +  TGTBUF(LIXPADD+42)
 187  CALL STRR23(L33ADS(IXP),L33ADE(IXP),3)
C     IF (IPAST .LT. 7) GOTO 190
```

```
C       WRITE(6,1010) IGTBUF(IXPADD+1),TGTBUF(IXPADD+42),
C      +   IGTBUF(KIXPADD+1),TGTBUF(KIXPADD+42),IGTBUF(LIXPADD+1),
C      +   TGTBUF(LIXPADD+42)
C                       *********** LIN APPORIATE TYPE WITH APPORIATE SNAPS
 190    CALL LINKXX(3,1,2)
        CALL LINKXX(1,3,2)
        CALL LINKXX(3,2,1)
        CALL LINKXX(3,3,2)

CALL LINKXX(2,3,2)
        CALL LINKXX(2,2,4)
C                       *********** DEGHOST AND ELIMINATE STRADDEL
C                                       FOR 2/2 THEN 2/3
        LIXP=MMOD((IXP-4),NUMSLT)
C       WRITE(6,1050) IXP,KIXP,LIXP,IPAST,INFLG,KNFLG,ISTR,KSTR
        CALL STRGHS(L22ADS(LIXP),L22ADE(LIXP),2)
        CALL STRGHS(L33ADS(LIXP),L33ADE(LIXP),3)
C                       ****************** CORRELATE STRADDLES BETWEEN
C                                               3/3;2/2,2/3
        CALL STR123(KIXP,KIXP)
        CALL STR123(KIXP,IXP)
        CALL STR123(IXP,KIXP)
C                       *************** JEM LINK WITHIN A SNAP
        CALL JEM(L11ADS(KIXP),L11ADE(KIXP))
C                       *************** JEM LINK WITHIN A SNAP
        CALL JEM2(L22ADS(KIXP),L22ADE(KIXP),2)
C                       *************** JEM LINK WITHIN A SNAP
        CALL JEM2(L33ADS(KIXP),L33ADE(KIXP),3)
C                       ****************
        CALL JEM123(KIXP)
C                       ************************ LINK JEM REPORTS
        CALL LNKJEM(1,1,1)
        CALL LNKJEM(3,1,2)
        CALL LNKJEM(1,3,2)
        CALL LNKJEM(3,2,1)
        CALL LNKJEM(3,3,2)
        CALL LNKJEM(2,3,2)
        CALL LNKJEM(2,2,4)
        CALL LNKJEM(1,2,-1)
        CALL LNKJEM(2,1,-1)
C                       *************** SLANT EXTEND AND FORM REPORTS
        CALL SLTEXT
C                       ************* OUT PUT REPORTS TO FILE AND PRINT
        CALL OUTFIL
 175    IPAST=IPAST+1
C       WRITE(6,1050) IZDUM,NSLT,IPAST,IXP
        GO TO 10
C                       ************* FORM FACTOR SUMMMARY
 200    CONTINUE
C                       *************** REPEAT SAME AS ABOVE AFTER ALL DETECTION
C                                       DATA IS READ IN TO TERMINATE RUN
 350    DO 300 I=1,6
        IXP=MMOD(IPAST,NUMSLT)
        IF(IPRSOP(7).EQ.1) GO TO 355
        CALL SNTSTR(L11ADS(IXP),L11ADE(IXP),KNFLG)
 355    CALL STRTWO(L11ADS(IXP),L11ADE(IXP),ISTR)
        CALL LINKXX(1,1,1)
        KIXP=MMOD((IXP-1),NUMSLT)
        IF(IPRSOP(7).EQ.1) GO TO 360
        CALL SNTGHS(L11ADS(KIXP),L11ADE(KIXP),INFLG)
        INFLG=KNFLG
 360    CALL GHSTWO(L11ADS(KIXP),L11ADE(KIXP),KSTR)
        KSTR=ISTR
        ISTR=MMOD(ISTR+1,2)
        IF(IPRSOP(7).EQ.1) GO TO 365
        CALL FFGOST(L11ADS(KIXP),L11ADE(KIXP))
 365    CALL STRR23(L22ADS(IXP),L22ADE(IXP),2)
        CALL STRR23(L33ADS(IXP),L33ADE(IXP),3)
        CALL LINKXX(3,1,2)
        CALL LINKXX(1,3,2)
        CALL LINKXX(3,2,1)
        CALL LINKXX(3,3,2)
        CALL LINKXX(2,3,2)
        CALL LINKXX(2,2,4)
C                       *********** DEGHOST AND ELIMINATE STRADDEL
C                                       FOR 2/2 THEN 2/3
        LIXP=MMOD((IXP-4),NUMSLT)
        CALL STRGHS(L22ADS(LIXP),L22ADE(LIXP),2)
        CALL STRGHS(L33ADS(LIXP),L33ADE(LIXP),3)
C                       ****************** CORRELATE STRADDLES BETWEEN
C                                               3/3;2/2,2/3
        CALL STR123(KIXP,KIXP)
        CALL STR123(KIXP,IXP)
        CALL STR123(IXP,KIXP)
C                       *************** JEM LINK WITHIN A SNAP
        CALL JEM(L11ADS(KIXP),L11ADE(KIXP))
C                       *************** JEM LINK WITHIN A SNAP
        CALL JEM2(L22ADS(KIXP),L22ADE(KIXP),2)
C                       *************** JEM LINK WITHIN A SNAP
        CALL JEM2(L33ADS(KIXP),L33ADE(KIXP),3)
C                       ****************
        CALL JEM123(KIXP)
C                       ******************************
        CALL JEM123(KIXP)
        CALL LNKJEM(1,1,1)
```

```
       CALL LNKJEM(3,1,2)
       CALL LNKJEM(1,3,2)
       CALL LNKJEM(3,2,1)
       CALL LNKJEM(3,3,2)
       CALL LNKJEM(2,3,2)
       CALL LNKJEM(2,2,4)
       CALL LNKJEM(1,2,-1)
       CALL LNKJEM(2,1,-1)
C                   ************ SLANT EXTENT AND FORM REPORT
       CALL SLTEXT
C                   ************ OUT PUT REPORTS TO FILE AND PRINT
       CALL OUTFIL
       IPAST=IPAST+1
 300   CONTINUE
 400   CONTINUE
       RETURN
 1000  FORMAT(7H TGMAIN, 1I20)
 1010  FORMAT(7H TGMAIN, 3(1X,1I10,1X,F7.3))
 1050  FORMAT(7H TGMAIN, 10I10)
       END

IHRS=JIBITS(IGTBUF(L+2),26,5)
       MIN=JIBITS(IGTBUF(L+2),20,6)
       ISECS=JIBITS(IGTBUF(L+2),14,6)
       MSECS=JIBITS(IGTBUF(L+2),4,10)

SUBROUTINE TRANGE(ISL,NSL,IT,LT,KAD,IRF,RANGE)

*****************************
            ROUTINE TO CORRLATE 2/3 : 2/2 RANGES

*****************************

COMMON /REPTGT/ TGTBUF(80000), IAD
       DIMENSION RANGE(4)
C
C
       IF(ISL.EQ.NSL) GO TO 400
       IF(LT.EQ.IT) GO TO 400
       DO 200 I=1,4
       IF(RANGE(I).EQ.0) GO TO 200
       RI=ABS(RANGE(I))
       KADB=KAD+29
       KADS=KADB+3
       KI=I
       DO 100 K=KADB,KADS
       RK=ABS(TGTBUF(K))
C      WRITE (6,1000) RI,RK,RI,RK,I,K,KI
       IF(ABS(RI-RK).LT..27) GO TO 300
 100   CONTINUE
 200   CONTINUE
       GO TO 400
 300   RANGE(1)=RANGE(KI)
       RANGE(2)=0.
       RANGE(3)=0.
       RANGE(4)=0.
       IRF=0
C      WRITE(6,1000) RANGE, IT,LT,KAD,KI
 400   RETURN
 1000  FORMAT(7H TRANGE, 4F10.1, 4I10)
       END
_$1$DUA3.[SEP.TRACKER]TRACORV2AZMM.FOR;7

C**************************************************************
C     SUBROUTINE ATRKR PROVIDES CORRELATION AND TRACKING PROCESSING
C
       SUBROUTINE ATRKR
       DIMENSION TLAST(1500),iitrk(3000),
      &ITYP(3500),ITYPA(0:6,3500),KMODE(3500),
      &KMODA(0:6,3500),DMRAWA(0:6,3500),
      &DMRAW(4,3000),DA(1500),DL(1500),RM(4,1500),
      &KOP(1500),JFL(1500),NCOAST(1500),
      &IF3(1500),ITRKNUM(1500),A(0:6,23,3500),
      &JBEST(4,4,1500),KORW(1500),KOR1(1500),NEL(0:6),NPCOR(0:6),
      &L(6),
      &NUMUP(121),IDROP(1500),IUNP(1500),
      &ICOR(0:6,3000),
      &CORR_FLAG(1500),NUM_UPDATE(1500),IRDOT_FLAG(1500)

DIMENSION VE_IN(0:71),VN_IN(0:71),DIFF(0:71),DIFFMIN(0:71)

DIMENSION ISCAN_FIRST(1500),ISCAN_SECOND(1500)

DIMENSION VE_SAVE(0:143),VN_SAVE(0:143),DELX_V(0:71),DELY_V(0:71),
      &DELXDOT_V(0:71),DELYDOT_V(0:71)

DIMENSION AZMRS1(1500),
      &IFIRM(4),RAN1(1500),DOP1(1500),
      &VHOST1(1500),KORT(4,3500),NTCP(4,3500),IBEST(4,3500),ijkntcp
      &(4,3500),
      &JCUR(4,3000),TLMIN(4,1500),RSMALL(3500),CLMIN(4),IOLD(4),
      &RSIGSIGY(3500),KRLS(3500),KRNS(3500),KTY(3500),KHOURS(3500),
      &KMINS(3500),KSECS(3500),KMSECS(3500),ICTN(3000),ICTR(3000),
```

```
&ELCOM(3500),HLAT(3500),HLON(3500),
&RF(3500),ALINE(3500),ALT(3500)
 DIMENSION RDUM(3000),IDUM(3000)
 DIMENSION ID(3500),
&HHOST(3500),VHOST(3500),KTYPE(3500),
&VNORTH(3500),VEAST(3500),NNZR(3500),FF(1500)
 DIMENSION TLASTXY(1500),VTRK(1500),HTRK(1500),
&TMISS(1500)

DIMENSION XFIRST(1500),YFIRST(1500),RDOTFIRST(1500),
&TIMEFIRST(1500),UPDATE_THIRD(1500)

INTEGER SKIP_SCAN(1500),REPEAT_SCAN(1500)

COMMON/TARV/T,DDD,TAU,TAUA,SIGA,SIGR,SIGD,
&NTRK,ITOTAL,ITSTAT(2000),
&TUP,DOPM(2000),
&ANGM(2000),RNGM(2000)
 COMMON/ATRACK/ISCH,CRD,I33,NOMORE,
&IOP,TRF,NODOP,IDSR23,IDHDLR,IDOPEL,
&IMODAZ,ELMAX,ELMIN,BETAMIN,IET,IEXTRA,IRDOT,AZCORMIN,AZCORMAX,
&NUM_REPORTS_UPDATE
 COMMON/EXWIND/CMIN,CMAX
 COMMON/LABEL/AZSTAB,AZMRS(3500),DELAZM(3500),PITCH(3500)
&,ROLL(3500),SQUINT,RG,RAD,JJ,HEADG,ELCMD,PI

COMMON/WEIGHT_TABLE/ WEIGHT_R(1500),WEIGHT_RDOT(1500),
& WEIGHT_POS(1500),WEIGHT_POSDOT(1500)

C         [SSP.TRACKER]TRACORV2AZMM.FOR;7

COMMON/SIGMA_TABLE/SIG_R_MANEUV,SIG_RDOT_MANEUV,
& SIG_AZ_MANEUV,SIG_R_SMOOTH,SIG_RDOT_SMOOTH,
& SIG_AZ_SMOOTH

COMMON/FLAG/MANEUVER_FLAG(1500),ALERT_FLAG(1500),
& M(1500),MAX(1500)

COMMON/SAVE_DEL/SAVE_DELTA_RDOT(1500),SAVE_DELTA_R(1500)
& ,SAVE_DELTA_X(1500),SAVE_DELTA_Y(1500)

COMMON/DELTA/DELTA_R(1500),DELTA_RDOT(1500)
& ,DELTA_AZ(1500),DELTA_X(1500),DELTA_Y(1500)

COMMON/TRACKER/DM(4,1500),RMEAS,AZM(1500),
& XM(1500),YM(1500),DP(1500),RP(1500),AZP(1500),XP(1500)
& ,YP(1500),TUP1,IAOT(1500),XDOTP(1500),YDOTP(1500)

DATA SIG_RDOT_MANEUV,SIG_R_MANEUV,SIG_AZ_MANEUV
& /.0033333,.0677,.00371755/
 DATA SIG_RDOT_SMOOTH,SIG_R_SMOOTH,SIG_AZ_SMOOTH
& /.0026667,.0549,.0029496I/

EQUIVALENCE(IDUM(1),RDUM(1))
 DATA PI,TWOPI,RAD/3.14159265,6.28318531,57.29578/
 DATA VMAX,CKL,CKDA,CKDL/0.7,9.,2.5,2.5/

DELAMX=22./RAD    !MAX ZONE SIZE IN PLOT-TRK COR
 DMB=10.
 AZLO=5./RAD
 AZHI=355./RAD
 HIDOP=.5          !HIGH DOPPLER SET AT MACH 2
 SHORTR=100.       !SHORT RANGE SET AT 100. NM

DO I=0,71
 DIFFMIN(I) = 400.
 VE_IN(I) = 0.
 VN_IN(I) = 0.
 ENDDO

C
C COUNTERS INITIALIZED
C
 N33=0
 N23=0
 N22=0
 NTT=0
 NTI=0
 NTU=0
 NTC=0
 NTD=0
 NIDO=0
 NET=0
 NFT=0
 NEU=0
 NEC=0
```

```
_$1$DUA3 [SSP.TRACKER]TRACORV2AZMM.FOR;7
      NED=0
      NEDO=0
      NOOR=0
      NTOOR=0
      NEOOR=0
      JJ=0
      NUMPL=0
      NACTAR=0
      MAXLEV=4
      MAXNR=4
      TUP1=TUP

IF(T.EQ.0)THEN
        DO I=1,1500
          IRDOT_FLAG(I) = 0
          MANEUVER_FLAG(I) = 0
          M(I)=5
          MAX(I)=10
          ALERT_FLAG(I) = 0
          NCOAST(I) = 0
          WEIGHT_R(I) = 0.4
          WEIGHT_RDOT(I) = 0.4
          WEIGHT_POS(I) = 0.23344
          WEIGHT_POSDOT(I) = 0.04458
        ENDDO
      ENDIF

IF(NTRK.GE.1000)IELRPT=1
      ISCAN=T/TAU+1
      IF(T.LT.TRF)GO TO 570
      WRITE(31,887)T
570   CONTINUE
887   FORMAT(////1X,6HTIME: ,F8.0)
      PRINT*, INT(T)
2013  FORMAT(5H SCAN,I4)
C
C     READ LIVE REPORTS FROM UNPACK1.DAT
C
      NUMPL=0
      JJ=0
      IF(NOMORE.EQ.1)GO TO 5281
      IF(ISCAN.GT.1)IFIRST=ILAST
      IF(ISCAN.GT.1)GO TO 564
565   CONTINUE
      IFIRST=1
      READ(78,END=569)LEN
      IJXTAR=LEN*30
      READ(78,END=569)(IDUM(I),I=1,IJXTAR)
564   CONTINUE
      DO 566 I=IFIRST,IJXTAR,30
      ILAST=I
      KTYPRPT=MOD(JIBITS(IDUM(I),0,3),4)
      MODE=JIBITS(IDUM(I+4),0,4)
      IHOURS=JIBITS(IDUM(I+4),26,5)
      MINS=JIBITS(IDUM(I+4),20,6)

_$1$DUA3 [SSP.TRACKER]TRACORV2AZMM.FOR;7
      ISECS=JIBITS(IDUM(I+4),14,6)
      MSECS=JIBITS(IDUM(I+4),4,10)
      ITY=IDUM(I)
      RLS=RDUM(I+2)
      RNS=RDUM(I+3)
      ELCMD=RDUM(I+5)
      FORMFAC=RDUM(I+6)
      HOSTLAT=RDUM(I+7)
      HOSTLON=RDUM(I+8)
      AZMR=RDUM(I+9)
      DAZMR=RDUM(I+11)
      ROLLH=RDUM(I+12)
      PITCHH=RDUM(I+13)
      HEAD=RDUM(I+14)
      RFSET=RDUM(I+15)
      ALTLINE=RDUM(I+16)
      VE=RDUM(I+17)
      VN=RDUM(I+18)
      VTOT=SQRT(VE*VE+VN*VN)
      VE=VTOT*SIN(HEAD/RAD)
      VN=VTOT*COS(HEAD/RAD)
      ALTI=RDUM(I+19)
      DMR=RDUM(I+20)
      DMR2=RDUM(I+21)
      DMR3=RDUM(I+22)
      DMR4=RDUM(I+23)
      RMR1=RDUM(I+24)
      RMR2=RDUM(I+25)
      RMR3=RDUM(I+26)
      RMR4=RDUM(I+27)
      SIGSIGY=RDUM(I+28)
```

```
        AZMR1=AZMR
        AZMR=AZMR+HEAD
        IF(AZMR.GT.360.)AZMR=AZMR-360.
        IF(AZMR.LT.0.)AZMR=AZMR+360.
        IF(JJ.EQ.0)GO TO 567
        IF(JJ.LT.10)GO TO 567
        IF(AZMR+5..LT.AZOLD) GO TO 568
567     CONTINUE
        JJ=JJ+1
C       PRINT*,'JJ=',JJ
        RJJ=FLOAT(JJ)/100.
        IJJ=INT(RJJ)
        IF(RJJ-IJJ.EQ.0)THEN
            WRITE(35,4002)JJ,IHOURS,MINS,ISECS,MSECS,HOSTLAT,HOSTLON,
     &      VN,VE,ROLLH,PITCHH,HEAD
4002    FORMAT(1X,I4,2X,4I7,2X,7(1X,F9.3))
        ENDIF
        KTYPE(JJ)=KTYPRPT
        KMODE(JJ)=MODE
        ITYP(JJ)=ITY
        AZM(JJ)=AZMR
        AZMRS(JJ)=AZMR1
        DM(1,JJ)=DMR
        DM(2,JJ)=DMR2
        DM(3,JJ)=DMR3
        DM(4,JJ)=DMR4
        RM(1,JJ)=RMR1
_$14DUA0:[SSP.TRACKER]TRACORV2AZMM.FOR;7

RM(2,JJ)=RMR2
        RM(3,JJ)=RMR3
        RM(4,JJ)=RMR4
        HHOST(JJ)=HEAD/RAD
        VNORTH(JJ)=VN
        VEAST(JJ)=VE
        VHOST(JJ)=SQRT(VE*VE+VN*VN)/3600.
        KTY(JJ)=ITY
        KRLS(JJ)=RLS
        KRNS(JJ)=RNS
        KHOURS(JJ)=IHOURS
        KMINS(JJ)=MINS
        KSECS(JJ)=ISECS
        KMSECS(JJ)=MSECS
        RSIGSIGY(JJ)=SIGSIGY
        ELCOM(JJ)=ELCMD
        FF(JJ)=FORMFAC
        HLAT(JJ)=HOSTLAT
        HLON(JJ)=HOSTLON
        DELAZM(JJ)=DAZMR
        ROLL(JJ)=ROLLH
        PITCH(JJ)=PITCHH
        RF(JJ)=RFSET
        ALINE(JJ)=ALTLINE
        ALT(JJ)=ALTI
        NUMPL=NUMPL+1
        AZOLD=AZM(JJ)
C
C           PUT VE AND VN IN APROPRIATE BINS
C
        IPOINTER=NINT(AZM(JJ)/5.)
        IF(IPOINTER.LT.72)THEN
         POINTER=IPOINTER*5.
          IF(AZM(JJ).GT.POINTER-2.5.AND.AZM(JJ).LE.POINTER+2.5)THEN
            DIFF(IPOINTER) = ABS(POINTER-AZM(JJ))
             IF(DIFF(IPOINTER).LT.DIFFMIN(IPOINTER))THEN
               VE_IN(IPOINTER)=VEAST(JJ)/3600.
               VN_IN(IPOINTER)=VNORTH(JJ)/3600.
               DIFFMIN(IPOINTER) = DIFF(IPOINTER)
             ENDIF
          ENDIF
        ENDIF

IF(ITIME.EQ.0)GO TO 572
        IF(ABS(KSECS(JJ)-IOLDSEC).LT.1.)GO TO 5722
572     CONTINUE
        IOLDSEC=KSECS(JJ)
        ITIME=1
        ITYM=ITYM+1
5722    CONTINUE
566     CONTINUE
        GO TO 565
569     CONTINUE
        NOMORE=1
568     CONTINUE
C
C
C-----------------------------------------------------------------
```

```
C
       DO IBIN=72,143
          VE_SAVE(IBIN)=VE_IN(IBIN-72)
          VN_SAVE(IBIN)=VN_IN(IBIN-72)
       ENDDO

C      FILL IN EMPTY BINS

DO IBIN = 72,143
       IF(VE_SAVE(IBIN).EQ.0.AND.VN_SAVE(IBIN).EQ.0)THEN
          VE_SAVE(IBIN) = VE_SAVE(IBIN-1)
          VN_SAVE(IBIN) = VN_SAVE(IBIN-1)
       ENDIF
       ENDDO

C
C      COMPUTE THE E3A MOTION DELTA'S
C
       DO IBIN = 0,71
       SUM_X =0
       SUM_Y =0
         DO JBIN = IBIN,IBIN+71
         SUM_X = SUM_X + VE_SAVE(JBIN)
         SUM_Y = SUM_Y + VN_SAVE(JBIN)
         ENDDO
       DELX_V(IBIN)=SUM_X * 5 /36. - (TAU*VE_SAVE(IBIN))
       DELY_V(IBIN)=SUM_Y * 5 /36. - (TAU*VN_SAVE(IBIN))
       DELXDOT_V(IBIN)=VE_SAVE(IBIN+72)-VE_SAVE(IBIN)
       DELYDOT_V(IBIN)= VN_SAVE(IBIN+72)-VN_SAVE(IBIN)
       ENDDO

C
C      UPDATE TRACK PREDICTIONS TO CORRECT FOR E3A MOTION
C

DO K = 1,NTRK
       I=IAOT(K)
       IF(ITSTAT(I).EQ.1.OR.ITSTAT(I).EQ.2)THEN
          XPSAVE=XP(I)
          YPSAVE=YP(I)
          XDOTSAVE=XDOTP(I)
          YDOTSAVE=YDOTP(I)
          AZSAVE=AZP(I)
          RPSAVE=RP(I)
          DPSAVE=DP(I)
          IBIN=NINT((AZP(I)*RAD)/5 )
          IF (IBIN.EQ.72)IBIN=0
          IF(RP(I).EQ.0.0)then
          PRINT*,AZP(I),AZM(JJ),I,JJ,RP(I),DP(I)
          rp(i)=0.0001
          endif
          DELR_V = (XP(I)*DELX_V(IBIN)+YP(I)*DELY_V(IBIN))/RP(I)
          DELRDOT_V = XP(I)*DELXDOT_V(IBIN)+YP(I)*DELYDOT_V(IBIN)+
     &                XDOTP(I)*DELX_V(IBIN)+YDOTP(I)*DELY_V(IBIN)
     &                -DP(I)*DELR_V
          DELPDOT_V = DELRDOT_V/RP(I)
          XP(I)=XP(I)-DELX_V(IBIN)
          YP(I)=YP(I)-DELY_V(IBIN)
          XDOTP(I)=XDOTP(I)-DELXDOT_V(IBIN)
          YDOTP(I)=YDOTP(I)-DELYDOT_V(IBIN)
          RP(I)=RP(I)-DELR_V
          DP(I)=DP(I)-DELRDOT_V
          AZP(I)=ATAN2(XP(I),YP(I))
          IF(AZP(I).LT.0.)AZP(I)=AZP(I)+TWOPI IF(IEXTRA.EQ.1)THEN
            CALL OUTPUT2(ISCAN-1,ICTN(I),ICTR(I),ITRKNUM(I),XPSAVE,
     &      XDOTSAVE,YPSAVE,YDOTSAVE,AZSAVE,RPSAVE,DPSAVE,XP(I),
     &      XDOTP(I),YP(I),YDOTP(I),AZP(I),RP(I),DP(I),DELX_V(IBIN)
     &      ,DELXDOT_V(IBIN),DELY_V(IBIN),DELYDOT_V(IBIN),DELR_V
     &      ,DELRDOT_V)
          ENDIF

CALL AZORT(K)
       ENDIF
       ENDDO

C
C      UPDATE SAVED VE AND VN VALUES FOR NEXT SCAN
C
       DO IBIN= 0,71
       VE_SAVE(IBIN)=VE_SAVE(IBIN+72)
       VE_SAVE(IBIN+72)=0.
       VN_SAVE(IBIN)=VN_SAVE(IBIN+72)
       VN_SAVE(IBIN+72)=0.
       ENDDO
```

```
         DO I=1,NTRK                          !INITIALIZE THE BOUNDRY FLAG
           REPEAT_SCAN(I)=0
         ENDDO
C
C    REPORT-TRACK CORRELATION
C
C    INITIALIZE PARAMETERS
C
         DO IPROCESS=1,2                      !HANDLES THE PROBLEM WITH
                                              !TRACKS CROSSING THE BOUNDRY
         LEVEL=1
         IP1=0
         DO 196 I=1,NTRK
         IF(IPROCESS.EQ.1.OR.
     &      (IPROCESS.EQ.2.AND.REPEAT_SCAN(I).EQ.1))THEN
           KOR(I)=0
           KORW(I)=0
           KOR1(I)=0
           CORR_FLAG(I)=0
           DO 175 IND=1,4
             TLMIN(IND,I)=.9E13
             DO 195 JND=1,4
             JBEST(IND,JND,I)=0
195        CONTINUE
         ENDIF
_$1$DUA3 [SSP.TRACKER]TRACORV2AZMM.FOR;7

196   CONTINUE
C
C--------------------------------------------------------------------
C
C     PROCESS REPORTS
C
         iexcbnd=0
         DO 207 JJ=1,NUMPL
           if(iexcbnd.eq.10)go to 5467
           if(jj.gt.1500)print*,'exceeded num reports per scan'
5467       if(jj.gt.1500)iexcbnd=10
         IF(IPROCESS.EQ.1)THEN
           PG=1
           IRF=RF(JJ)
           HEADG=HHOST(JJ)*RAD
           AZMR=AZM(JJ)
           AZMR1=AZMRS(JJ)
           CALL FREQ(IRF)
           CALL STABL
           IF(ABS(AZSTAB-AZMR).GT.200.)THEN
             AZSTAB=AZMR
             AZMRS(JJ)=AZMR1
           ENDIF
           DCOR=-VHOST(JJ)*3600.*COS(AZMRS(JJ)/RAD)

DO IND=1,4
             DMRAW(IND,JJ)=DM(IND,JJ)
           ENDDO

DO IND=1,4
           IF(DM(IND,JJ).NE.0)THEN
             DM(IND,JJ)=DM(IND,JJ)+DCOR
           ENDIF
           ENDDO

ENDIF !IPROCESS = 1

ID(JJ)=4-KTYPE(JJ)
         IF(ID(JJ).GE.4)GO TO 207
         IF(I33.EQ.1)THEN
           IF(ID(JJ).NE.3)GO TO 207             !JUMP TO 207 TO PROCESS ONLY 3/3
         ENDIF
         IF(ID(JJ).NE.3)GO TO 256
         N33=N33+1
         RTOT=RM(1,JJ)
         RM(1,JJ)=RTOT
         RM(2,JJ)=0.
         RM(3,JJ)=0.
         RM(4,JJ)=0.
         RSMALL(JJ)=RM(1,JJ)
         INON=1
         NNZR(JJ)=1
         GO TO 255
256    CONTINUE
_$1$DUA3 [SSP.TRACKER]TRACORV2AZMM.FOR;7

IF(IPROCESS.EQ.1)THEN
           IF(ID(JJ).EQ.2)N22=N22+1
           IF(ID(JJ).EQ.1)N23=N23+1
         ENDIF
```

```
            NNZR(JJ)=0
            DO 254 IND=1,4
            IF(RM(IND,JJ).EQ.0)GO TO 254
            NNZR(JJ)=NNZR(JJ)+1
254         CONTINUE
255         CONTINUE

IF(IPROCESS.EQ.1)THEN
               AZM(JJ)=AZSTAB
            ENDIF

IF(T.LT.TRF)GO TO 337
            IF(AZM(JJ).LT.AZCORMIN.OR.AZM(JJ).GT.AZCORMAX)GO TO 337
            WRITE(31,896)JJ,KTYPE(JJ),RM(1,JJ),RM(2,JJ),RM(3,JJ),RM(4,JJ),
           &AZM(JJ),AZMRS(JJ),DM(1,JJ),DM(2,JJ),DM(3,JJ),DM(4,JJ)
337         CONTINUE

IF(IPROCESS.EQ.1)THEN
               AZM(JJ)=AZM(JJ)/RAD
               AZMRS(JJ)=AZMRS(JJ)/RAD
               DO 338 IND=1,4
                  DM(IND,JJ)=DM(IND,JJ)/3600.
338            CONTINUE
            ENDIF

896         FORMAT(/1X,6HREPORT,2I5,5X,6F8.3,4F11.3)
897         FORMAT(7X,9F11.3)
            IF(ID(JJ).EQ.3.AND.RM(1,JJ).LT.5.)ID(JJ)=0
            IF(ID(JJ).EQ.0)GO TO 207
            DO 334 IND=1,4
            IBEST(IND,JJ)=0
            KORT(IND,JJ)=0
            CLMIN(IND)=.9E13
334         CONTINUE
            ICTOP=0
            ICBOT=0
            ISMALL=0
            ILARGE=0
            IF(AZM(JJ).LT.AZLO)ISMALL=1
            IF(AZM(JJ).GT.AZHI)ILARGE=1
C
C-----------------------------------------------------------------
C
C     COMPUTE AZIMUTH ZONE FOR REPORT JJ
C
            IF(ID(JJ).EQ.3)GO TO 262
            DO 257 INON=1,4
            IF(RM(INON,JJ).LE.0.)GO TO 257
            RSMALL(JJ)=RM(INON,JJ)              !RM(INON,JJ)is first positive-range
            GO TO 258                            !of report JJ
257         CONTINUE
258         CONTINUE
            DO 262 IND=INON+1,4
            IF(RM(IND,JJ).LE.0.)GO TO 262
            IF(RM(IND,JJ).GE.RSMALL(JJ))GO TO 262
            RSMALL(JJ)=RM(IND,JJ)               !RSMALL(JJ)is now the smallest
262         CONTINUE                             !positive-range of report JJ
            DELA=ATAN2(DMB,RSMALL(JJ))
            IF(DELA.GT.DELAMX)DELA=DELAMX
            AS=AZM(JJ)-DELA
            AE=AZM(JJ)+DELA
C
C-----------------------------------------------------------------
C
C     SET TRACK POINTER
C
604         CONTINUE
            IF(IP1.EQ.0)GO TO 605
            IF(AS.GT.AZP(IAOT(IP1)))GO TO 605
            IP1=IP1-1
            GO TO 604
605         CONTINUE
            IF(IP1+1.LE.NTRK)GO TO 293
            IF(ISMALL.EQ.1)GO TO 298
            IF(ILARGE.EQ.1)GO TO 296
            GO TO 207
293         CONTINUE
            IF(AS.LE.AZP(IAOT(IP1+1)))GO TO 603
            IP1=IP1+1
            GO TO 605
603         CONTINUE
C
C-----------------------------------------------------------------
C
C     PROCESS TRACKS IN ZONE
C
            DO 206 KK=1,NTRK
            IF(ICTOP.EQ.1)GO TO 297
            IF(ICBOT.EQ.1)GO TO 299
            IF(IP1+1.LE.NTRK)GO TO 294
            IF(ISMALL.EQ.1)GO TO 298
            IF(ILARGE.EQ.1)GO TO 296
            GO TO 207
```

```
294     CONTINUE
        IF(AZP(IAOT(IP1+1)).LE.AE)GO TO 295
        IF(ISMALL.EQ.1)GO TO 298
        IF(ILARGE.EQ.1)GO TO 296
        GO TO 207
295     CONTINUE
        IP1=IP1+1
        I=IAOT(IP1)
        GO TO 300
296     CONTINUE
        ICTOP=1
        IPTOP=0
297     CONTINUE
        IF(IPTOP+1.GT.NTRK)GO TO 207
        IPTOP=IPTOP+1
        I=IAOT(IPTOP)
        IF(AZP(I).GT.AZLO)GO TO 207
        GO TO 300
_$!!DUA3 [SSP TRACKER]TRACORV2AZMM.FOR;7

298     CONTINUE
        ICBOT=1
        IPBOT=NTRK+1
299     CONTINUE
        IF(IPBOT-1.LT.1)GO TO 207
        IPBOT=IPBOT-1
        I=IAOT(IPBOT)
        IF(AZP(I).LT.AZHI)GO TO 207
300     CONTINUE
        IF(KOR(I).EQ.1)GO TO 206

IF(ITSTAT(I).EQ.1)THEN
         IF(ID(JJ).EQ.3)THEN
          IF(FF(JJ).LT..25.OR.FF(JJ).GT.50.)GO TO 206
         ENDIF
        ENDIF

IF(IPROCESS.EQ.2.AND.REPEAT_SCAN(I).EQ.0)GO TO 206

IF(SKIP_SCAN(I).EQ.1)THEN
          GO TO 206
        ENDIF

IF(T.LT.TRF)GO TO 599
        IF(AZM(JJ).LT.AZCORMIN/RAD.OR.AZM(JJ).GT.AZCORMAX/RAD)GO TO 599
        WRITE(31,886)ITRKNUM(I)
        WRITE(31,894)RP(I),AZP(I)*RAD,DP(I)*3600.
599     CONTINUE
C
C----------------------------------------------------------------
C
C       RANGE CHECK
C
        IRNG=INON
        RMEAS=RM(INON,JJ)
        RERROR=RMEAS-RP(I)
        IF(ID(JJ).EQ.3)GO TO 204
        DO 204 IND=INON+1,4
        IF(RM(IND,JJ).LE.0.)GO TO 204
        IF(ABS(RM(IND,JJ)-RP(I)).GE.ABS(RERROR))GO TO 204
        IRNG=IND
        RMEAS=RM(IND,JJ)
        RERROR=RM(IND,JJ)-RP(I)
204     CONTINUE
        IF(RMEAS.LT.5.)GO TO 206
C
C----------------------------------------------------------------
        IF(NODOP.EQ.1)GO TO 269
C----------------------------------------------------------------
C
C       DOPPLER CHECK
C
        IDOP=1
        DOPDIF=ABS(DM(1,JJ)-DP(I))
        DO 266 IND=2,4,1
        IF(DM(IND,JJ).EQ.0.)GO TO 266
        IF(ABS(DM(IND,JJ)-DP(I)).GT.DOPDIF)GO TO 266
        DOPDIF=ABS(DM(IND,JJ)-DP(I))
_$!!DUA3 [SSP TRACKER]TRACORV2AZMM.FOR;7

IDOP=IND
266     CONTINUE
        IF(ABS(DM(IDOP,JJ)-DP(I)).LT..417)GO TO 269
        GO TO 206
269     CONTINUE
C
C----------------------------------------------------------------
        DO 113 IND=1,4
        IF(RM(IND)=0
113     CONTINUE
        IF(T.LT.TRF)GO TO 114
        IF(AZM(JJ).LT.AZCORMIN/RAD.OR.AZM(JJ).GT.AZCORMAX/RAD)GO TO 114
886     FORMAT(1X,7HTRACK: ,I6,2I8 )
        WRITE(31,865)RMEAS
        WRITE(31,882)DM(IDOP,JJ)*3600.
```

```
882     FORMAT(1X,19HCLOSEST DOPPLER IS ,F11.3)
865     FORMAT(1X,21HCLOSEST REPORT RANGE=,F8.3)
114     CONTINUE
        JFL(I)=0
        IF(T.LT.TRF)GO TO 116
        IF(AZM(JJ).LT.AZCORMIN/RAD.OR.AZM(JJ).GT.AZCORMAX/RAD)GO TO 116
        IF(ITSTAT(I).EQ.1)GO TO 116
        WRITE(31,893)
893     FORMAT(1X,12HMANEUVER BOX)
116     CONTINUE
892     FORMAT(1X,F8.3)
C
C------------------------------------------------------------------------
C
C       MANEUVER BOX (AXIAL)
C
        XM(JJ)=RMEAS*SIN(AZM(JJ))
        YM(JJ)=RMEAS*COS(AZM(JJ))

EX=XM(JJ)-XP(I)
        EY=YM(JJ)-YP(I)
        IF(ITSTAT(I).EQ.1)GO TO 119
        DA(I)=EX*SIN(HTRK(I))+EY*COS(HTRK(I))
        IF(T.LT.TRF)GO TO 110
        IF(AZM(JJ).LT.AZCORMIN/RAD.OR.AZM(JJ).GT.AZCORMAX/RAD)GO TO 110
        WRITE(31,892)DA(I)
110     CONTINUE
        IF(IDROP(I).EQ.7)GO TO 652
        TMISS(I)=T-TAU
        GO TO 654
652     CONTINUE
        IF(T-TMISS(I).GT.3.*TAU)GO TO 653
        GO TO 654
653     CONTINUE
        CKDAP=2.5       !STANDARD SIZE MANEUVER BOX
        CKDLP=2.5
        TMISS(I)=-100000.
        GO TO 655
654     CONTINUE
        CKDAP=5.0       !EXPANDED MANEUVER BOX
        CKDLP=5.0
655     CONTINUE
        IF(ABS(DA(I)).GE.CKDAP)GO TO 206
_$1$DUA3:[SSP.TRACKER]TRACORV2AZMM.FOR;7

C
C------------------------------------------------------------------------
C
C       MANEUVER BOX (LATERAL)
C
        DL(I)=EX*COS(HTRK(I))-EY*SIN(HTRK(I))
        IF(T.LT.TRF)GO TO 118
        IF(AZM(JJ).LT.AZCORMIN/RAD.OR.AZM(JJ).GT.AZCORMAX/RAD)GO TO 118
        WRITE(31,892)DL(I)
        IF(T.EQ.170)WRITE(31,892)CKDLP
118     CONTINUE
        IF(ABS(DL(I)).GE.CKDLP)GO TO 206
C
C------------------------------------------------------------------------
C
C       RANGE ELLIPSE
C
119     CONTINUE
        IF(ITSTAT(I).EQ.1)THEN
        IF(IDROP(I).EQ.7)GO TO 1652
        TMISS(I)=T-TAU
1652    CONTINUE
        ENDIF

IF(ITSTAT(I).EQ.2)THEN
          CLR=(RERROR/SIGR)*(RERROR/SIGR)
          IF(T.EQ.170)WRITE(31,892)CLR
        ELSE
          SIGRCW = SQRT((2.*SIGR**2)+((ISCAN-ISCAN_SECOND(I))**2)
     &               *(TAU**2)*(SIGD**2))

IF(ABS(RERROR).GT.3.*SIGRCW)GO TO 206
          CLR=(RERROR/SIGR)*(RERROR/SIGR)
C         CLR=(RERROR/SIGRCW)*(RERROR/SIGRCW)
        ENDIF
C       IF(ITSTAT(I).EQ.1.AND.CLR.GE.9)GO TO 206
        IF(CLR.GE.CKL)JFL(I)=1
C
C------------------------------------------------------------------------
C
C       AZIMUTH ELLIPSE
C
        AERROR=AZM(JJ)-AZP(I)
        IF(AERROR.GT.PI)AERROR=AERROR-TWOPI
        IF(AERROR.LT.-PI)AERROR=AERROR+TWOPI

IF(ITSTAT(I).EQ.2)THEN
          CLA=(AERROR/SIGA)*(AERROR/SIGA)
          IF(T.EQ.170)WRITE(31,892)CLA
```

```
          ELSE
              SIGACW=SQRT(2.*(1.+(((ISCAN-ISCAN_SECOND(I))*
     &              (ISCAN-ISCAN_FIRST(I)))/
     &              ((ISCAN_SECOND(I)-ISCAN_FIRST(I))**2))))
     &              *SIGA
              IF(ABS(AERROR).GT.3.*SIGACW)GO TO 206
              CLA=(AERROR/SIGA)*(AERROR/SIGA)
C             CLA=(AERROR/SIGACW)*(AERROR/SIGACW)
          ENDIF
_$1$DUA3.[SSP.TRACKER]TRACORV2AZMM.FOR;7

C         IF(ITSTAT(I).EQ.1.AND.CLA.GE.9)GO TO 206
          IF(CLA.GE.CKL)JFL(I)=1
C
C-----------------------------------------------------------------
C
C         DOPPLER ELLIPSE
C
          IF(IDOPEL.NE.1)GO TO 822
          DERROR=DM(IDOP,JJ)-DP(I)
C         IF(ID(JJ).NE.3)THEN
C            IF(ABS(DERROR).GT.100./3600.)GO TO 206
C         ENDIF

C         IF(ABS(RERROR).GT.1..OR.ABS(AERROR).GT.1/RAD)THEN
C            IF(ABS(DERROR).GT.100./3600.)GO TO 206
C         ENDIF

IF(ITSTAT(I).EQ.2)THEN
              CLD=(DERROR/SIGD)*(DERROR/SIGD)
              IF(T.EQ.170)WRITE(31,892)CLD
          ELSE
              SIGDCW=SQRT(2.)*SIGD
              IF(ABS(DERROR).GT.3.*SIGDCW)GO TO 206
              CLD=(DERROR/SIGD)*(DERROR/SIGD)
C             CLD=(DERROR/SIGDCW)*(DERROR/SIGDCW)
          ENDIF
C         IF(ITSTAT(I).EQ.1.AND.CLD.GE.9)GO TO 206
          IF(CLD.GE.CKL)JFL(I)=1
C
C-----------------------------------------------------------------
C
C         TOTAL L
C
822       CONTINUE
          CLTOT=CLR+CLA+CLD
          IF(T.LT.TRF)GO TO 121
          IF(AZM(JJ).LT.AZCORMIN/RAD.OR.AZM(JJ).GT.AZCORMAX/RAD)GO TO 121
          WRITE(31,898)CLR,CLA,CLD,CLTOT
898       FORMAT(1X,4F12.3)
121       CONTINUE
          IF(JFL(I).EQ.0)GO TO 122
          IF(NODOP.EQ.1)GO TO 122
C            IF(DOPDIF/(8-IDROP(I)).GT.40./3600.)GO TO 120
C            IF(ABS(RERROR)/(8-IDROP(I)).GT...6)GO TO 120
C            GO TO 122

IF(ABS(DOPDIF).GT.40./3600.)GO TO 120
          IF(ABS(RERROR).GT..30)GO TO 120

120       CONTINUE
          RDOTAVE=(DOP1(I)+DM(IDOP,JJ))/2.
          AZAVE=(AZMRS1(I)+AZMRS(JJ))/2.
          VHAVE=VHOST(JJ)
C         RDOTTOT=RDOTAVE-VHAVE*COS(AZAVE)              !ORIGINAL EQUATION 10/1/84
          RDOTTOT=RDOTAVE
          REXP=RAN1(I)+RDOTTOT*(T-TLAST(I))
C         IF(ABS(REXP-RMEAS)/(8-IDROP(I)).GT...35)GO TO 206
_$1$DUA3.[SSP.TRACKER]TRACORV2AZMM.FOR;7

C         IF(ABS(REXP-RMEAS).GT..356)GO TO 206   !7/30/85
          IF(ABS(REXP-RMEAS).GT.(.29115+.0647*(8.-IDROP(I)))) GO TO 206

IF(IRDOT_FLAG(I).EQ.1.AND.ABS(DERROR).GT.100./3600.)THEN
              RDOTAVE=(DOP1(I)+DP(I))/2.
              REXP=RAN1(I)+RDOTAVE*(T-TLAST(I))
              IF(ABS(REXP-RMEAS).GT.(.29115+.0647*(8.-IDROP(I)))) GO TO 206
          ENDIF

122       CONTINUE
          IF(IRNG.NE.1)GO TO 213
          IF(JFL(I).NE.0)GO TO 208
          IFIRM(I)=1
          TMISS(I)=-100000.
          CLTOT=0
          IF(ID(JJ).NE.3)GO TO 202
          IF(CLMIN(1).NE.TLMIN(1,IBEST(1,JJ)))GO TO 202
          KORW(IBEST(1,JJ))=0
          JBEST(1,1,IBEST(1,JJ))=0
          TLMIN(1,IBEST(1,JJ))=.9E13
202       CONTINUE
          KOR(I)=1
          JBEST(1,1,I)=JJ
          JBEST(1,2,I)=0
```

```
            JBEST(1,3,I)=0
            JBEST(1,4,I)=0
            IF(T.LT.TRF)GO TO 123
            IF(AZM(JJ).LT.AZCORMIN/RAD.OR.AZM(JJ).GT.AZCORMAX/RAD)GO TO 123
            WRITE(31,880)
880         FORMAT(1X,16HFIRM ASSOCIATION)
            IF(IF3(I).EQ.1)GO TO 201
            WRITE(31,881)
881         FORMAT(1X,15HWITH WEAK TRACK)
201         CONTINUE
            WRITE(31,870)JJ,ITRKNUM(I)
870         FORMAT(1X,6HREPORT,I5,12H    AND TRACK,I5,2I8/)
123         CONTINUE
208         CONTINUE
            IF(CLTOT.GE.TLMIN(1,I))GO TO 350
            JBEST(4,1,I)=JBEST(3,1,I)
            JBEST(4,2,I)=JBEST(3,2,I)
            JBEST(4,3,I)=JBEST(3,3,I)
            JBEST(4,4,I)=JBEST(3,4,I)
            TLMIN(4,I)=TLMIN(3,I)
            JBEST(3,1,I)=JBEST(2,1,I)
            JBEST(3,2,I)=JBEST(2,2,I)
            JBEST(3,3,I)=JBEST(2,3,I)
            JBEST(3,4,I)=JBEST(2,4,I)
            TLMIN(3,I)=TLMIN(2,I)
            JBEST(2,1,I)=JBEST(1,1,I)
            JBEST(2,2,I)=JBEST(1,2,I)
            JBEST(2,3,I)=JBEST(1,3,I)
            JBEST(2,4,I)=JBEST(1,4,I)
            TLMIN(2,I)=TLMIN(1,I)
            TLMIN(1,I)=CLTOT
            JBEST(1,1,I)=JJ
            JBEST(1,2,I)=0
            JBEST(1,3,I)=0
_$1$DUA3 [SSP.TRACKER]TRACORV2AZMM.FOR;7

JBEST(1,4,I)=0
            KORW(I)=1
            GO TO 361
350         CONTINUE
            IF(CLTOT.GE.TLMIN(2,I))GO TO 351
            JBEST(4,1,I)=JBEST(3,1,I)
            JBEST(4,2,I)=JBEST(3,2,I)
            JBEST(4,3,I)=JBEST(3,3,I)
            JBEST(4,4,I)=JBEST(3,4,I)
            TLMIN(4,I)=TLMIN(3,I)
            JBEST(3,1,I)=JBEST(2,1,I)
            JBEST(3,2,I)=JBEST(2,2,I)
            JBEST(3,3,I)=JBEST(2,3,I)
            TLMIN(3,I)=TLMIN(2,I)
            TLMIN(2,I)=CLTOT
            JBEST(2,1,I)=JJ
            JBEST(2,2,I)=0
            JBEST(2,3,I)=0
            JBEST(2,4,I)=0
            GO TO 361
351         CONTINUE
            IF(CLTOT.GE.TLMIN(3,I))GO TO 359
            JBEST(4,1,I)=JBEST(3,1,I)
            JBEST(4,2,I)=JBEST(3,2,I)
            JBEST(4,3,I)=JBEST(3,3,I)
            JBEST(4,4,I)=JBEST(3,4,I)
            TLMIN(4,I)=TLMIN(3,I)
            TLMIN(3,I)=CLTOT
            JBEST(3,1,I)=JJ
            JBEST(3,2,I)=0
            JBEST(3,3,I)=0
            JBEST(3,4,I)=0
            GO TO 361
359         CONTINUE
            IF(CLTOT.GE.TLMIN(4,I))GO TO 361
            TLMIN(4,I)=CLTOT
            JBEST(4,1,I)=JJ
            JBEST(4,2,I)=0
            JBEST(4,3,I)=0
            JBEST(4,4,I)=0
361         CONTINUE
            IF(CLTOT.GE.CLMIN(1))GO TO 354
            IBEST(1,JJ)=I
            CLMIN(1)=CLTOT
354         CONTINUE
            IF(ID(JJ).EQ.3.AND.IFIRM(1).EQ.1)GO TO 207
            IF(ID(JJ).EQ.3)GO TO 206
            IF(ITSTAT(I).EQ.2)GO TO 229
            IF(IF3(I).EQ.1)GO TO 229
            IF(IFIRM(1).EQ.1)KOR(I)=0
            GO TO 206
229         CONTINUE
            IF(IFIRM(1).NE.1)GO TO 105
            IF(IF3(I).NE.1)GO TO 222
            DO 222 IND=1,4
            KORT(IND,JJ)=1
222         CONTINUE
            KORT(1,JJ)=1
```

_$1$DUA3:[SSP.TRACKER]TRACORV2AZMM.FOR;7

```
                GO TO 207
    105     CONTINUE
                GO TO 206
    210     CONTINUE
                IF(JFL(I).NE.0)GO TO 209
                IFIRM(IRNG)=1
                TMISS(I)=-100000.
                CLTOT=0
                KOR(I)=1
                DO 227 IND=1,4
                JBEST(1,IND,I)=0
    227     CONTINUE
                JBEST(1,IRNG,I)=JJ
                IF(T.LT.TRF)GO TO 124
                IF(AZM(JJ).LT.AZCORMIN/RAD.OR.AZM(JJ).GT.AZCORMAX/RAD)GO TO 124
                WRITE(31,880)
                IF(IF3(I).EQ.1)GO TO 203
                WRITE(31,881)
    203     CONTINUE
                WRITE(31,870)JJ,ITRKNUM(I)
    124     CONTINUE
    209     CONTINUE
                IF(CLTOT.GE.TLMIN(1,I))GO TO 356
                JBEST(4,1,I)=JBEST(3,1,I)
                JBEST(4,2,I)=JBEST(3,2,I)
                JBEST(4,3,I)=JBEST(3,3,I)
                JBEST(4,4,I)=JBEST(3,4,I)
                TLMIN(4,I)=TLMIN(3,I)
                JBEST(3,1,I)=JBEST(2,1,I)
                JBEST(3,2,I)=JBEST(2,2,I)
                JBEST(3,3,I)=JBEST(2,3,I)
                JBEST(3,4,I)=JBEST(2,4,I)
                TLMIN(3,I)=TLMIN(2,I)
                JBEST(2,1,I)=JBEST(1,1,I)
                JBEST(2,2,I)=JBEST(1,2,I)
                JBEST(2,3,I)=JBEST(1,3,I)
                JBEST(2,4,I)=JBEST(1,4,I)
                TLMIN(2,I)=TLMIN(1,I)
                TLMIN(1,I)=CLTOT
                DO 283 IND=1,4
                JBEST(1,IND,I)=0
    283     CONTINUE
                JBEST(1,IRNG,I)=JJ
                KORW(I)=1
                GO TO 363
    356     CONTINUE
                IF(CLTOT.GE.TLMIN(2,I))GO TO 357
                JBEST(4,1,I)=JBEST(3,1,I)
                JBEST(4,2,I)=JBEST(3,2,I)
                JBEST(4,3,I)=JBEST(3,3,I)
                JBEST(4,4,I)=JBEST(3,4,I)
                TLMIN(4,I)=TLMIN(3,I)
                JBEST(3,1,I)=JBEST(2,1,I)
                JBEST(3,2,I)=JBEST(2,2,I)
                JBEST(3,3,I)=JBEST(2,3,I)
                JBEST(3,4,I)=JBEST(2,4,I)
                TLMIN(3,I)=TLMIN(2,I)
                TLMIN(2,I)=CLTOT
```

_$1$DUA3:[SSP.TRACKER]TRACORV2AZMM.FOR;7

```
                DO 284 IND=1,4
                JBEST(2,IND,I)=0
    284     CONTINUE
                JBEST(2,IRNG,I)=JJ
                GO TO 363
    357     CONTINUE
                IF(CLTOT.GE.TLMIN(3,I))GO TO 362
                JBEST(4,1,I)=JBEST(3,1,I)
                JBEST(4,2,I)=JBEST(3,2,I)
                JBEST(4,3,I)=JBEST(3,3,I)
                JBEST(4,4,I)=JBEST(3,4,I)
                TLMIN(4,I)=TLMIN(3,I)
                TLMIN(3,I)=CLTOT
                DO 285 IND=1,4
                JBEST(3,IND,I)=0
    285     CONTINUE
                JBEST(3,IRNG,I)=JJ
                GO TO 363
    362     CONTINUE
                IF(CLTOT.GE.TLMIN(4,I))GO TO 363
                TLMIN(4,I)=CLTOT
                DO 286 IND=1,4
                JBEST(4,IND,I)=0
    286     CONTINUE
                JBEST(4,IRNG,I)=JJ
    363     CONTINUE
                IF(CLTOT.GE.CLMIN(IRNG))GO TO 360
                IBEST(IRNG,JJ)=I
                CLMIN(IRNG)=CLTOT
    360     CONTINUE
                IF(ITSTAT(I).EQ.2)GO TO 231
                IF(IF3(I).EQ.1)GO TO 231
```

```
            IF(IFIRM(IRNG).EQ.1)KOR(I)=0
            GO TO 206
231         CONTINUE
            IF(IFIRM(IRNG).NE.1)GO TO 206
            IF(IF3(I).NE.1)GO TO 226
            DO 226 IND=1,4
            KORT(IND,JJ)=1
226         CONTINUE
            KORT(IRNG,JJ)=1
            GO TO 207
206         CONTINUE
207         CONTINUE
C
C           END OF REPORT-TRACK CORRELATION
C
C-----------------------------------------------------------------
C
C           RESOLUTION OF NON-FIRM ASSOCIATIONS
C
c           do 9111 j=1,4
c           do 9111 i=1,3000
c           iitrk(i)=0
c           nfirm=0
c           ijkntcp(j,i)=0
c9111       continue
c
_$!#DUA2:[SSP.TRACKER]TRACORV2AZMM.FOR;7 c           do 9483 kk=1,ntrk
c           if(kor(kk).eq.1)nfirm=nfirm+1
c           if(kor(kk).eq.1)write(6,8899)nfirm,iitrk(kk),
c         & ijkntcp(iyy,jbest(ixx,iyy,kk)),kk
c           if(kor(kk).eq.1)go to 9483
c           do 9483 ixx=1,4
c           write(6,8891)
c           do 9483 iyy=1,4
c           ijkntcp(iyy,jbest(ixx,iyy,kk))=ntcp(iyy,jbest(ixx,iyy,kk))+1
c           if(jbest(ixx,iyy,kk).gt.0)iitrk(kk)=iitrk(kk)+1
c           write(6,8890)nfirm,iitrk(kk),ijkntcp(iyy,jbest(ixx,iyy,kk)),kk
c9483       continue 211         CONTINUE
            DO 500 JJ=1,NUMPL
            DO 500 IND=1,4
            NTCP(IND,JJ)=0
            JCUR(IND,JJ)=0
500         CONTINUE
            DO 505 KK=1,NTRK c           DO 777 IXX=1,4
c           DO 777 IYY=1,4
c           IF(KOR(KK).EQ.1)NFIRM=NFIRM+1
c           IF(KOR(KK).EQ.1)GO TO 777
c           IF(JBEST(IXX,IYY,KK).GT.0)IITRK(KK)=IITRK(KK)+1
c777        CONTINUE I=IAOT(KK)
            IF(IPROCESS.EQ.2.AND.REPEAT_SCAN(I).EQ.0)GO TO 505
            IF(LEVEL.EQ.1)GO TO 502
            IF(KOR1(I).EQ.1)GO TO 505
502         CONTINUE
            DO 505 IND=1,4
            IF(JBEST(1,IND,I).EQ.0)GO TO 505
            IF(LEVEL.EQ.1)GO TO 508
            IF(KORT(IND,JBEST(1,IND,I)).NE.0)GO TO 505
508         CONTINUE
            NTCP(IND,JBEST(1,IND,I))=NTCP(IND,JBEST(1,IND,I))+1
505         CONTINUE DO 8889 KK=1,NTRK
c           write(6,8891)
8891        FORMAT(1X,'          ')
            DO 8889 IND=1,4
c           write(6,8890)nfirm,iitrk(kk),ntcp(ind,jbest(1,ind,kk)),kk
8899        format(1x,'*',4(3x,i7))
8890        FORMAT(2x,4(3X,I7))
8889        CONTINUE
504         CONTINUE
c           write(6,8891)
            DO 507 JJ=1,NUMPL
            DO 503 IND=1,4
            IF(NTCP(IND,JJ).NE.0)KORT(IND,JJ)=1
503         CONTINUE
            DO 513 IND=1,4
            IF(NTCP(IND,JJ).EQ.0)GO TO 513
            DLMIN=.9E13
_$!#DUA2:[SSP.TRACKER]TRACORV2AZMM.FOR;7
            IOLD(IND)=0
            DO 509 KK=1,NTRK
            I=IAOT(KK)
            IF(IPROCESS.EQ.2.AND.REPEAT_SCAN(I).EQ.0)GO TO 509
            IF(LEVEL.EQ.1)GO TO 499
            IF(KOR1(I).EQ.1)GO TO 509
```

```
499     CONTINUE
        IF(JBEST(1,IND,I).NE.JJ)GO TO 509
        IF(TLMIN(1,I).GE.DLMIN)GO TO 511
        IF(KOR(I).EQ.1)GO TO 667
667     CONTINUE
        IF(IOLD(IND).NE.0)GO TO 506
        IOLD(IND)=I
        DLMIN=TLMIN(1,I)
        GO TO 509
506     CONTINUE
        KOR(IOLD(IND))=0
        KORW(IOLD(IND))=0
        DLMIN=TLMIN(1,I)
        IOLD(IND)=I
        GO TO 509
511     CONTINUE
        KOR(I)=0
        KORW(I)=0
509     CONTINUE
        IBEST(IND,JJ)=IOLD(IND)
        KORW(IOLD(IND))=1
        JCUR(IND,JJ)=1
        IF(IF3(IOLD(IND)).NE.1)GO TO 501
        DO 501 IX=1,4
        KORT(IX,JJ)=1
501     CONTINUE
        IF(T.LT.TRF)GO TO 904
        IF(AZM(JJ).LT.AZCORMIN/RAD.OR.AZM(JJ).GT.AZCORMAX/RAD)GO TO 904
        WRITE(31,899)JJ,IND,ITRKNUM(IOLD(IND))
899     FORMAT(/1X,27HBEST ASSOCIATION FOR REPORT,I5,7H  RANGE,I2,
       &9H IS TRACK,I5)
904     CONTINUE
513     CONTINUE
507     CONTINUE
        DO 233 JJ=1,NUMPL
        DO 233 IND1=1,3
        DO 233 IND2=IND1+1,4
        IF(IBEST(IND1,JJ).NE.0)GO TO 518
        IF(IBEST(IND2,JJ).NE.0)GO TO 519
        GO TO 233
518     CONTINUE
        IF(IBEST(IND2,JJ).NE.0)GO TO 520
        IF(JCUR(IND1,JJ).EQ.1.AND.IF3(IBEST(IND1,JJ)).EQ.1)
       &KORT(IND2,JJ)=1
        GO TO 233
519     CONTINUE
        IF(JCUR(IND2,JJ).EQ.1.AND.IF3(IBEST(IND2,JJ)).EQ.1)
       &KORT(IND1,JJ)=1
        GO TO 233
520     CONTINUE
        IF(IF3(IBEST(IND1,JJ)).EQ.IF3(IBEST(IND2,JJ)))GO TO 233
        IF(IF3(IBEST(IND1,JJ)).EQ.1)GO TO 521
_$1+DUA3 [SSP.TRACKER]TRACORV2A7MM.FOR;7

KORW(IBEST(IND1,JJ))=0
        KOR(IBEST(IND1,JJ))=0
        GO TO 233
521     CONTINUE
        KORW(IBEST(IND2,JJ))=0
        KOR(IBEST(IND2,JJ))=0
233     CONTINUE
        IF(LEVEL.EQ.MAXLEV)GO TO 235
        LEVEL=LEVEL+1
        DO 243 KK=1,NTRK
        I=IAOT(KK)
        IF(IPROCESS.EQ.2.AND.REPEAT_SCAN(I).EQ.0)GO TO 243
        IF(KOR(I).EQ.0.AND.KORW(I).EQ.0)GO TO 242
        KOR1(I)=1
        GO TO 243
242     CONTINUE
        DO 253 IND=1,4
        JBEST(1,IND,I)=JBEST(LEVEL,IND,I)
253     CONTINUE
        TLMIN(1,I)=TLMIN(LEVEL,I)
243     CONTINUE
        GO TO 211
235     CONTINUE
C
C       NON-FIRM ASSOCIATIONS RESOLVED
C
C-------------------------------------------------------------------
C
C       PUT UNCORRELATED REPORTS IN ARRAY O

IF(IPROCESS.EQ.1)THEN
         NUMUP(ISCAN)=0
         DO 526 JJ=1,NUMPL
         IF(ID(JJ).EQ.0)GO TO 526
         IF(ISCH.GT.1)GO TO 522
         IF(ID(JJ).NE.3)GO TO 526
522      CONTINUE
         IF(KORT(1,JJ).NE.0)GO TO 524
         IF(IDSR23.NE.1)GO TO 523      !IDSR23=0 IF NO ELIM SHORT 2/3 RANGE
         IF(ID(JJ).EQ.3)GO TO 523      !IDSR23=1 IF ELIM SHORT 2/3 RANGE
         IF(RM(1,JJ).EQ.RSMALL(JJ))GO TO 524
```

```
523     CONTINUE                          !IDHDLR=0 IF NOT ELIM HI DOP LONG RANGE
        IF(IDHDLR.NE.1)GO TO 484          !IDHDLR=1 IF ELIM HI DOP-LONG RANGE
        IF(RM(1,JJ).LT.SHORTR)GO TO 484
        IF(DM(1,JJ).LT.HIDOP)GO TO 484
        GO TO 524
484     CONTINUE
        IF(RM(1,JJ).LT.5.)GO TO 524
        NUMUP(ISCAN)=NUMUP(ISCAN)+1
        A(0,1,NUMUP(ISCAN))=RM(1,JJ)
        A(0,2,NUMUP(ISCAN))=AZM(JJ)
        A(0,3,NUMUP(ISCAN))=KTYPE(JJ)
        A(0,4,NUMUP(ISCAN))=ID(JJ)
        A(0,5,NUMUP(ISCAN))=HHOST(JJ)
        A(0,6,NUMUP(ISCAN))=VHOST(JJ)
        A(0,7,NUMUP(ISCAN))=RSIGSIGY(JJ)
        A(0,8,NUMUP(ISCAN))=KHOURS(JJ)
        A(0,9,NUMUP(ISCAN))=KMINS(JJ)
_$1$DUA3:[SSP.TRACKER]TRACORV2AZMM.FOR;7

A(0,10,NUMUP(ISCAN))=KSECS(JJ)
        A(0,11,NUMUP(ISCAN))=KMSECS(JJ)
        A(0,12,NUMUP(ISCAN))=DM(1,JJ)
        A(0,13,NUMUP(ISCAN))=DM(2,JJ)
        A(0,14,NUMUP(ISCAN))=DM(3,JJ)
        A(0,15,NUMUP(ISCAN))=FF(JJ)
        A(0,16,NUMUP(ISCAN))=AZMRS(JJ)
        A(0,17,NUMUP(ISCAN))=NNZR(JJ)
        A(0,18,NUMUP(ISCAN))=HLAT(JJ)
        A(0,19,NUMUP(ISCAN))=HLON(JJ)
        A(0,20,NUMUP(ISCAN))=VEAST(JJ)
        A(0,21,NUMUP(ISCAN))=VNORTH(JJ)
        A(0,22,NUMUP(ISCAN))=ELCOM(JJ)
        A(0,23,NUMUP(ISCAN))=KTYPE(JJ)
        ITYPA(0,NUMUP(ISCAN))=ITYP(JJ)
        KMODA(0,NUMUP(ISCAN))=KMODE(JJ)
        DMRAWA(0,NUMUP(ISCAN))=DMRAW(1,JJ)
524     CONTINUE
        IF(ID(JJ).EQ.3)GO TO 526
        DO 526 IND=2,4,1
        IF(KORT(IND,JJ).NE.0)GO TO 526
        IF(IDSR23.NE.1)GO TO 487
        IF(RM(IND,JJ).EQ.RSMALL(JJ))GO TO 526
487     CONTINUE
        IF(IDHDLR.NE.1)GO TO 485
        IF(RM(IND,JJ).LT.SHORTR)GO TO 485
        IF(DM(1,JJ).LT.HIDOP)GO TO 485
        GO TO 526
485     CONTINUE
        IF(RM(IND,JJ).LT.5.)GO TO 526
        NUMUP(ISCAN)=NUMUP(ISCAN)+1
        A(0,1,NUMUP(ISCAN))=RM(IND,JJ)
        A(0,2,NUMUP(ISCAN))=AZM(JJ)
        A(0,3,NUMUP(ISCAN))=KTYPE(JJ)
        A(0,4,NUMUP(ISCAN))=ID(JJ)
        A(0,5,NUMUP(ISCAN))=HHOST(JJ)
        A(0,6,NUMUP(ISCAN))=VHOST(JJ)
        A(0,7,NUMUP(ISCAN))=RSIGSIGY(JJ)
        A(0,8,NUMUP(ISCAN))=KHOURS(JJ)
        A(0,9,NUMUP(ISCAN))=KMINS(JJ)
        A(0,10,NUMUP(ISCAN))=KSECS(JJ)
        A(0,11,NUMUP(ISCAN))=KMSECS(JJ)
        A(0,12,NUMUP(ISCAN))=DM(1,JJ)
        A(0,13,NUMUP(ISCAN))=DM(2,JJ)
        A(0,14,NUMUP(ISCAN))=DM(3,JJ)
        A(0,15,NUMUP(ISCAN))=FF(JJ)
        A(0,16,NUMUP(ISCAN))=AZMRS(JJ)
        A(0,17,NUMUP(ISCAN))=NNZR(JJ)
        A(0,18,NUMUP(ISCAN))=HLAT(JJ)
        A(0,19,NUMUP(ISCAN))=HLON(JJ)
        A(0,20,NUMUP(ISCAN))=VEAST(JJ)
        A(0,21,NUMUP(ISCAN))=VNORTH(JJ)
        A(0,22,NUMUP(ISCAN))=ELCOM(JJ)
        A(0,23,NUMUP(ISCAN))=KTYPE(JJ)
C       IF(NUMUP(ISCAN).GT.1500) PRINT*,'NUMUP()=',NUMUP(ISCAN),ISCAN,JJ
        ITYPA(0,NUMUP(ISCAN))=ITYP(JJ)
        KMODA(0,NUMUP(ISCAN))=KMODE(JJ)
        DMRAWA(0,NUMUP(ISCAN))=DMRAW(1,JJ)
_$1$DUA3:[SSP.TRACKER]TRACORV2AZMM.FOR;7

526     CONTINUE
        IF(F.LT.TRF)GO TO 528
        IF(AZM(JJ).LT.AZCORMIN/RAD.OR.AZM(JJ).GT.AZCORMAX/RAD)GO TO 528
        WRITE(31,864)NUMUP(ISCAN)
864     FORMAT(/1X,I5,39H   UNCORRELATED REPORTS SAVED IN ARRAY 0)
        DO 528 JJ=1,NUMUP(ISCAN)
        WRITE(31,851)JJ,INT(A(0,3,JJ)),A(0,1,JJ),A(0,2,JJ)*RAD,
     *  A(0,12,JJ)*3600.,A(0,13,JJ)*3600.,A(0,14,JJ)*3600.,
     *  A(0,15,JJ)*3600.,INT(A(0,4,JJ))
851     FORMAT(1X,2I5,2X,2F8.3,4F11.3,I3)
528     CONTINUE
        ENDIF
```

```
C
C       ARRAY O IS COMPLETE
C
C----------------------------------------------------------------------
C
C       UPDATE TRACKS

DO 239 KK=1,NTRK
        I=IAOT(KK)
        IF(ITSTAT(I).EQ.3)GO TO 239            !DROPPED TRACK

IF(SKIP_SCAN(I).EQ.1) THEN
            TLAST(I)=TLAST(I)+10.              !REFLECT THAT A SCAN HAS GONE BY
            SKIP_SCAN(I) = 0
            GO TO 239         !DONT WANT TO UPDATE OR COAST THIS SCAN
        ENDIF

IF(IPROCESS.EQ.2.AND.REPEAT_SCAN(1).EQ.0)GO TO 239

IF(KOR(I).EQ.1.OR.KORW(I).EQ.1)CORR_FLAG(I)=1

!   DETERMINE WHETHER TRACK CORRELATED WITH A REPORT
        IF(CORR_FLAG(I).EQ.0)THEN
        IF(ITSTAT(I).EQ.1)NTC=NTC+1
        IF(ITSTAT(I).EQ.2)NEC=NEC+1
        IF(T.LT.TRF)GO TO 183
        IF(AZM(JJ).LT.AZCORMIN/RAD.OR.AZM(JJ).GT.AZCORMAX/RAD)GO TO 183
        IF(ITSTAT(I).EQ.1)GO TO 182
        WRITE(31,980)ITRKNUM(I)
980     FORMAT(/1X,5HTRACK,I5,9H   COAST:,5X,1HE,6H     -1,I8)
        GO TO 184
182     CONTINUE
        WRITE(31,982)ITRKNUM(I)
982     FORMAT(/1X,5HTRACK,I5,9H   COAST:,5X,1HT,6H     -1,I8)
184     CONTINUE
        WRITE(31,894)RP(I),AZP(I)*RAD,DP(I)*3600.
183     CONTINUE
        ISF=ITSTAT(I)
        IF(IDROP(I).EQ.1)ISF=3
        IF(ITSTAT(I).EQ.2)GO TO 178
        IF(IUNP(I).GE.7)ISF=3
        IF(IF3(I).EQ.1)GO TO 178
        IF(IDROP(I).EQ.5)ISF=3
178     CONTINUE
#1#DUAD LEEP TRACKER]TRACORV2AZMM FOR, 7

IF(IEI.EQ.1)THEN
        CALL OUTPUT(ISCAN-1,ICTN(I),ICTR(I),ITRKNUM(I),ISF,0,
     +  0 ,0 ,0 ,0,
     +  0 ,0,0,0,0,
     +  0,0,RP(I),AZP(I),DP(I),XP(I),YP(I),0.,0.,0.,0.,0.,0.,0,0.,0.,
     +  XDOTP(I),YDOTP(I),MANEUVER_FLAG(I),0.,0.,0.,0 )
        ENDIF

AZP_BEFORE = AZP(I)                    !STORE VALUE BEFORE COAST

IF(UPDATE_THIRD(I).EQ.1)THEN           !STANDARD COAST EQUATIONS

RP(I) = RP(I) + TUP*DP(I)
            XP(I) = XP(I) + TUP*XDOTP(I)
            YP(I) = YP(I) + TUP*YDOTP(I)
            AZP(I) = ATAN2(XP(I),YP(I))
            IF(AZP(I).LT.0)AZP(I)=AZP(I)+TWOPI
            IF(AZP(I).GT.TWOPI)AZP(I)=AZP(I)-TWOPI
            NCOAST(I) = NCOAST(I) + 1

ELSE

XP(I)=XP(I) + XDOTP(I)*TUP
            YP(I)=YP(I) + YDOTP(I)*TUP
            RP(I)=RP(I) + DP(I)*TUP
            DP(I)=DP(I)
            AZP(I) = ATAN2(XP(I),YP(I))
            IF(AZP(I).LT.0)AZP(I)=AZP(I)+TWOPI
            IF(AZP(I).GT.TWOPI)AZP(I)=AZP(I)-TWOPI
            NCOAST(I) = NCOAST(I) + 1

ENDIF

IF(T.LT.TRF)GO TO 185
        IF(AZM(JJ).LT.AZCORMIN/RAD.OR.AZM(JJ).GT.AZCORMAX/RAD)GO TO 185
        WRITE(31,894)RP(I),AZP(I)*RAD,DP(I)*3600.
185     CONTINUE

IF(IPROCESS.EQ.1)THEN

IF(AZP_BEFORE.GT.350./RAD.AND.AZP(I).LT.10./RAD)THEN
                SKIP_SCAN(I)=1
            ELSE
                SKIP_SCAN(I)=0
            ENDIF
```

```
            IF(AZP_BEFORE.LT.10./RAD.AND.AZP(I).GT.350./RAD)THEN
               REPEAT_SCAN(I)=1
            ELSE
               REPEAT_SCAN(I)=0
            ENDIF

ENDIF

IDROP(I)=IDROP(I)-1
_#1*DUA3 [GSP TRACKER]TRACORV2AZMM.FOR;7

IF(ITSTAT(I).EQ.2)GO TO 131
         IF(IDROP(I).EQ.0)GO TO 132
         IUNP(I)=IUNP(I)+1
         IF(IF3(I).EQ.0)GO TO 130
         IF(IUNP(I).EQ.8)GO TO 132            !3 CHANGED TO 8
         GO TO 189
130      CONTINUE
         IF(IDROP(I).EQ.4)GO TO 132
         IF(IUNP(I).GE.8)GO TO 132
         GO TO 189
131      CONTINUE
         IF(IDROP(I).NE.0)GO TO 189
127      CONTINUE
         AZP(I)=10.
         ITSTAT(I)=3
         NED=NED+1
         IF(T.LT.TRF)GO TO 189
         IF(AZM(JJ).LT.AZCORMIN/RAD.OR.AZM(JJ).GT.AZCORMAX/RAD)GO TO 189
         WRITE(31,875)ITRKNUM(I)
875      FORMAT(/1X,17HESTABLISHED TRACK,I5,9H  DROPPED,2I8/)
         GO TO 189
132      CONTINUE
         AZP(I)=10.
         ITSTAT(I)=3
         NTD=NTD+1
         IF(T.LT.TRF)GO TO 189
         IF(AZM(JJ).LT.AZCORMIN/RAD.OR.AZM(JJ).GT.AZCORMAX/RAD)GO TO 189
         WRITE(31,877)ITRKNUM(I)
877      FORMAT(/1X,15HTENTATIVE TRACK,I5,9H  DELETED,2I8/)
189      CONTINUE

ELSE

IF(ITSTAT(I).EQ.1)NTU=NTU+1
         IF(ITSTAT(I).EQ.2)NEU=NEU+1
         IPROM=0
         DO 199 IND=1,4
         IF(JBEST(1,IND,I).EQ.0)GO TO 199
         JJ=JBEST(1,IND,I)
         RMEAS=RM(IND,JJ)
c        if(xxzz.eq.0.0)print*,'rmeas= ',rmeas
         GO TO 237
199      CONTINUE
237      CONTINUE
         IDOP=1
         DOPDIF=ABS(DM(1,JJ)-DP(I))
         DO 170 IND=2,4,1
         IF(DM(IND,JJ).EQ.0.)GO TO 170
         IF(ABS(DM(IND,JJ)-DP(I)).GT.DOPDIF)GO TO 170
         DOPDIF=ABS(DM(IND,JJ)-DP(I))
         IDOP=IND
170      CONTINUE
         IF(DM(2,JJ).NE.0)THEN
            PSIGSIGY(JJ)=-RSIGSIGY(JJ)
            IRDOT_FLAG(I)=1
         ENDIF
_#1*DUA3 [GSP TRACKER]TRACORV2AZMM.FOR;7

SAVE CURRENT PREDICTIONS FOR WRITING TO OUTPUT

RPOLD=RP(I)
         XPOLD=XP(I)
         YPOLD=YP(I)
         AZPOLD=AZP(I)
         XDOTPOLD=XDOTP(I)
         YDOTPOLD=YDOTP(I)
         DPOLD=DP(I)

! IF THIS IS THE FIRST UPDATE (THIRD SAMPLE) THEN CORRECT
! THE PREDICTIONS BEFORE GOING THRU THE MANEUVER MECHANISM

IF(UPDATE_THIRD(I).EQ.0)THEN
            ISCAN_SECOND(I) = ISCAN
            UPDATE_THIRD(I) = 1
            XP(I)=RMEAS*SIN(AZM(JJ))
            XDOTP(I)=(XP(I)-XFIRST(I))/(T-TIMEFIRST(I))
```

```
                YP(I)=RMEAS*COS(AZM(JJ))
                YDOTP(I)=(YP(I)-YFIRST(I))/(T-TIMEFIRST(I))

RP(I)=RMEAS
                DP(I)=DM(IDOP,JJ)

AZP(I) = ATAN2(XP(I),YP(I))
                IF(AZP(I).LT.0)AZP(I)=AZP(I)+TWOPI
                IF(AZP(I).GT.TWOPI)AZP(I)=AZP(I)-TWOPI

ENDIF

! COMPUTE THE DRIVING ERRORS (MEASURED - PREDICTED)
            DELTA_R(I) = RMEAS - RP(I)
            DELTA_RDOT(I) = DM(IDOP,JJ) - DP(I)
            IF(ABS(DELTA_RDOT(I)).GT.100./3600..AND.IRDOT_FLAG(I).EQ.1)THEN
                DELTA_RDOT(I)=0
            ENDIF
            DELTA_AZ(I) = AZM(JJ) - AZP(I)
            IF(DELTA_AZ(I).LT.-PI)DELTA_AZ(I)=DELTA_AZ(I)+TWOPI
            IF(DELTA_AZ(I).GT.PI)DELTA_AZ(I)=DELTA_AZ(I)-TWOPI
            XM(JJ) = RMEAS * SIN(AZM(JJ))
            YM(JJ) = RMEAS * COS(AZM(JJ))
            DELTA_X(I) = XM(JJ) - XP(I)
            DELTA_Y(I) = YM(JJ) - YP(I)

IF(T.LT.TRF)GO TO 125
            IF(AZM(JJ).LT.AZCORMIN/RAD.OR.AZM(JJ).GT.AZCORMAX/RAD)GO TO 125
            IF(ITSTAT(I).EQ.1)GO TO 186
            WRITE(31,984)ITRKNUM(I)
984         FORMAT(/1X,5HTRACK,I5,10H   UPDATE:,5X,1HE,2I8)
            GO TO 188
186         CONTINUE
            WRITE(31,990)ITRKNUM(I)
990         FORMAT(/1X,5HTRACK,I5,10H   UPDATE:,5X,1HT,2IP)
  *1*DUAJ [SSP TRACKER]TRACORVZA/MM FOR,7

188         CONTINUE
            WRITE(31,894)RP(I),AZP(I)*RAD,DP(I)*3600.
125         CONTINUE
            IUP=ID(JJ)
            IDROP(I)=7
            IF(ITSTAT(I).EQ.1)GO TO 133
            GO TO 136
133         CONTINUE
            IF(IF3(I).EQ.0)GO TO 134
            NUM_UPDATE(I)=NUM_UPDATE(I)+1
            IF(NUM_UPDATE(I).LT.NUM_REPORTS_UPDATE) THEN
                IUNP(I)=IUNP(I)+1
                GO TO 136
            ENDIF
            ITSTAT(I)=2
            ICONS=ICONS+1
            ICTN(I)=ICONS
            IPROM=1
            GO TO 136
134         CONTINUE
            IF(ID(JJ).NE.3)GO TO 135
            NUM_UPDATE(I)=NUM_UPDATE(I)+1
            IF(NUM_UPDATE(I).LT.NUM_REPORTS_UPDATE)THEN
                IF3(I)=1
                IUNP(I)=IUNP(I)+1
                GO TO 136
            ENDIF
            ITSTAT(I)=2
            ICONS=ICONS+1
            ICTN(I)=ICONS
            IF3(I)=1
            IPROM=1
            GO TO 136
135         CONTINUE
            NUM_UPDATE(I)=NUM_UPDATE(I)+1
            IUNP(I)=IUNP(I)+1
            IF(IUNP(I).EQ.8)ITSTAT(I)=3
136         CONTINUE

! DECIDE WHETHER TO USE THE SMOOTH OR MANEUVER WEIGHTS

IF(MANEUVER_FLAG(I).EQ.1)THEN
                CALL MANEUVER(I)
            ELSE
                CALL SMOOTH(I,JJ,IDOP)
            ENDIF

! TRACKING EQUATIONS

RP(I) = RP(I) + WEIGHT_R(I)*DELTA_R(I)+
     %      TUP*DP(I)

DP(I) = DP(I) + WEIGHT_RDOT(I)*DELTA_RDOT(I)
```

```
_$1$DUA3 [SSP TRACKER]TRACORV2AZMM.FOR;7

YP(I) = XP(I) + WEIGHT_POS(I)*DELTA_X(I)
     &   + TUP*XDOTP(I)

XDOTP(I) = XDOTP(I)+WEIGHT_POSDOT(I)*DELTA_X(I)
     &   /(TUP*(NCOAST(I)+1))

YP(I) = YP(I) + WEIGHT_POS(I)*DELTA_Y(I)
     &   + TUP*YDOTP(I)

YDOTP(I) = YDOTP(I)+WEIGHT_POSDOT(I)*DELTA_Y(I)
     &   /(TUP*(NCOAST(I)+1))

AZP(I) = ATAN2(XP(I),YP(I))
      IF(AZP(I).LT.0)AZP(I)=AZP(I)+TWOPI
      IF(AZP(I).GT.TWOPI)AZP(I)=AZP(I)-TWOPI

NCOAST(I) = 0

VX=XDOTP(I)+VHOST(JJ)*SIN(HHOST(JJ))
      VY=YDOTP(I)+VHOST(JJ)*COS(HHOST(JJ))
      HTRK(I)=ATAN2(VX,VY)
      IF(HTRK(I).LT.0.)HTRK(I)=HTRK(I)+TWOPI
      VTRK(I)=SQRT(VX*VX+VY*VY)

IF(AZPOLD.GT.350./RAD.AND.AZP(I).LT.10./RAD)THEN
         SKIP_SCAN(I)=1
      ELSE
         SKIP_SCAN(I)=0
      ENDIF

IF(AZPOLD.LT.10./RAD.AND.AZP(I).GT.350./RAD)THEN
         REPEAT_SCAN(I)=1
      ELSE
         REPEAT_SCAN(I)=0
      ENDIF
C
      IF(IPROM.EQ.1)NFT=NFT+1
      IF(T.LT.TRF)GO TO 234
      IF(AZM(JJ).LT.AZCORMIN/RAD.OR.AZM(JJ).GT.AZCORMAX/RAD)GO TO 234
      WRITE(31,894)RP(I),AZP(I)*RAD,DP(I)*3600.
894   FORMAT(1X,3F11.3)
      IF(IPROM.NE.1)GO TO 234
      WRITE(31,876)ITRKNUM(I)
876   FORMAT(/1X,5HTRACK,I5,25H   PROMOTED TO ESTABLISHED,/)
234   CONTINUE
      RAN1(I)=RMEAS
      VHOST1(I)=VHOST(JJ)

IF(REPEAT_SCAN(I).EQ.1)THEN
         TLAST(I)=T-10.
      ELSE
         TLAST(I)=T
      ENDIF
$1*DUA3 [SSP TRACKER]TRACORV2A/MM.FOR;7
      DOP(I)=DM(IDOP,JJ)
      AZMPSI(I)=AZMRS(JJ)
      IF(IST.NE.1)GO TO 407
      IF(IDOP.EQ.1) THEN
         DMSAV2=DM(2,JJ)
         DMSAV3=DM(3,JJ)
         DMSAV4=DM(4,JJ)
      ELSEIF (IDOP.EQ.2) THEN
         DMSAV2=DM(1,JJ)
         DMSAV3=DM(3,JJ)
         DMSAV4=DM(4,JJ)
      ELSEIF (IDOP.EQ.3) THEN
         DMSAV2=DM(1,JJ)
         DMSAV3=DM(2,JJ)
         DMSAV4=DM(4,JJ)
      ELSE
         DMSAV2=DM(1,JJ)
         DMSAV3=DM(2,JJ)
         DMSAV4=DM(3,JJ)
      ENDIF

CALL OUTPUT(ISCAN-1,ICTN(I),ICTR(I),ITRKNUM(I),ITSTAT(I),1,
     &RMEAS,AZM(JJ),AZMRS(JJ),DM(IDOP,JJ),
     &RSIGSIGY(JJ),KRLS(JJ),KRNS(JJ),ITYP(JJ),KHOURS(JJ),KMINS
     &(JJ),KSECS(JJ),KMSECS(JJ),RPOLD,AZPOLD,DPOLD,XPOLD,YPOLD
     &,FF(JJ),HLAT(JJ),HLON(JJ),VEAST(JJ),VNORTH(JJ)
     &,ELCOM(JJ),KMODE(JJ),HTRK(I),VTRK(I),XDOTPOLD,YDOTPOLD
     &,MANEUVER_FLAG(I),DMRAW(IDOP,JJ),DMSAV2,DMSAV3,DMSAV4)
407   CONTINUE
238   CONTINUE
      IF(ITSTAT(I).NE.3)GO TO 168
      AZP(I)=10
      NTD=NTD+1
      IF(T.LT.TRF)GO TO 168
```

```
         IF(AZM(JJ).LT.AZCORMIN/RAD.OR.AZM(JJ).GT.AZCORMAX/RAD)GO TO 168
         WRITE(31,877)ITRKNUM(1)
168      CONTINUE
         ENDIF            !CORR_FLAG .EQ. 0
         CALL AZORT(KK)
239      CONTINUE
         IFG=0
         IUP=0

IF(IPROCESS.EQ.1)THEN
            NUMPL=0
            DO JJ=1,NUMUP(ISCAN)
               IF(A(0,2,JJ).GT.350./RAD)THEN
               NUMPL=NUMPL+1
               RM(1,NUMPL)=A(0,1,JJ)
               AZM(NUMPL)=A(0,2,JJ)
               KTYPE(NUMPL)=A(0,3,JJ)
               ID(NUMPL)=A(0,4,JJ)
               HHOST(NUMPL)=A(0,5,JJ)
               VHOST(NUMPL)=A(0,6,JJ)
               RSIGSIGY(NUMPL)=A(0,7,JJ)
               KHOURS(NUMPL)=A(0,8,JJ)
               KMINS(NUMPL)=A(0,9,JJ)
               KSECS(NUMPL)=A(0,10,JJ)
*INCLUDE    TRACKER]TRACORV.AZMM.FOR;

HMSGS(NUMPL)=A(0,11,JJ)
               PM(1,NUMPL)=A(0,12,JJ)
               PM(2,NUMPL)=A(0,13,JJ)
               PM(3,NUMPL)=A(0,14,JJ)
               FF(NUMPL)=A(0,15,JJ)
               AZMRS(NUMPL)=A(0,16,JJ)
               HNZR(NUMPL)=A(0,17,JJ)
               HLAT(NUMPL)=A(0,18,JJ)
               HLON(NUMPL)=A(0,19,JJ)
               VEAST(NUMPL)=A(0,20,JJ)
               VNORTH(NUMPL)=A(0,21,JJ)
               CLCOM(NUMPL)=A(0,22,JJ)
               STYPE(NUMPL)=A(0,23,JJ)
               ITYP(NUMPL)=ITYPA(0,JJ)
               KMODE(NUMPL)=KMODA(0,JJ)
               DMRAW(1,NUMPL)=DMRAWA(0,JJ)
               ENDIF !A(0,2,JJ)
            ENDDO !JJ
         ENDIF !IPROCESS = 1

ENDDO 'IPROCESS

C
C***************************************************************************
C
C      = PLOT-PLOT CORRELATION
C
         IAZONE=0
         ISP1=0
         AELT=5./RAD
         AZLO=4./RAD
         AZHI=356./RAD
         CD=50./3600.      !NOT INCREASING WITH AGE OF STORED REPORT
         AZLIMIN=4./RAD
         CRIN=6.67         !FORMERLY 8., BUT 6.67 ACCOMODATES 2400 KTS
         NEL(0)=0          !COULD EVENTUALLY BE SMALLER, 3.33
         NPCOR(0)=0
         DO 498 JJ=1,NUMUP(ISCAN)
         ICOR(0,JJ)=0
498      CONTINUE
         DO 4444 IA=1,IOP
         IF(ISCAN.GT.IOP)GO TO 510
         IF(ISCAN.EQ.IA)GO TO 630
510      CONTINUE
         CR=IA*CRIN
         AZLIM=IA*AZLIMIN
         NPCOR(IA)=0    !# ELTS OF ARRAY IA COR WITH RPTS IN AO
         NEL(IA)=0      !# ELTS OF ARRAY IA ELIM AS AMBIGUOUS
         DO 512 I=1,L(IA)
         ICOR(IA,I)=0
512      CONTINUE
         IPNT=0
C
C-----------------------------------------------------------------
C
C      PROCESS REPORTS IN AO
C
         DO 536 JJ=1,NUMUP(ISCAN)
*INCLUDE    TRACKER]TRACORV.AZMM.FOR;

IF(A(0,4,JJ).EQ.3)THEN                               !ONLY CHECK 3/3'S
            IF(A(0,15,JJ).LT..25.OR.A(0,15,JJ).GT.50.)GO TO 536  !CHECK FORM FACTOR
         ENDIF

IF(A(0,17,JJ).GT.MAXNR)GO TO 536
         IF(A(0,4,JJ).EQ.0)GO TO 536
```

```
C
C-----------------------------------------------------------------
C
C       COMPUTE ANGULAR ZONE FOR REPORT JJ IN AO
C
        IAZONE=IAZONE+1
        AZON=A(0,2,JJ)
        ABEG=AZON-AEXT
        AEND=AZON+AEXT
        ICTOP=0
        ICBOT=0
        ISMALL=0
        ILARGE=0
        IF(AZON.LT.AZLO)ISMALL=1
        IF(AZON.GT.AZHI)ILARGE=1
C
C-----------------------------------------------------------------
C
C       SET A(IA) POINTER FOR REPORT JJ IN AO
C
496     CONTINUE
        IF(IPNT.EQ.0)GO TO 495
        IF(ABEG.GT.A(IA,2,IPNT))GO TO 495
        ISP1=ISP1+1
        IPNT=IPNT-1
        GO TO 496
495     CONTINUE
        IF(IPNT+1.LE.L(IA))GO TO 390
        IF(ISMALL.EQ.1)GO TO 395
        IF(ILARGE.EQ.1)GO TO 393
        GO TO 536
390     CONTINUE
        IF(ABEG.LE.A(IA,2,IPNT+1))GO TO 494
        ISP1=ISP1+1
        IPNT=IPNT+1
        GO TO 495
494     CONTINUE
C
C-----------------------------------------------------------------
C
C       PROCESS REPORTS IN A(IA)
C
        DO 534 KK=1,L(IA)
        IF(ICTOP.EQ.1)GO TO 394
        IF(ICBOT.EQ.1)GO TO 396
        IF(IPNT+1.LE.L(IA))GO TO 391
        IF(ISMALL.EQ.1)GO TO 395
        IF(ILARGE.EQ.1)GO TO 393
        GO TO 536
391     CONTINUE
        IF(A(IA,2,IPNT+1).LE.AEND)GO TO 392
_$!$DUA3 [SSP.TRACKER]TRACORV2AZMM.FOR;7

IF(ISMALL.EQ.1)GO TO 395
        IF(ILARGE.EQ.1)GO TO 393
        GO TO 536
392     CONTINUE
        IPNT=IPNT+1
        I=IPNT
        GO TO 397
393     CONTINUE
        ICTOP=1
        IPTOP=0
394     CONTINUE
        IF(IPTOP+1.GT.L(IA))GO TO 536
        IPTOP=IPTOP+1
        I=IPTOP
        IF(A(IA,2,I).GT.AZLO)GO TO 536
        GO TO 397
395     CONTINUE
        ICBOT=1
        IPBOT=L(IA)+1
396     CONTINUE
        IF(IPBOT-1.LT.1)GO TO 536
        IPBOT=IPBOT-1
        I=IPBOT
        IF(A(IA,2,I).LT.AZHI)GO TO 536
397     CONTINUE

IF(A(IA,4,I).EQ.3)THEN                                      !ONLY CHECK 3/3'S
          IF(A(IA,15,I).LT..25.OR.A(IA,15,I).GT.50.)GO TO 534       !CHECK FORM FACTOR
        ENDIF

IF(A(IA,17,I).GT.MAXNR)GO TO 534
        IF(A(IA,4,I).EQ.0)GO TO 534
        IF(ISCH.NE.3)GO TO 535
        IF(A(IA,4,I).EQ.2.AND.A(0,4,JJ).EQ.2)GO TO 534
535     CONTINUE
        IF(NODOP.EQ.1)GO TO 555
        DO 553 IND=12,12,1
        IF(A(0,IND,JJ).EQ.0.)GO TO 553
        DO 553 JND=12,12,1
        IF(A(IA,JND,I).EQ.0.)GO TO 553
```

```
      IF(ABS(A(0,IND,JJ)-A(IA,JND,I))/IA.GE.CD)GO TO 553

DELTAR=A(0,1,JJ)-(A(IA,1,I)+A(IA,JND,I)*IA*TAU)

IF(ABS(DELTAR).GE.CRD)GO TO 553
      RCHANGE=A(0,1,JJ)-A(IA,1,I)
C     IF(ABS(RCHANGE)/IA.GE..07)GO TO 550
C     DELV=(A(0,IND,JJ)-A(IA,6,I)*COS(AZON))/IA

DELV=A(0,IND,JJ)
      IF(ABS(DELV).LT.20./3600.)GO TO 553

DELV=A(IA,JND,I)
      IF(ABS(DELV).LT.20./3600.)GO TO 553

C     IF(ABS(DELV).LT.10./3600.)GO TO 553
_$1$DUA3:[SP.TRACKER]TRACORV2AZMM.FOR;7
C     DRDOT=RCHANGE/(IA*TAU)
C     IF(ABS(DELV-DRDOT).GE.20/3600.)GO TO 553

DMAVE = (A(0,IND,JJ)+A(IA,JND,I))/2.
      RCOMP = DMAVE*IA*10
      RREAS=ABS(RCOMP-RCHANGE)/IA
C     RREAS=ABS(RCOMP-RCHANGE)   !7/30/85
      IF(RREAS.GT.0.2)GO TO 553

550   CONTINUE

DELA3=IA*TAU*A(IA,6,I)*SIN(A(IA,2,I)-A(IA,5,I))/(A(IA,1,I)
     &-IA*TAU*A(IA,6,I)*COS(A(IA,2,I)-A(IA,5,I)))

ADIF=AZON-A(IA,2,I)-DELA3
      IF(ADIF.GT.PI)ADIF=ADIF-TWOPI
      IF(ADIF.LT.-PI)ADIF=ADIF+TWOPI
      CA=ATAN2(IA*TAU*(SQRT(VMAX**2-A(IA,JND,I)**2)),A(IA,1,I))+1.7*SIGA

IF(CA.GT.AZLIM)CA=AZLIM
      IF(ABS(ADIF).GE.CA)GO TO 553
551   CONTINUE
552   CONTINUE
      IS=IND
      JS=JND
      GO TO 406
553   CONTINUE
      RCHANGE=A(0,1,JJ)-A(IA,1,I)
      IF(ABS(RCHANGE).GE.CR)GO TO 534
      IF(ABS(RCHANGE).GE..07)GO TO 832
      IF(379..LT.A(0,1,JJ).AND.A(0,1,JJ).LT.380.)GO TO 534  !SOME GHOST
      IF(362..LT.A(0,1,JJ).AND.A(0,1,JJ).LT.363.)GO TO 534  !RANGES
      IF(233..LT.A(0,1,JJ).AND.A(0,1,JJ).LT.234.)GO TO 534
      IF(150.5.LT.A(0,1,JJ).AND.A(0,1,JJ).LT.151.5)GO TO 534
      IF(146..LT.A(0,1,JJ).AND.A(0,1,JJ).LT.147.)GO TO 534
832   CONTINUE
      DELA3=IA*TAU*A(IA,6,I)*SIN(A(IA,2,I)-A(IA,5,I))/(A(IA,1,I)
     &-IA*TAU*A(IA,6,I)*COS(A(IA,2,I)-A(IA,5,I)))
      ADIF=AZON-A(IA,2,I)-DELA3
      IF(ADIF.GT.PI)ADIF=ADIF-TWOPI
      IF(ADIF.LT.-PI)ADIF=ADIF+TWOPI
      CA=ATAN2(IA*TAU*VMAX,A(IA,1,I))+1.7*SIGA
      IF(CA.GT.AZLIM)CA=AZLIM
      IF(ABS(ADIF).GE.CA)GO TO 534
406   CONTINUE
      IF(NTRK.EQ.0)GO TO 554
      IF(ITSTAT(IAOT(NTRK)).NE.3)GO TO 554
      INEW=IAOT(NTRK)
      GO TO 556
554   CONTINUE
      NTRK=NTRK+1
      INEW=NTRK
      IAOT(INEW)=INEW
      ITRKNUM(NTRK)=NTRK
556   CONTINUE
      IF(T.EQ.10)PRINT*, INEW
_$1$DUA3:[SP.TRACKER]TRACORV2AZMM.FOR;7

IF(T.LT.TRF)GO TO 558
      IF(AZM(JJ).LT.AZCORMIN/RAD.OR.AZM(JJ).GT.AZCORMAX/RAD)GO TO 558
      WRITE(31,859)JJ,I,IA
859   FORMAT(/1X,6HREPORT,I5,16H COR WITH REPORT,I5,14H  OF OLD ARRAY,
     &I5)
      WRITE(31,853)ITRKNUM(INEW)
853   FORMAT(/1X,21HNEW TRACK NUMBER IS  ,I6,I16)
558   CONTINUE
      ILAST(INEW)=T
      TLASTXY(INEW)=T
      IDROP(INEW)=7
      IUNP(INEW)=0
      ITSTAT(INEW)=1
      TMISS(INEW)=-100000
```

```
      NTI=NTI+1
      IF3(INEW)=0
      IF(A(O,4,JJ).EQ.3 OR.A(IA,4,1).EQ.3)IF3(INEW)=1
C
C     X-Y TRACK INITIALIZATION
C
      XCUR=A(O,1,JJ)*SIN(A(O,2,JJ))
      YCUR=A(O,1,JJ)*COS(A(O,2,JJ))
      XOLD=A(IA,1,I)*SIN(A(IA,2,I))
      YOLD=A(IA,1,I)*COS(A(IA,2,I))

XDOTP(INEW)=(XCUR-XOLD)/(IA*TAU)
      YDOTP(INEW)=(YCUR-YOLD)/(IA*TAU)

VX=XDOTP(INEW)+A(IA,6,I)*SIN(A(IA,5,I))
      VY=YDOTP(INEW)+A(IA,6,I)*COS(A(IA,5,I))
      VTRK(INEW)=SQRT(VX*VX+VY*VY)

HTRK(INEW)=ATAN2(VX,VY)
      IF(HTRK(INEW).GT.TWOPI)HTRK(INEW)=HTRK(INEW)-TWOPI
      IF(HTRK(INEW).LT.O.)HTRK(INEW)=HTRK(INEW)+TWOPI

XP(INEW)=XCUR+XDOTP(INEW)*TAU
      YP(INEW)=YCUR+YDOTP(INEW)*TAU

AZP(INEW)=(((A(O,2,JJ)-A(IA,2,I))/(IA*TAU))*TAU)+A(O,2,JJ)
      IF(AZP(INEW).GT.TWOPI)AZP(INEW)=AZP(INEW)-TWOPI
      IF(AZP(INEW).LT.O)AZP(INEW)=AZP(INEW)+TWOPI

RP(INEW)=A(O,1,JJ) + A(O,IS,JJ)*TAU
      DP(INEW)=A(O,IS,JJ)

AZMRS1(INEW)=A(O,16,JJ)
      DOP1(INEW)=A(O,IS,JJ)
      RAN1(INEW)=A(O,1,JJ)

ISCAN_FIRST(INEW)=ISCAN-IA
      ISCAN_SECOND(INEW)=ISCAN

UPDATE_THIRD(INEW)=0
      XFIRST(INEW)=XOLD
      YFIRST(INEW)=YOLD
C**DUA? ?? TRACKER:TRACURV2AZMM FOR;7
      RDOTFIRST(INEW)=A(IA,JS,I)
      TIMEFIRST(INEW)=T-(IA*TAU)

NUM_UPDATE(INEW) = 0

IRDOT_FLAG(INEW) = 0
      MANEUVER_FLAG(INEW) = 0
      M(INEW)=5
      MAX(INEW)=10
      ALERT_FLAG(INEW) = 0
      NCOAST(INEW) = 0
      WEIGHT_R(INEW) = 0.4
      WEIGHT_RDOT(INEW) = 0.4
      WEIGHT_POS(INEW) = 0.23344
      WEIGHT_POSDOT(INEW) = 0.04458

C
852   FORMAT(1X,4F18.3)
      ICTN(INEW)=0
      ITOTAL=ITOTAL+1
      ICTR(INEW)=ITOTAL
      AZOR=A(O,2,JJ)-A(O,5,JJ)
      IF(AZOR.GT.TWOPI)AZOR=AZOR-TWOPI
      IF(AZOR.LT.O.)AZOR=AZOR+TWOPI
      IF(A(IA,13,I).NE.0)THEN
       A(IA,7,I)=-A(IA,7,I)
      ENDIF
      IF (A(O,13,JJ).NE.0)THEN
       A(O,7,JJ)=-A(O,7,JJ)
      ENDIF
      IF(IET.NE.1)GO TO 531
      AZORIA=A(IA,2,I)-A(IA,5,I)
      IF(AZORIA.GT.TWOPI)AZORIA=AZORIA-TWOPI
      IF(AZORIA.LT.O.)AZORIA=AZORIA+TWOPI
      CALL OUTPUT(ISCAN-1,ICTN(INEW),ICTR(INEW),ITRKNUM(INEW),
     &ITSTAT(INEW),1,A(O,1,JJ),A(O,2,JJ),AZOR,A(O,IS,JJ),
     &A(O,7,JJ),0,0,
     &ITYPA(O,JJ),INT(A(O,8,JJ)),INT(A(O,9,JJ)),
     &INT(A(O,10,JJ)),INT(A(O,11,JJ)),0.,0.,
     &0.,0.,0.,A(O,15,JJ),A(O,18,JJ),A(O,19,JJ),A(O,20,JJ),
     &A(O,21,JJ),A(O,22,JJ),KMODA(O,JJ),0.,0.,0.,0.,0,DMRAWA(O,JJ),
     &A(O,13,JJ),A(O,14,JJ),0,0)
      CALL OUTPUT(ISCAN-1-IA,ICTN(INEW),ICTR(INEW),ITRKNUM(INEW),
     &ITSTAT(INEW),1,A(IA,1,I),A(IA,2,I),AZORIA,
     &A(IA,JS,I),A(IA,7,I),0,0,
     &ITYPA(IA,I),INT(A(IA,8,I)),INT(A(IA,9,I)),
     &INT(A(IA,10,I)),INT(A(IA,11,I)),0.,0.,
     &0.,0.,0.,A(IA,15,I),A(IA,18,I),A(IA,19,I),A(IA,20,I)
     &,A(IA,21,I),A(IA,22,I),KMODA(IA,I),0.,0.,0.,0.,0,DMRAWA(IA,I),
     &A(IA,13,I),A(IA,14,I),0,0)
```

```
531     CONTINUE
        CALL AZORT(NTRK)
        IF(IDSR23.EQ.1)GO TO 529
        IF(A(0,4,JJ).EQ.A(IA,4,I))GO TO 529
        IF(A(0,4,JJ).EQ.2.AND.A(IA,4,I).EQ.3)GO TO 532
        IF(ICOR(IA,I).EQ.2)GO TO 529
        ICOR(IA,I)=2
        DO 700 IDEC=1,3
_$1$DUA3 [SSP.TRACKER]TRACORV2AZMM.FOR;7

IF(I-IDEC.EQ.0)GO TO 710
        IF(NODOP.EQ.1)GO TO 527
        IF(A(IA,12,I-IDEC).NE.A(IA,12,I).OR.A(IA,2,I-IDEC).NE.A(IA,2,I))
       &GO TO 710
        GO TO 530
527     CONTINUE
        IF(A(IA,2,I-IDEC).NE.A(IA,2,I))GO TO 710
530     CONTINUE
        A(IA,4,I-IDEC)=0
        NEL(IA)=NEL(IA)+1
700     CONTINUE
        GO TO 529
710     CONTINUE
        DO 711 IINC=1,3
        IF(I+IINC.EQ.1+NUMUP(ISCAN))GO TO 529
        IF(NODOP.EQ.1)GO TO 1527
        IF(A(IA,12,I+IINC).NE.A(IA,12,I).OR.A(IA,2,I+IINC).NE.A(IA,2,I))
       &GO TO 529
        GO TO 1530
1527    CONTINUE
        IF(A(IA,2,I+IINC).NE.A(IA,2,I))GO TO 529
1530    CONTINUE
        A(IA,4,I+IINC)=0
        NEL(IA)=NEL(IA)+1
711     CONTINUE
        GO TO 529
532     CONTINUE
        IF(ICOR(0,JJ).EQ.2)GO TO 529
        ICOR(0,JJ)=2
        DO 701 IDEC=1,3
        IF(JJ-IDEC.EQ.0)GO TO 712
        IF(NODOP.EQ.1)GO TO 533
        IF(A(0,12,JJ-IDEC).NE.A(0,12,JJ).OR.A(0,2,JJ-IDEC).NE.A(0,2,JJ))
       &GO TO 712
        GO TO 537
533     CONTINUE
        IF(A(0,2,JJ-IDEC).NE.A(0,2,JJ))GO TO 712
537     CONTINUE
        A(0,4,JJ-IDEC)=0
        NEL(0)=NEL(0)+1
701     CONTINUE
        GO TO 529
712     CONTINUE
        DO 713 IINC=1,3
        IF(JJ+IINC.EQ.1+NUMUP(ISCAN))GO TO 529
        IF(NODOP.EQ.1)GO TO 1533
        IF(A(0,12,JJ+IINC).NE.A(0,12,JJ).OR.A(0,2,JJ+IINC).NE.A(0,2,JJ))
       &GO TO 529
        GO TO 1537
1533    CONTINUE
        IF(A(0,2,JJ+IINC).NE.A(0,2,JJ))GO TO 529
1537    CONTINUE
        A(0,4,JJ+IINC)=0
        NEL(0)=NEL(0)+1
713     CONTINUE
529     CONTINUE
        IF(IELRPT.NE.1)GO TO 562
        A(0,4,JJ)=0
_$1$DUA3 [SSP.TRACKER]TRACORV2AZMM.FOR;7

A(IA,4,I)=0
        NPCOR(0)=NPCOR(0)+1
        NPCOR(IA)=NPCOR(IA)+1
        GO TO 536
562     CONTINUE
        IF(ICOR(0,JJ).GE.1)GO TO 563
        ICOR(0,JJ)=1
563     CONTINUE
        IF(ICOR(IA,I).GE.1)GO TO 553
        ICOR(IA,I)=1
553     CONTINUE
534     CONTINUE
536     CONTINUE
        IF(IELRPT.EQ.1)GO TO 560
        DO 542 JJ=1,NUMUP(ISCAN)
        IF(A(0,4,JJ).EQ.0)GO TO 542
        IF(ICOR(0,JJ).EQ.0)GO TO 542
        NPCOR(0)=NPCOR(0)+1
        A(0,4,JJ)=0
542     CONTINUE
        DO 560 I=1,L(IA)
        IF(A(IA,4,I).EQ.0)GO TO 560
        IF(ICOR(IA,I).EQ.0)GO TO 560
        NPCOR(IA)=NPCOR(IA)+1
```

```
              A(IA,4,I)=0
560    CONTINUE
4444   CONTINUE
C----------------------------------------------------------------
630    CONTINUE
       IF(ISCAN.EQ.1)GO TO 632
       INA=IOP
       IF(ISCAN.LT.IOP)INA=ISCAN
       DO 632 IA=INA,2,-1
       L(IA)=L(IA-1)-NPCOR(IA-1)-NEL(IA-1)
       IF(T.LT.TRF)GO TO 631
       IF(AZM(JJ).LT.(AZCORMIN9/RAD).OR.AZM(JJ).GT.AZCORMAX/RAD)GO TO 631
       WRITE(31,858)L(IA),IA
858    FORMAT(/1X,I5,24H  REPORTS SAVED IN ARRAY,I2)
631    CONTINUE
       I=0
       DO 632 JJ=1,L(IA-1)
       IF(A(IA-1,4,JJ).EQ.0)GO TO 632
       I=I+1
       DO 628 KND=1,23,1
       A(IA,KND,I)=A(IA-1,KND,JJ)
628    CONTINUE
       ITYPA(IA,I)=ITYPA(IA-1,JJ)
       KMODA(IA,I)=KMODA(IA-1,JJ)
       DMRAWA(IA,I)=DMRAWA(IA-1,JJ)
       IF(T.LT.TRF)GO TO 632
       IF(AZM(JJ).LT.AZCORMIN/RAD.OR.AZM(JJ).GT.AZCORMAX/RAD)GO TO 632
       WRITE(31,851)I,INT(A(IA,3,I)),A(IA,1,I),A(IA,2,I)*RAD,
      %A(IA,12,I)*3600.,A(IA,13,I)*3600,A(IA,14,I)*3600.,
      %A(IA,15,I)*3600.,INT(A(IA,4,I))
632    CONTINUE
       NUC23=0
       IF(ISCH.NE.2)GO TO 636       !IN SCHEME 2 2/3'S NOT MOVED
       DO 636 JJ=1,NUMUP(ISCAN)     !FROM A0 TO A1
_*1*DUA3  :: F [RACKER]TRACORV2A4MM.FOR;7

IF(A(0,4,JJ).NE.2)GO TO 636
       IF(ICOR(0,JJ).GE.1)GO TO 636
       NUC23=NUC23+1
       A(0,4,JJ)=0
634    CONTINUE
       L(1)=NUMUP(ISCAN)-NPCOR(0)-NEL(0)-NUC23
       IF(T.LT.TRF)GO TO 635
       IF(AZM(JJ).LT.AZCORMIN/RAD.OR.AZM(JJ).GT.AZCORMAX/RAD)GO TO 635
       WRITE(31,858)L(1),1
635    CONTINUE
       I=0
       DO 634 JJ=1,NUMUP(ISCAN)
C      IF(JJ.GT.5000.)PRINT*,A(0,4,JJ),JJ,NUMUP(ISCAN)
       IF(A(0,4,JJ).EQ.0)GO TO 634
       I=I+1
       DO 629 KND=1,23,1
       A(1,KND,I)=A(0,KND,JJ)
629    CONTINUE
       ITYPA(1,I)=ITYPA(0,JJ)
       KMODA(1,I)=KMODA(0,JJ)
       DMRAWA(1,I)=DMRAWA(0,JJ)
       IF(T.LT.TRF)GO TO 634
       IF(AZM(JJ).LT.AZCORMIN/RAD.OR.AZM(JJ).GT.AZCORMAX/RAD)GO TO 634
       WRITE(31,851)I,INT(A(1,3,I)),A(1,1,I),A(1,2,I)*RAD,
      %A(1,12,I)*3600.,A(1,13,I)*3600.,A(1,14,I)*3600.,
      %A(1,15,I)*3600.,INT(A(1,4,I))
634    CONTINUE
       NTM=T
       NTC=NTC-NTD+NTOOR
       NEC=NEC-NED+NEOOR
       NTT=NTI+NTC+NTU-NFT
       NET=NFT+NEU+NEC
       NTO=NET+NTT
       WRITE(20,844)NTM,N33,N22,N23,NUMUP(ISCAN),L(1),
      %L(2),L(3),L(4),L(5),L(6),
      %NTT,NTI,NTU,NTC,NTD,NET,NFT,NEU,NEC,NED,NTO
844    FORMAT(/I4,10I5,1I14)
5281   RETURN
       END
```

I claim as my invention:

1. A method of processing detected signals from a pulse Doppler radar system for automatically tracking targets, wherein said system has a directional antenna that scans in azimuth repetitively collecting return signals from respective targets during successive scans of the antenna, said method comprising:

determining the range and Doppler shift of each return signal exceeding a selected threshold level during each dwell of the antenna to constitute a detected signal;

correlating detected signals on successive dwells of the antenna;

forming candidate target reports having an unambiguous range and ambiguous ranges in accordance with the number of correlated detected signals;

selecting target reports from the candidate target reports, said target reports selected having an amplitude sum of correlated signals meeting a criterion corresponding to a predetermined beam-shaped modulation; and tracking the movement of selected unambiguous and ambiguous range target reports during successive scans of the antenna.

2. A method according to claim 1 wherein the step of forming candidate target reports includes forming said reports from the correlation of detected signals on each of three out of three modulation periods, two out of two modulation periods, and two out of three modulation periods.

3. A method according to claim 1 wherein the step of forming the candidate target reports includes the substeps of:

forming candidate target reports having a plurality of ambiguous ranges from the correlation of detected signals on two out of three and two out of two modulation periods; and forming candidate target reports having an unambiguous range from the correlation of detected signals on three out of three modulation periods.

4. A method according to claim 1 wherein the step of selecting candidate target reports includes:

rejecting two out of three correlations at times when the intervening modulation period is not range gate eclipsed; and rejecting two out of two correlations at times when an adjacent modulation is not range gate eclipsed and the sum of the amplitudes fail to meet a predetermined criterion.

5. A method of processing signals for a pulse Doppler surveillance radar system, comprising:

determining the range and Doppler shift of each return signal exceeding a selected threshold level during each dwell of the antenna;

correlating successive detected signals from different PRF's to form categories of target reports, said categories including a (3/3) category of candidate target reports formed by three consecutive detected signals, a (2/2) category of candidate target reports formed by two consecutive detected signals, a (2/3) category of candidate target reports formed by two detected signals out of three dwells of the antenna, said (2/2) and (2/3) categories of candidate target reports having up to four ambiguous ranges;

linking selected combinations of said categories of candidate target reports having the same range and Doppler in accordance with the number of missed detections in successive modulation periods between each candidate target report, the selected combination of target links including the extension of said categories in accordance with the difference between the number of modulation periods from the beginning of a first report (M) to the beginning of the next report (N) in accordance with the formula N-M as follows:

| Extensions | Modulation Periods Between Report Types |
|---|---|
| (3/3) to (3/3) | 1 |
| (3/3) to (2/3) | 1 |
| (2/3) to (3/3) | 2 |
| (2/3) to (2/2) | 1 |
| (2/3) to (2/3) | 2 |
| (2/2) to (2/3) | 2 |
| (2/2) to (2/2) | 4 | and resolving in azimuth closely spaced targets in accordance with said linked combinations.

6. A method according to claim 5 further comprising, determining the number of individual target reports, including the substeps of:

outputting one target report for two to five successive detected returns;

outputting two target reports for eight consecutive detected returns; and outputting selectively either one target report or two target reports for successive detected returns less than eight and greater than five as a function of the amplitude of the return.

7. A method according to claim 6 wherein the substep of outputting selectively either one or two target reports, comprises:

outputting two target reports for six consecutive detections at times when the second successive detection has an amplitude greater than the third successive detection amplitude by a preselected ratio, and the fifth successive detection has an amplitude greater than the fourth successive detection, and the ratio of the second detection to the fourth detection is within a preselected range.

8. A method according to claim 6 wherein the substep of outputting selectively either one or two target reports, comprises:

outputting two target reports for seven consecutive detections at times when the second detection has an amplitude greater than the amplitude of the third successive detection by a pre-selected ratio, and the sixth detection has an amplitude greater than the fourth successive detection by a preselected ratio and the fourth successive detection has an amplitude less than the fifth successive detection.

9. A method according to claim 6 wherein the substep of outputting selectively either one or two target reports, comprises:

outputting two target reports for seven consecutive detections at times when the sixth successive detection has an amplitude greater than the fifth detection amplitude by a preselected ratio and the second detection has an amplitude greater than the fourth successive detection by a selected ratio and the amplitude of the fourth detection is less than the amplitude of the third detection.

10. A method of processing detected signals from a pulse Doppler radar system for automatically tracking targets wherein said system has a directional antenna that scans in azimuth repetitively collecting return signals from respective targets during successive scans of the antenna, said method comprising:

determining the range and Doppler shift of each return signal exceeding a selected threshold level using successive PRF detected signals to form candidate target reports;

identifying candidate target reports having the same Doppler and either ambiguous or unambiguous ranges within one range gate of each other; and rejecting one of said identified candidate target reports in accordance with a predetermined criterion to reject range ghosts occurring as a result of multiple detections at the same Doppler, said rejecting step including the substeps of comparing unambiguous target reports to determine adjacent range gates of individual detections;

and eliminating ambiguous target reports occupying identical range gates at times when an unambiguous pair of target reports has consecutive detections in adjacent range gates.

11. A method according to claim 10 wherein the step of rejecting further includes the substeps of:
comparing unambiguous target reports to determine the occurrence of three unambiguous target reports with at least two detections in adjacent range gates; and
eliminating unambiguous and ambiguous target reports having at least two detections occupying identical range gates of said (3/3) unambiguous target report having detections in adjacent range gates.

12. A method according to claim 10 wherein the step of rejecting further includes the substeps of:
comparing ambiguous target reports to determine the occurrence of pairs of ambiguous target reports occupying adjacent range gates;
eliminating single ambiguous target reports occupying the same range as one of said adjacent pairs.

13. A method of automatically tracking detected targets in a pulse Doppler surveillance radar having a directional antenna that scans in azimuth for detecting targets during successive scans, said method comprising the steps of:
comparing uncorrelated ambiguous and unambiguous target reports from a current scan of the antenna with uncorrelated target reports formed during preceding scans of the antenna to initiate a tentative track in response to a correlation of said reports;
comparing said target reports from the current scan of the antenna with tentative tracks initiated during preceding scans of the antenna to form an established track in response to correlation of a target report with a tentative track; and
eliminating tentative tracks failing to correlate with a target report within a selected azimuth zone after a selected number of scans of the antenna, said eliminating step including the substeps of eliminating a tentative track failing to correlate with a target report having an unambiguous range after a first selected number of scans at times when said track is initiated by a pair of target reports having ambiguous ranges; and
eliminating a tentative track failing to correlate with an ambiguous range target report after a second selected number of scans less than said first selected number at times when said tentative track is initiated by ambiguous range target reports.

14. A method of tracking targets according to claim 13 further comprising:
storing uncorrelated target reports for a selected number of scans of the antenna; and
determining the size of an azimuth zone for each uncorrelated report as a function of the number of antenna scans the report is stored.

15. A method of tracking targets according to claim 13 further comprising:
correlating ambiguous and unambiguous range, range rate, and azimuth of target reports;
comparing the actual range change with range prediction based on range rate and the time difference of the target reports being correlated; and
rejecting initiation of a tentative track at times when the actual range change and predicted range change of the current and preceding reports are outside of a selected distance of the target reports.

16. A method of tracking targets according to claim 13 further comprising:
predicting during a current scan of the antenna, the coordinates of a target report for the subsequent scan for correctly assigning the target report to a track during said subsequent scan, said step of predicting including the substep of:
adaptively weighting the range, range rate, X and Y coordinate driving errors as a function of the operation of a target during the current scan where the driving errors are formed by subtracting the predicted values for the current scan from the actual values obtained from the target report during said current scan.

17. A method of tracking targets in a pulse Doppler radar surveillance system having a directional antenna that scans in azimuth for collecting return signals from respective targets during successive scans, said method comprising the steps of:
detecting for each range the Doppler of each detected signal having a selected threshold level;
correlating for each range the Doppler of successive detected signals during each scan of the antenna;
correlating successive detected returns to provide candidate target reports having ambiguous and unambiguous ranges;
processing candidate target reports to provide selected target reports meeting a preselected criterion for outputting both ambiguous and unambiguous range type target reports;
processing in selected azimuth zones successively output target reports of both range types during a current scan of the antenna and output target reports formed during preceding scans of the antenna for initiating tentative tracks;
associating tentatively in said azimuth zones output target reports produced during a current scan with tracks initiated during a preceding scan;
selecting a tentative association to provide a firm track correlation, said step of selecting including the substep of prioritizing the output target reports for a respective tentative track at times when more than one target output report is tentatively associated with such track;
predicting the coordinates of an output target report for a respective track in a succeeding scan in accordance with selected weight values of the range, range rate, X coordinate and Y coordinate driving errors of the output target report selected for the firm correlation of such track on the current scan, said step of predicting in accordance with selected weight values including the substeps of storing a plurality of non-maneuvering weight values, each corresponding to range, range rate, position and velocity for tracking a target in the smoothing mode;
storing a plurality of maneuver weight values, each corresponding to range, range rate, position and velocity for tracking a target in the maneuver mode;

checking during each current scan of the antenna the mode utilized in predicting the coordinates of the target report for a respective track in a preceding scan of the antenna;

comparing to respective first distinct values during each scan of the antenna the computed driving error values for each output target report having the non-maneuver weight values utilized in predicting the coordinates;

comparing to respective second distinct values during each scan of the antenna the computed driving error values for each output target report having the maneuver weight values utilized in predicting the coordinates;

using maneuver weight values in predicting coordinates for target reports having at least one driving error exceeding said first distinct values for at least two successive scans of the antenna, and exceeding said second distinct values subsequent to said two successive scans, and having all driving error values less than said second distinct values for a selected number of successive scans of the antenna; and selecting the weight values in accordance with the weight values used on the preceding scan and the driving errors of the firmly correlated target report on the current scan of the antenna.

18. A method of tracking according to claim 17 wherein the step of selecting weight values comprises the further substep of:

comparing to third distinct values during each scan of the antenna the computed driving error values for each output target report having the maneuver weight values utilized in predicting coordinates and having driving error values less than said second distinct values for a selected number of successive scans of the antenna;

changing from the maneuver weight values to the smooth weight values for targets having driving error values less tha the third distinct values upon the expiration of said selected number of scans of the antenna; and delaying the changing from the maneuver weight to the smooth weight values for an additional scan succeeding said selected number for target reports having at least one driving error value greater than a respective said third distinctive value and during successive scans of the antenna subsequent to said selected number of scans.

19. A method of tracking targets according to claim 18 wherein the selected number of successive scans for utilizing maneuver weight values in predicting coordinates is comprised of a function of the magnitude of the driving error relative to said first distinct values for target reports having non-maneuver weight values used in predicting the coordinates, and wherein the predicted coordinates made with non-maneuver weights on the scan preceding the one where the maneuver weights are selected are corrected to predicted coordinates made with maneuver weights, and wherein the driving errors for the scan where the maneuver weights are selected are recomputed using these corrected predicted coordinates.

20. A method of tracking targets according to claim 19 wherein the first distinct values are each a multiple of a statistical value corresponding to random errors in a given type driving error for non-maneuver mode target reports and the second and third distinct values are each a different multiple of a statistical value corresponding to random errors in a given type driving error for maneuver mode target reports.

21. A method of tracking targets in a surveillance radar system having a scanning antenna, said method comprising:

sampling values of range, range rate, and azimuth angle for each target during successive scans of the antenna;

storing a plurality of non-maneuver weight values, each corresponding to range, range rate, position, and velocity for tracking a target in a non-maneuver mode;

storing a plurality of maneuver weight values, each corresponding to range, range rate, position, and velocity for tracking a target in a maneuver mode;

computing a driving error value for each of the sampled target values during a current scan of the antenna by subtracting corresponding predicted target values for the current scan from said respective sampled target values;

computing a predicted value for each of the sampled target values for a succeeding scan of the antenna by adding to a corresponding predicted value for a current scan of the antenna, the product of the computed driving error value and a corresponding weight value selected from one of said non-maneuver and maneuver plurality of stored weight values;

selecting one of said non-maneuver and maneuver plurality of weight values for multiplying with a driving error value during a current scan of the antenna in accordance with the weight values used on the preceding scan and the magnitude of the computed driving error values during the current scan of the antenna, said selecting step including the substeps of checking during each current scan of the antenna the selected one of the non-maneuver and maneuver plurality of weight values utilized in computing the predicted target values during a preceding scan;

comparing during the current scan of the antenna the computed driving error values for each target to respective first distinct predetermined values at times when the non-maneuver plurality of weight values are utilized in computing the predicted target values;

and changing the weight values from the non-maneuver plurality to the maneuver plurality in computing the predicted target values of respective target for the succeeding scan at times when the driving error values of said target for said preceding scan and the current scan of the antenna are both of a predetermined comparison to said respective first distinct predetermined values; and tracking non-maneuvering and maneuvering targets during successive scans of the antenna in accordance with the correlation of the sampled target values and the corresponding computed predicted target values.

22. A method of tracking targets according to claim 21 wherein the step of selecting the maneuver plurality of weight values further comprises the substeps of:

determining the magnitude of the driving error value relative to a distinct predetermined value for a respective target corresponding to said predetermined comparison:

selecting the number of subsequent consecutive scans of the antenna for using the maneuver plurality of weight values in predicting target values for said target in accordance with the determined relative magnitude;

correcting the predicted target values made on a preceding scan with the use of non-maneuver weights to predicted values made with the maneuver weights; and recomputing the driving errors for the current scan in accordance with the corrected predicted target values.

23. A method of tracking targets according to claim 21 wherein the step of selecting one of the non-maneuver and maneuver plurality of weight values comprises the substeps of:

checking during each current scan of the antenna the selected one of the non-maneuver and maneuver plurality of weight values used in computing the predicted target values during a preceding scan;

comparing to second distinct predetermined values, driving error values of each target having the maneuver plurality of weight values used in computing its predicted values during the preceding scan of the antenna;

increasing the number of subsequent scans of the antenna a selected number of scans to a predetermined number for using the maneuver plurality of weight values in predicting target values for said target with any driving error magnitude greater than respective second distinct predetermined values;

decreasing the number of subsequent scans of the antenna a selected number of scans for using the maneuver plurality of weight values in predicting target values for said target with all driving error magnitudes less than respective second distinct predetermined values;

comparing the driving error values with third distinct values during the final of said selected number of scans for using the maneuver plurality of weight values;

selecting the non-maneuver plurality of weight values for computing the predicted target values of said target having all driving error magnitudes less than said third distinct values; and delaying the selection of the smooth pluraltity of weight values to a succeeding scan of the antenna for a target having any driving error magnitude greater than said third distinct values.

24. A method of tracking targets according to claim 21 wherein the first distinct values are each a multiple of a statistical value corresponding to random errors in a given type driving error for non-maneuver mode targets and the second and third distinct values are each a different multiple of a statistical value corresponding to random errors in a given type driving error for maneuver mode targets.

* * * * *